US009602974B2

United States Patent
Rudow et al.

(10) Patent No.: US 9,602,974 B2
(45) Date of Patent: Mar. 21, 2017

(54) DEAD RECONING SYSTEM BASED ON LOCALLY MEASURED MOVEMENT

(71) Applicant: Trimble Navigation Limited, Sunnyvale, CA (US)

(72) Inventors: Richard Rudow, Mesa, AZ (US); Robert Wold, Pheonix, AZ (US); Venkateswaran Kasirajan, Tamil Nadu (IN); Nicholas C. Talbot, Ashburton (AU); Peter Van Wyck Loomis, Sunnyvale, CA (US); Shawn D. Weisenburger, Denver, CO (US); James M. Janky, Los Altos, CA (US)

(73) Assignee: Trimble Inc., Sunnyvale, CA (US)

( * ) Notice: Subject to any disclaimer, the term of this patent is extended or adjusted under 35 U.S.C. 154(b) by 382 days.

(21) Appl. No.: 14/268,993

(22) Filed: May 2, 2014

(65) Prior Publication Data
US 2014/0378170 A1    Dec. 25, 2014

Related U.S. Application Data

(63) Continuation-in-part of application No. 14/035,884, filed on Sep. 24, 2013, now Pat. No. 9,369,843, and (Continued)

(51) Int. Cl.
*H04W 4/02* (2009.01)
*G01S 19/09* (2010.01)
(Continued)

(52) U.S. Cl.
CPC ............ *H04W 4/028* (2013.01); *G01S 5/16* (2013.01); *G01S 19/09* (2013.01); *G01S 19/13* (2013.01);
(Continued)

(58) Field of Classification Search
CPC ....... H04W 4/02; H04W 4/025; H04W 4/027; H04W 4/028; G01S 5/16; G01S 19/01;
(Continued)

(56) References Cited

U.S. PATENT DOCUMENTS

| 5,043,736 A | 8/1991 | Darnell et al. |
| 5,225,842 A | 7/1993 | Brown et al. |

(Continued)

FOREIGN PATENT DOCUMENTS

| EP | 0508405 | 10/1992 |
| EP | 1729145 A1 | 12/2006 |

(Continued)

OTHER PUBLICATIONS

"PCT/US2013/078125 International Search Report and Written Opinion", Apr. 23, 2014, 25 pages.
(Continued)

*Primary Examiner* — Bernarr Gregory
(74) *Attorney, Agent, or Firm* — Kilpatrick Townsend & Stockton LLP

(57) ABSTRACT

A Global Navigation Satellite System (GNSS) chipset embedded within the cellular device is accessed. The GNSS chipset calculates raw pseudoranges. The raw pseudoranges are extracted from the GNSS chipset for processing elsewhere in the cellular device outside of the GNSS chipset. A position fix is calculated based on the raw pseudoranges. At a first point in time, a first image, and at a second point in time, a second image are obtained with an image capturing device that is in a known physical relationship with the cellular device. An estimate of a distance that the cellular device moved from the first point in time to the second point in time is calculated by processing image data collected
(Continued)

from the first point in time to the second point in time. The position fix is processed based on the estimate of the distance.

22 Claims, 64 Drawing Sheets

Related U.S. Application Data a continuation-in-part of application No. 13/842,447, filed on Mar. 15, 2013, application No. 14/268,993, filed on May 2, 2014, which is a continuation-in-part of application No. 13/954,995, filed on Jul. 31, 2013, now Pat. No. 9,177,384.

(60) Provisional application No. 61/746,916, filed on Dec. 28, 2012.

(51) Int. Cl.
| | | |
|---|---|---|
| G01S 19/13 | (2010.01) | |
| G01S 19/35 | (2010.01) | |
| G01S 19/48 | (2010.01) | |
| G01S 19/49 | (2010.01) | |
| G01S 5/16 | (2006.01) | |
| H04W 4/00 | (2009.01) | |
| G01S 19/00 | (2010.01) | |

(52) U.S. Cl.
CPC .............. *G01S 19/35* (2013.01); *G01S 19/48* (2013.01); *G01S 19/49* (2013.01); *H04W 4/027* (2013.01)

(58) Field of Classification Search
CPC .......... G01S 19/03; G01S 19/09; G01S 19/13; G01S 19/35; G01S 19/38; G01S 19/39; G01S 19/42; G01S 19/48; G01S 19/49; G01S 19/10; G01S 19/11; G01S 19/40; G01S 19/43; G01C 21/26; G01C 21/34; G01C 21/36; G01C 21/3605; G01C 21/3623
See application file for complete search history.

(56) References Cited

U.S. PATENT DOCUMENTS

| | | | |
|---|---|---|---|
| 5,345,244 A | 9/1994 | Gildea et al. | |
| 5,379,224 A | 1/1995 | Brown et al. | |
| 5,438,337 A | 8/1995 | Aguado | |
| 5,471,217 A | 11/1995 | Hatch et al. | |
| 5,477,228 A | 12/1995 | Tiwari et al. | |
| 5,523,761 A | 6/1996 | Gildea | |
| 5,594,454 A | 1/1997 | Devereux et al. | |
| 5,621,416 A | 4/1997 | Lennen | |
| 5,625,668 A | 4/1997 | Loomis et al. | |
| 5,740,048 A | 4/1998 | Abel et al. | |
| 5,805,108 A | 9/1998 | Lennen | |
| 5,825,327 A | 10/1998 | Krasner | |
| 5,841,396 A | 11/1998 | Krasner | |
| 5,862,501 A | 1/1999 | Talbot et al. | |
| 5,899,957 A | 5/1999 | Loomis | |
| 5,903,235 A | 5/1999 | Nichols | |
| 5,913,170 A | 6/1999 | Wortham | |
| 5,982,324 A | 11/1999 | Watters et al. | |
| 6,067,046 A | 5/2000 | Nichols | |
| 6,072,431 A | 6/2000 | Froeberg | |
| 6,087,983 A | 7/2000 | Ho et al. | |
| 6,111,538 A | 8/2000 | Schuchman et al. | |
| 6,122,506 A | 9/2000 | Lau et al. | |
| 6,128,501 A | 10/2000 | Ffoulkes-Jones | |
| 6,131,067 A | 10/2000 | Girerd et al. | |
| 6,204,808 B1 | 3/2001 | Bloebaum et al. | |
| 6,208,290 B1 | 3/2001 | Krasner | |
| 6,211,823 B1 | 4/2001 | Herring | |
| 6,222,483 B1 | 4/2001 | Twitchell et al. | |
| 6,236,359 B1 | 5/2001 | Watters et al. | |
| 6,246,960 B1 | 6/2001 | Lin | |
| 6,249,245 B1 | 6/2001 | Watters et al. | |
| 6,324,473 B1 | 11/2001 | Eschenbach | |
| 6,408,178 B1 | 6/2002 | Wickstrom et al. | |
| 6,429,808 B1 | 8/2002 | King et al. | |
| 6,430,416 B1 | 8/2002 | Loomis | |
| 6,430,503 B1 | 8/2002 | McBurney et al. | |
| 6,473,030 B1 | 10/2002 | McBurney et al. | |
| 6,487,500 B2* | 11/2002 | Lemelson | G01S 19/11 340/436 |
| 6,501,420 B2 | 12/2002 | Townsend et al. | |
| 6,507,738 B1 | 1/2003 | Allison et al. | |
| 6,510,387 B2 | 1/2003 | Fuchs et al. | |
| 6,564,144 B1 | 5/2003 | Cherveny | |
| 6,565,144 B1 | 5/2003 | Crean | |
| 6,590,525 B2 | 7/2003 | Yule et al. | |
| 6,853,909 B2 | 2/2005 | Scherzinger | |
| 6,901,260 B1 | 5/2005 | Xin et al. | |
| 6,928,292 B2 | 8/2005 | Tsunehara et al. | |
| 6,934,633 B1 | 8/2005 | Gallagher et al. | |
| 7,003,112 B1 | 2/2006 | Froeberg | |
| 7,043,364 B2 | 5/2006 | Scherzinger | |
| 7,151,489 B2 | 12/2006 | Pande et al. | |
| 7,191,097 B1 | 3/2007 | Lee et al. | |
| 7,295,156 B2 | 11/2007 | Van Wyck | |
| 7,362,265 B2 | 4/2008 | Weill | |
| 7,480,511 B2 | 1/2009 | O'Meagher | |
| 7,487,042 B2* | 2/2009 | Odamura | G01C 21/3623 701/420 |
| 7,541,974 B2 | 6/2009 | Scherzinger | |
| 7,570,204 B1 | 8/2009 | McGraw et al. | |
| 7,616,112 B2 | 11/2009 | Miller et al. | |
| 7,908,106 B2 | 3/2011 | Cho et al. | |
| 7,961,141 B2 | 6/2011 | Dai et al. | |
| 8,024,144 B2 | 9/2011 | Kludas et al. | |
| 8,032,152 B2 | 10/2011 | Manson et al. | |
| 8,044,852 B2 | 10/2011 | Green et al. | |
| 8,068,848 B2 | 11/2011 | Manson et al. | |
| 8,068,849 B2 | 11/2011 | Manson et al. | |
| 8,078,192 B2 | 12/2011 | Wirola et al. | |
| 8,081,987 B2 | 12/2011 | Manson et al. | |
| 8,081,988 B2 | 12/2011 | Manson et al. | |
| 8,081,989 B2 | 12/2011 | Manson et al. | |
| 8,085,196 B2 | 12/2011 | Whitehead | |
| 8,085,387 B2 | 12/2011 | Kludas et al. | |
| 8,095,149 B2 | 1/2012 | Manson et al. | |
| 8,134,497 B2 | 3/2012 | Janky et al. | |
| 8,136,545 B2 | 3/2012 | Jablonski | |
| 8,242,956 B2 | 8/2012 | Lamance et al. | |
| 8,339,311 B2 | 12/2012 | Walley et al. | |
| 8,368,875 B2 | 2/2013 | Kludas et al. | |
| 8,447,519 B2 | 5/2013 | Basnayake et al. | |
| 8,473,195 B2* | 6/2013 | Sambongi | G01S 19/40 701/408 |
| 8,699,409 B2 | 4/2014 | Aryan et al. | |
| 8,719,188 B2 | 5/2014 | Kuhn et al. | |
| 9,037,527 B2 | 5/2015 | Kuhn et al. | |
| 9,101,175 B2 | 8/2015 | Redpath et al. | |
| 2001/0017599 A1 | 8/2001 | Yule et al. | |
| 2002/0008661 A1 | 1/2002 | McCall et al. | |
| 2002/0072854 A1 | 6/2002 | Fuchs et al. | |
| 2002/0186180 A1 | 12/2002 | Duda | |
| 2003/0114984 A1 | 6/2003 | Scherzinger | |
| 2005/0017911 A1 | 1/2005 | Lee | |
| 2005/0064878 A1 | 3/2005 | O'Meagher | |
| 2005/0104774 A1 | 5/2005 | Pande et al. | |
| 2006/0146136 A1 | 7/2006 | Cho et al. | |
| 2007/0139262 A1 | 6/2007 | Scherzinger | |
| 2008/0263097 A1 | 10/2008 | Manson et al. | |
| 2008/0319664 A1 | 12/2008 | Kremin et al. | |
| 2009/0024325 A1 | 1/2009 | Scherzinger | |
| 2009/0083430 A1 | 3/2009 | Edge et al. | |
| 2009/0093959 A1 | 4/2009 | Scherzinger et al. | |
| 2009/0189804 A1 | 7/2009 | Ashjaee et al. | |
| 2009/0262016 A1 | 10/2009 | Wirola et al. | |

(56) References Cited

U.S. PATENT DOCUMENTS

| | | | |
|---|---|---|---|
| 2010/0057359 A1 | 3/2010 | Caballero et al. | |
| 2010/0079333 A1 | 4/2010 | Janky et al. | |
| 2010/0141510 A1 | 6/2010 | Dai et al. | |
| 2010/0164789 A1* | 7/2010 | Basnayake | G01S 19/43 342/357.23 |
| 2010/0231443 A1 | 9/2010 | Whitehead | |
| 2010/0260150 A1 | 10/2010 | Aryan et al. | |
| 2010/0312471 A1* | 12/2010 | Cheng | G01S 19/48 701/532 |
| 2010/0312475 A1* | 12/2010 | Cheng | G01S 19/48 701/469 |
| 2011/0018761 A1 | 1/2011 | Walley et al. | |
| 2011/0064312 A1 | 3/2011 | Janky et al. | |
| 2011/0163914 A1 | 7/2011 | Seymour et al. | |
| 2011/0187590 A1 | 8/2011 | Leandro | |
| 2011/0195687 A1 | 8/2011 | Das et al. | |
| 2011/0267230 A1 | 11/2011 | Lamance et al. | |
| 2011/0285587 A1 | 11/2011 | Vollath et al. | |
| 2012/0116676 A1 | 5/2012 | Basnayake et al. | |
| 2012/0163656 A1 | 6/2012 | Wang et al. | |
| 2012/0166137 A1 | 6/2012 | Grässer et al. | |
| 2012/0330601 A1 | 12/2012 | Soubra et al. | |
| 2013/0027246 A1 | 1/2013 | Hadef et al. | |
| 2013/0243250 A1 | 9/2013 | France et al. | |
| 2014/0081571 A1 | 3/2014 | Briggs et al. | |
| 2014/0184442 A1 | 7/2014 | Large et al. | |
| 2014/0187193 A1 | 7/2014 | Rudow et al. | |
| 2014/0240170 A1 | 8/2014 | Rudow et al. | |
| 2014/0253375 A1 | 9/2014 | Rudow et al. | |
| 2014/0292569 A1 | 10/2014 | Wallace et al. | |
| 2014/0292570 A1 | 10/2014 | Wallace et al. | |
| 2014/0375493 A1 | 12/2014 | Weisenburger et al. | |
| 2014/0378170 A1 | 12/2014 | Rudow et al. | |
| 2014/0378171 A1 | 12/2014 | Rudow et al. | |
| 2015/0009067 A1 | 1/2015 | Rudow et al. | |
| 2015/0043012 A1 | 2/2015 | Rudow et al. | |
| 2015/0045058 A1 | 2/2015 | Rudow et al. | |
| 2015/0045059 A1 | 2/2015 | Rudow et al. | |
| 2015/0050907 A1 | 2/2015 | Rudow et al. | |
| 2015/0057028 A1 | 2/2015 | Rudow et al. | |
| 2015/0289097 A1 | 10/2015 | Rudow et al. | |

FOREIGN PATENT DOCUMENTS

| | | |
|---|---|---|
| EP | 2275778 A1 | 1/2011 |
| EP | 2 722 647 A1 | 4/2014 |
| KR | 20110085744 | 7/2011 |
| KR | 101241171 B1 | 3/2013 |
| WO | 2005/045458 | 5/2005 |
| WO | 2008089792 A1 | 7/2008 |
| WO | 2009074654 A1 | 6/2009 |
| WO | 2011120141 A1 | 10/2011 |

OTHER PUBLICATIONS

Afzal, "Design Methodology for Dual Frequency Configurable GPD Receiver", ION GNSS 2010, Session E5, Portland, OR, Sep. 21-24, 2010, 9 pages.

Brown, "Tidget Mayday System for Motorists", Presented at IEEE Position Location and Navigation Symposium (PLANS) '94 Las Vegas, NV, Apr. 1994, 7 pages.

Rho, "Dual-Frequency GPS Precise Point Positioning with Wadgps Corrections", Department of Geodesy and Geomatics Engineering, University of new Brunswick, Fredericton, N.B. Canada, Sep. 13-16, 2005, 1470-1482.

"Spirit Level with bubble", https://play.google.com/storetapps/details?id=conn.zabaanapps.android.level, Mar. 25, 2014, 2 pages.

"Technical Tips from Inland GPS", Trimble TSC2—RTK over internet—establishing IP Connection, Jun. 14, 2011, 8 pages.

"Theodolite", Hunter Research & Technology, Mar. 24, 2014, 1 Page.

"Trimble S8 Total Station Datasheet", Trimble Navigation Limited, 2013, 4 Pages.

"Wireless RTK Bridge—Cellular User Guide", Revision 1.4, 2009, 47 pages.

Ike, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.

"Comparison of Photogrammetry Software", http://en.wikipedia.org/wiki/Comparison_of_photogrammetry_software, Jul. 8, 2015, 4 pages.

"Photogrammetry", http://en.wikipedia.org/wiki/Photogrammetry, Jun. 25, 2015, 5 pages.

"Pi Pelican Imaging: Life in 3D", http://www.pelicanimaging.com, 2015, 3 pages.

Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.

Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.

Hatch, "The Synergism of GPS Code and Carrier Measurements", Proceedings of the Third International Geodetic Symposium on Satellite Doppler Positioning, 1982, 1213-1232.

Landau, et al., "Virtual Reference Stations Versus Broadcast Solutions in Network Rtk", GNSS 2003, Graz, Austria, Apr. 2003, 15 pages.

Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.

"PCT/US2015/035328 International Search Report", Oct. 15, 2015, pp. 1-13.

"PCT/US2015/035346 International Search Report", Oct. 13, 2015, pp. 1-12.

Afzal, "Design Methodology for a Dual Frequency Configurable GPS Receiver", Proceedings of the 23rd nternational Technical Meeting of the Satellite Division of the Institute of Navigation (ION GNSS 2010), Sep. 24, 2010, pp. 2892-2900.

Guixens, et al., "System Aspects and Practical Results for Precise Car Navigation with Modern Civil Signals Using a Software Receiver", Proceedings of the 21st International Technical Meeting of the Satellite Division of the Institute of lavigation (ION GNSS 2008), Sep. 19, 2008, pp. 2280-2292.

Haak, "A Multi-Purpose Software Gnss Receiver for Automotive Applications", Proceedings of the 23rd International Technical Meeting of the Satellite Division of the Institute of Navigation (ION GNSS 2010), Sep. 24, 2010, pp. 1869-1874.

Ruegamer, et al., "A Flexible and Portable Multiband GNSS Front-end System", Proceedings of the 25th International Technical Meeting of the Satellite Division of the Institute of Navigation (ION GNSS 2012), Sep. 21, 2012, pp. 2378-2389.

International Search Report of the International Searching Authority for PCT Application No. PCT/US2015/028622 mailed Sep. 28, 2015, 6 pages.

International Written Opinion of the International Searching Authority for PCT Application No. PCT/US2015/028622 mailed Sep. 28, 2015, 13 pages.

International Search Report of the International Searching Authority for PCT Application No. PCT/US2015/052370 mailed Jan. 8, 2016, 6 pages.

International Written Opinion of the International Searching Authority for PCT Application No. PCT/US2015/052370 mailed Jan. 8, 2016, 7 pages.

Global Positioning System Standard Positioning Service Signal Specification, GPS NAVSTAR, 2nd edition, Jun. 2, 1995, 51 pages.

U.S. Appl. No. 14/134,437, Non-Final Office Action mailed on Feb. 23, 2016, 15 pages.

U.S. Appl. No. 14/134,437, Final Office Action mailed on Aug. 18, 2016, 14 pages.

U.S. Appl. No. 14/269,013, Ex Parte Quayle Action mailed on Aug. 24, 2016, 7 pages.

(56) References Cited

OTHER PUBLICATIONS

U.S. Appl. No. 14/134,437, Notice of Allowance mailed on Dec. 14, 2016, 8 pages.
U.S. Appl. No. 14/269,013, Non-Final Office Action mailed on Jan. 10, 2017, 11 pages.

* cited by examiner

DEAD RECONING SYSTEM BASED ON LOCALLY MEASURED MOVEMENT

CROSS-REFERENCE TO RELATED APPLICATIONS

Continuation in Part

This application claims priority and is a continuation-in-part application of U.S. patent application Ser. No. 14/035,884, filed on Sep. 24, 2013, now U.S. Pat. No. 9,369,843, entitled, "EXTRACTING PSEUDORANGE INFORMATION USING A CELLULAR DEVICE" by Rudow et al., and assigned to the assignee of the present application and to the extent not repeated herein; the contents of U.S. patent application Ser. No. 14/035,884, filed on Sep. 24, 2013 now U.S. Pat. No. 9,369,843, are hereby incorporated herein by reference.

U.S. patent application Ser. No. 14/035,884, filed on Sep. 24, 2013 now U.S. Pat. No. 9,369,843, claimed priority to and benefit of then U.S. Provisional Patent Application No. 61/746,916, filed on Dec. 28, 2012 entitled, "IMPROVED GPS/GNSS ACCURACY FOR A CELL PHONE" by Rudow et al., and assigned to the assignee of the present application; the contents of U.S. Provisional Patent Application No. 61/746,916 were incorporated by reference into U.S. patent application Ser. No. 14/035,884, filed on Sep. 24, 2013 now U.S. Pat. No. 9,369,843.

Application Ser. No. 14/035,884, filed on Sep. 24, 2013 now U.S. Pat. No. 9,369,843, also claimed priority to and is a continuation-in-part to the patent application Ser. No. 13/842,447, entitled "OBTAINING PSEUDORANGE INFORMATION USING A CELLULAR DEVICE," by Richard Rudow, with filing date Mar. 15, 2013, now U.S. Pat. No. 9,429,640, and assigned to the assignee of the present application, the disclosure of which was incorporated by reference into application Ser. No. 14/035,884.

This application is a continuation-in-part application of and claims the benefit of U.S. patent application Ser. No. 13/954,995 filed on Jul. 31, 2013, now U.S. Pat. No. 9,177,384, entitled "ROLLING SEQUENTIAL BUNDLE ADJUSTMENT," by Shawn D. Weisenburger, and assigned to the assignee of the present application; the contents of U.S. patent application Ser. No. 13/954,995, filed Jul. 31, 2013, now U.S. Pat. No. 9,177,384, are hereby incorporated by reference herein.

CROSS-REFERENCE TO RELATED APPLICATIONS

This application is related to U.S. patent application Ser. No. 14/268,965 filed on May 2, 2014, now U.S. Pat. No. 9,192,138, entitled "POSITION DETERMINATION OF A CELLULAR DEVICE USING CARRIER PHASE SMOOTHING" by Richard Rudow et al., and assigned to the assignee of the present application; the contents of which are hereby incorporated herein by reference in their entirety.

This application is related to co-pending U.S. patent application Ser. No. 14/134,437 filed on Dec. 19, 2013 entitled "GNSS RECEIVER POSITIONING SYSTEM" by Peter Large et al., and assigned to the assignee of the present application.

This application is related to co-pending U.S. patent application Ser. No. 14/268,998 filed on May 2, 2014 entitled "CONCURRENT DUAL PROCESSING OF PSEUDORANGES WITH CORRECTIONS" by Richard Rudow et al., and assigned to the assignee of the present application; the contents of which are hereby incorporated herein by reference in their entirety.

This application is related to co-pending U.S. patent application Ser. No. 14/269,013 filed on May 2, 2014 entitled "LOCALLY MEASURED MOVEMENT SMOOTHING OF POSITION FIXES BASED ON EXTRACTED PSEUDORANGES" by Richard Rudow et al., and assigned to the assignee of the present application; the contents of which are hereby incorporated herein by reference in their entirety.

This application is related to U.S. patent application Ser. No. 14/268,898 filed on May 2, 2014, now U.S. Pat. No. 9,488,898, entitled "LOCALLY MEASURED MOVEMENT SMOOTHING OF GNSS POSITION FIXES" by Shawn Weisenburger et al., and assigned to the assignee of the present application; the contents of which are hereby incorporated herein by reference in their entirety.

BACKGROUND

The Global Positioning System (GPS) and its extensions in the Global Navigation Satellite Systems (GNSS) have become thoroughly pervasive in all parts of human society, worldwide. GPS and GNSS receivers in the form of chipsets have become widely incorporated into cell phones and other types of cellular devices with cellular-based communications equipment.

Typically, cellular devices include highly integrated GNSS chipsets that are designed to work with the E-911 service primarily, and are not designed to provide anywhere near a full range of features and outputs. They do provide a position fix, but are not designed to make available very many other parameters of interest. All GNSS receivers must acquire, track and decode a data message that conveys information about the location of the satellites in space, and time information. The principal additional parameter obtained is the "pseudorange." However, conventionally, this set of data is not available as an output from the cellular device's GNSS chipsets for use by the cellular device itself. Conventionally, in circumstances where it is available, it is under access control by the vendor.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

DESCRIPTION OF EMBODIMENTS

Figure 1A:
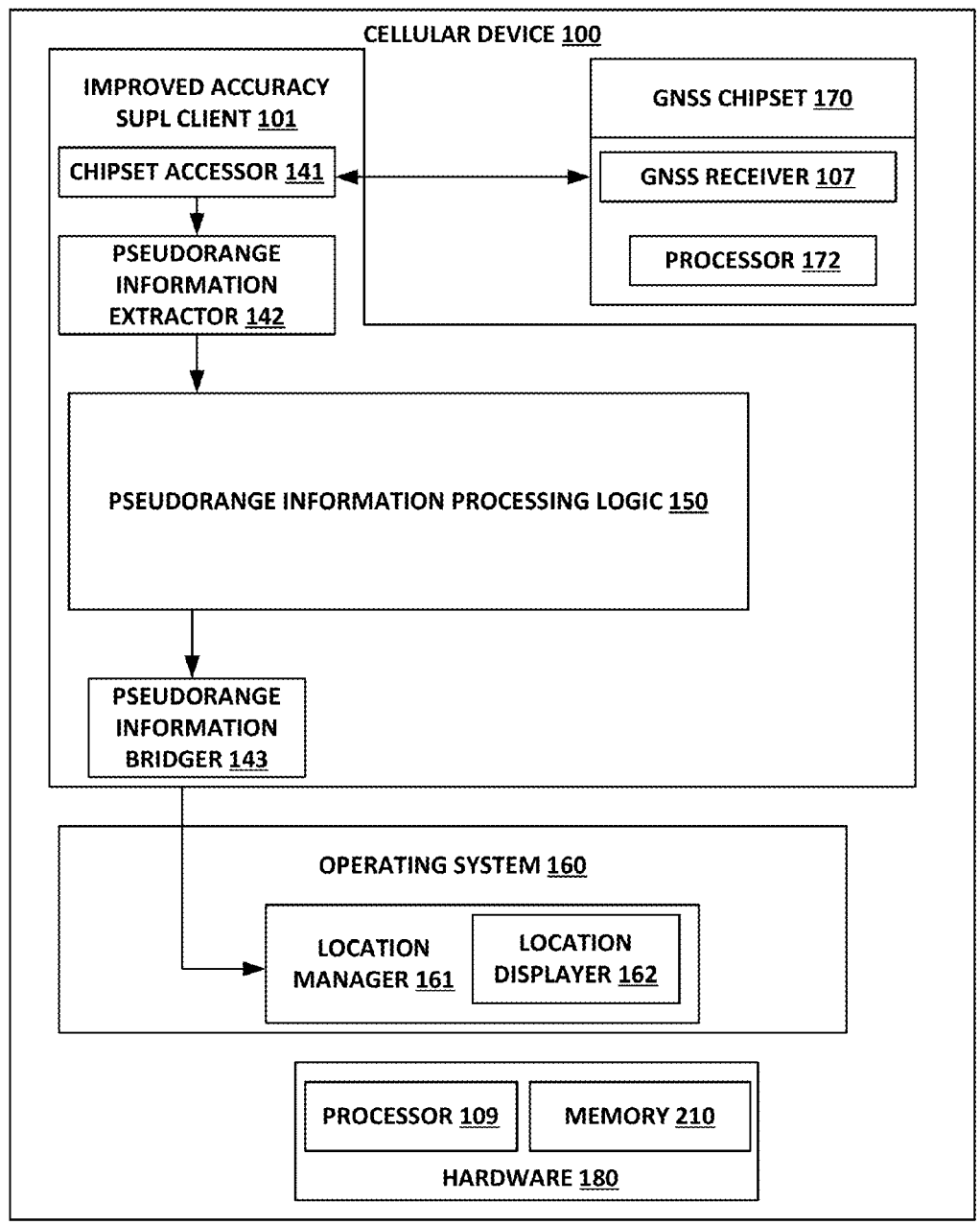
FIG. 1A depicts a block diagram of a cellular device for extracting pseudorange information, according to one embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "accessing," "calculating," "extracting," "using," "providing," "applying," "correcting," "smoothing," "reconstructing," "modeling," "improving," "adjusting," "filtering," "discarding," "removing," "processing," "determining," "selecting," "determining," "locating," "positioning," "increasing," "accessing," "differentiating," "integrating," "bridging," "displaying," "performing," "providing," "obtaining," "calculating," "receiving," "storing," "notifying," "matching," "creating," "generating," "communicating," "transmitting," "requesting," "providing," "activating," "deactivating," "initiating," "terminating," "interpolating," "changing," "replacing," "causing," "transforming data," "modifying data to transform the state of a computer system," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

I. Extracting Pseudorange Information Using a Cellular Device

Overview

Cellular devices, such as cell phones and non-voice enabled cellular devices, possesses pseudorange information that can be used in surveying and other positioning operations. Conventionally, however, the pseudorange information from cellular device chipsets are only available under a limited set of conditions, usually only when performing a E-911 service call, and then only for use by the Assisted GPS service located in conjunction with the E-911 service facility. Therefore, according to one embodiment, an embedded GNSS chipset is employed with in a cellular device, which: a) calculates pseudorange information for use by the GNSS chipset; and b) permits extraction of this pseudorange information by the cellular device in which it is embedded. As will be discussed, the pseudorange information from the GNSS chipset is extracted for use elsewhere in the cellular device outside of the GNSS chipset.

Examples of Systems for Extracting Pseudorange Information

FIG. 1A depicts a block diagram of a cellular device 100 for extracting pseudorange information, according to one embodiment. Examples of a cellular device 100 include a cell phone, a non-voice enabled cellular device, and a mobile hand-held GNSS receiver. The cellular device may be mobile or stationary. The cellular device may be hand-holdable or incorporated as a portion of a system which is not hand-holdable. In some embodiments, a cellular device, such as cellular device 100, may be utilized as a portion of a navigation system, security system, safety system, telematics device/box, or the like. In some embodiments, cellular device 100 may be utilized as sub-system of the vehicle mounted portion of a vehicle safety system, security system, and/or navigation system. The vehicle mounted portion of the OnStar® vehicle safety, vehicle security, and vehicle navigation system that is utilized in many vehicles is one non-limiting example of a system which may include cellular device 100.

As depicted in FIG. 1A, the cellular device 100 includes a GNSS chipset 170, a GNSS receiver 107, a processor 172 that is part of the GNSS receiver 107, a chipset accessor logic 141, a pseudorange information extractor logic 142, an improved accuracy Secure User Platform Location (SUPL) client 101, a pseudorange information bridger logic 143, a pseudorange information processing logic 150, an operating system 160, a location manager logic 161, a location displayer logic 162, hardware 180 that is outside of the GNSS receiver 107. According to one embodiment, the chipset accessor logic 141, the pseudorange information extractor logic 142, the pseudorange information processing logic 150, and the pseudorange information bridger logic 143 are a part of the improved accuracy SUPL client 101.

According to one embodiment, the hardware 180 includes a hardware processor 109 and memory 210. An example of a hardware processor 109 is a central processing unit. An example of hardware memory 210 is computer readable storage, such as, but not limited to, a disk, a compact disk (CD), a digital versatile device (DVD), random access memory (RAM) or read only memory (ROM). The hardware memory 210 is physical and, therefore, tangible, according to one embodiment. The hardware memory 210, according to another embodiment, is non-transitory.

According to one embodiment, the processor 172 and the GNSS receiver 107 are a part of the GNSS chipset 170. According to one embodiment, the chipset accessor logic 141, pseudorange information extractor logic 142, the pseudorange information bridger logic 143, the improved accuracy SUPL client 101, the operating system 160, and the processor 109 are located in a portion of the cellular device 100 that is outside of the GNSS chipset 170. The location manager logic 161 can be a part of the operating system 160 and external to the GNSS chipset 170. According to one embodiment, the location displayer logic 162 is a part of the location manager logic 161. According to one embodiment, the chipset accessor logic 141, pseudorange information extractor logic 142, the pseudorange information processing logic 150, pseudorange information bridger logic 143, and improved accuracy SUPL client 101 are application programming interfaces (API) function applications that reside in memory of the cellular device 100 and are executed by a processor 109 of the cellular device 100.

According to one embodiment, the GNSS receiver 107 is capable of receiving signals from GPS satellites, GLONASS satellites, or from a combination of satellites from different constellations. The GNSS receiver 107 can perform GPS measurements to derive raw measurement data for a position of the cellular device 100. The raw measurement data can provide an instant location of the cellular device 100. According to one embodiment, the raw measurement data is the pseudorange information that is extracted (also referred to as "extracted pseudorange information"). Examples of the extracted pseudorange information are uncorrected pseudorange information, observed pseudorange information, or unsmoothed pseudorange information, or a combination thereof. Conventionally, the raw measurement data is only for use by the GNSS chipset 170 and the GNSS chipset 170 calculates pseudorange information that is only for use by the GNSS chipset 170. Examples of pseudorange information are uncorrected pseudorange information, smoothed pseudoranges, and corrected pseudoranges. Examples of corrections used to improve accuracy of a position fix include differential GNSS corrections (DGPS), high precision GNSS satellite orbital data, GNSS satellite broadcast ephemeris data, and ionospheric and tropospheric error corrections and error projections based on location.

The GNSS chipset 170 has a processor 172 and, therefore, is capable of processing information, such as pseudorange information, itself. However, according to various embodiments, information that the GNSS chipset 170 has can be extracted from the GNSS chipset 170 and processed outside of the GNSS chipset 170 instead of by the GNSS chipset 170 using its own processor 172, in order to provide an improved accuracy position fix.

The chipset accessor logic 141 is configured for accessing the GNSS chipset 170. The pseudorange information extractor logic 142 is configured for extracting the pseudorange information from the accessed GNSS chipset 170. The extracted pseudorange information can be received and stored continuously. The pseudorange information bridger logic 143 is configured for bridging the pseudorange information from the GNSS chipset 170 to the location manager logic 161 that resides in the operating system 160 of the cellular device 100.

According to one embodiment, the chipset accessor logic 141, the pseudorange information extractor logic 142, the pseudorange information processing logic 150 and pseudorange information bridger logic 143 are a part of an improved accuracy SUPL client 101. For example, The SUPL client 101 can interface between the GNSS chipset 170 and the location manager logic 161, which resides in the operating system 160.

The pseudorange information can be obtained from the processor 172 of the GNSS receiver 107. The GNSS chipset 170 may be designed, for example, by the manufacturer of the GNSS chipset 170, to provide requested information, such as pseudorange information, in response to receiving the command. The pseudorange information may be extracted from the GNSS chipset 170 using the command that the manufacturer has designed the GNSS chipset 170 with. For example, according to one embodiment, the GNSS chipset 170 is accessed using an operation that is a session started with a message that is an improved accuracy Secure User Platform Location (SUPL) start message or a high precision SUPL INIT message. According to one embodiment, the message is a custom command that is specific to the GNSS chipset 170 (also referred to as "a GNSS chipset custom command") and by which the improved accuracy SUPL client 101 can gain access to the raw measurements of the GNSS chipset 170. Access may be controlled by the chipset manufacturer and a suitable key made available for use in the SUPL for obtaining access to the pseudoranges. A suitable key is an example of a "custom command."

A worker thread associated with the SUPL client 101 can monitor the raw measurements delivered by the GNSS chipset 170 into the GNSS chipset 170's memory buffers, cache the raw measurements and use the raw measurements to determine a position fix. The pseudorange information extractor logic 142 and the pseudorange information processing logic 150 can be associated with the worker thread. For example, the pseudorange information extractor logic 142 can cache the raw measurements and the pseudorange information processing logic 150 can determine the location.

According to one embodiment, a worker thread is a light weight process that executes a specific sequence of tasks in the background. The tasks can be of long term and/or at times periodic in nature. The worker thread can assist in helping the main thread, which may also be referred to as the main program or main task, with specific functions. Worker threads can be started when these functions of the sequence of tasks are to be executed. A worker thread can remain in the active state as long as its respective functions are being executed. A worker thread may terminate itself, when it completes its functions or when it reaches a point where it can no longer continue to function, for example, due to an irrecoverable error. A worker thread can post its status to the main thread when it ends. Examples of posted status are completion or termination. A worker thread may also post to the main thread the level of progress of its functions periodically. At a given point in time, there may be many such worker threads in progress at the same time. Worker threads may maintain some sort of synchronization amongst themselves depending upon the tasks they are intended for. The main thread may terminate a worker thread, for example, when the functions of that worker thread are no longer needed or due to other execution changes in the system.

According to one embodiment, the cellular device 100 can improve the accuracy of the extracted pseudorange information. For example, the pseudorange information processing logic 150 can improve the accuracy of the extracted pseudorange information, as will become more evident.

The output of the pseudorange information processing logic 150 can be used for determining the location of the cellular device 100. For example, a latitude, longitude and altitude can be determined based on the output of the pseudorange information processing logic 150, which can be displayed by the location displayer logic 162.

According to one embodiment, the pseudorange information bridger logic 143 communicates the output from the pseudorange information processing logic 150 to the location manager logic 161 in the operating system 160. According to one embodiment, the output of the pseudorange information processing logic 150 is a location that is defined in terms of latitude, longitude, and altitude. The methods are well-known in the GPS arts. The pseudoranges are used to first determine a location the WGS-84 coordinate system of the Global Positioning System, and then converted into latitude, longitude, and elevation.

The location displayer logic 162 can display the location with respect to a digital representation of a map available, for example, from third parties via download to the cellular device.

Figure 1B:
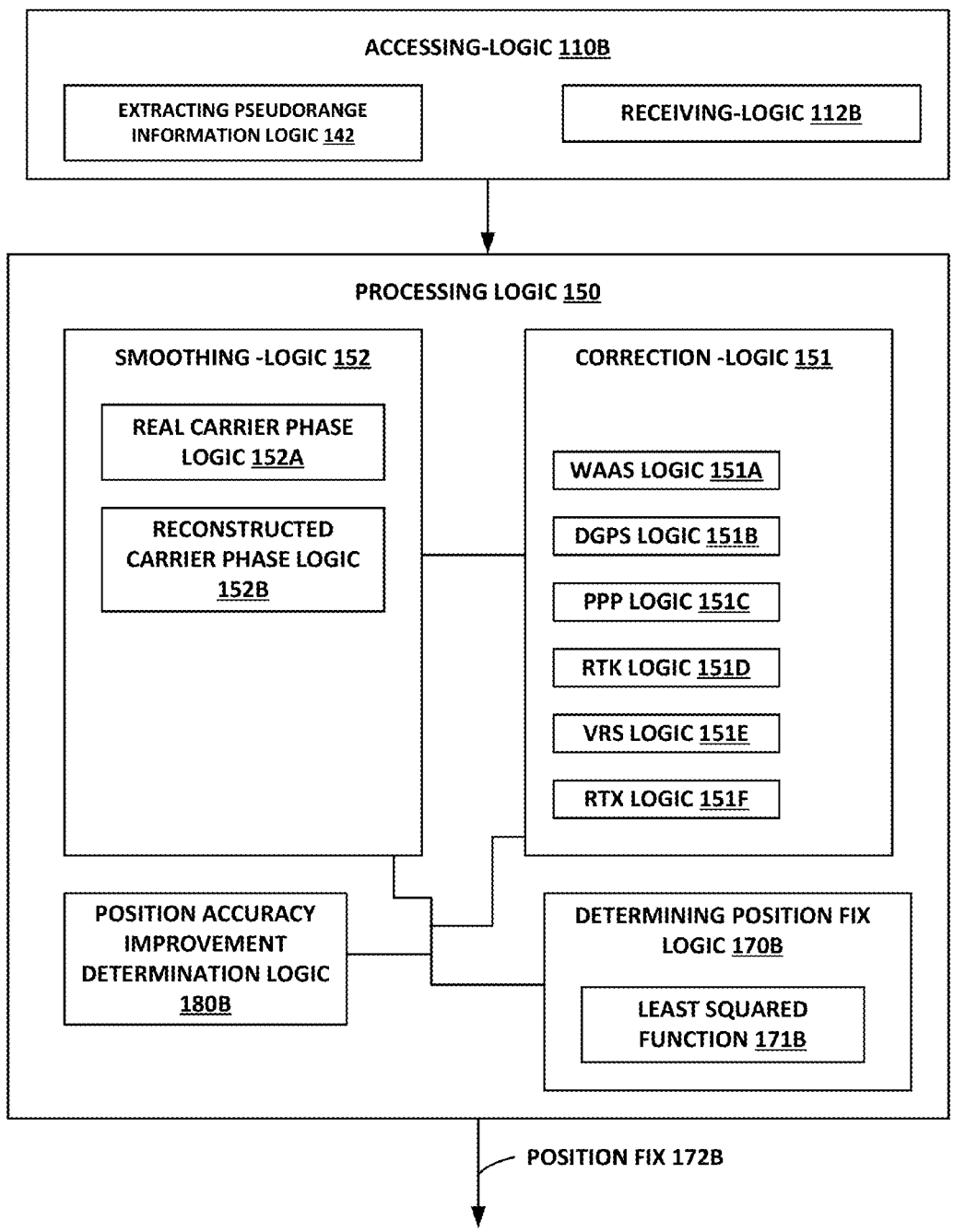
FIG. 1B depicts a block diagram of a cellular device for extracting and processing pseudorange information, according to one embodiment.

FIG. 1B depicts a block diagram of a portion of a cellular device 100, 100D for extracting pseudorange information, according to one embodiment. The cellular device 100, 100D includes accessing-logic 110B and processing logic 150. The accessing logic 110B includes extracting logic112B and receiving logic 114B. The extracting logic 112B includes pseudorange information extracting logic 142, satellite-based augmentation system (SBAS), extracting logic 112B-5, WAAS extracting logic 112B-2, Doppler shift extracting logic 112B-3, and carrier phase measurement extracting logic 112B-4. According to one embodiment, WAAS is an example of SBAS. According to one embodiment, SBAS extracting logic 112B-5 includes WAAS extracting logic 112B-2.

Examples of satellite-based augmentation system (SBAS) are Indian GPS aided Geo Augmented Navigation System (GAGAN), European Geostationary Navigation Overlay Service (EGNOS), Japanese Multi-functional Satellite Augmentation System (MSAS), John Deere's StarFire, WAAS, and TRIMBLE® OmniStar.

As depicted in FIG. 1B, the pseudorange information processing logic 150 includes pseudorange-correction-logic 151, pseudorange-carrier-phase-smoothing-logic 152, position accuracy improvement determination logic 180B and determining position fix logic 170B. Examples of "improving" are "smoothing" or "correcting," or a combination thereof. The pseudorange-correction-logic 151 includes WAAS logic 151A, DGPS logic 151B, Precise Point Positioning (PPP) logic 151C, RTK logic 151D, VRS (Virtual Reference Station) logic 151E, and RTX™ logic 151F. The pseudorange-carrier-phase-smoothing-logic 152 includes real carrier phase logic 152A and reconstructed carrier phase logic 152B. According to one embodiment, the accessing-logic 110B and the processing logic 150 reside in the improved accuracy SUPL client 101.

Examples of pseudorange information are extracted pseudoranges, corrected pseudoranges, smoothed pseudoranges, or a combination thereof, among other things. Examples of pseudorange corrections include Wide Area Augmentation System (WAAS) corrections, Differential Global Positioning System (DGPS) corrections, Precise Point Positioning (PPP) corrections, Real Time Kinematic (RTK) corrections, and Virtual Reference Station (VRS) corrections. Examples of carrier phase information include real carrier phase and reconstructed carrier phase information.

The extracting logic 112B can extract various types of information from the GNSS chipset 170, as discussed herein. For example, the extracting logic 112B includes pseudorange information extracting logic 142, WAAS extracting logic 112B-2, Doppler extracting logic 112B-3, and carrier phase measurement extracting logic 112B-4. According to one embodiment, the extracting logic 112B can be used to extract these various types of information from the GNSS chipset 170 in a similar manner that the pseudorange information extractor logic 142 extracts pseudorange information from the GNSS chipset 170, for example, using an SUPL Client 101 that employs a command designed or provided by the manufacturer of the GNSS chipset 170, as described herein. More specifically, the WAAS extracting logic 112B-2, the Doppler extracting logic 112B-3, and carrier phase measurement extracting logic 112B-4 can employ commands designed or provided by the manufacturer of the GNSS chipset 170 to extract respectively WAAS, Doppler information, and carrier phase measurements for real carrier phase information.

The receiving logic 114B receives other types of information that are not extracted from the GNSS chipset 170. The receiving logic 114B can receive the information in response to a request (also commonly known as "pulling") or receive the information without the information being requested (also commonly known as "pushing"). "Obtaining" and "accessing" can be used interchangeably, according to various embodiments.

Table 1 depicts the types of information that are extracted from the GNSS chipset or received without extraction, as discussed herein, according to various embodiments.

TABLE 1

Types of Information that are Extracted from the
GNSS Chipset or Received without Extraction

| Extracted | Received |
|---|---|
| Pseudorange Information | WAAS/SBAS |
| Doppler Shift Information | DGPS |
| Carrier Phase Measurements for real carrier phase information | RTK |
| WAAS/SBAS | Not Applicable |

The information depicted in the extracted column can be extracted from the GNSS chipset 170 using the SUPL client 101 in a manner similar to extracting pseudorange information, as discussed herein. WAAS may be extracted or received, for example, over the Internet. When this Doppler shift information is available but real carrier phase information is not, the extracted Doppler shift information can be integrated by processor 109, for example, to reconstruct carrier phase information. Techniques for reconstructing carrier phase information from Doppler shift information are well known in the art. Any one or more of the information depicted in Table 1 can be processed by the cellular device 100, for example, using the processor 109 that is outside of the GNSS chipset 170.

The pseudorange-carrier-phase-smoothing-logic 152 can smooth pseudorange information by applying carrier phase information to the pseudorange information.

The pseudorange-carrier-phase-smoothing-logic 152 receives raw pseudorange information from the accessing logic 110B. The carrier phase information may be reconstructed carrier phase information or real carrier phase information.

The pseudorange-correction-logic 151 can correct pseudorange information. For example, the pseudorange-correction-logic 151 can receive pseudorange information and apply pseudorange corrections to the pseudorange information. Examples of the pseudorange information received by the pseudorange-correction-logic 151 include extracted pseudorange information, DGPS corrected pseudoranges, and smoothed pseudoranges that were smoothed, for example, using either real carrier phase information or reconstructed carrier phase information. Examples of pseudorange corrections that can be applied to the received pseudorange information are WAAS corrections, DGPS corrections, PPP corrections, RTK corrections and VRS corrections. The PPP logic 151C performs Precise Point Positioning (PPP) processing on pseudorange information.

According to one embodiment, RTX™ is proprietary form of PPP developed by Trimble Navigation Limited. It should be appreciated that there are other forms of Precise Point Positioning which may operate using similar principles.

The pseudorange information processing logic 150 may also include a determining position fix logic 170B that performs, for example, a least squares solution 171B can be performed after the extracted pseudorange information is improved by the pseudorange-correction-logic 151 or the pseudorange-carrier-phase-smoothing-logic 152, or a combination thereof and prior to transmitting the output to the pseudorange information bridger logic 143. According to one embodiment, the determining position fix logic 170B resides in the processing logic 150. Least-squares solution methods are well-known in the position determination arts.

According to one embodiment, extracted pseudorange information is passed from the extracting pseudorange information logic 142 to the smoothing logic 152 where it is smoothed at either real carrier phase logic 152A or reconstructed carrier phase logic 152B. According to one embodiment, the smoothed pseudorange information is communicated from the smoothing logic 152 to the correcting logic 151 for further correction, where one or more corrections may be performed. If a plurality of corrections is performed, they can be performed in various combinations. If carrier phase smoothing is not possible, the extracted pseudorange information can be communicated from extracting pseudorange information logic 142 to correction logic 151. One or more of the logics 152A, 152B, 151A, 151E, 151F in the processing logic 150 can communicate with any one or more of the logics 152A, 152B, 151A, 151E 151F in various orders and combinations. Various embodiments are not limited to just the combinations and orders that are described herein. According to one embodiment, extracted pseudorange information may not be smoothed or corrected. In this case, unsmoothed uncorrected pseudorange information can be communicated from logic 142 to logic 170B.

The cellular device 100 may also include a position-accuracy-improvement-determination-logic 180B for determining whether to apply any improvements and if so, the one or more position accuracy improvements to apply to the extracted pseudorange information. For example, the cellular device 100 may be preconfigured based on the signals that are available to the cellular device 100 or a user of the cellular device 100 may manually configure the cellular device 100. For example, the cellular device 100 can display the signals that are available to the user and the user can select which signals they desire from the displayed list of signals. The configuration information, whether preconfigured or manually configured by the user, can be stored for example, in a look up table in the cellular device 100. Examples of position improvements that can be determined by the position accuracy improvement determination logic 180B are real carrier phase information, reconstructed carrier phase information, WAAS, DGPS, PPP, RTX™, RTK and VRS. The position accuracy improvement determination logic 180B can be used to determine to reconstruct carrier phase information based on Doppler shift if real carrier phase information is not available, for example. The position-accuracy-improvement-determination-logic 180B, according to one embodiment, is a part of the SUPL client 101.

Extracted pseudorange information without any additional improvements provides 4-5 meters of accuracy. Various combinations of position accuracy improvements can be applied to extracted pseudorange information (EPI) according to various embodiments, where examples of position accuracy improvements include, but are not limited to, Wide Area Augmentation System (WAAS) pseudorange corrections, Differential GPS (DGPS) pseudorange corrections, Precise Point Positioning (PPP) processing, RTX™, Real Time Kinematic (RTK), Virtual Reference Station (VRS) corrections, real carrier phase information (real CPI) smoothing, and reconstructed carrier phase information (reconstructed CPI) smoothing.

One or more of the logics 110B, 112B, 114B, 142, 112B-2, 112B-3, 180B, 152, 152A, 152B, 151, 151Aj-151F, 170B, 171B can be executed, for example, by the processor 109 of the cellular device 100 that is located outside of the GNSS chipset 170.

Table 2 depicts combinations of information that result in a position fix 172B, according to various embodiments. However, various embodiments are not limited to the combinations depicted in Table 2.

TABLE 2

Combinations of Information that Result in a Position Fix

| Combination Identifier | Combinations of Information that Result in a Position Fix |
|---|---|
| 1 | Extracted pseudorange information (EPI) |
| 2 | EPI + Real or Reconstructed Carrier Phase Information (CPI) |
| 3 | EPI + CPI + WAAS |
| 4 | EPI + CPI + WAAS + DGPS |
| 5 | EPI + CPI + DGPS |
| 6 | EPI + CPI + DGPS + PPP |
| 7 | EPI + DGPS |
| 8 | EPI + DGPS + WAAS |
| 9 | EPI + DGPS + PPP |
| 10 | EPI + RTK |
| 11 | EPI + VRS |

Figure 1C:
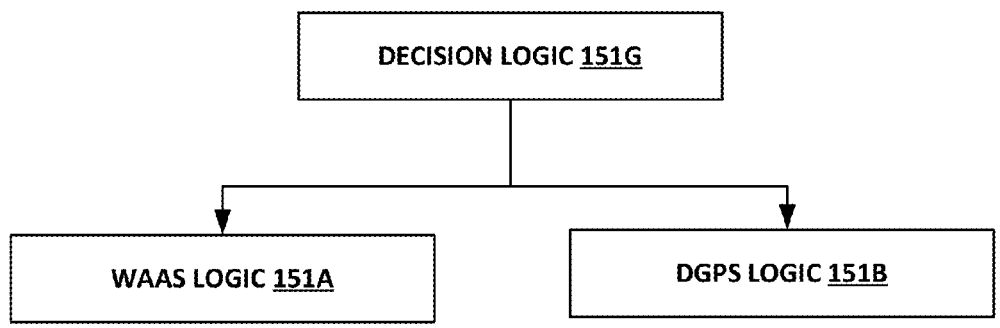
FIG. 1C depicts decision logic for determining whether to apply WAAS (Wide Area Augmentation System) corrections or DGPS (Differential Global Positioning System) corrections, according to one embodiment.

FIG. 1C depicts decision logic 151H for determining whether to apply SBAS corrections 151G, WAAS corrections 151A, PPP corrections 151C, RTX™ corrections 151F or DGPS corrections 151B, according to one embodiment. According to one embodiment, the SBAS corrections that are applied are WAAS corrections. According to one embodiment, the decision logic 151H is located in the position accuracy improvement determination logic 180B or the correction logic 151.

According to one embodiment, a first position is determined by an available means. For example, the first position may be based on uncorrected unsmoothed extracted pseudorange information, cellular tower triangulation, WiFi triangulation or other means. A level of precision may be selected, for example, by a user or preconfigured into the cellular device, where DGPS or one or more of SBAS, WAAS, RTX™, PPP would be used to achieve that level of precision. The decision logic 151H can access the level of precision and receive two or more reference station locations by sending a message to a database enquiring about nearby reference stations for DGPS. The decision logic 151H can determine the distance between the cellular device 100 and the nearest reference station. If the distance is greater than some selected distance threshold, the decision logic 151H can use PPP, RTX™, SBAS or WAAS, instead of DGPS. If the distance is less than the selected distance threshold, the decision logic 151H can use DGPS instead of PPP, RTX™, SBAS or WAAS. According to one embodiment, a range for a distance threshold is approximately 20 to 60 miles. According to one embodiment, the distance threshold is approximately 60 miles.

If the decision logic 151H determines to apply DGPS corrections at DGPS logic 151B resulting in DGPS corrected smoothed pseudoranges, further corrections can be made using the orbit-clock information contained in the PPP corrections. For example, a position fix can be determined based on the DGPS corrected smoothed pseudoranges and the PPP corrections. The position fix can be determined external to the GNSS chipset, for example, at the processing logic 150.

The cellular device 100 may be configured with the distance threshold, for example, by the manufacturer of the cellular device 100 or by a user of the cellular device 100. The cellular device 100 may be configured with the distance threshold through service that is remote with respect to the cellular device 100 or may be configured locally. The distance threshold can be selected based on a degree of position accuracy that is desired.

Figure 1D:
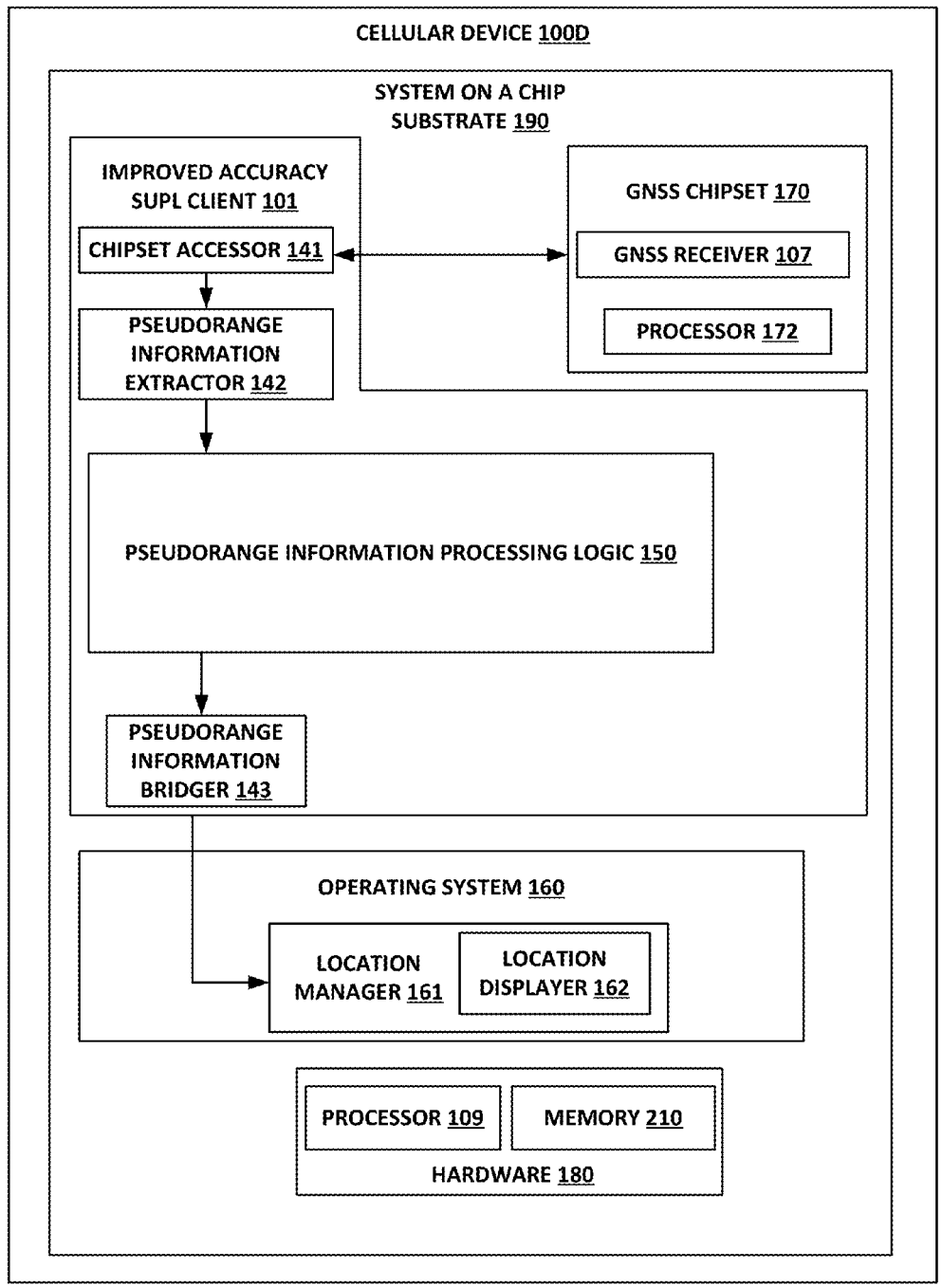
FIG. 1D depicts a block diagram of a cellular device for extracting pseudorange information, according to one embodiment.

FIG. 1D depicts a block diagram of a cellular device 100D for extracting pseudorange information, according to one embodiment.

As depicted in FIG. 1D, the GNSS chipset 170 is located on a system on a chip (SOC) substrate (SOCS) 190.

As described herein, various information can be extracted from the GNSS receiver 1130, such as pseudorange information, Doppler Shift Information, Real Carrier Phase Measurement, WAAS and SBAS. Other types of processing information output by the GNSS receiver 1130 can be ignored.

A Cell device 100D's hardware architecture includes discreet physical layout and interconnection of multiple chipsets for processing and for special purposes such as a GNSS chipset 170. In addition, newer architectures involve further integration of chipsets in the "system on a chip" (SoC) configuration. In this configuration, the GNSS chipset 170 can still be a complete element capable of delivering a PVT (position velocity and time) solution. However in an embodiment, the pseudorange information, carrier phase, and/or Doppler measurements, along with WAAS corrections if available, are extracted prior to further signal processing in the GNSS chipset 170 and are processed using different algorithms and corrections data for developing an improved accuracy PVT solution. In so doing the deleterious effects of multipath and other error sources may be minimized. Further the GNSS chipset 170 outputs are ignored and not displayed when the external processing is employed and the higher-accuracy PVT data is available.

Figure 2:
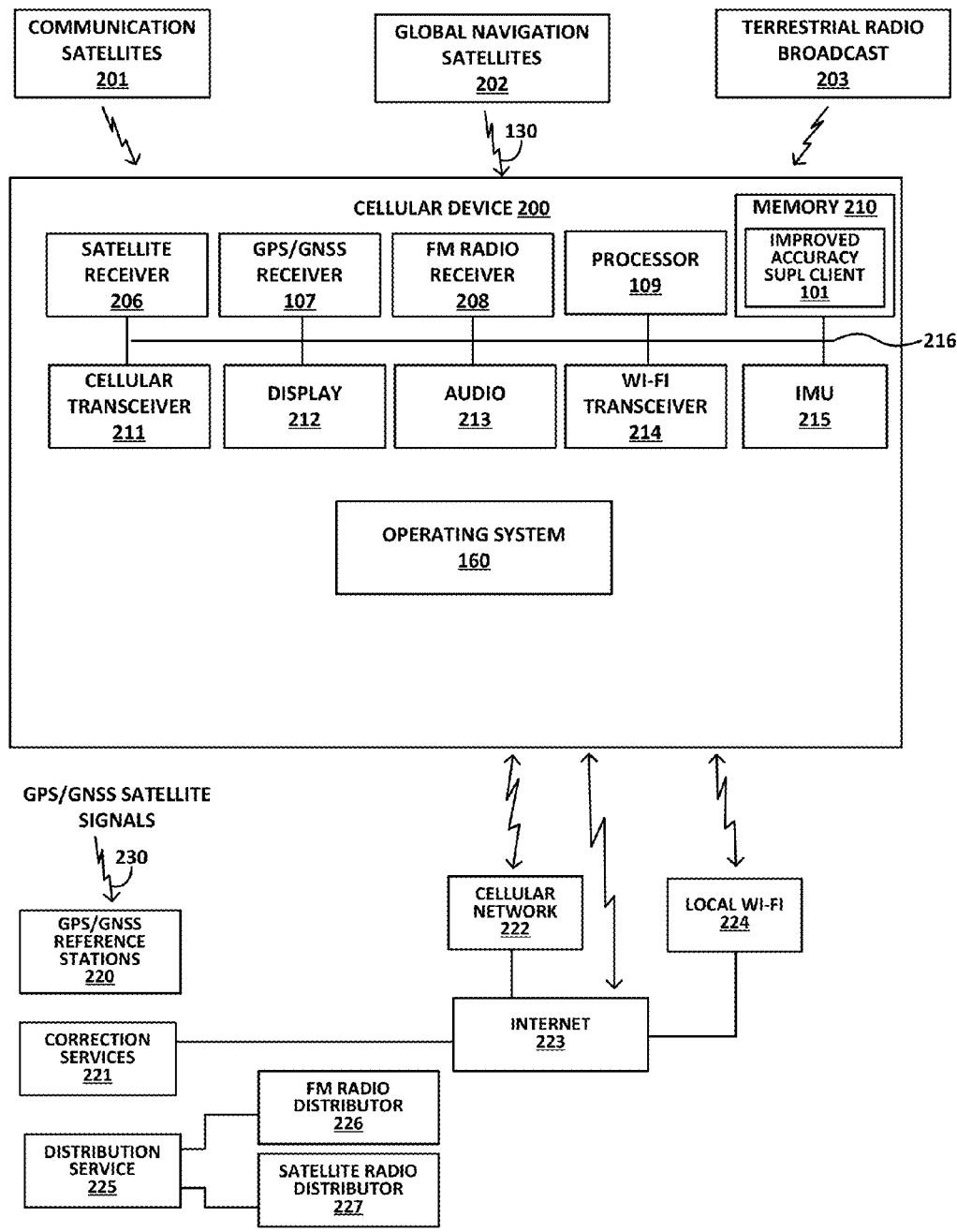
FIG. 2 depicts a block diagram of multiple sources for providing positioning correction information to a cellular device for processing pseudorange information, according to one embodiment.

FIG. 2 depicts a block diagram of a set of correction delivery options for providing positioning information to a cellular device for extracting pseudorange information, according to one embodiment. Examples of a cellular device 200 include a cell phone, a non-voice enabled cellular device, and a mobile hand-held GNSS receiver. The cellular device may be mobile or stationary.

The cellular device 200 includes a bus 216, a satellite receiver 206, a GNSS receiver 107, an FM radio receiver 208, a processor 109, memory 210, a cellular transceiver 211, a display 212, audio 213, Wi-Fi transceiver 214, IMU 215, image capturing device 240, and operating system 160. Components 206, 107, 208, 109, 210, 211, 212, 213, 214, 215, and 240 are all connected with the buss 216.

In FIG. 2, a plurality of broadcast sources is used to convey data and media to a cellular device 200. As an example, cellular device 200 can receive broadcast signals from communication satellites 201 (e.g., two-way radio, satellite-based cellular such as the Inmarsat or Iridium communication networks, etc.), global navigation satellites 202 which provide radio navigation signals (e.g., the GPS, GNSS, GLONASS, GALILEO, BeiDou, Compass, etc.), and terrestrial radio broadcast (e.g., FM radio, AM radio, shortwave radio, etc.)

A cellular device 200 can be configured with a satellite radio receiver 206 coupled with a communication bus 216 for receiving signals from communication satellites 201, a GNSS receiver 107 coupled with bus 216 for receiving radio navigation signals from global navigation satellites 202 and for deriving a position of cellular device 200 based thereon. Cellular device 200 further comprises an FM radio receiver 208 coupled with bus 216 for receiving broadcast signals from terrestrial radio broadcast 203. Other components of cellular device 200 comprise a processor 109 coupled with bus 216 for processing information and instructions, a memory 210 coupled with bus 216 for storing information and instructions for processor 109. It is noted that memory 210 can comprise volatile memory and non-volatile memory, as well as removable data storage media in accordance with various embodiments. Cellular device 200 further comprises a cellular transceiver 211 coupled with bus 216 for communicating via cellular network 222. Examples of cellular networks used by cellular device 200 include, but are not limited to GSM: cellular networks, GPRS cellular networks, GDMA cellular networks, and EDGE cellular networks. Cellular device 200 further comprises a display 212 coupled with bus 216. Examples of devices which can be used as display 212 include, but are not limited to, liquid crystal displays, LED-based displays, and the like. It is noted that display 212 can be configured as a touch screen device (e.g., a capacitive touch screen display) for receiving inputs from a user as well as displaying data. Cellular device 200 further comprises an audio output 213 coupled with bus 216 for conveying audio information to a user. Cellular device 200 further comprises a Wi-Fi transceiver 214 and an inertial measurement unit (IMU) 215 coupled with bus 216. Wi-Fi transceiver 114 may be configured to operate on any suitable wireless communication protocol including, but not limited to WiFi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the BLUETOOTH® standard).

Improvements in GNSS/GPS positioning may be obtained by using reference stations with a fixed receiver system to calculate corrections to the measured pseudoranges in a given geographical region. Since the reference station is located in a fixed environment and its location can be determined very precisely via ordinary survey methods, a processor associated with the Reference Station GNSS/GPS receivers can determine more precisely what the true pseudoranges should be to each satellite in view, based on geometrical considerations. Knowing the orbital positions via the GPS almanac as a function of time enables this process, first proposed in 1983, and widely adopted ever since. The difference between the observed pseudorange and the calculated pseudorange for a given Reference station is called the pseudorange correction. A set of corrections for all the global navigation satellites 202 in view is created second by second, and stored, and made available as a service, utilizing GPS/GNSS reference stations 220 and correction services 221. The pseudoranges at both the cellular device 200 GPS receiver 107 and those at the reference stations 220 are time-tagged, so the corrections for each and every pseudorange measurement can be matched to the local cell phone pseudoranges. The overall service is often referred to as Differential GPS, or DGPS. Without any corrections, GNSS/GPS receivers produce position fixes with absolute errors in position on the order of 4.5 to 5.5 m per the GPS SPS Performance Standard, $4^{th}$ Ed. 2008. In FIG. 2, one or more correction services 221 convey these corrections via a cellular network 222, or the Internet 223. Internet 223 is in turn coupled with a local Wi-Fi network 224 which can convey the corrections to cellular device 200 via Wi-Fi transceiver 214. Alternatively, cellular network 222 can convey the corrections to cellular device 200 via cellular transceiver 211. In some embodiments, correction services 221 are also coupled with a distribution service 225 which conveys the corrections to an FM radio distributor 226. FM radio distributor 226 can broadcast corrections as a terrestrial radio broadcast 103. It should be appreciated that an FM signal is being described as a subset of possible terrestrial radio broadcasts which may be in a variety of bands and modulated in a variety of manners. In some embodiments, cellular device 200 includes one or more integral terrestrial radio antennas associated with integrated terrestrial receivers; FM radio receiver 208 is one example of such a terrestrial receiver which would employ an integrated antenna designed to operate in the correct frequency band for receiving a terrestrial radio broadcast 103. In this manner, in some embodiments, cellular device 200 can receive the corrections via FM radio receiver 208 (or other applicable type of integrated terrestrial radio receiver). In some embodiments, correction services 221 are also coupled with a distribution service 225 which conveys the corrections to a satellite radio distributor 227. Satellite radio distributor 227 can broadcast corrections as a broadcast from one or more communications satellites 201. In some embodiments, cellular device 200 includes one or more integral satellite radio antennas associated with integrated satellite radio receivers 206. Satellite radio receiver 206 is one example of such a satellite receiver which would employ an integrated antenna designed to operate in the correct frequency band for receiving a corrections or other information broadcast from communication satellites 201. In this manner, in some embodiments, cellular device 200 can receive the corrections via satellite radio receiver 206.

Examples of a correction source that provides pseudorange corrections are at least correction service 221, FM radio distribution 226, or satellite radio distributor 227, or a combination thereof. According to one embodiment, a correction source is located outside of the cellular device 200.

Examples of image capturing device 240 are a camera, a video camera, a digital camera, a digital video camera, a digital camcorder, a stereo digital camera, a stereo video camera, a motion picture camera, and a television camera. The image capturing device 240 may use a lens or be a pinhole type device.

The blocks that represent features in FIGS. 1A-2 can be arranged differently than as illustrated, and can implement additional or fewer features than what are described herein. Further, the features represented by the blocks in FIGS. 1A-2 can be combined in various ways. A cellular device 100, 200 (FIGS. 1A-3) can be implemented using software, hardware, hardware and software, hardware and firmware, or a combination thereof. Further, unless specified otherwise, various embodiments that are described as being a part of the cellular device 100, 200, whether depicted as a part of the cellular device 100, 200 or not, can be implemented using software, hardware, hardware and software, hardware and firmware, software and firmware, or a combination thereof. Various blocks in FIGS. 1A-2 refer to features that are logic, such as but not limited to, 150, 180B, 152, 152A, 152B, 151, 151A-151G, 170B, which can be; implemented using software, hardware, hardware and software, hardware and firmware, software and firmware, or a combination thereof.

The cellular device 100, 200, according to one embodiment, includes hardware, such as the processor 109, memory 210, and the GNSS chipset 170. An example of hardware memory 210 is a physically tangible computer readable storage medium, such as, but not limited to a disk, a compact disk (CD), a digital versatile device (DVD), random access memory (RAM) or read only memory (ROM) for storing instructions. An example of a hardware processor 109 for executing instructions is a central processing unit. Examples of instructions are computer readable instructions for implementing at least the SUPL Client 101 that can be stored on a hardware memory 210 and that can be executed, for example, by the hardware processor 109. The SUPL client 101 may be implemented as computer readable instructions, firmware or hardware, such as circuitry, or a combination thereof.

Pseudorange Information

A GNSS receiver 107 (also referred to as a "receiver"), according to various embodiments, makes a basic measurement that is the apparent transit time of the signal from a satellite to the receiver, which can be defined as the difference between signal reception time, as determined by the receiver's clock, and the transmission time at the satellite, as marked in the signal. This basic measurement can be measured as the amount of time shift required to align the C/A-code replica generated at the receiver with the signal received from the satellite. This measurement may be biased due to a lack of synchronization between the satellite and receiver clock because each keeps time independently. Each satellite generates a respective signal in accordance using a clock on board. The receiver generates a replica of each signal using its own clock. The corresponding biased range, also known as a pseudorange, can be defined as the transit time so measured multiplied by the speed of light in a vacuum.

There are three time scales, according to one embodiment. Two of the time scales are the times kept by the satellite and receiver clocks. A third time scale is a common time reference, GPS Time (GPST), also known as a composite time scale that can be derived from the times kept by clocks at GPS monitor stations and aboard the satellites.

Let $\tau$ be the transit time associated with a specific code transition of the signal from a satellite received at time t per GPST. The measured apparent range r, called pseudorange, can be determined from the apparent transmit time using equation 1 as follows:

measured pseudorange at $(t)=c$[arrival time at $(t)-$
emission time at $(t-\tau)$]. Eq. 1

Both t and $\tau$ are unknown, and can be estimated. In this discussion of pseudoranges, measurements from a GPS satellite are dealt with in a generic way to make the notation simple, making no reference to the satellite ID or carrier frequency (L1 or L2).

Figure 3:
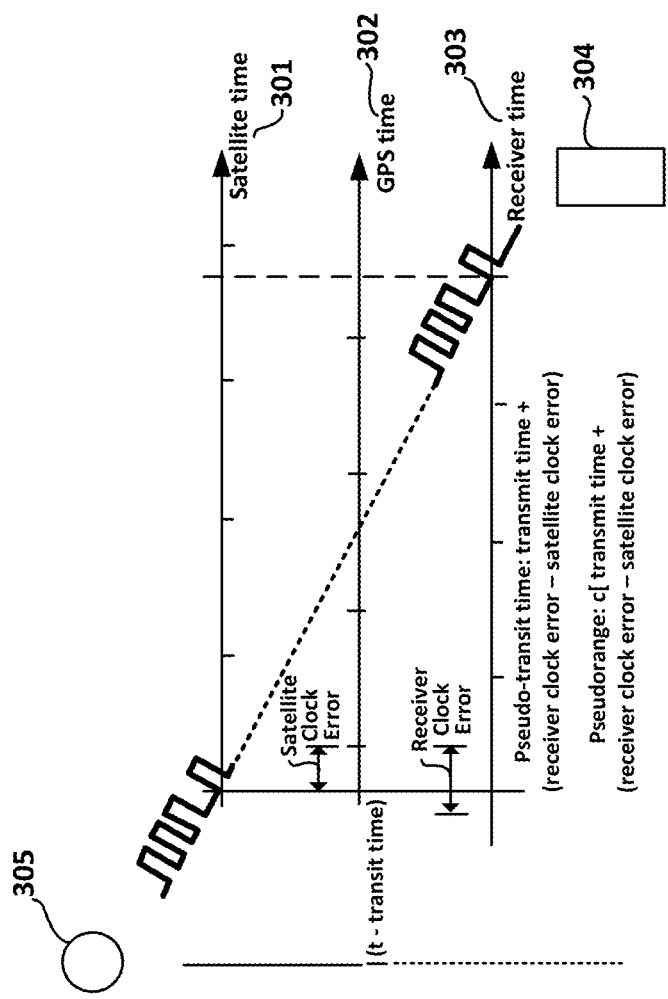
FIG. 3 depicts a conceptual view of pseudorange measurements, according to various embodiments.

Equations 2 and 3 depict how to relate the time scales of the receiver and the satellite clocks with GPST:

arrival time at $(t)=t+$receiver clock at $(t)$ eq. 2 arrival time at $(t-\tau)=(t-\tau)+$satellite clock error at $(t-\tau)$ eq. 3 where receiver clock error represents the receiver 304's clock bias 303 and satellite clock error represents the bias 301 in the satellite 305's clock, and both the receiver clock and the satellite clock are measured relative to GPST 302, as shown in FIG. 3. Receiver clock error and satellite clock error represent the amounts by which the satellite 305 and receiver 304 clocks are advanced in relation to GPST. The satellite clock error 301 is estimated by the Control Segment and specified in terms of the coefficients of a quadratic polynomial in time. The values of these coefficients can be broadcast in the navigation message.

Accounting for the clock biases, the measured pseudorange (eq. 1) can be written as indicated in equation 4:

$PR(t)=c[t+$receiver clock error at $(t)-(t-\tau+$satellite clock error at $(t-\tau))]+$miscellaneous errors at $(t)=c$ $\tau+c$[receiver clock errors at $(t)-$satellite clock error at $(t-\tau)]+$miscellaneous errors at $(t)$ eq. 4 where miscellaneous errors represent unmodeled effects, modeling error, and measurement error. The transmit time multiplied by the speed of light in a vacuum can be modeled as satellite position at $(t-\tau)$. Ionosphere error and troposphere error reflect the delays associated with the transmission of the signal respectively through the ionosphere and the troposphere. Both ionosphere error and troposphere error are positive.

For simplicity, explicitly reference to the measurement epoch t has been dropped, and the model has been rewritten for the measured pseudorange as indicated in equation 5.

$PR=r+$[receiver clock error$-$satellite clock error]$+$
ionosphere error$+$troposphere error$+$miscellaneous errors eq. 5 where PR is the measured pseudorange, r is the true range from the receiver to the satellite, receiver clock error is the difference between the receiver clock and the GPSTIME, satellite clock error is the difference between the satellite clock and GPSTIME, GPSTIME is ultimately determined at the receiver as part of the least squared solution determined by the least squares solution 171B so that all clock errors can be resolved to some level of accuracy as part of the position determination process, and miscellaneous errors include receiver noise, multipath and the like.

At least one source of error is associated with satellite positions in space. The navigation message in the GPS signal contains Keplerian parameters which define orbital mechanics mathematics and, thus, the positions of the satellites as a function of time. One component of WAAS and RTX™ contains adjustments to these parameters, which form part of the constants used in solving for the position fix at a given time. Taking account of the corrections is well-known in the GPS position determining arts.

Ideally, the true range r to the satellite is measured. Instead, what is available is PR, the pseudorange, which is a biased and noisy measurement of r. The accuracy of an estimated position, velocity, or time, which is obtained from these measurements, depends upon the ability to compensate for, or eliminate, the biases and errors.

The range to a satellite is approximately 20,000 kilometers (km) when the satellite is overhead, and approximately 26,000 km when the satellite is rising or setting. The signal transit time varies between about 70 millisecond (ms) and 90 ms. The C/A-code repeats each millisecond, and the code correlation process essentially provides a measurement of pseudo-transmit time modulo 1 ms. The measurement can be ambiguous in whole milliseconds. This ambiguity, however, is easily resolved if the user has a rough idea of his location within hundreds of kilometers. The week-long P(Y)-code provides unambiguous pseudoranges.

The receiver clocks are generally basic quartz crystal oscillators and tend to drift. The receiver manufacturers attempt to limit the deviation of the receiver clock from GPST, and schedule the typical once-per-second measurements at epochs that are within plus or minus 1 millisecond (ms) of the GPST seconds. One approach to maintaining the receiver clock within a certain range of GPST is to steer the receiver clock 'continuously.' The steering can be implemented with software. The second approach is to let the clock drift until it reaches a certain threshold (typically 1 ms), and then reset it with a jump to return the bias to zero.

An example of pseudorange measurements with a receiver using the second approach shall now be described in more detail. Assume that there are pseudorange measurements from three satellites which rose about the same time but were in different orbits. Assume that one comes overhead and stays in view for almost seven hours. Assume that the other two stay lower in the sky and could be seen for shorter periods. There are discontinuities common to all three sets of measurements due to the resetting of the receiver clock. A determination can be made as to whether the receiver clock is running fast or slow, and its frequency offset from the nominal value of 10.23 megahertz (MHz) can be estimated.

For more information on pseudorange information, refer to "Global Positioning Systems," by Pratap Misra and Per Eng, Ganga-Jamuna Press, 2001; ISBN 0-9709544-0-9.

Position Accuracy Improvements

The pseudorange information processing logic 150 can include various types of logic for improving the position accuracy of the extracted pseudorange information, as described herein. Table 2, as described herein, depicts various combinations of position accuracy improvements for improving extracted pseudorange information, according to various embodiments. Table 3 also depicts various combinations of position accuracy improvements for improving extracted pseudorange information, according to various embodiments.

TABLE 3

Various Combinations of Position Accuracy Improvements for Improving Extracted Pseudorange Information

Figure 6:
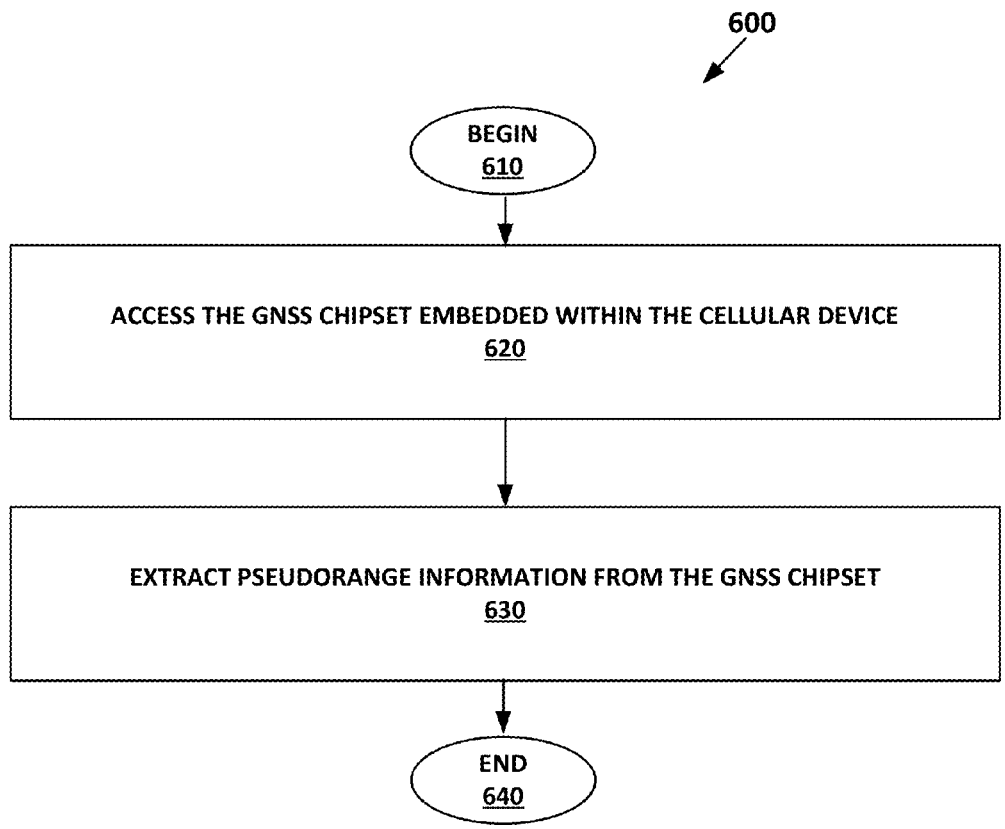
FIG. 6 depicts a flowchart of a method of extracting pseudorange information using a cellular device, according to one embodiment.
Figure 7A:
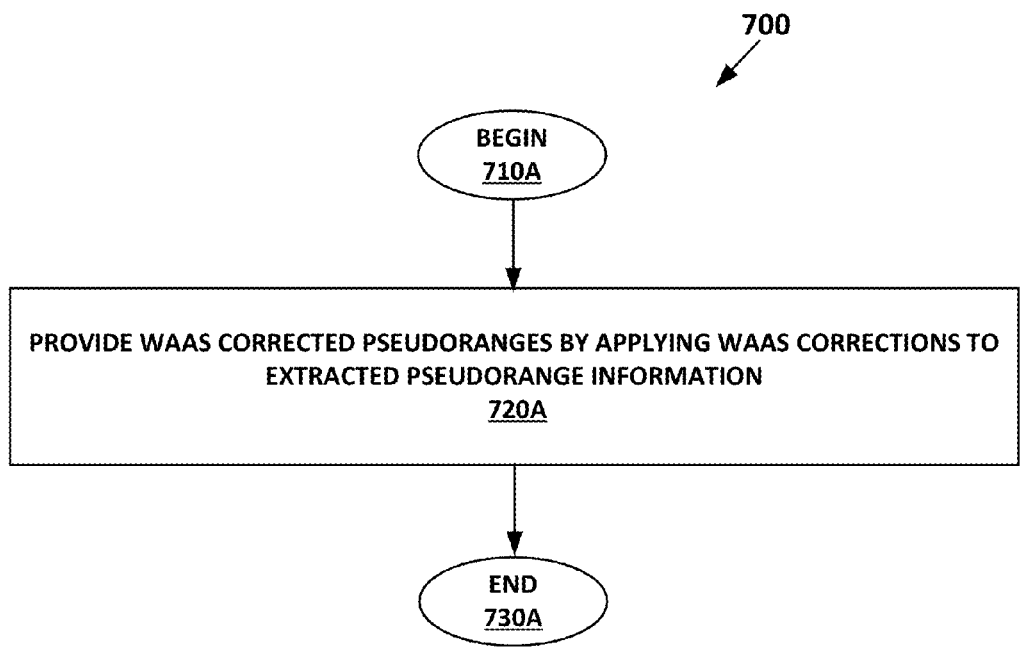
FIGS. 7A-10 depict flowcharts of methods of improving the position accuracy using one or more position accuracy improvements, according to various embodiments.
Figure 7B:
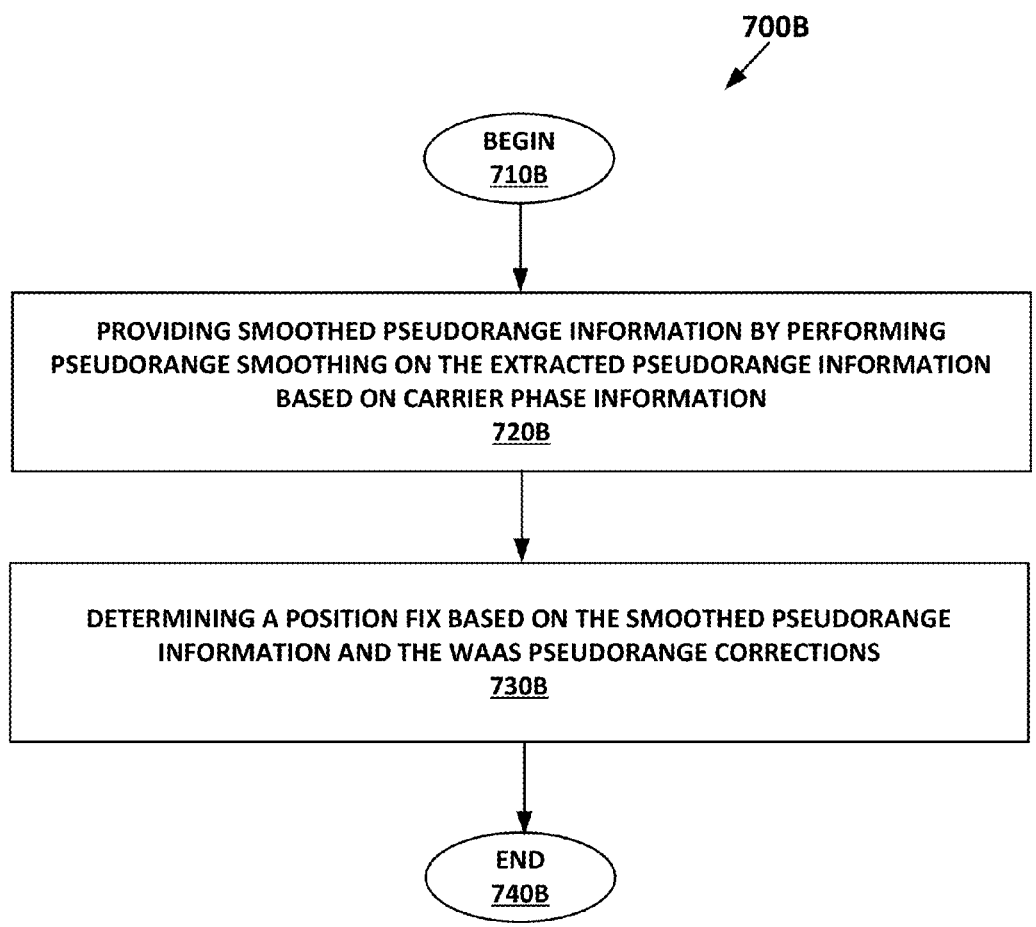
Figure 8A:
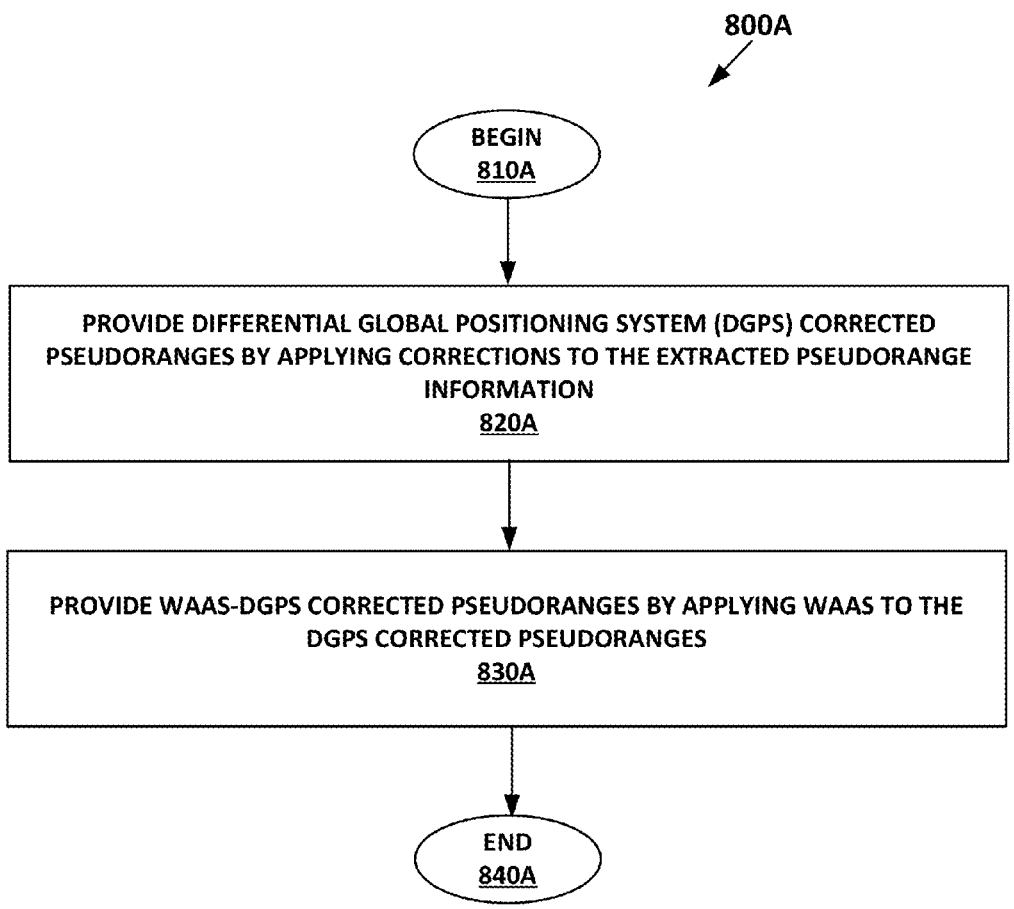
Figure 8B:
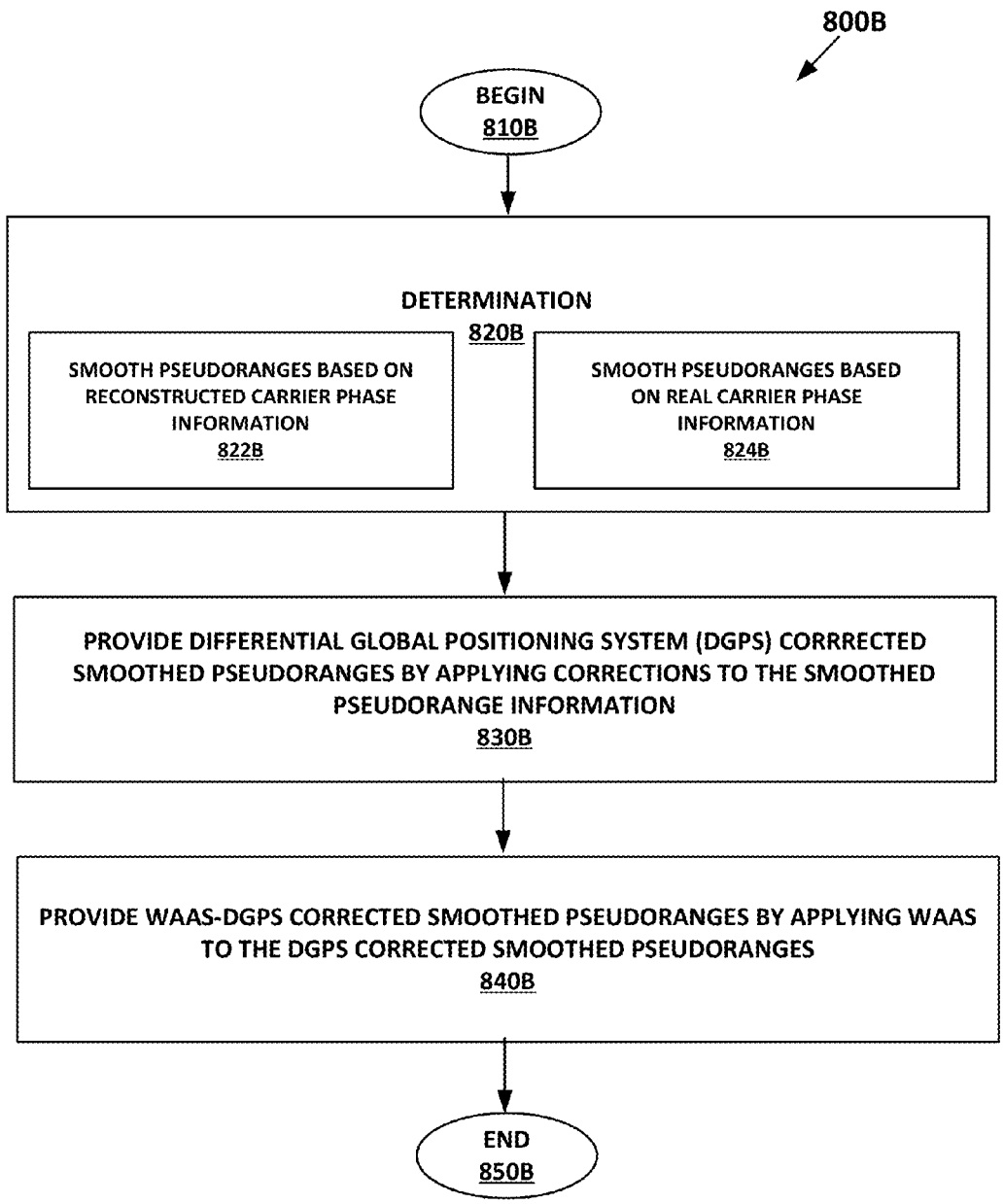
Figure 9A:
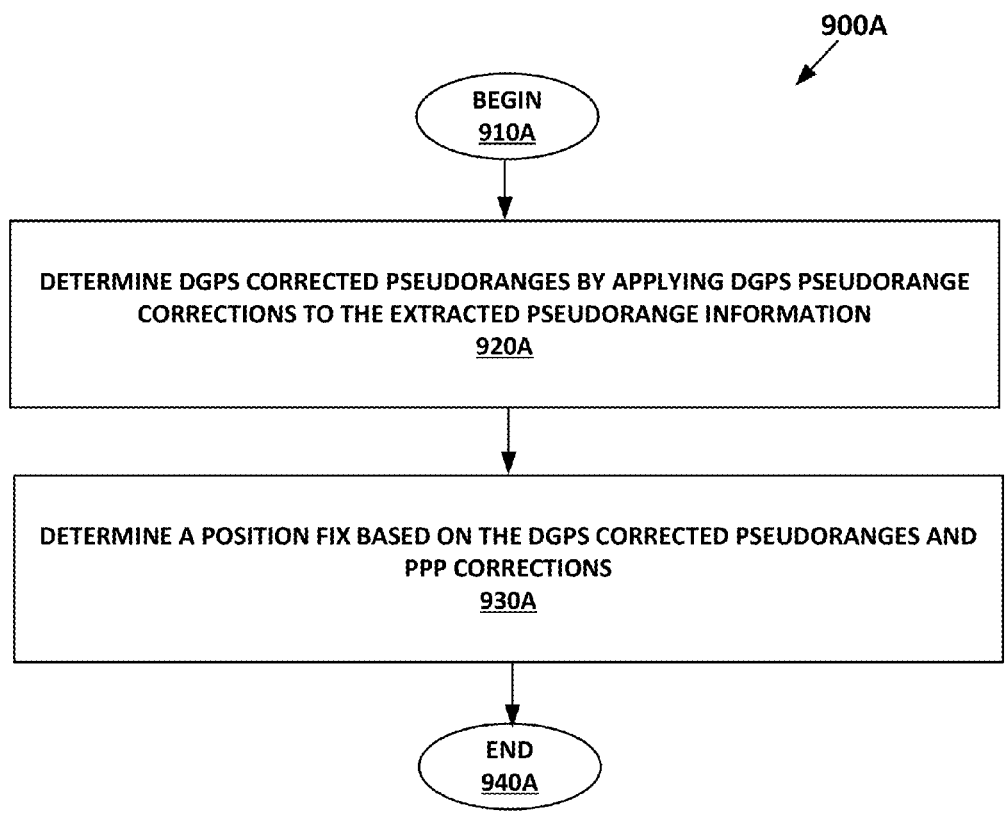
Figure 9B:
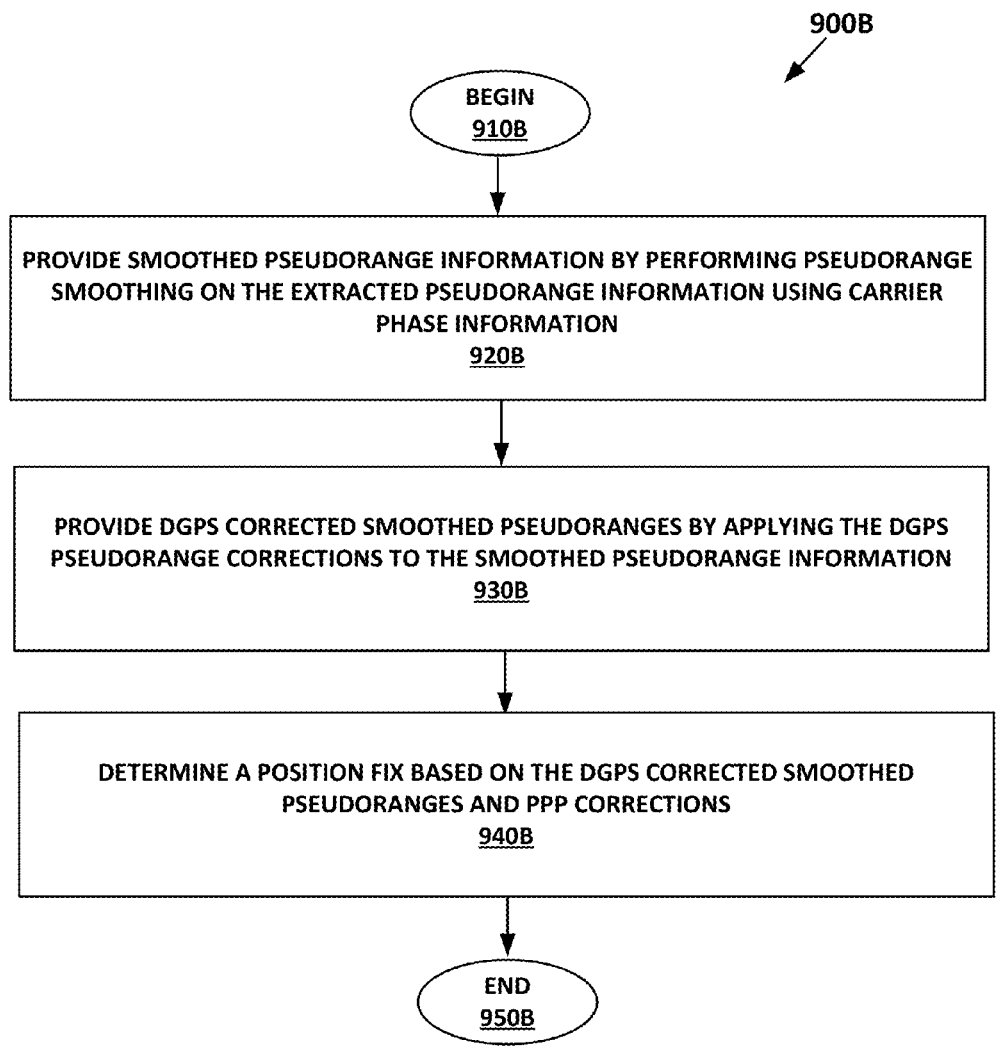

| Combination Identifier | Operation | Description | Accuracy |
|---|---|---|---|
| 1 | 620 (FIG. 6) | Extracted Pseudo-range Information (EPI) | 4-5 meters (m) |
| 2 | 720A (FIG. 7A) | EPI + WAAS | approx. 1.7 m |
| 3 | FIG. 7B | EPI + reconstructed CPI + WAAS | <1 m |
| 4 | 820A (FIG. 8A) | EPI + DGPS | ~1 m |
| 5 | 830A (FIG. 8A) | EPI + DGPS + WAAS | <1 m |
| 6 | 820B, 822B, 830B, 840B FIG. 8B | EPI + reconstructed CPI + DGPS + WAAS | <1 m |
| 7 | 820B, 824B, 830B, 840B (FIG. 8B) | EPI + real CPI + DGPS + WAAS | <1 m |
| 8 | 920A (FIG. 9A) | EPI + PPP | <1 m |
| 9 | 930A (FIG. 9A) | EPI + PPP + DGPS | <1 m |
| 10 | FIG. 9B | EPI + reconstructed CPI + PPP + DGPS | <1 m |
| 11 | 1020 and 1030 (FIG. 10) | EPI + CPI + PPP | <<1 m |
| 12 | 1040 (FIG. 10) | EPI + CPI + PPP + DGPS | approx. 10 cm |
| 13 | | EPI + RTK | approx. 2-10 cm |

Table 3 includes columns for combination identifier, operation, description, and accuracy. The combination identifier column indicates an identifier for each combination of improvements. The operation column specifies operations of various flowcharts in FIGS. 6-10 for the corresponding combination. The description column specifies various combinations of position accuracy improvements that can be applied to extracted pseudorange information (EPI) according to various embodiments, where examples of position accuracy improvements include, but are not limited to, Wide Area Augmentation System (WAAS) pseudorange corrections, real carrier phase smoothing (real CPI) information, reconstructed carrier phase smoothing information (reconstructed CPI), Differential GPS (DGPS) pseudorange corrections, and Precise Point Positioning (PPP) processing. The accuracy column specifies levels of accuracy provided by the corresponding combination.

Combination 1 is extracted pseudorange information without any additional improvements, which provides 4-5 meters of accuracy. Combination 1 is described in Table 3 to provide a comparison with the other combinations 2-13.

According to one embodiment, the SUPL client 101 can also include a position-accuracy-improvement-determination-logic 180B for determining the one or more position accuracy improvements to apply to the extracted pseudorange information based on one or more factors such as cost, quality of service, and one or more characteristics of the cellular device. For example, different costs are associated with different position accuracy improvements. More specifically, extracted pseudorange information, WAAS and Doppler information are typically free. There is a low cost typically associated with DGPS and real carrier phase information. There is typically a higher cost associated with PPP. Therefore, referring to Table 3, according to one embodiment, combinations 1, 2, and 3 are typically free, combinations 4-7 typically are low cost, and combinations 8-12 are typically higher cost.

Various cellular devices have different characteristics that make them capable of providing different types of position accuracy improvements. For example, one type of cellular device may be capable of providing WAAS but not be capable of providing Doppler information. In another example, some types of cellular devices may be capable of providing DGPS but not capable of providing PPP. In yet another example, different activities may require different levels of improvement. For example, some activities and/or people may be satisfied with 4-5 meters, others may be satisfied with 1.7 meters. Yet others may be satisfied with less than 1 meter, and still others may only be satisfied with 2 centimeters. Therefore, different users may request different levels of accuracy.

Table 4 depicts sources of the various position accuracy improvements, according to various embodiments.

TABLE 4

Sources of the Various Position Accuracy Improvements

| Position Accuracy Improvement Name | Source |
|---|---|
| Pseudorange Information | extracted from GNSS chipset |
| WAAS | extracted from GNSS chipset or satellite broadcast via Internet or radio delivery |
| Real Carrier Phase Information | extracted from GNSS chipset |
| Doppler for reconstructing carrier phase information | extracted from GNSS chipset |
| Differential Global Positioning System (DGPS) | from a reference station delivered by dialing up, wired/wireless internet/intranet connection, or by receiving a broadcast subcarrier modulation concatenated to an FM carrier frequency. DGPS can be obtained at least from Trimble ® |
| Real Time Kinematic (RTK) | from a reference station |

The first column of Table 4 provides the name of the position accuracy improvement. The second column of Table 4 specifies the source for the corresponding position accuracy improvement.

According to various embodiments, a cellular device 100, 200 can initially provide a position that is within 4-5 meters using, for example, unimproved extracted pseudorange information and the position can continually be improved, using various position accuracy improvements as described herein, as long as the antennae of the cellular device 100, 200 is clear of obstructions to receive various position accuracy improvements.

The following describes various position accuracy improvements and related topics in more detail.

Global Navigation Satellite Systems

A Global Navigation Satellite System (GNSS) is a navigation system that makes use of a constellation of satellites orbiting the earth to provide signals to a receiver, such as GNSS receiver 107, which estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequencies, a pseudo-random number (PRN) code, and satellite navigation data.

Two different PRN codes are transmitted by each satellite: A coarse acquisition (C/A) code and a precision (P/Y) code which is encrypted for use by authorized users. A receiver, such as GNSS receiver 107, designed for precision positioning contains multiple channels, each of which can track the signals on both L1 and L2 frequencies from a GPS satellite in view above the horizon at the receiver antenna, and from these computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

Each GLONASS satellite transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz. The code and carrier signal structure is similar to that of NAVSTAR. A GNSS receiver designed for precision positioning contains multiple channels each of which can track the signals from both GPS and GLONASS satellites on their respective L1 and L2 frequencies, and generate pseudorange and carrier phase observables from these. Future generations of GNSS receivers will include the ability to track signals from all deployed GNSSs.

Differential Global Positioning System (DGPS)

Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemerides). The reference station receives essentially the same GPS signals as cellular devices 100, 200 which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference in timing can be expressed in terms of pseudorange lengths, in meters. The difference between the received GPS signals and what they optimally should be is used as an error correction factor for other GPS receivers in the area. Typically, the reference station broadcasts the error correction to, for example, a cellular device 100, 200 which uses this data to determine its position more precisely. Alternatively, the error corrections may be stored for later retrieval and correction via post-processing techniques.

DGPS corrections cover errors caused by satellite clocks, ephemeris, and the atmosphere in the form of ionosphere errors and troposphere errors. The nearer a DGPS reference station is to the receiver 107 the more useful the DGPS corrections from that reference station will be.

The system is called DGPS when GPS is the only constellation used for Differential GNSS. DGPS provides an accuracy on the order of 1 meter or 1 sigma for users in a range that is approximately in a few tens of kilometers (kms) from the reference station and growing at the rate of 1 m per 150 km of separation. DGPS is one type of Differential GNSS (DGNSS) technique. There are other types of DGNSS techniques, such as RTK and Wide Area RTK (WARTK), that can be used by high-precision applications for navigation or surveying that can be based on using carrier phase measurements. It should be appreciated that other DGNSS which may utilize signals from other constellations besides the GPS constellation or from combinations of constellations. Embodiments described herein may be employed with other DGNSS techniques besides DGPS.

A variety of different techniques may be used to deliver differential corrections that are used for DGNSS techniques. In one example, DGNSS corrections are broadcast over an FM subcarrier. U.S. Pat. No. 5,477,228 by Tiwari et al. describes a system for delivering differential corrections via FM subcarrier broadcast method, the contents of which are incorporated herein by reference.

Real-Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the cellular device 100, 200 in the area. Measurements of GPS signal errors taken at the reference station (e.g., dual-frequency code and carrier phase signal errors) and broadcast to one or more cellular devices 100, 200 working in the area. The one or more cellular devices 100, 200 combine the reference station data with locally collected position measurements to estimate local carrier-phase ambiguities, thus allowing a more precise determination of the cellular device 100, 200's position. The RTK method is different from DGPS methods in that the vector from a reference station to a cellular device 100, 200 is determined (e.g., using the double differences method). In DGPS methods, reference stations are used to calculate the changes needed in each pseudorange for a given satellite in view of the reference station, and the cellular device 100, 200, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to a receiver of the cellular device 100, 200, or pseudo range) changes significantly for separation distances beyond 70 km. This is because the ionosphere is typically not homogeneous in its density of electrons, and because the electron density may change based on, for example, the sun's position and therefore time of day.

Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GPS receiver altogether. This enhancement is referred to as the "Network RTK" or "Virtual Reference Station" (VRS) system and method.

Figure 4:
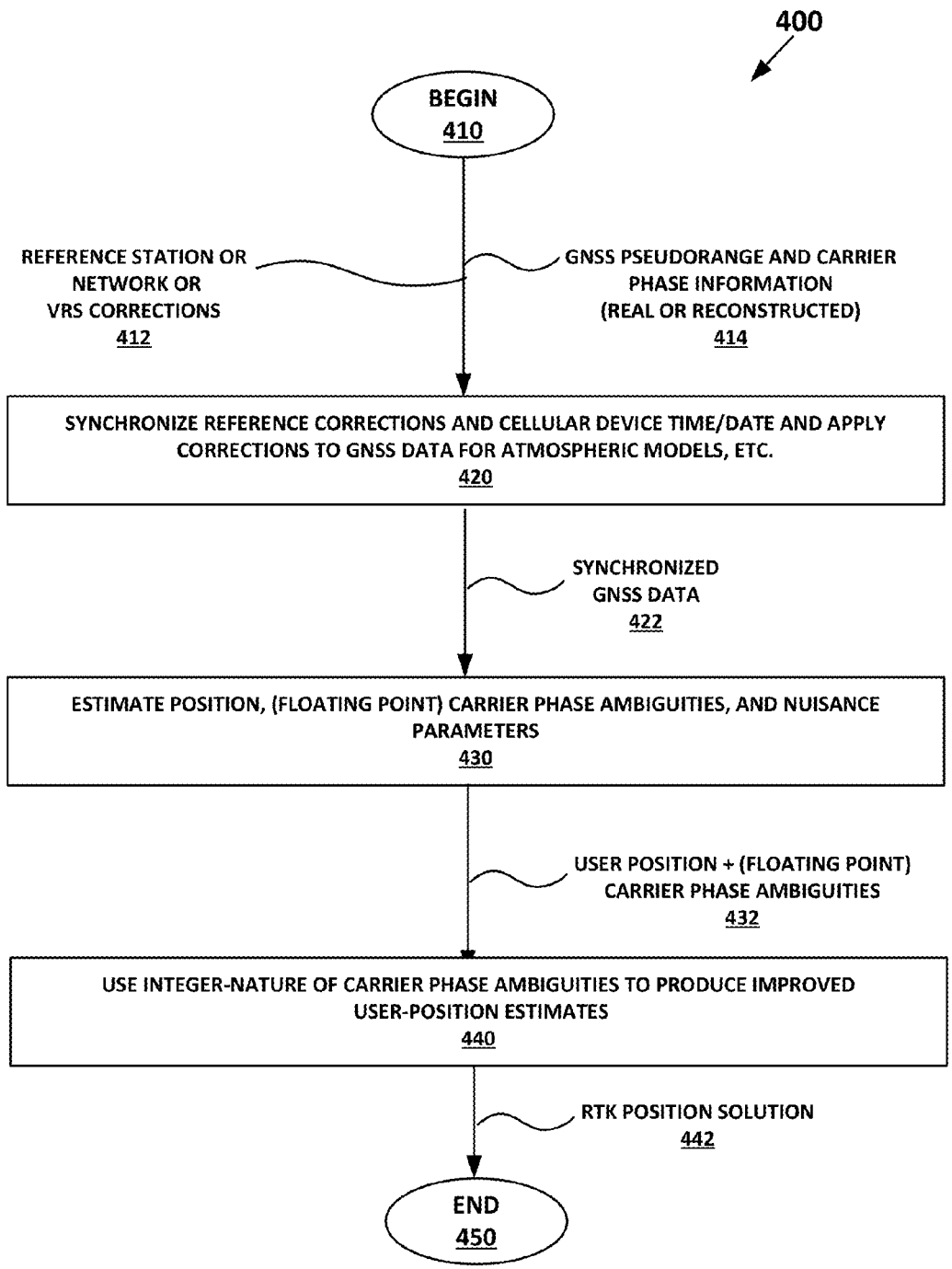
FIG. 4 depicts a flowchart for determining an RTK (Real Time Kinematic) position solution, according to one embodiment.

FIG. 4 depicts a flowchart 400 for determining an RTK position solution, according to one embodiment. At 410, the method begins. The inputs to the method are reference station network or VRS corrections 412 and GNSS pseudorange plus carrier phase information from the cellular device 414. At 420, reference corrections and cellular device data are synchronized and corrections are applied to the GNSS data for atmospheric models and so on. The output of 420 is synchronized GNSS data 422, which is received by operation 430. At 430, position, carrier phase ambiguities in floating point, and nuisance parameters are estimated. The output 432 of 430 is user position plus carrier phase ambiguities in floating point. Operation 440 receives the output 432 and produces improved user-position estimates using the integer-nature of carrier phase ambiguities. The output 442 of 440 is an RTK position solution, which can be used according to various embodiments. The method ends at 450.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the cellular device 100, 200 with the means to estimate the ionospheric path delay from each satellite in view from the cellular device 100, 200, and to take account other error contributions for those same satellites at the current instant in time for the cellular device 100, 200's location.

The cellular device 100, 200 is configured to couple a data-capable cellular telephone to its internal signal processing system. The user operating the cellular device 100, 200 determines that he needs to activate the VRS process and initiates a call to the control center to make a connection with the processing computer.

The cellular device 100, 200 sends its approximate position, based on raw GPS data from the satellites in view without any corrections, to the control center. Typically, this approximate position is accurate to approximately 4-7 meters. The user then requests a set of "modeled observables" for the specific location of the cellular device 100, 200. The control center performs a series of calculations and creates a set of correction models that provide the cellular device 100, 200 with the means to estimate the ionospheric path delay from each satellite in view from the cellular device 100, 200, and to take into account other error contributions for those same satellites at the current instant in time for the cellular device 100, 200's location. In other words, the corrections for a specific cellular device 100, 200 at a specific location are determined on command by the central processor at the control center and a corrected data stream is sent from the control center to the cellular device 100, 200. Alternatively, the control center may instead send atmospheric and ephemeris corrections to the cellular device 100, 200 which then uses that information to determine its position more precisely.

These corrections are now sufficiently precise that the high performance position accuracy standard of 2-3 cm may be determined, in real time, for any arbitrary cellular device 100, 200's position. Thus a GPS enabled cellular device 100, 200's raw GPS data fix can be corrected to a degree that makes it behave as if it were a surveyed reference location; hence the terminology "virtual reference station."

An example of a network RTK system in accordance with embodiments of the present invention is described in U.S. Pat. No. 5,899,957, entitled "Carrier Phase Differential GPS Corrections Network," by Peter Loomis, assigned to the assignee of the present invention and incorporated as reference herein in its entirety.

The Virtual Reference Station method extends the allowable distance from any reference station to the cellular devices 100, 200. Reference stations may now be located hundreds of miles apart, and corrections can be generated for any point within an area surrounded by reference stations. However, there are many construction projects where cellular coverage is not available over the entire physical area under construction and survey.

Virtual Reference Stations

To achieve very accurate positioning (to several centimeters or less) of a terrestrial mobile platform of a cellular device 100, 200, relative or differential positioning methods are commonly employed. These methods use a GNSS reference receiver located at a known position, in addition to the data from a GNSS receiver 107 on the mobile platform, to compute the estimated position of the mobile platform relative to the reference receiver.

The most accurate known method uses relative GNSS carrier phase interferometry between the GNSS cellular device 100, 200's receiver and GNSS reference receiver antennas plus resolution of integer wavelength ambiguities in the differential phases to achieve centimeter-level positioning accuracies. These differential GNSS methods are predicated on the near exact correlation of several common errors in the cellular device 100, 200 and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the cellular device 100, 200 and reference receivers are almost exactly the same. These atmospheric delay errors therefore cancel in the cellular device 100, 200's reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the cellular device 100, 200 and reference receiver antennas become increasingly different, so that their presence in the cellular device 100, 200's-reference differential GNSS observables and their influence on the ambiguity resolution process increases. Ambiguity resolution on single cellular device 100, 200's reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of a cellular device 100, 200's receiver using reference observables from three or more reference receivers that approximately surround the cellular device 100, 200's receiver trajectory. This implies that the cellular device 100, 200's receiver trajectory is mostly contained by a closed polygon whose vertices are the reference receiver antennas. The cellular device 100, 200's receiver 107 can move a few kilometers outside this polygon without significant loss of positioning accuracy. A network GNSS algorithm calibrates the ionosphere and troposphere signal delays at each reference receiver position and then interpolates and possibly extrapolates these to the cellular device 100, 200's position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the cellular device 100, 200 and reference receivers so as to establish a relative phase interferometry position of the cellular device 100, 200's antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the cellular device 100, 200 and reference receivers result in the cancellation of all common mode range errors except the integer ambiguities. An ambiguity resolution algorithm uses redundant carrier phase observables from the cellular device 100, 200 and reference receivers, and the known reference antenna position, to estimate and thereby resolve these ambiguities.

Once the integer cycle ambiguities are known, the cellular device 100, 200's receiver 107 can compute its antenna position with accuracies generally on the order of a few centimeters, provided that the cellular device 100, 200 and reference antennas are not separated by more than 10 kilometers. This method of precise positioning performed in real-time is commonly referred to as real-time kinematic (RTK) positioning. The separation between a cellular device 100, 200 and reference antennas shall be referred to as "cellular device reference separation."

The reason for the cellular device-reference separation constraint is that KAR positioning relies on near exact correlation of atmospheric signal delay errors between the cellular device 100, 200 and reference receiver observables, so that they cancel in the cellular device 100, 200's reference observables combinations (for example, differences between cellular device 100, 200 and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

When the cellular device 100, 200 reference separation exceeds 10 kilometers, as maybe the case when the cellular device 100, 200 has a GNSS receiver 107 that is a LEO satellite receiver, the atmospheric delay errors become de-correlated and do not cancel exactly. The residual errors can now interfere with the ambiguity resolution process and thereby make correct ambiguity resolution and precise positioning less reliable.

The cellular device 100, 200's reference separation constraint has made KAR positioning with a single reference receiver unsuitable for certain mobile positioning applications where the mission of the mobile platform of the cellular device 100, 200 will typically exceed this constraint. One solution is to set up multiple reference receivers along the mobile platform's path so that at least one reference receiver falls within a 10 km radius of the mobile platform's estimated position.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the cellular device 100, 200's receiver, so that the cellular device 100, 200's receiver 107 can perform reliable ambiguity resolution on combinations of carrier phase observables from the cellular device 100, 200 and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 1003-1004) for a comparison of different network GNSS implementations and comparisons of their respective performances.

A virtual reference station (VRS) network method is a particular implementation of a network GNSS method that is characterized by the method by which it computes corrective data for the purpose of cellular device 100, 200's position accuracy improvement. A VRS network method comprises a VRS corrections generator and a single-baseline differential GNSS position generator such as a GNSS receiver 107 with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 1001 (hereinafter "Hofmann-Wellenhof [1001]"), gives comprehensive descriptions of different methods of differential GNSS position computation, ranging in accuracies from one meter to a few centimeters. The single-baseline differential GNSS position algorithm typically computes differences between the cellular device 100, 200 and reference receiver observables to cancel atmospheric delay errors and other common mode errors such as orbital and satellite clock errors. The VRS position is usually specified to be close to or the same as the roving receiver's estimated position so that the actual atmospheric errors in the cellular device 100, 200 receiver 107's observables approximately cancel the estimated atmospheric errors in the VRS observables in the cellular device 100, 200's reference observables differences.

The VRS corrections generator computes the synthetic observables at each sampling epoch (typically once per second) from the geometric ranges between the VRS position and the M satellite positions as computed using well-known algorithms such as those given in IS-GPS-200G interface specification tilted "Navstar GPS Space Segment/Navigation User Interfaces," and dated 5 Sep. 2012. It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the GNSS cellular device 100, 200's receiver 107. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by TRIMBLE® includes a number of dedicated reference stations, a VRS server, multiple server-reference receiver bi-directional communication channels, and multiple server-cellular-device-bi-directional data communication channels. Each server-cellular device bi-directional communication channel serves one cellular device 100, 200. The reference stations provide their observables to the VRS server via the server-reference receiver bi-directional communication channels. These channels can be implemented by a public network such as the Internet. The bi-directional server-cellular-device communication channels can be radio modems or cellular telephone links, depending on the location of the server with respect to the cellular device 100, 200.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va. 22209. The synthetic observables are the observables that a reference receiver located at the VRS position would measure. The VRS position is selected to be close to the cellular device 100, 200's estimated position so that the cellular device 100, 200's VRS separation is less than a maximum separation considered acceptable for the application. Consequently, the cellular device 100, 200 receiver 107 must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., Virtual Reference Stations versus Broadcast Solutions in Network RTK, GNSS 2003 Proceedings, Graz, Austria (2003); each of which is incorporated herein by reference.

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Precise Positioning Point (PPP)

Descriptions of a Precise Point Positioning (PPP) technique are provided in U.S. Patent application publication 20110187590, of Leandro, which is assigned to Trimble Navigation Limited and is incorporated herein by reference. Trimble Navigation Limited has commercialized a version of PPP corrections which it calls RTX™. PPP corrections can be any collection of data that provides corrections from a satellite in space, clock errors, ionosphere or troposphere, or a combination thereof. According to one embodiment, PPP corrections can be used in instead of WAAS or RTX™.

The term Precise Point Positioning (PPP), as used henceforth in this document, is used as shorthand to refer to any system or technique which has the characteristics and functionality of PPP described or referenced herein and is not necessarily limited to a system from Trimble Navigation Ltd. Hence, the term "PPP" is used in this document merely to facilitate description and is used without derogation to any trademark rights of Trimble Navigation Ltd. or any subsidiary thereof or other related entity. Techniques for generating PPP corrections are well known in the art. In general, a PPP system utilizes a network (which may be global) of GNSS reference receivers tracking navigation satellites such as GPS and GLONASS satellites and feeding data back to a centralized location for processing. At the centralized location, the precise orbits and precise clocks of all of the tracked navigation satellites are generated and updated in real time. A correction stream is produced by the central location; the correction stream contains the orbit and clock information. This correction stream is broadcast or otherwise provided to GNSS receivers, such as a GNSS receiver 107, in the field (conventionally by satellite service or cellular link). Corrections processors in the GNSS receivers utilize the corrections to produce centimeter level positions after a short convergence time (e.g., less than 30 minutes). A main difference between PPP and VRS is that PPP networks of reference receivers are typically global while VRS networks may be regional or localized with shorter spacing between the reference stations in a VRS network.

Wide Area Augmentation System (WAAS)

Wide Area Augmentation System (WAAS) corrections are corrections of satellite position and their behavior. WAAS was developed by the Federal Aviation Administration (FAA). WAAS includes a network of reference stations that are on the ground located in North America and Hawaii. The reference stations transmit their respective measurements to master stations which queue their respective received measurements. The master stations transmit WAAS corrections to geostationary WAAS satellites, which in turn broadcast the WAAS corrections back to earth where cellular devices 100, 200 that include WAAS-enabled GPS receivers can receive the broadcasted WAAS corrections. According to one embodiment, the GNSS receiver 107 is a WAAS-enabled GPS receiver. The WAAS corrections can be used to improve the accuracy of the respective cellular devices 100, 200' positions, for example, by applying the WAAS corrections to extracted pseudoranges. WAAS operation and implementation is well known in the art.

Real Carrier Phase Information

According to one embodiment, a GNSS chipset 170 provides real carrier phase information (also referred to as "actual carrier phase information"). The cellular device 100, 200 can extract real carrier phase information from the GNSS chipset 170 in a manner similar to extracting pseudorange information from the GNSS chipset 170, where the extracted carrier phase information is for use elsewhere in the cellular device 100, 200 outside of the GNSS chipset 170 as described herein, for example, with flowchart 600 of FIG. 6.

Figure 5A:
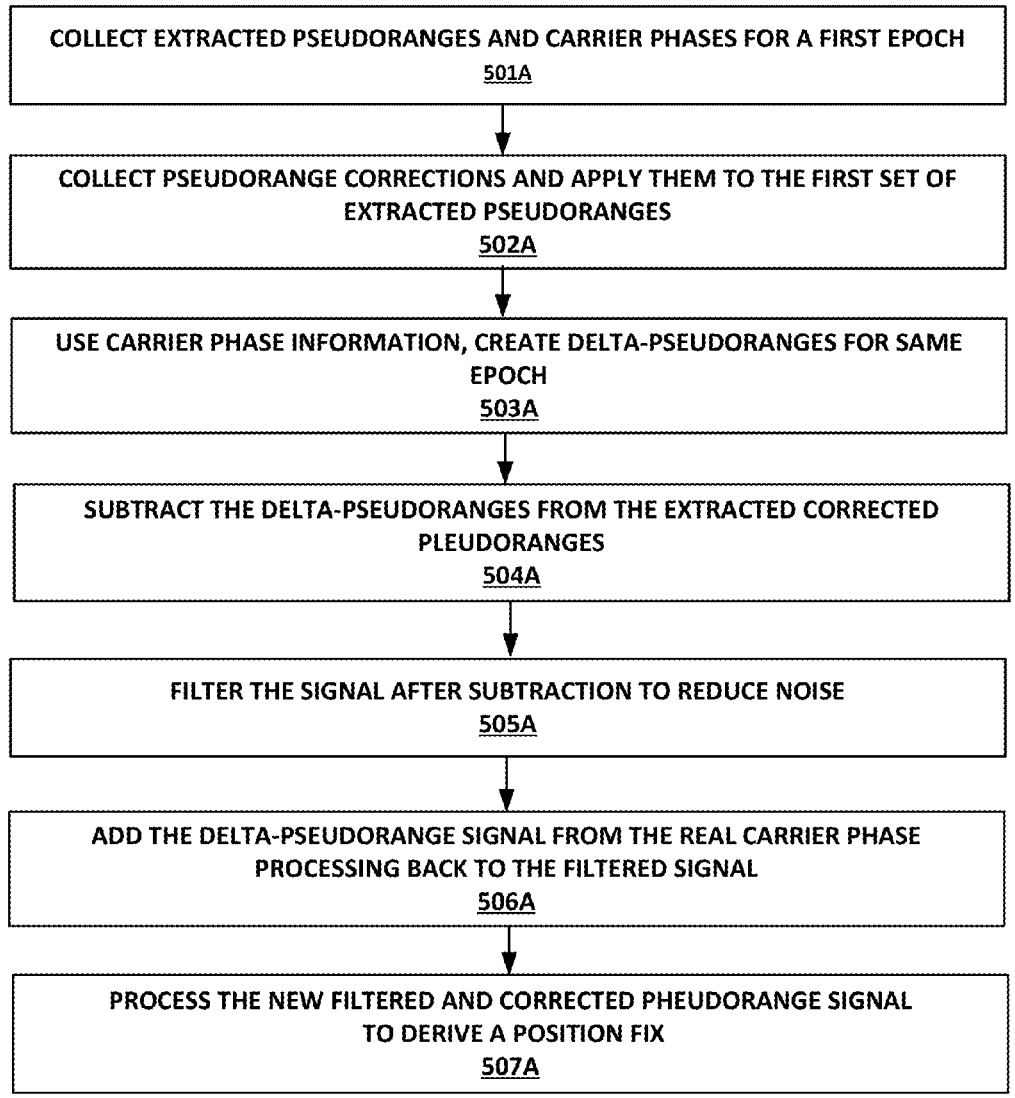
FIG. 5A is a flowchart of a method for performing a carrier phase smoothing operation using real carrier phase information, according to one embodiment.

FIG. 5A is a flowchart 500A of a method for performing a carrier phase smoothing operation using real carrier phase information, according to one embodiment. In various embodiments, carrier phase smoothing logic 152 may be implemented by either a range domain hatch filter, or a position domain hatch filter, or by any of other implementations known in the literature. The range domain hatch filter method is described in U.S. Pat. No. 5,471,217 by Hatch et al., entitled "Method and Apparatus for Smoothing Coded Measurements in a Global Positioning System Receiver," filed Feb. 1, 1993, incorporated by reference herein, and the Hatch paper entitled "The synergism of GPS code and carrier measurements," published in the Proceedings of the Third International Geodetic symposium on satellite Doppler Positioning, New Mexico, 1982: 1213-1232. See also p 45 of the Master's Thesis by Sudha Neelima Thipparthi entitled "Improving Positional Accuracy using Carrier Smoothing Techniques in Inexpensive GPS Receivers," MSEE thesis, New Mexico State University, Las Cruces, N. Mex., February 2004.

The filtering/processing described herein lies in the family of errors in pseudorange processing that affect code and carrier measurements in the same way. In various embodiments, the code phase pseudorange measurements are "disciplined" by subtracting out a more constant equivalent pseudorange-like distance measurement derived from the carrier phase. Next, a filtering on the net subtracted signal is performed which allows various embodiments to eliminate multipath induced errors in the raw, and corrected, pseudorange data. This method does not deal with ionospheric effects, according to one embodiment.

In operation 501A of FIG. 5A, extracted pseudorange information and carrier phases for a first epoch are collected. In one embodiment, these extracted pseudorange information and carrier phases are received at carrier phase smoothing logic 152 from the GNSS receiver 107.

In operation 502A of FIG. 5A, pseudorange corrections are collected and applied to the first set of extracted pseudoranges collected in operation 501A. In one embodiment, these corrections themselves may be smoothed at the reference receiver (e.g., at GPS/GNSS reference stations 220) so that the delivered pseudorange corrections themselves are less noisy. Smoothing the pseudorange corrections derived at the GPS/GNSS reference stations 220 using the same carrier phase method of flowchart 500A can vastly improve the quality of the delivered pseudorange corrections delivered to cellular device 100, 200 for use by a position determination processor (e.g., GNSS receiver 107 or pseudorange information processing logic 150). Such corrected pseudoranges that are also smoothed may be used by the cellular device 100, 200 and fetched if available.

In operation 503A of FIG. 5A, delta carrier phase measurements for the same epoch are created using real carrier phase information. In accordance with various embodiments, this replicates creating a second distance measurement, similar to the reconstructed carrier phase information, based on integrated Doppler Shift.

In operation 504A of FIG. 5A, the delta carrier phase measurements are subtracted from the corrected extracted pseudoranges. In accordance with various embodiments, this provides a fairly constant signal for that epoch and is equivalent to the corrected extracted pseudorange at the start of the integration interval. In accordance with various embodiments, this is referred to as a "disciplining" step that smoothes out the corrected extracted pseudorange signal and therefore reduces the instant errors in the later-computed position fixes.

In operation 505A of FIG. 5A, the signal is filtered after the subtraction of operation 504A to reduce noise. In accordance with one embodiment, this is performed by averaging the carrier phase "yardsticks" over a series of epochs.

In operation 506A of FIG. 5A, the delta carrier phase measurements from the real carrier phase processing operation is added back into the filtered signal of operation 505A.

In operation 507A of FIG. 5A, the new filtered and corrected extracted pseudorange signal is processed, for example, at the pseudorange information processing logic 150, to derive a position fix 172B.

Reconstructing Carrier Phase Information Based on Doppler Shift

Carrier Phase Information can be reconstructed (referred to herein as "reconstructed carrier phase") based on Doppler Shift. Doppler Shift is the change in frequency of a periodic event (also known as a "wave") perceived by an observer that is moving relative to a source of the periodic event. For example, Doppler shift refers to the change in apparent received satellite signal frequency caused by the relative motion of the satellites as they either approach the cellular device 100, 200 or recede from it. Thus any measurement of Doppler frequency change is similar to differentiating carrier phase. It is therefore possible to reconstruct the carrier phase by integrating the Doppler shift data. In an embodiment, the GNSS chipset 170 of GNSS receiver 107 may provide Doppler information it determines through other means. This Doppler frequency shift information or "Doppler" may be collected at each GPS timing epoch (e.g., one second) and integrated over a sequence of the one-second epochs, to produce a model of carrier phase. This Doppler-derived carrier phase model may be substituted for the real carrier phase data, and used in the same manner as shown in the flow chart for carrier phase smoothing of FIG. 5A. Doppler Shift signal processing is well known in the art.

Figure 5B:
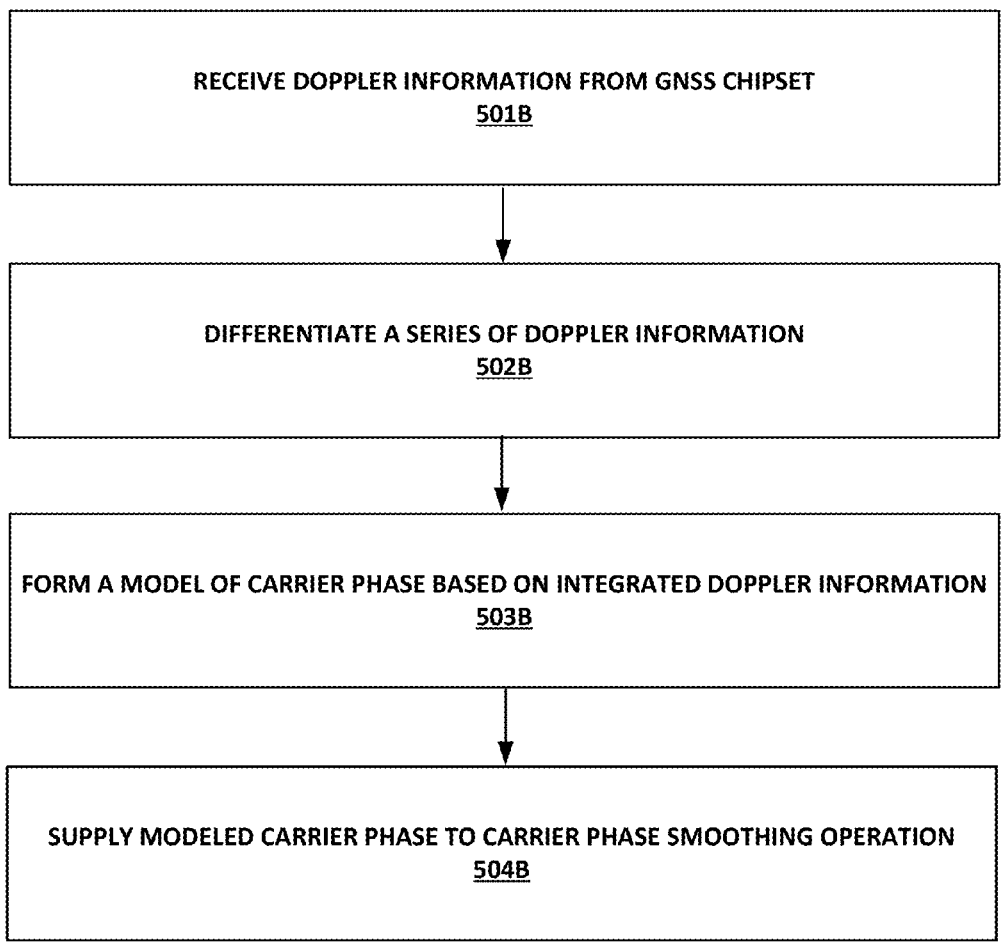
FIG. 5B is a flowchart of a method for generating reconstructed carrier phase information based on Doppler shift, according to one embodiment.

FIG. 5B is a flowchart 500B of a method for generating reconstructed carrier phase information (also referred to as a "Doppler-derived carrier phase model") based on Doppler Shift, according to one embodiment. In accordance with one embodiment, method of flowchart 500B is implemented at GPS/GNSS reference stations and the modeled carrier phase is provided to cellular device 100, 200 via one of the communication networks described above.

In operation 501B of FIG. 5B, Doppler information from a GNSS receiver 107 of a GNSS chipset 170 is received by pseudorange-carrier-phase-smoothing-logic 152.

In operation 502B of FIG. 5B, a series of Doppler information is integrated. As described above, Doppler frequency shift information may be collected at each GPS timing epoch (e.g., one second) and stored for use in producing a model of carrier phase.

In operation 503B of FIG. 5B, a model of carrier phase is created based on integrated Doppler information. As discussed above with reference to operation 502B, a series of Doppler information for a plurality of timing epochs is integrated. In one embodiment, this Doppler information is integrated over a sequence of the one-second epochs, to produce a model of carrier phase. The sequence may include 10-100 epochs, or seconds. The model of carrier phase smoothing is used as the reconstructed carrier phase information.

In operation 504B of FIG. 5B, the modeled carrier phase, which is also referred to as "reconstructed carrier phase information", is supplied to pseudorange-carrier-phase-smoothing-logic 152. As described above, method of flowchart 500B can be implemented at GPS/GNSS reference stations 220 and the reconstructed carrier phase information can then be broadcast to cellular device 100, 200.

Method of Extracting Pseudorange Information

FIG. 6 depicts a flowchart 600 of a method of extracting pseudorange information using a cellular device, according to one embodiment.

At 610, the method begins.

At 620, the cellular device 100, 200 accesses the GNSS chipset 170 embedded within the cellular device 100, 200 where the GNSS chipset 170 calculates pseudorange information for use by the GNSS chipset 170. For example, the GNSS receiver 107 can perform GPS measurements to derive raw measurement data for a position of the cellular device 100. The raw measurement data provides an instant location of the cellular device 100. The GNSS chipset 170 calculates pseudorange information that is for use by the GNSS chipset 170. According to one embodiment, the raw measurement data is the pseudorange information that will be extracted. Examples of pseudorange information are uncorrected pseudorange information, differential GNSS corrections, high precision GNSS satellite orbital data, GNSS satellite broadcast ephemeris data, and ionospheric projections.

A chipset accessor logic 141, according to one embodiment, is configured for accessing the GNSS chipset 170. According to one embodiment, the chipset accessor logic 141 is a part of an SUPL client 101.

The pseudorange information can be obtained from the processor 172 of the GNSS receiver 107 using a command. The GNSS chipset 170 may be designed, for example, by the manufacturer of the GNSS chipset 170, to provide requested information, such as pseudorange information, in response to receiving the command. The pseudorange information may be extracted from the GNSS chipset 170 using the command that the manufacturer has designed the GNSS chipset 170 with. For example, according to one embodiment, the GNSS chipset 170 is accessed using an operation that is a session started with a message that is an improved accuracy Secure User Platform Location (SUPL) start message or a high precision SUPL INIT message. According to one embodiment, the message is a custom command that is specific to the GNSS chipset 170 (also referred to as "a GNSS chipset custom command") and the improved accuracy SUPL client 101 can access to the raw measurements of the GNSS chipset 170.

Examples of chipset manufacturers include Qualcomm, Texas Instruments, FastraX, Marvel, SIRF, TRIMBLE®, SONY, Furuno, Nemerix, Phillips, and XEMICS, to name a few.

At 630, the cellular device 100, 200 extracts the pseudorange information from the GNSS chipset 170 for use elsewhere in the cellular device 100, 200 outside of the GNSS chipset 170. For example, pseudorange information extractor logic 142 may be associated with a worker thread of the SUPL client 101. The worker thread associated with the SUPL client 101 can monitor the raw measurements delivered by the GNSS chipset 170 into the GNSS chipset 170's memory buffers, cache the raw measurements and use the raw measurements to determine a position fix. The pseudorange information extractor logic 142 and the pseudorange information processing logic 150 can be associated with the worker thread. For example, the pseudorange information extractor logic 142 can cache the raw measurements and the pseudorange information processing logic 150 can determine the location.

According to one embodiment, the raw measurement data is the pseudorange information that is extracted. According to one embodiment, the raw measurement data is pseudorange information that is calculated by the GNSS chipset 170 and is only for use by the GNSS chipset 170.

According to one embodiment, a determining position fix logic 170B may perform a least squares solution171B on the extracted pseudorange information prior to transmitting the output to the pseudorange information bridger logic 143. According to another embodiment, the extracted pseudorange information is improved using various embodiments described in FIGS. 7A-10 prior to performing a least squares solution171B, as will be described herein.

Methods of Improving Position Accuracy of Extracted Pseudorange Information

The extracted pseudorange information without further improvements can be used to provide an instant location, as described herein. The extracted pseudorange information can be improved by applying position accuracy improvements that include, but are not limited to, those depicted in Tables 2 and 3. The instant location or the improved location can be communicated to location manager logic 161, as discussed herein, that displays the instant location or the improved location with respect to a map.

FIG. 7A depicts a flowchart 700A of a method of improving the position accuracy using one or more position accuracy improvements, according to one embodiment.

At 710A, the method begins.

At 720A, the pseudorange-correction-logic 151 provides Wide Area Augmentation System (WAAS) corrected pseudoranges by applying WAAS corrections to the extracted pseudorange information. For example, the pseudorange-correction-logic 151 receives the extracted pseudorange information that was extracted from the GNSS chipset 170 at 630 of FIG. 6. The cellular device 100, 200 receives the WAAS corrections, as described herein, and provides the WAAS corrections to the pseudorange-correction-logic 151. The pseudorange-correction-logic 151 provides Wide Area Augmentation System (WAAS) corrected pseudoranges by applying the received WAAS corrections to the extracted pseudorange information.

At 730A the method ends.

FIG. 7B depicts a flowchart 700B of a method of improving the position accuracy using one or more position accuracy improvements, according to one embodiment.

At 710B, the method begins.

At 720B, the pseudorange-carrier-phase-smoothing-logic 152 provides smoothed pseudorange information by performing pseudorange smoothing on the extracted pseudorange information based on carrier phase information. For example, if real carrier phase information is available, the cellular device 100, 200 can extract it as discussed herein. Otherwise, the cellular device 100, 200 can derive reconstructed carrier phase information as described herein and provide the reconstructed carrier phase information to the pseudorange-carrier-phase-smoothing-logic 152. The pseudorange-carrier-phase-smoothing-logic 152 can receive the extracted pseudorange information that was extracted from the GNSS chipset 170 at 630 of FIG. 6. The pseudorange-carrier-phase-smoothing-logic 152 can apply either the real carrier phase information or the real carrier phase information to the extracted pseudorange information to provide smoothed pseudorange information.

At 730B, a position fix is determined based on the smoothed pseudorange information and WAAS pseudorange corrections. For example, the pseudorange-correction-logic 151 receives the smoothed pseudorange information and receives WAAS pseudorange corrections and determines a position fix based on the smoothed pseudorange information and the WAAS pseudorange corrections.

At 740B, the method ends.

According to one embodiment, a determining position fix logic 170B may perform a least squares solution 171B on the output of flowchart 700A and 700B prior to transmitting the output to the pseudorange information bridger logic 143.

FIG. 8A depicts a flowchart 800A of a method of improving the position accuracy using one or more position accuracy improvements, according to one embodiment.

At 810A, the method begins.

At 820A, the pseudorange-correction-logic 151 provides Differential Global Positioning System (DGPS) corrected pseudoranges by applying DGPS corrections to the extracted pseudorange information.

For example, the pseudorange-correction-logic 151 receives the extracted pseudorange information that was extracted from the GNSS chipset 170 at 630 of FIG. 6. The cellular device 100, 200 receives the DGPS corrections as described herein and provides the DGPS corrections to the pseudorange-correction-logic 151. The pseudorange-correction-logic 151 provides Differential Global Positioning System (DGPS) corrected pseudoranges by applying the received DGPS corrections to the extracted pseudorange information.

At 830A, the pseudorange-correction-logic 151 provides WAAS-DGPS corrected pseudoranges by applying Wide Area Augmentation System (WAAS) to the DGPS corrected pseudoranges.

For example, the pseudorange-correction-logic 151 accesses the DGPS corrected pseudoranges determined at 820A of FIG. 8A. The cellular device 100, 200 receives the WAAS corrections as described herein and provides the WAAS corrections to the pseudorange-correction-logic 151. The pseudorange-correction-logic 151 provides WAAS-DGPS corrected pseudoranges by applying Wide Area Augmentation System (WAAS) to the DGPS corrected pseudoranges.

At 840A, the method ends.

FIG. 8B depicts a flowchart 800B of a method of improving the position accuracy using one or more position accuracy improvements, according to one embodiment.

At 810B, the method begins.

At 820B, a position determination decision is made as to whether to proceed to 822B or 824B. For example, at operation 820B, the position accuracy improvement determination logic 180B can determine whether to proceed to 822B or 824B as discussed herein.

At 830B, DGPS corrected smoothed pseudoranges are provided by applying corrections to the smoothed pseudorange information. For example, the pseudorange-correction-logic 151 can provide DGPS corrected smoothed pseudoranges by applying DGPS corrections to the smoothed pseudoranges determined at either 822B or 824B.

At 840B, WAAS-DGPS corrected smoothed pseudoranges are provided by applying WAAS to the DGPS corrected smoothed pseudoranges. For example, the pseudorange-correction-logic 151 can provide WAAS-DGPS corrected smoothed pseudoranges by applying WAAS corrections to the DGPS corrected smoothed pseudoranges.

At 850B, the method ends.

According to one embodiment, a determining position fix logic 170B may perform a least squares solution 171B on the output of flowcharts 800A or 800B prior to transmitting the output to the pseudorange information bridger logic 143.

FIG. 9A depicts a flowchart 900A of a method of improving the position accuracy using one or more position accuracy improvements, according to one embodiment.

At 910A, the method begins.

At 920A, DGPS corrected pseudoranges are determined by applying DGPS pseudorange corrections to extracted pseudorange information. For example, the pseudorange-correction-logic 151 receives extracted pseudorange information from the pseudorange information extractor logic 142 and applies the DGPS pseudorange corrections to the extracted pseudorange information.

At 930A, the pseudorange-correction-logic 151 can determine a position fix based on the DGPS corrected pseudoranges and PPP corrections.

At 940A, the method ends.

FIG. 9B depicts a flowchart 900B of a method of improving the position accuracy using one or more position accuracy improvements, according to one embodiment.

At 910B, the method begins.

At 920B, smoothed pseudorange information is provided by performing pseudorange smoothing on the extracted pseudorange information using carrier phase information. For example, the pseudorange-carrier-phase-smoothing-logic 152 provides smoothed pseudorange information by performing pseudorange smoothing on the extracted pseudorange information, which can be obtained as discussed herein, based on carrier phase information. If real carrier phase information is available, the cellular device 100, 200 can extract the real carrier phase information, as discussed herein. Otherwise, the cellular device 100, 200 can derive reconstructed carrier phase information, as described herein, and provide the reconstructed carrier phase information to the pseudorange-carrier-phase-smoothing-logic 152.

At 930B, DGPS corrected smoothed pseudoranges are provided by applying DGPS pseudorange corrections to the smoothed pseudorange information. For example, the pseudorange-correction-logic 151 can receive the smoothed pseudorange information from the pseudorange-carrier-phase-smoothing-logic 152. The pseudorange-correction-logic 151 can determine the corrected smoothed pseudoranges by applying DGPS pseudorange corrections to the smoothed pseudorange information.

At 940B, a position fix can be determined based on the DGPS corrected smoothed pseudoranges and PPP corrections. For example, the pseudorange-correction-logic 151 can determine a position fix based on the DGPS corrected smoothed pseudoranges and PPP corrections.

At 950B, the method ends.

According to one embodiment, a determining position fix logic 170B may perform a least squares solution 171B on the output of flowcharts 900A and 900B prior to transmitting the output to the pseudorange information bridger logic 143.

Figure 10:
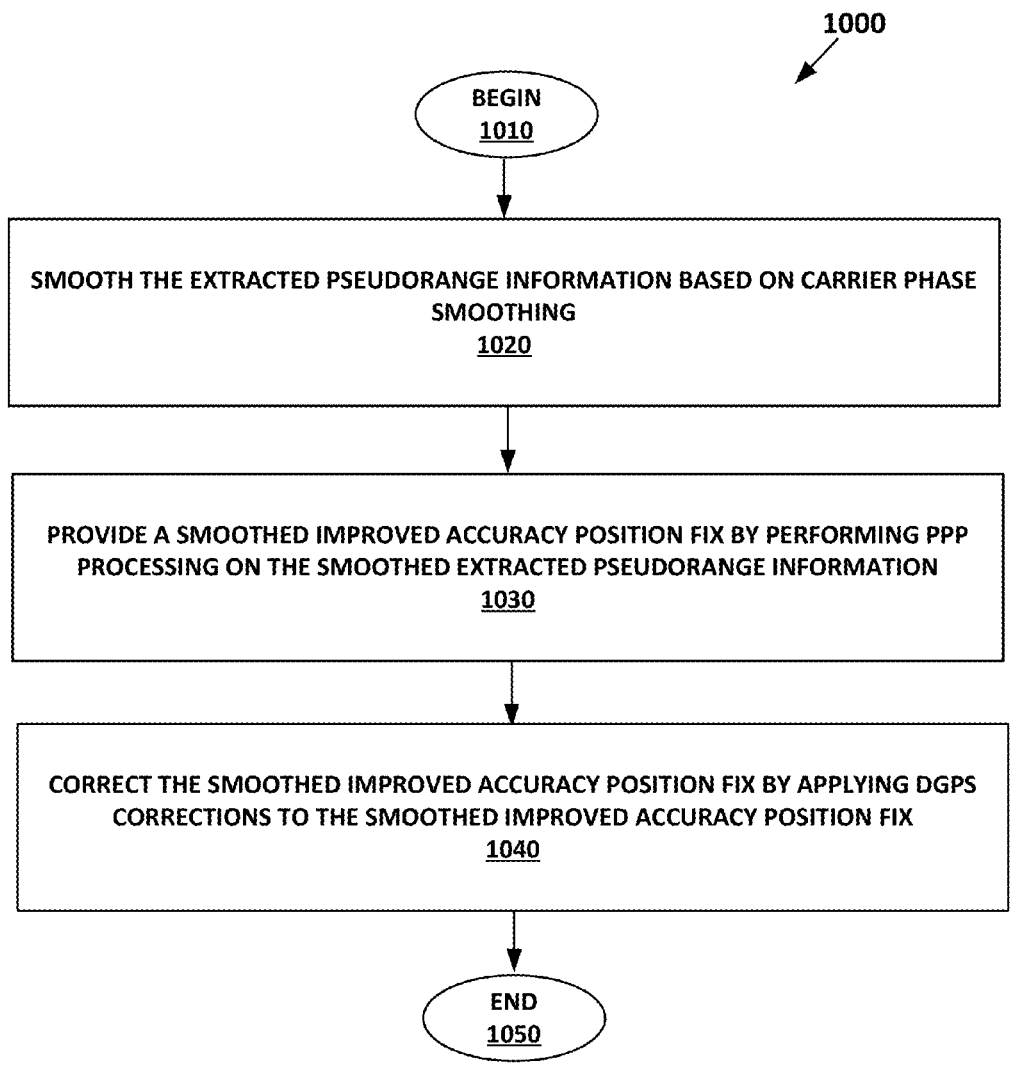

FIG. 10 depicts a flowchart 1000 of a method of improving the position accuracy using one or more position accuracy improvements, according to one embodiment.

At 1010, the method begins.

At 1020, the pseudorange-carrier-phase-smoothing-logic 152 smoothes the extracted pseudorange information based on carrier phase smoothing. For example, the pseudorange-carrier-phase-smoothing-logic 152 receives extracted pseudorange information from the pseudorange information extractor logic 142 and receives carrier phase information, which may be either real carrier phase information or reconstructed carrier phase information, as described herein. The pseudorange-carrier-phase-smoothing-logic 152 smoothes the extracted pseudorange information based on carrier phase smoothing.

At 1030, the PPP logic 151C provides a smoothed improved accuracy position fix by performing Precise Point Positioning (PPP) processing on the smoothed extracted pseudorange information. For example, the PPP logic 151C receives the smoothed extracted pseudorange information provided by the pseudorange-carrier-phase-smoothing-logic 152 at 1020. The PPP logic 151C provides a smoothed improved accuracy position fix by performing Precise Point Positioning (PPP) processing on the smoothed extracted pseudorange information At 1040, the pseudorange-correction-logic 151 can optionally correct the smoothed improved accuracy position fix by applying Differential Global Positioning System (DGPS) corrections to the smoothed improved accuracy position fix. For example, pseudorange-correction-logic 151 receives the smoothed improved accuracy position fix provided by the PPP logic 151C at 1030. The pseudorange-correction-logic 151 receives DGPS corrections as described herein. The pseudorange-correction-logic 151 corrects the smoothed improved accuracy position fix by applying Differential Global Positioning System (DGPS) corrections to the smoothed improved accuracy position fix, thus, providing a corrected smoothed improved accuracy position fix. Operation 1040 is optional, according to one embodiment.

At 1050, the method ends.

According to one embodiment, a determining position fix logic 170B may perform a least squares solution 171B on the output of flowchart 1000 prior to transmitting the output to the pseudorange information bridger logic 143.

Figure 11:
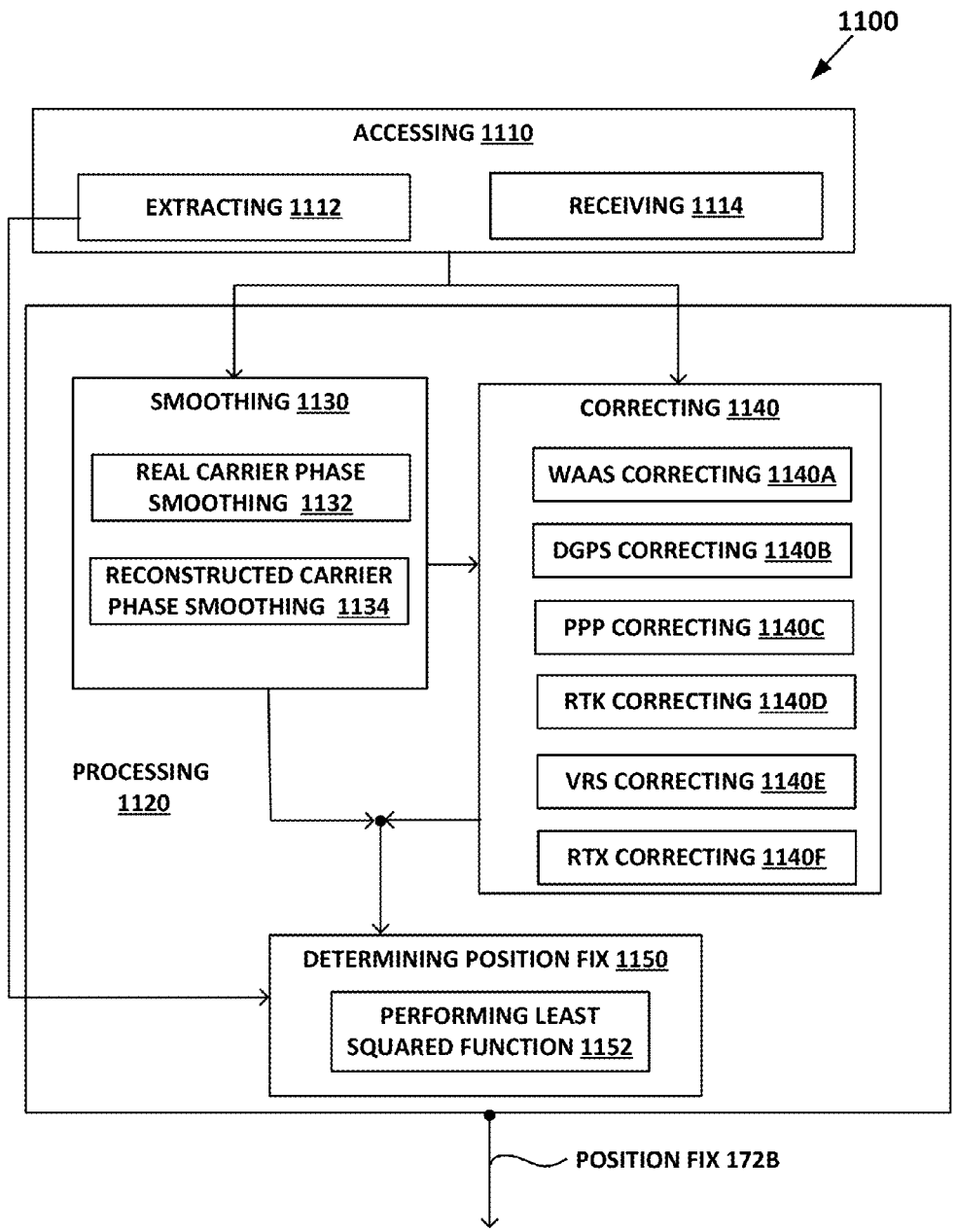
FIG. 11 depicts a flowchart a method of accessing and processing extracted pseudorange information, according to one embodiment.

FIG. 11 depicts a flowchart 1100 of a method of accessing and processing extracted pseudorange information, according to one embodiment.

At 1110, various types of information can be accessed. Examples of accessing are extracting 1112 information and receiving 1114 information. Unsmoothed uncorrected pseudorange information can be extracted at 1112A, WAAS corrections can be extracted at 1112B, SBAS corrections can be extracted at 1112E, Doppler shift can be extracted at 1112C, and carrier phase measurements can be extracted at 1112D. "Accessing" and "obtaining" can be used interchangeably. Table 1 depicts types of information that can be extracted at operation 1112 from the GNSS chipset 170 and types of information that are received at operation 1114 instead of being extracted. However, various embodiments are not limited to the types of information that can be extracted or received depicted in Table 1.

The received or extracted information or a combination thereof, can be processed at 1120.

What or whether to apply position accuracy improvements can be determined at 1160, for example, by the position accuracy improvement determination logic 180B. Examples of position accuracy improvements are real carrier phase information, reconstructed carrier phase information, WAAS, SBAS, DGPS, PPP, RTK, VRS and RTX™ corrections. The determination logic 180B can determine whether one or more and in what order logics 152A, 152B, 151A-151F are performed, according to one embodiment. Tables 2 and 3 are examples of carrier phase information or corrections or a combination thereof, that the position accuracy improvement determination logic 180B may determine, as discussed herein.

The information can be smoothed at 1130. Examples of smoothing 1130 are real carrier phase smoothing 1132 and reconstructed carrier phase smoothing 1134.

Either unsmoothed information or smoothed information can be corrected at 1140. For example, unsmoothed information from 1110 or smoothed information from 1130 can be corrected at 1140. Examples of correcting are SBAS correcting 1140G, WAAS correcting 1140A, DGPS correcting 1140B, PPP correcting 1140C, RTK correcting 1140D, VRS correcting 1140E, and RTX™ correcting 1140F. The smoothed information or unsmoothed information can be corrected using one or more of operations 1140A-1140G. According to one embodiment, WAAS correcting 1140A is an example of SBAS correcting 1140G.

Unsmoothed information from 1110, smoothed information from 1112, corrected unsmoothed information from 1140 or corrected smoothed information from 1140 can be used to determine a position fix 172B at 1150, for example, by performing a least squares solution 171B at 1152. The output of flowchart 1100 is a position fix 172B. Table 2 and Table 3 depict combinations of information that result in a position fix 172B, according to various embodiments.

According to one embodiment, accessing 1110, extracting 1112, extracting pseudorange information 1112A, extracting SBAS 1112E, extracting WAAS 1112B, extracting Doppler 1112C, extracting carrier phase measurement 1112D, receiving 1114, smoothing 1130, correcting 1140, determining a position fix 1150, and performing a least squares solution 1152 can be performed respectively by logic 110B, 142, 112B-5, 112B-2, 112B-3, 112B-4, 114B, 150, 152, 151, and 170B. Real carrier phase smoothing 1132, reconstructed carrier phase smoothing 1134, correcting 1140A-1140G can be performed respectively by logic 152A, 152B, 151A-151E, 151F, 151G.

Any one or more of 1112, 1112A-1112E, 1132, 1134, 1140A-1140G can be performed. Further, any one or more of 1112, 1112A-1112E, 1112B, 1112C, 1112E, 1132, 1134, 1140A-1140G can be performed in various orders. Various embodiments are not limited to just the combinations that are described herein.

According to one embodiment, a Global Navigation Satellite System (GNSS) chipset embedded within the cellular device is accessed at 620 (FIG. 6) where the GNSS chipset calculates pseudorange information for use by the GNSS chipset. The pseudorange information is extracted at 640 (FIG. 6), 112 (FIG. 11) from the GNSS chipset for use elsewhere in the cellular device outside of the GNSS chipset. The accessing 620 and the extracting 640, 1112A can be performed by the cellular device 100, 200 that includes hardware 180.

The extracted pseudorange information can be smoothed at 1130. The smoothing 1130 can be based on reconstructed carrier phase information or real carrier phase information. The smoothed pseudorange information can be corrected at 1140. Examples of the types of corrected pseudoranges are Wide Area Augmentation System (WAAS), Differential Global Positioning System (DGPS), Precise Point Positioning (PPP), and Real Time Kinematic (RTK). Pseudorange corrections can be accessed 1110. The corrected pseudorange information can be derived, for example at 1140, by applying the pseudorange corrections to the extracted pseudorange information.

FIGS. 4-11 depict flowcharts 400-1100, according to one embodiment. Although specific operations are disclosed in flowcharts 400-1100, such operations are exemplary. That is, embodiments of the present invention are well suited to performing various other operations or variations of the operations recited in flowcharts 400-1100. It is appreciated that the operations in flowcharts 400-1100 may be performed in an order different than presented, and that not all of the operations in flowcharts 400-1100 may be performed.

The operations depicted in FIGS. 4-11 transform data or modify data to transform the state of a cellular device 100, 200. For example, by extracting pseudorange information from a GNSS chipset 170 for use elsewhere, the state of the cellular device 100, 200 is transformed from a cellular device that is not capable of determining a position fix itself into a cellular device that is capable of determining a position fix itself. In another example, operations depicted in flowcharts 400-1100 transform the state of a cellular device 100, 200 from not being capable of providing an improved accuracy position fix to be capable of providing an improved accuracy position fix.

The above illustration is only provided by way of example and not by way of limitation. There are other ways of performing the method described by flowcharts 400-1100.

The operations depicted in FIGS. 4-11 can be implemented as computer readable instructions, hardware or firmware. According to one embodiment, hardware associated with a cellular device 100, 200 can perform one or more of the operations depicted in FIGS. 4-11.

Example GNSS Receiver

Figure 12:
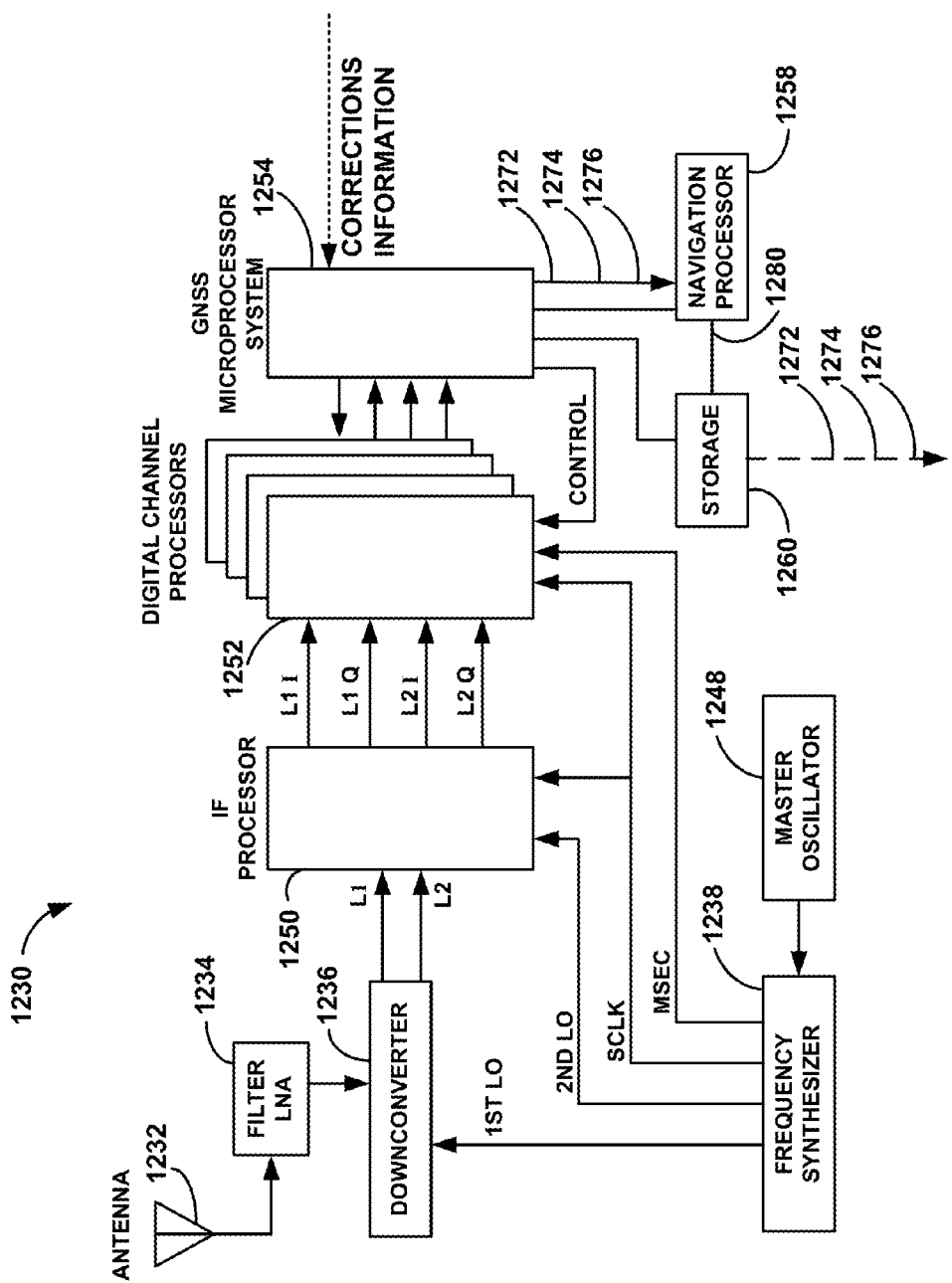
FIG. 12 depicts a block diagram of a GNSS receiver, according to one embodiment.

With reference now to FIG. 12, a block diagram is shown of an embodiment of an example GNSS receiver which may be used in accordance with various embodiments described herein. In particular, FIG. 12 illustrates a block diagram of a GNSS receiver in the form of a general purpose GPS receiver 1230 capable of demodulation of the L1 and/or L2 signal(s) received from one or more GPS satellites. A more detailed discussion of the function of a receiver such as GPS receiver 1230 can be found in U.S. Pat. No. 5,621,416, by Gary R. Lennen, is titled "Optimized processing of signals for enhanced cross-correlation in a satellite positioning system receiver," and includes a GPS receiver very similar to GPS receiver 1230 of FIG. 12.

In FIG. 12, received L1 and L2 signals are generated by at least one GPS satellite. Each GPS satellite generates different signal L1 and L2 signals and they are processed by different digital channel processors 1252 which operate in the same way as one another. FIG. 12 shows GPS signals (L1=1575.42 MHz, L2=1227.60 MHz) entering GPS receiver 1230 through a dual frequency antenna 1232. Antenna 1232 may be a magnetically mountable model commercially available from Trimble Navigation of Sunnyvale, Calif. Master oscillator 1248 provides the reference oscillator which drives all other clocks in the system. Frequency synthesizer 1238 takes the output of master oscillator 1248 and generates important clock and local oscillator frequencies used throughout the system. For example, in one embodiment frequency synthesizer 1238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1234 performs filtering and low noise amplification of both L1 and L2 signals. The noise figure of GPS receiver 1230 is dictated by the performance of the filter/LNA combination. The downconvertor 1236 mixes both L1 and L2 signals in frequency down to approximately 175 MHz and outputs the analogue L1 and L2 signals into an IF (intermediate frequency) processor 1250. IF processor 1250 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1252 inputs the digitally sampled L1 and L2 inphase and quadrature signals. All digital channel processors 1252 are typically are identical by design and typically operate on identical input samples. Each digital channel processor 1252 is designed to digitally track the L1 and L2 signals produced by one satellite by tracking code and carrier signals and to from code and carrier phase measurements in conjunction with the GNSS microprocessor system 1254. One digital channel processor 1252 is capable of tracking one satellite in both L1 and L2 channels. Microprocessor system 1254 is a general purpose computing device (such as computer system 1000 of FIG. 10) which facilitates tracking and measurements processes, providing pseudorange and carrier phase measurements for a determining position fix logic 1258. In one embodiment, microprocessor system 1254 provides signals to control the operation of one or more digital channel processors 1252. According to one embodiment, the GNSS microprocessor system 1254 provides one or more of pseudorange information 1272, Doppler Shift information 1274, and real Carrier Phase Information 1276 to the determining position fix logic 1258. One or more of pseudorange information 1272, Doppler Shift information 1274, and real Carrier Phase Information 1276 can also be obtained from storage 1260. One or more of the signals 1272, 1274, 1276 can be conveyed to the cellular device's processor, such as processor 109 (FIG. 1A) that is external to the GNSS chipset 170 (FIG. 1A). Determining position fix logic 1258 performs the higher level function of combining measurements in such a way as to produce position, velocity and time information for the differential and surveying functions, for example, in the form of a position fix 1280. Storage 1260 is coupled with determining position fix logic 1258 and microprocessor system 1254. It is appreciated that storage 1260 may comprise a volatile or non-volatile storage such as a RAM or ROM, or some other computer readable memory device or media. In some embodiments, determining position fix logic 1258 performs one or more of the methods of position correction described herein.

In some embodiments, microprocessor 1254 and/or determining position fix logic 1258 receive additional inputs for use in receiving corrections information. According to one embodiment, an example of the corrections information is WAAS corrections. According to one embodiment, examples of corrections information are differential GPS corrections, RTK corrections, signals used by the previously referenced Enge-Talbot method, and wide area augmentation system (WAAS) corrections among others.

Although FIG. 12 depicts a GNSS receiver 1130 with navigation signals L1I, L1Q, L2I, L2Q, various embodiments are well suited different combinations of navigational signals. For example, according to one embodiment, the GNSS receiver 1130 may only have an L1I navigational signal. According to one embodiment, the GNSS receiver 1130 may only have L1I, L1Q and L2I.

Various embodiments are also well suited for future navigational signals. For example, various embodiments are well suited for the navigational signal L2C that is not currently generally available. However, there are plans to make it available for non-military receivers.

According to one embodiment, either or both of the accessing logic 110B and the processing logic 150 reside at either or both of the storage 1260 and GNSS microprocessor system 1254.

According to one embodiment, the GNSS receiver 1230 is an example of a GNSS receiver 107 (see e.g., FIG. 1A and FIG. 1D). According to one embodiment, the determining position fix logic 1258 is an example of determining position fix logic 170B (FIG. 1B). According to one embodiment, position fix 1280 is an example of a position fix 172B (FIG. 1B).

Kalman Filtering

Figure 13:
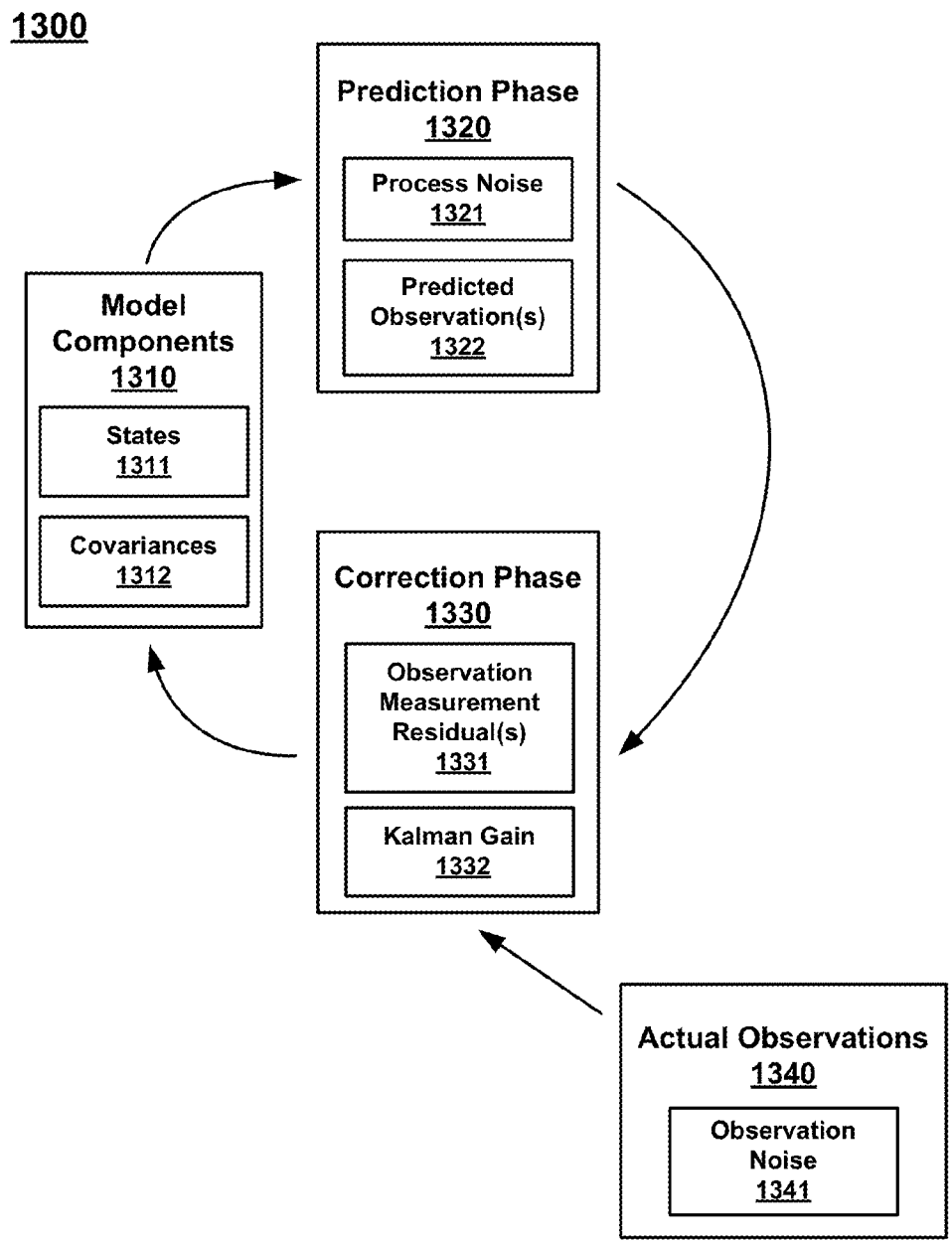
FIG. 13 depicts an example Kalman Filtering process, according to some embodiments.

FIG. 13 depicts an example Kalman filtering process 1300, according to some embodiments. It should be appreciated that Kalman filtering is well known. As such, FIG. 13 and the associated discussion are utilized only to provide a high-level general description. Variations in the described procedures will occur during specific implementations of Kalman filtering. The extended Kalman filter and the unscented Kalman filter represent some of the variations to the basic method. Such variations are normal and expected. Generally speaking, Kalman filtering is a basic two-step predictor/corrector modeling process that is commonly used model dynamic systems. A dynamic system will often be described with a series of mathematical models. Models describing satellites in a Global Navigation Satellite System (GNSS) are one example of a dynamic system. Because the position of any satellite and/or the positions of all the satellites in a system constantly and dynamically change and the satellites output a signal that can be measured by a GNSS receiver, Kalman filtering can be used in determining positions of the satellites.

A basic Kalman filter implemented using Kalman filtering process 1300 typically has at least two major components 1310: states 1311 and covariances 1312. States 1311 represent variables that are used to describe a system being modeled, at a particular moment in time. Covariances 1312 are represented in a covariance matrix that describes uncertainty, or lack of confidence, of states 1311 with respect to each other at that same moment in time. Kalman filtering process 1300 also handles noise, or unpredictable variability, in the model. There are two principle types of noise, observation noise 1341 and process noise 1321. A Kalman filter may handle additional noise types, in some embodiments. Process noise 1321 describes noise of the states 1311 as a function of time. Observation noise 1341 is noise that relates to the actual observation(s) 1340 (e.g., observed measurements) that are used as an input/update to Kalman filtering process 1300.

A prediction phase 1320 is the first phase of Kalman filtering process 1300. Prediction phase 1320 uses predictive models to propagate states 1311 to the time of an actual observation(s) 1340. Prediction phase 1320 also uses process noise 1321 and predictive models to propagate the covariances 1312 to time of the actual observation(s) 1340 as well. The propagated states 1311 are used to make predicted observation(s) 1322 for the time of actual observation(s) 1340.

A correction phase 1330 is the second phase in the Kalman filtering process 1300. During correction phase 1330, Kalman filtering process 1300 uses the difference between the predicted observation(s) 1322 and the actual observation(s) 1340 to create an observation measurement residual 1331, which may commonly be called the "measurement residual." Observation noise 1341 can be noise in actual observation(s) 1340 and/or noise that occurs in the process of taking the actual observation(s) 1340. A Kalman gain 1332 is calculated using both the covariances 1312 and the observation noise 1341. The states 1311 are then updated using the Kalman Gain 1332 multiplied by the observation measurement residual 1331. The covariances 1312 are also updated using a function related to the Kalman gain 1332; for example, in one embodiment where Kalman gain is limited to a value between 0 and 1, this function may be 1 minus the Kalman gain. This updating is sometimes referred to as the "covariance update." In some embodiments, if no actual observation 1340 is available, Kalman filtering process 1300 can simply skip correction phase 1330 and update the states 1311 and covariances 1312 using only the information from prediction phase 1320, and then begin again. Using the new definitions of the states 1311 and covariances 1312, Kalman filtering process 1300 is ready to begin again and/or to be iteratively accomplished.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a cellular device 100, 200 (FIGS. 1A-2) and are executed by a hardware processor of the cellular device 100, 200. When executed, the instructions cause a computer system to implement the functionality of various embodiments of the present invention. For example, the instructions can be executed by a central processing unit associated with the cellular device 100, 200. According to one embodiment, the non-transitory computer readable storage medium is tangible.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause the cellular device 100, 200 to implement the functionality of various embodiments. For example, according to one embodiment, the SUPL client 101 and the operations of the flowcharts 400-1100 depicted in FIGS. 4-11 are implemented with computer readable instructions that are stored on computer readable storage medium, which can be tangible or non-transitory or a combination thereof, and can be executed by a hardware processor 109 of a cellular device 100, 200.

II. Improving Position Determination of a Cellular Device Using Carrier Phase Smoothing Overview of Discussion At times a current position fix can differ significantly from one or more previous position fixes or succeeding position fixes, or a combination of previous position fixes and succeeding position fixes. A position fix that differs significantly from one or more previous position fixes or succeeding position fixes, or a combination thereof, is referred to as an "outlier." Further, locally measured movement information obtained, for example, from hardware, such as an accelerometer or an image capturing device, may be used to validate the accuracy of a position fix, to discard a position fix that is an "outlier," or to calculate a new position fix that can replace the discarded position fix, or a combination there of.

A position fix may be determined to be an "outlier" based on the accuracy of that position fix. Validating accuracy of a position fix, discarding a position fix that is an "outlier," and calculating a new position fix to replace a discarded position fix based on locally measured movement information are each examples of improving position determine of a cellular device using locally measured movement information. A filter can be used to perform one or more of the validating of the accuracy of a position fix, the discarding of the position fix, the calculating of a new position fix and the replacing of the discarded position fix.

The locally measured movement information that is used to determine to remove a position fix or to calculate a new position fix that will replace the removed position fix can be from dissimilar kinds of sensors. An accelerometer and an image capturing device are examples of sensors that are dissimilar with respect to each other. A filter can be used to integrate (also known as "blend") the locally measured movement information from the dissimilar sensors together, for example, using weighting factors, as discussed herein.

Locally measured movement information, according to one embodiment, is information that includes measurements of movement where the movement and the measurements of the movement occur locally with respect to a cellular device. For example, an accelerometer that is attached or part of a cellular device can be used to measurement the distance that the cellular device has moved. In another example, one or more images obtained with an image capturing device that is attached or part of the cellular device can be used to measure the distance the cellular device has moved.

According to various embodiments, there are at least two processes that execute concurrently. The first process extracts raw pseudorange information, which is uncorrected and unsmoothed, from a GNSS chipset embedded in the cellular device, determines position fix(es) based on the extracted raw pseudoranges and optionally smoothes, for example, by discarding one or more of the position fix(es) using locally measured movement (LMM) information. The extracted raw pseudoranges may be corrected based on external corrections prior to determining the position fix(es). Examples of external corrections include WAAS, SBAS, DGPS, PPP, RTK, VRS and RTX™ corrections. External corrections are obtained from sources that are external to the cellular device.

The second process extracts raw pseudorange information, smoothes the extracted raw pseudorange information using carrier phase information, which may be either real or reconstructed carrier phase information, determines one or more position fixes based on the smoothed pseudorange information, and optionally performs additional smoothing by applying locally measured movement (LMM) information to one or more position fix(es). According to one embodiment, real carrier phase information is preferred over reconstructed carrier phase information. The smoothed pseudoranges (also referred to as "carrier phase smoothed pseudoranges") may be corrected based on external corrections prior to determining a position fix.

Carrier phase smoothing can be used to discard pseudoranges with larger changes in apparent size than might be expected, due to a variety of impairments, well-known in the Global Positioning arts. Locally measured movement (LMM) information can be used for determining which of the position fix(es) exhibit unexpected and unwanted changes. A position fix that exhibits unexpected or unwanted changes is an "outlier." The process of filtering (also known as "smoothing") position fixes involves, according to one embodiment, examining position fixes to determine which position fixes are "outliers," and discarding position fixes that are "outliers." Position fixes are smoothed as a part of applying locally measured movement (LMM) information to position fixes, according to one embodiment.

Typically it takes substantially longer to provide a position fix using the second process than with the first process because the second process gathers enough, such as a predetermined amount, carrier phase information to smooth the extracted raw pseudoranges before providing a position fix. Therefore, according to various embodiments, one or more position fixes may be provided using the first process while waiting for the second process to be capable of providing a position fix. Further, if carrier phase smoothing becomes unavailable or unreliable while using the second process, subsequent position fix(es) can be provided to the user from the first process instead of the second process. If carrier phase smoothing becomes available and reliable while using the first process to provide position fix(es), subsequent position fix(es) can be provided to the user from the second process instead of the first process. Thus, the providing of position fix(es) to a user can be switched between the two processes depending, for example, on whether carrier phase information is available and reliable.

According to one embodiment, the first process determines a first set of one or more position fixes based on the extracted raw pseudorange information and the second process determines carrier phase smoothed pseudoranges by smoothing the extracted raw pseudorange information based on carrier phase information, while the first process and the second process are executing concurrently.

According to one embodiment, a preference hierarchy of options is used as follows where the hierarchy is ordered from highest preference to least preference: (1) smoothed corrected pseudoranges that were smoothed based on real carrier phase information, (2) smoothed corrected pseudoranges that were smoothed based on reconstructed carrier phase information, (3) unsmoothed corrected pseudoranges, and (4) unsmoothed uncorrected pseudoranges. The particular option that is used depends, for example, on what information is available. For example, real carrier phase information will be used if it is available. If it is not available, but Doppler Shift Information is available, then reconstructed carrier phase information will be used. If external corrections are available, the pseudoranges might be corrected. If external corrections are not available, the pseudoranges will not be corrected.

Figure 14:
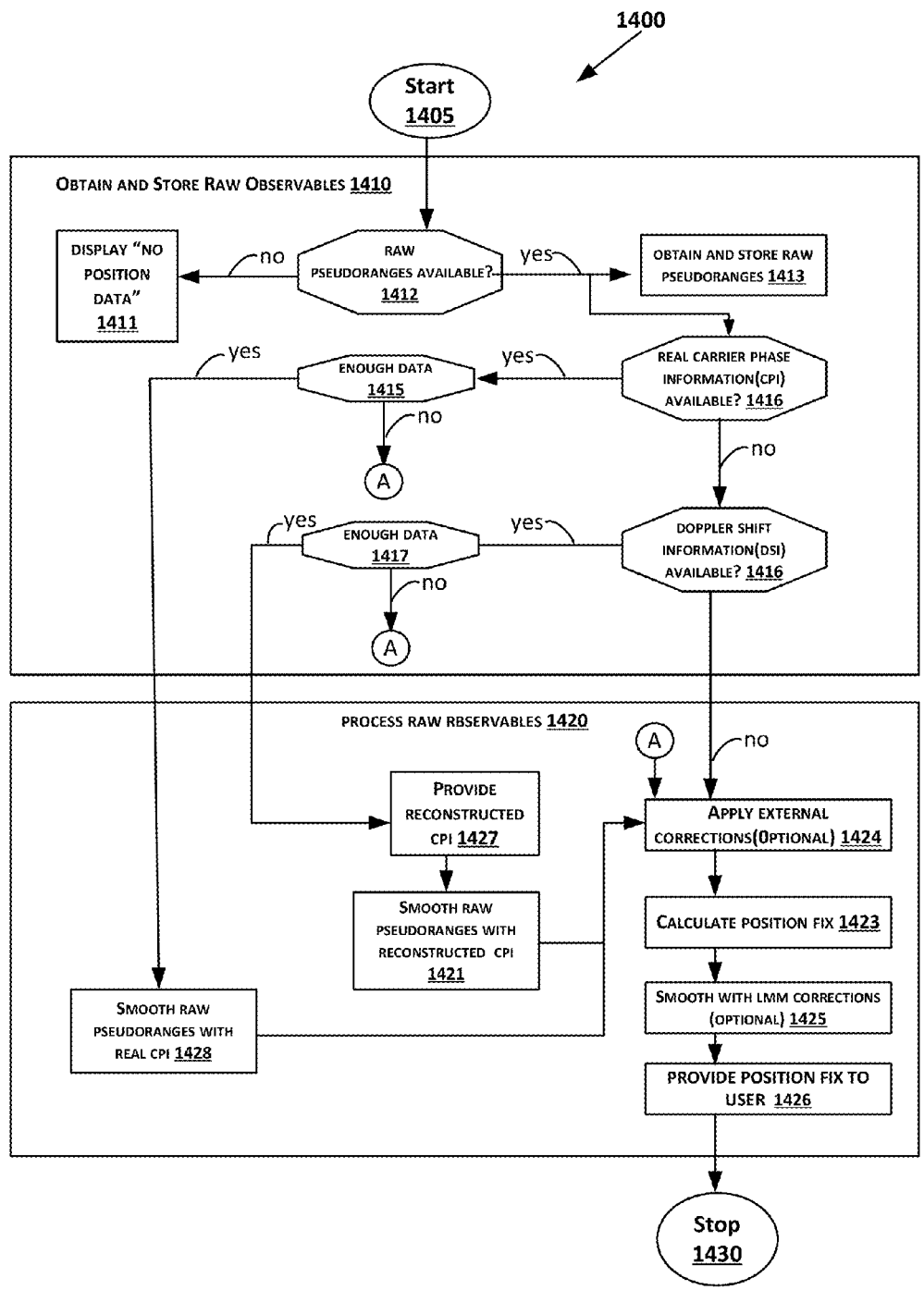
FIG. 14 depicts a flow chart with at least two processes executing concurrently for providing position fix(es), according to various embodiments.

FIG. 14 depicts a flow chart 1400 with at least two processes executing concurrently for providing position fix(es), according to various embodiments.

As depicted in FIG. 14, an example of a first process includes one or more of operations 1413, 1416, 1418, optionally 1424, 1423, and 1426. One example of a second process includes one or more of operations 1413, 1416, 1415, 1428, optionally 1424, 1423, 1418, 1417, 1427, 1421, optionally 1424, 1423, and 1426.

Examples of raw observables are raw pseudoranges, real carrier phase information and Doppler Shift Information. According to various embodiments, the raw pseudoranges are smoothed using real carrier phase information if real carrier phase information is available. If real carrier phase information is not available and Doppler Shift Information is available, the raw pseudoranges are smoothed using reconstructed carrier phase information that was reconstructed using Doppler Shift Information. If neither Real Carrier Phase Information nor Doppler Shift Information is available, then the raw pseudoranges may be corrected from external correction data sources, a position fix determined, and then the position fix can be smoothed using locally measured movement information.

Flow chart 1400 includes two major operations 1410 and 1420. For example, at 1405 the method begins and proceeds to the first major operation 1410. The first major operation is 1410 where raw observables are obtained and stored. The obtained raw observables can be stored in memory 210.

Processing proceeds to the second major operation 1420. The second major operation processes raw observables 1420.

The two major operations 1410 and 1420 each include additional operations, according to various embodiments. For example, obtaining and storing raw observables 1410 includes operations 1411-1418 and processing raw observables 1420 includes operations 1421-1428.

Processing of 1400 starts at 1405 and proceeds to 1412.

At 1412, a determination can be made as to whether raw pseudoranges are available. If raw pseudoranges are not available, a message can be displayed at 1411 indicating that position data is not available. If raw pseudoranges are available, processing can proceed from 1412 to 1413 and 1416. At 1413, raw pseudoranges can be obtained and stored. The raw pseudoranges can be obtained by extracting them from a GNSS receiver. The obtained raw pseudoranges can be stored in memory 210. At 1416, a determination can be made as to whether real carrier phase information is available from the cellular device. The real carrier phase information can be obtained by extracting it from a GNSS receiver. The obtained real carrier phase information can be stored in memory 210. If the cellular device is capable of providing real carrier phase information, processing can proceed to 1415; otherwise, processing can proceed to 1418.

At 1415, a determination is made as to whether enough, such as a predetermined amount, of real carrier phase information is available to perform smoothing. If enough real carrier phase information is available, processing proceeds to 1428, which is a part of processing raw observables 1420. According to one embodiment, enough real carrier phase information or Doppler shift information is obtained before pseudorange smoothing is performed.

At 1418, a determination is made as to whether Doppler shift information (DSI) is available. If Doppler shift information is available, processing proceeds to 1417. Doppler Shift information can be obtained by extracting it from a GNSS receiver. The obtained Doppler Shift Information can be stored in memory 210. If Doppler Shift Information is not available, processing proceeds to 1424, which is a part of processing raw extracted observables 1420.

At 1416, a determination is made as to whether enough, such as a predetermined amount, of Doppler Shift Information is available. If enough Doppler Shift Information is available, processing proceeds to 1427, which is a part of processing raw extracted observables 1420. If enough Doppler Shift Information is not available, processing proceeds to 1424, which is a part of processing raw observables.

Obtaining and processing raw extracted observables 1410 includes 1411-1418. After processing 1415, 1417, and 1418, the raw extracted observables have been obtained and stored 1410. The raw extracted observables are processed at 1420, upon proceeding to 1427, 1428 and 1424.

At 1428, the raw pseudoranges obtained at 1413 are smoothed with the real carrier phase information that were obtained at 1415, according to one embodiment. Processing proceeds to 1424.

At 1427, the Doppler Shift Information obtained at 1417, is used to provide reconstructed carrier phase information. Processing proceeds to 1421.

At 1421, the pseudoranges obtained at 1413 are smoothed with reconstructed carrier phase information. Processing proceeds to 1424.

At 1424, external corrections can optionally be applied to unsmoothed uncorrected pseudoranges obtained at 1418, smoothed uncorrected pseudoranges obtained at 1421 or 1428. Processing proceeds to 1423.

At 1423, a position fix is calculated based on the pseudoranges, which are any one of unsmoothed uncorrected pseudoranges from 1418, smoothed uncorrected pseudoranges from 1421 or 1428, unsmoothed corrected pseudoranges from 1424 when 1424 is proceeded by either 1417 or 1418, and smoothed corrected pseudoranges from 1424 when 1424 is proceeded by either 1428 or 1421.

At 1425, locally measured movement information can optionally applied to the position fix calculated at 1423 to provide additional smoothing. Processing proceeds to 1426.

At 1426, the position fix is provided to the user. Processing proceeds to 1430.

At 1430, the method stops.

Raw observables can be or can become unreliable or unavailable for many reasons, such as the cellular device being obstructed from receiving the GNSS signals containing the raw observables because it is under a tree, a structure or obscured by surroundings. However, there are other reasons why the raw observables may be or may become unreliable or unavailable. A time threshold can be used to determine when enough, such as a predetermined amount, data has been received, for example, at 1415 and 1416 as a measure of reliability and availability, according to various embodiments. However, various embodiments are well suited to using other metrics for determining reliability and availability such as consistency of signal to noise ratio (SNR) and other metrics such as dilution of precision (DOP).

According to various embodiments, if raw pseudoranges are available (1412), the raw pseudoranges are smoothed (1421) using real carrier phase information if enough, such as a predetermined amount, real carrier phase information is available (1416, 1415). According to various embodiments, the result of smoothing based on real carrier phase information, smoothing based on reconstructed carrier phase information or neither can be used to determine a position fix (1423), optionally corrected by applying external corrections (1424), optionally smoothed using locally measured movement information (1425) to provide a position fix or an improved position fix (1426).

As can be seen, a position fix may be determined based on the raw pseudoranges using the path 1413, 1416, 1418, skip 1424, 1423, a position fix may be determined based on smoothed pseudoranges that were smoothed based on real carrier phase information using the path 1413, 1416, 1415, 1428, optionally 1424, 1423, a position fix may be determined based on smoothed pseudoranges that were smoothed based on reconstructed carrier phase information using the path 1413, 1416, 1418, 1417, 1427, 1421, optionally 1424, 1423. A position fix may be determined based on corrected pseudoranges, uncorrected pseudoranges, unsmoothed pseudoranges, smoothed pseudoranges, or a combination thereof.

According to one embodiment, the position fix, that is output at 1425, is a locally measured movement smoothed position fix. According to one embodiment, smoothed pseudoranges are determined at 1428 by applying carrier phase information to the raw pseudoranges. According to one embodiment, a carrier phase smoothed position fix is determined at 1423 based on the smoothed pseudoranges. According to one embodiment, operation 1425 performs processing the position fix based on the locally measured cellular device movement information.

As discussed herein, processing can switch between the first process and the second process, as discussed herein. According to one embodiment, the first process can provide a quicker and less expensive position fix than the second process because, for example, it uses less processing power.

The second process can provide a higher accuracy position fix, for example, because the raw position fixes are smoothed with carrier phase information. Further, either one of the first process or the second process can be turned off, for example, when it is not being used to save power.

Figure 15A:
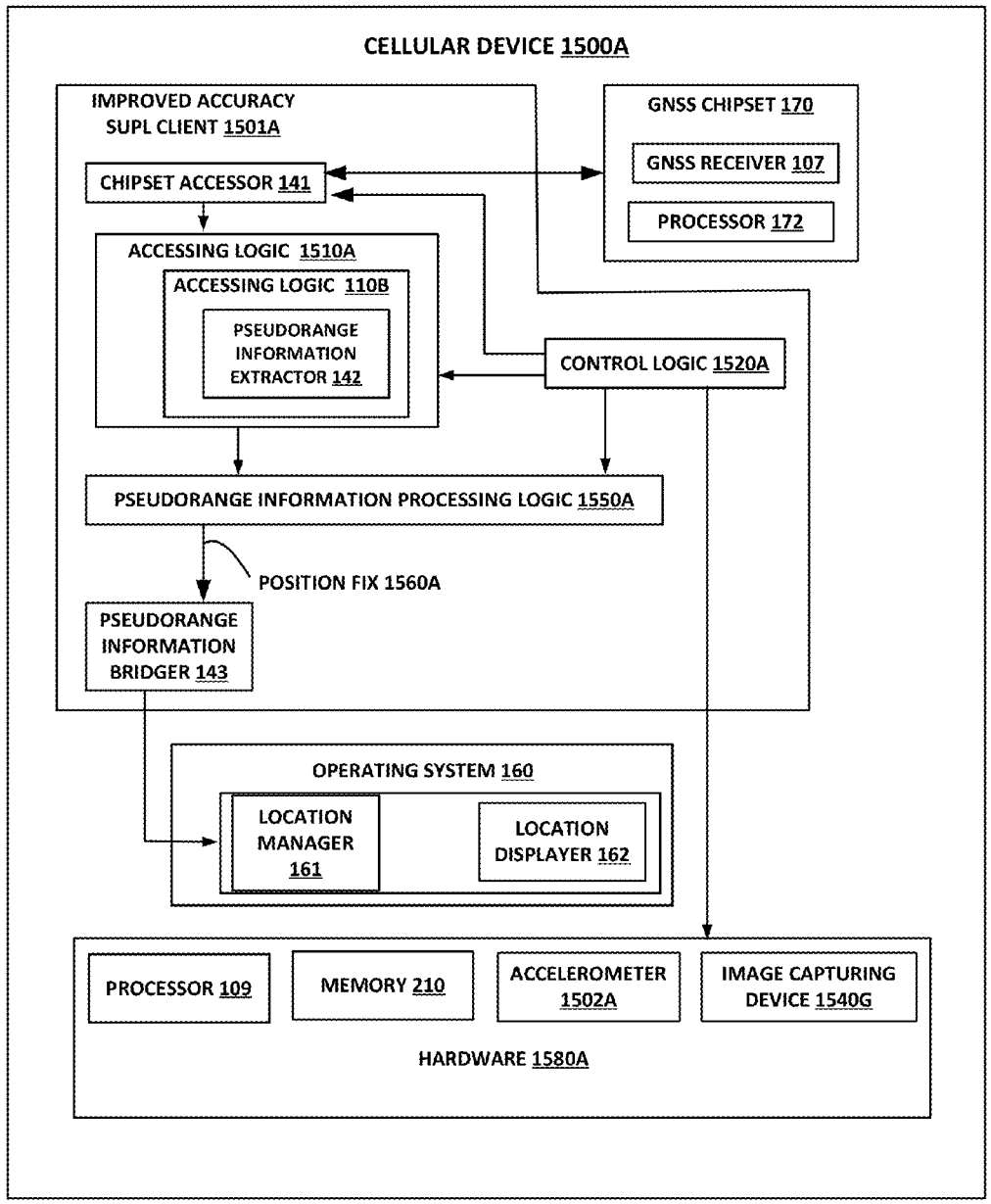
FIGS. 15A-15J depict block diagrams of a cellular device and various portions of the cellular device for providing improved position fix determination, according to one embodiment.

Systems for Improving Pseudoranges by Filtering the Extracted Pseudorange Information FIG. 15A depicts a block diagram of a cellular device 1500A for providing improved position fix determination, according to one embodiment. Examples of a cellular device 1500A include a cell phone, a non-voice enabled cellular device, a tablet computer, and a mobile hand-held GNSS receiver. The cellular device 1500A may be mobile or stationary. Examples of a tablet computer are MICROSOFT® SURFACE®, APPLE® iPads®, APPLE® iPad Mini®, SAMSUNG® GALAXY® Tab families. According to one embodiment, a cellular device is a mobile communications device (MCD) with cellular communications capabilities (also referred to as a "cellular communication enabled mobile communications device"). According to one embodiment, a mobile communications device has communications capabilities, such as Wi-Fi or BLUETOOTH®, or a combination thereof. According to one embodiment, a mobile communications device includes or communicates with one or more of a camera, compass, and accelerometer. Examples of a mobile communications device are tablet computers, laptops with detachable tablets, personal digital assistants, TRIMBLE® JUNO®, and similar devices.

As depicted in FIG. 15A, the cellular device 1500A includes a GNSS chipset 170, a GNSS receiver 107, a processor 172 that is part of the GNSS receiver 107, a chipset accessor 141, accessing logic 1510A, accessing logic 110B, pseudorange information extractor logic 142, an improved accuracy Secure User Platform Location (SUPL) client 1501A, a pseudorange information bridger logic 143, control logic 1520A, a pseudorange information processing logic 1550A, an operating system 160, a location manager logic 161, a location displayer logic 162, hardware 1580A that is outside of the GNSS receiver 107.

According to one embodiment, the hardware 1580A includes a hardware processor 109, hardware memory 210, accelerometer 1502A, and image capturing device 1540G. Raw observables, such as raw pseudoranges, real carrier phase information, Doppler Shift Information, data, such as corrected pseudoranges, uncorrected pseudoranges, smoothed pseudoranges, unsmoothed pseudoranges, or a combination thereof, can be stored in memory 210 and processed using one or more hardware processors 109. According to one embodiment, the cellular device includes at least one hardware processor 109. According to one embodiment, the cellular device includes at least one hardware sensor, such as 1502A, 1540G.

Examples of an image capturing device 1540G (also referred to as an "imager") are a camera, a video camera, a digital camera, a digital video camera, a digital camcorder, a stereo digital camera, a stereo video camera, a motion picture camera, and a television camera. The image capturing device 1540G most often will use a lens, although use of a pinhole type device is feasible. The image capture device may also be a separate unit not embedded in the cellular device's body. Such a unit may be coupled to the cellular device's electronics via a cable or via a BLUETOOTH® wireless link. Cellular devices, such as cell phones, have a multi-purpose connector for recharging the battery and for inputting or exporting data of many kinds to and from the cellular device's processor and memory.

The images may or may not have been obtained with an image capturing device that is a video device. Therefore, the images may be individual images taken with a non-video device or may be frames of a video taken with a video device.

Examples of an accelerometer 1502A are an ADXL330/335 chipset accelerometer made by Analog Devices Inc. and a LIS3LV02DQ made by STMicroelectronics. Many other such products are available and commonly used in cellular devices, such as cellphones.

According to one embodiment, the processor 172 and the GNSS receiver 107 are a part of the GNSS chipset 170. According to one embodiment, the chipset accessor 141, the accessing logic 1510A, the accessing logic 110B, pseudorange information extractor logic 142, the pseudorange information bridger logic 143, the improved accuracy SUPL client 1501A, the operating system 160, and the hardware 1580A are located in a portion of the cellular device 1500A that is outside of the GNSS chipset 170. The location manager logic 161 can be a part of the operating system 160 and external to the GNSS chipset 170. According to one embodiment, the location displayer logic 162 is a part of the location manager logic 161. According to one embodiment, the chipset accessor 141, the accessing logic 1510A, the accessing logic 110B, pseudorange information extractor logic 142, the control logic 1520A, the pseudorange information processing logic 1550A, pseudorange information bridger logic 143, and improved accuracy SUPL client 1501A are application programming interfaces (API) function applications that reside in memory of the cellular device 1500A and are executed by a processor 109 of the cellular device 1500A.

According to one embodiment, the chipset accessor 141, the accessing logic 1510A, the accessing logic 110B, the pseudorange information extractor logic 142, the control logic 1520A, the pseudorange information processing logic 1550A and pseudorange information bridger logic 143 are a part of an improved accuracy SUPL client1501A. For example, The SUPL client 1501A can interface between the GNSS chipset 170 and the location manager logic 161, which resides in the operating system 160.

Many of the features depicted in FIG. 15A have already been described herein. Therefore, in the interest of brevity, those features will not be described again.

The Improved Accuracy SUPL Client 1501A can extract pseudorange information from the GNSS chipset 170 in a similar manner that the improved Accuracy SUPL client 101 can extract pseudorange information.

The pseudorange information processing logic 1550A, according to one embodiment, provides improved position fix determination by performing one or more of determining the accuracy of a position fix, removing a position fix that is an "outlier," (also referred to as "filtering"), calculating a new position fix to replace the removed position fix. The determination of the accuracy of a position fix, the removal of a position fix that is an "outlier," and the calculation of a new position to replace a removed position fix are each performed based on locally measured movement (LMM) that is measured by hardware 1502A, 1540G coupled with the cellular device 1500A, according to various embodiments. The output of the processing logic 1550A includes one or more position fix(es) 1560C.

According to one embodiment, the control logic 1520A controls the improving of the position fix determination using locally measured movement information. For example, the control logic 1520A can provide the processing directly itself or may communicate with other entities, such as the chipset accessor 141, the accessing logic 1510A, the pseudorange information processing logic 1550A, associated with the cellular device 1500A to provide the processing.

According to one embodiment, incidental errors in true, world position or location in one or more of x, y, z, latitude, longitude, and altitude can be corrected with data from an accelerometer 1502A. According to one embodiment, an image capturing device 1540G can provide position shift information as the image capturing device 1540G is moved. According to one embodiment, the information from the image capturing device 1540G accumulates errors more slowly than information from the accelerometer 1502A. Errors in position shift information from the image capturing device occur due to extent of motion experienced, or distance traveled, as well as over time. For continuous travel, or constant motion, time passed is a viable metric for estimating error buildup. When distance travelled is small, as when a user is standing around, executing some movement of the cellular device 1500A but over limited distance range, the time-out period for declaring a specific error buildup for the image capturing device 1540G can be extended by a factor that ranges from 2-5-10. In an embodiment, integrating the use of the image capturing device 1540G and accelerometer 1502A may provide extended operational correction time durations.

According to one embodiment, the accessing logic 1510A (FIG. 15*a*) performs the operation 1410 (FIG. 14) of obtaining and storing raw observables. According to one embodiment, the pseudorange information processing logic 1550A (FIG. 15*a*) performs the operation 1420 (FIG. 14) of processing raw observables.

According to one embodiment, a system is provided that comprises one or more hardware processors 109 located in the cellular device 1500A and outside of a Global Navigation Satellite System (GNSS) chipset 170 embedded within the cellular device 1500A. The cellular device 1500A includes accessing logic 110B that accesses the Global Navigation Satellite System (GNSS) chipset embedded within the cellular device, wherein the GNSS chipset calculates raw observables that include raw pseudoranges and either Doppler shift information or real carrier phase information. The cellular device 1500A includes extracting logic 112B that extracts the raw observables from the GNSS chipset for processing elsewhere in the cellular device outside of the GNSS chipset. The cellular device 1500A includes position fix determining based on raw observables logic 170B that determines a position fix based on the raw observables. The cellular device 1500A includes locally measured movement information accessing logic 1510B that obtains locally measured cellular device movement information from at least one sensor that has a known physical relationship with the cellular device. The cellular device 1500A includes processing logic 1550A that applies the locally measured cellular device movement information to the position fix. The accessing logic 110B, the extracting logic 112B, the position fix determining based on raw observables logic 170B, the locally measured movement information accessing logic 1510B, the processing logic 1550A are executed by the one or more processor 109.

FIGS. 15B-15H depict portions of a cellular device 1500A for providing improved position fix determination based on locally measured movement information, according to one embodiment.

Figure 15B:
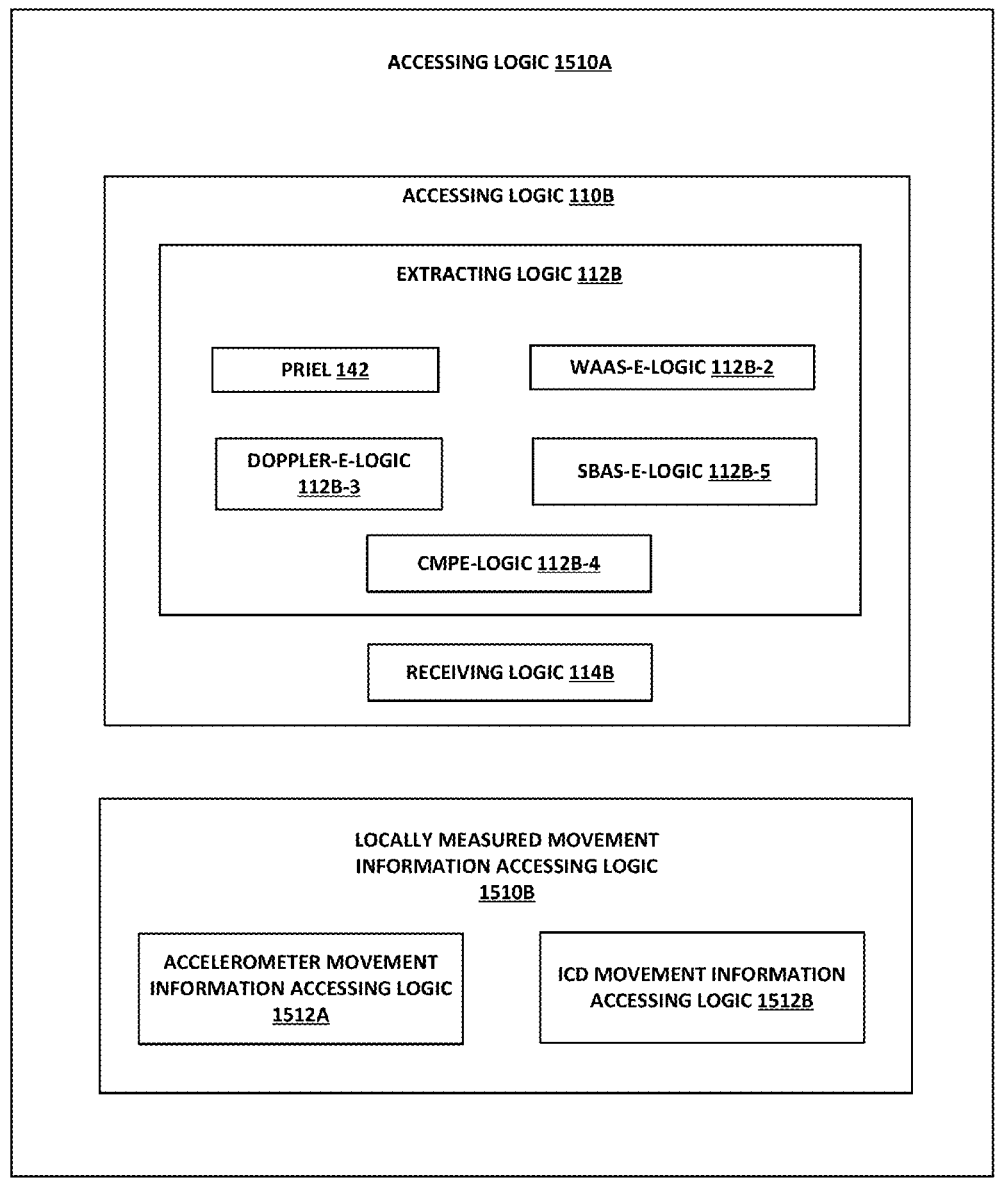

Referring to FIG. 15B, the cellular device 1500A includes accessing logic 1510A. The accessing logic 1510A includes locally measured movement information accessing logic 1510B. Optionally, the accessing logic 1510A includes accessing logic 110B. As depicted in FIG. 1B, accessing logic 110B includes extracting logic 112B and receiving logic 114B. The movement information accessing logic 1510B includes accelerometer movement information accessing logic 1512A and image capturing device (ICD) movement information accessing logic 1512B.

Figure 15C:
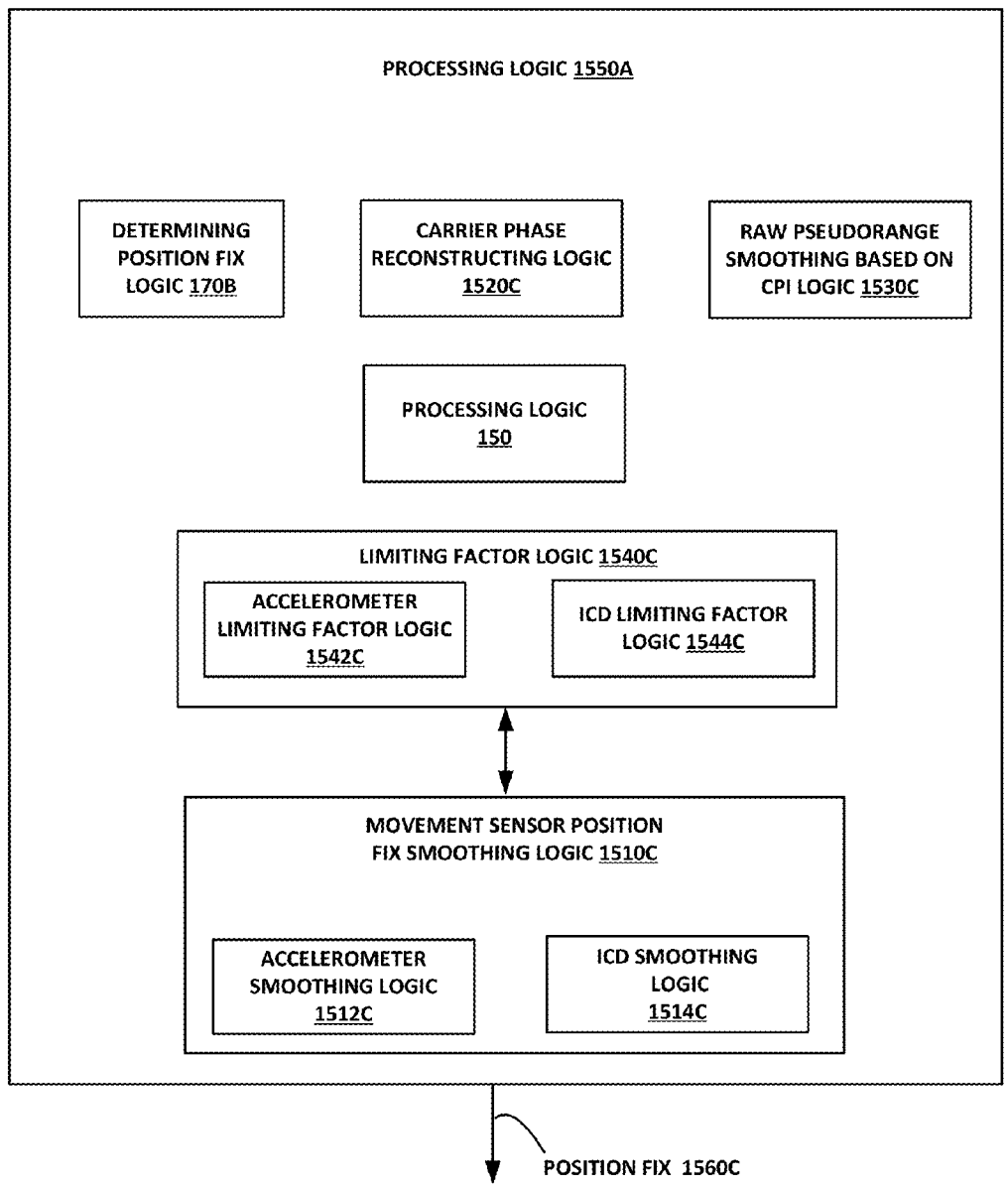

FIG. 15C depicts processing logic 1550A, according to one embodiment. The processing logic 1550A includes determining position fix logic 170B, carrier phase reconstructing logic 1520C, raw pseudorange smoothing based on CPI logic 1530C, limiting factor logic 1540C, and movement sensor smoothing logic 1510C. Optionally, the processing logic 1550A includes processing logic 150. The limiting factor logic 1540C includes accelerometer limiting factor logic 1542C and ICD limiting factor logic 1544C. The movement sensor smoothing logic 1510C includes accelerometer smoothing logic 1512C and ICD smoothing logic 1514C. The output of the processing logic 1550A is a position fix 1560C.

The processing logic 1550A, according to one embodiment, provides provided pseudoranges that is one of smoothed uncorrected pseudoranges, smoothed corrected pseudoranges, unsmoothed corrected pseudoranges, and raw pseudoranges. According to one embodiment, determining position fix logic 170B (also referred to as "position determination logic") determines a position fix based on the provided pseudoranges.

According to one embodiment, the extracting logic 112*b* extracts additional raw pseudoranges from the GNSS chipset for processing elsewhere in the cellular device outside of the GNSS chipset; the position fix determining logic 170B further determines an additional position fix based on the additional raw pseudoranges; the locally measured movement information accessing logic 1510B further obtains additional locally measured cellular device movement information from the at least one sensor; and the movement sensor position fix smoothing logic 1510C of the processing logic 1550A further applies the additional locally measured cellular device movement information to the additional position fix if a limiting factor is not exceeded.

Figure 15D:
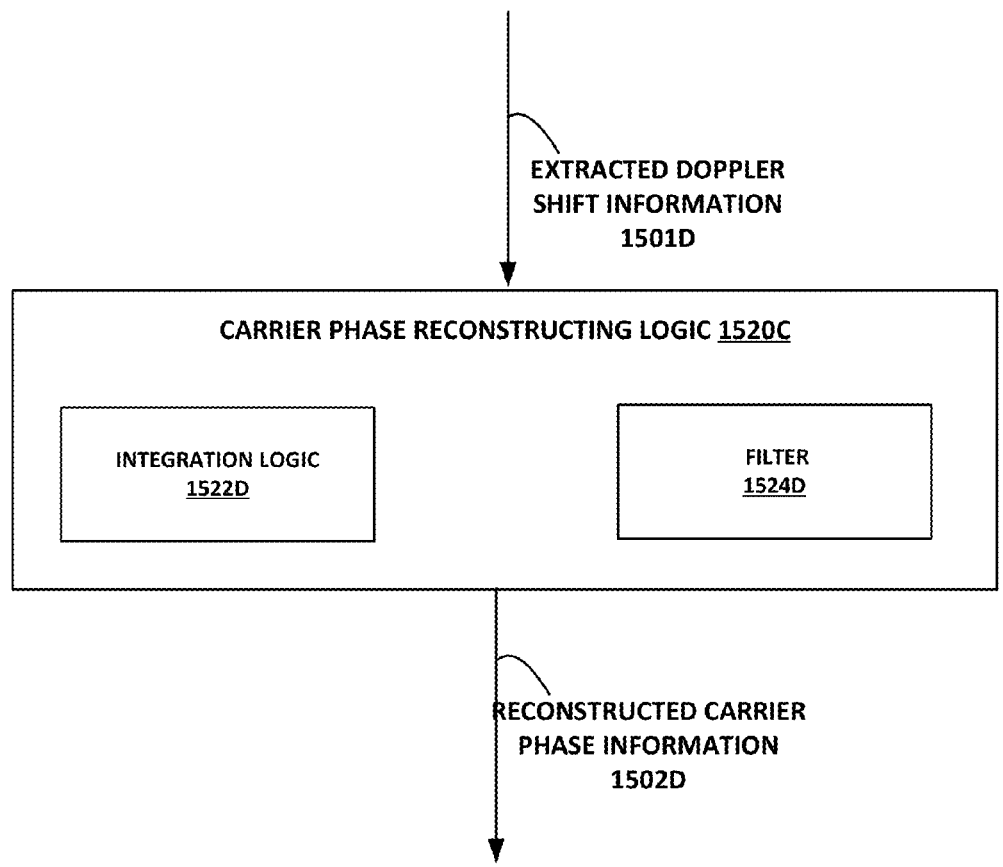

FIG. 15D depicts carrier phase reconstructing logic 1520C, according to one embodiment. The carrier phase reconstructing logic 1520C can be implemented with integration logic 1522D or filter 1524D, or both. The input of the carrier phase reconstructing logic 1520C can be extracted Doppler shift information 1501D. The output of the carrier phase reconstructing logic 1520C can be reconstructed carrier phase information 1502D. Either the integration logic 1522D or the filter 1524D can receive the extracted Doppler shift information 1501D, process the extracted Doppler shift information 1501D to create reconstructed carrier phase information 1502D.

Figure 15E:
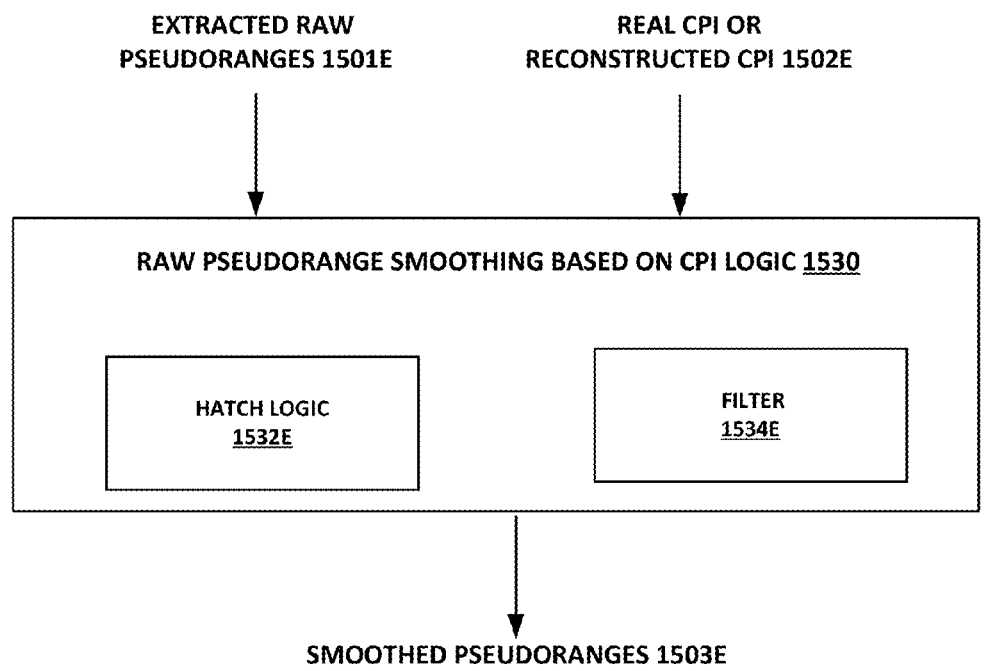

FIG. 15E depicts a raw pseudorange smoothing based on carrier phase information (CPI) logic 1530C. The raw pseudorange smoothing based on CPI logic 1530C can include Hatch logic 1532E or filter 1534E, or both. The Hatch logic 1530A is described in U.S. Pat. No. 5,471,217 by Hatch et al., entitled "Method and Apparatus for Smoothing Coded Measurements in a Global Positioning System Receiver," filed Feb. 1, 1993, incorporated by reference herein, and the Hatch paper entitled "The synergism of GPS code and carrier measurements," published in the Proceedings of the Third International Geodetic symposium on satellite Doppler Positioning, New Mexico, 1982: 1213-1232. The Hatch method as described in U.S. Pat. No. 5,471,217 can be implemented with or without a filter. Therefore, the Hatch method may be used as a part of implementing the filter 1534E.

The input to the pseudorange smoothing based on CPI logic 1530C can be extracted raw pseudoranges 1501E and carrier phase information (CPI) 1502E. The carrier phase information 1502E can be either real carrier phase information or reconstructed carrier phase information. The output of the raw pseudorange smoothing based on CPI logic 1530C is smoothed pseudoranges 1503E. The raw pseudorange smoothing based on CPI logic 1530C can smooth the extracted raw pseudoranges 1501E with the CPI using either the Hatch logic 1532E or the filter 1534E to provide the smoothed pseudoranges 1503E.

Figure 15F:
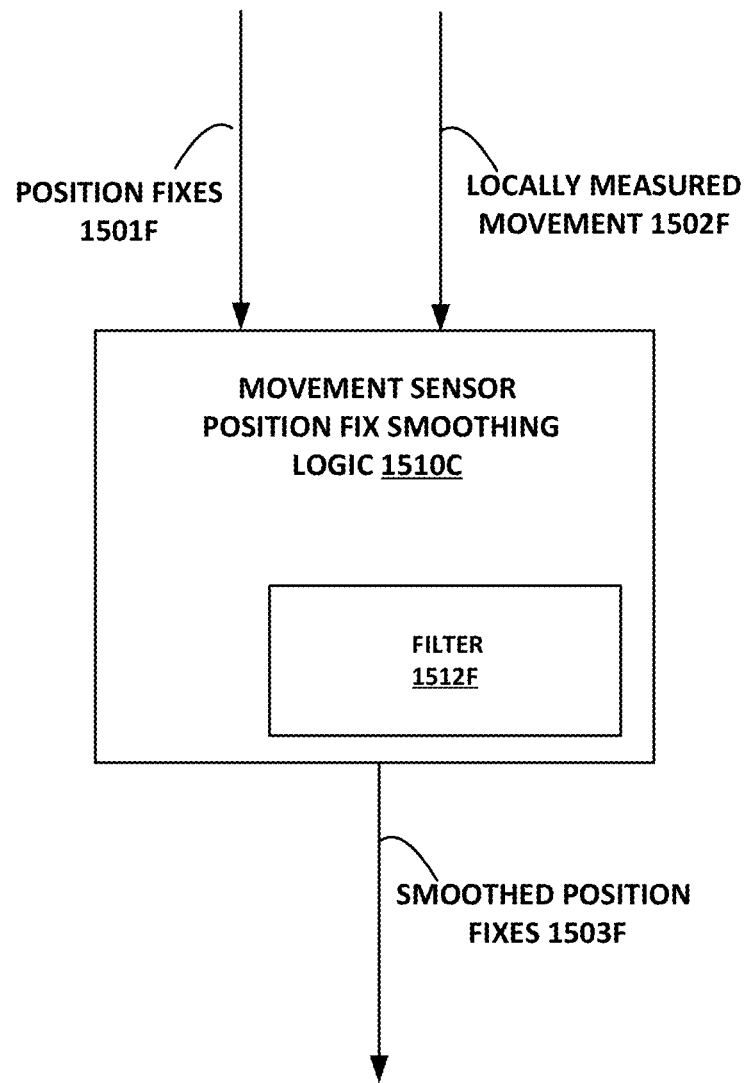

FIG. 15F depicts a movement sensor position fix smoothing logic 1510C. The movement sensor position fix smoothing logic 1510C includes a filter 1512F. The inputs to the movement sensor position fix smoothing logic 1510C can be position fixes 1501F and locally measured movement information 1502F. The output of the movement sensor position fix smoothing logic 1510C is smoothed position fixes 1503F. The smoothed position fixes 1503F are position fixes that locally measured movement (LMM) information has been applied to. Either or both of the accelerometer smoothing logic 1512C and the ICD smoothing logic 1514C can be implemented with a filter 1512F.

According to various embodiments, the processing logic discards at least one of the first set of position fixes based on the locally measured movement information, where the first process discards the at least one of the first set of position fixes based on the locally measured movement information. According to various embodiments, the processing logic discards at least one of the second set of position fixes based on the locally measured movement information, where the second process discards the at least one of the second set of position fixes based on the locally measured movement information. The discarding can be performed by movement sensor position fix smoothing logic 1510C in processing logic 1550A.

According to various embodiments, the processing logic 1550A obtains external corrections from a correction source that is external to the cellular device; provides, performed by the first process, corrected unsmoothed pseudoranges by applying the external corrections to the extracted raw pseudoranges; and determines, performed by the first process, the first set of position fixes based on the corrected unsmoothed pseudoranges. According to various embodiments, the processing logic 1550A obtains external corrections from a correction source that is external to the cellular device; provides, performed by the second process, as described herein, corrected smoothed pseudoranges by applying the external corrections to the carrier phase smoothed pseudoranges; and determines, performed by the second process, the second set of position fixes based on the corrected smoothed pseudoranges.

According to various embodiments, various filters, such as filters 1524D, 1534E, 1512F, can be implemented using a Kalman Filter, robust estimation, least squares, particle filtering, Hough transform, RANSAC, sequential least squares, nonlinear variants, such as sigma-editing, both a priori and a posteriori, and non-optimal (in a Gaussian sense) linear variants.

Figure 15G:
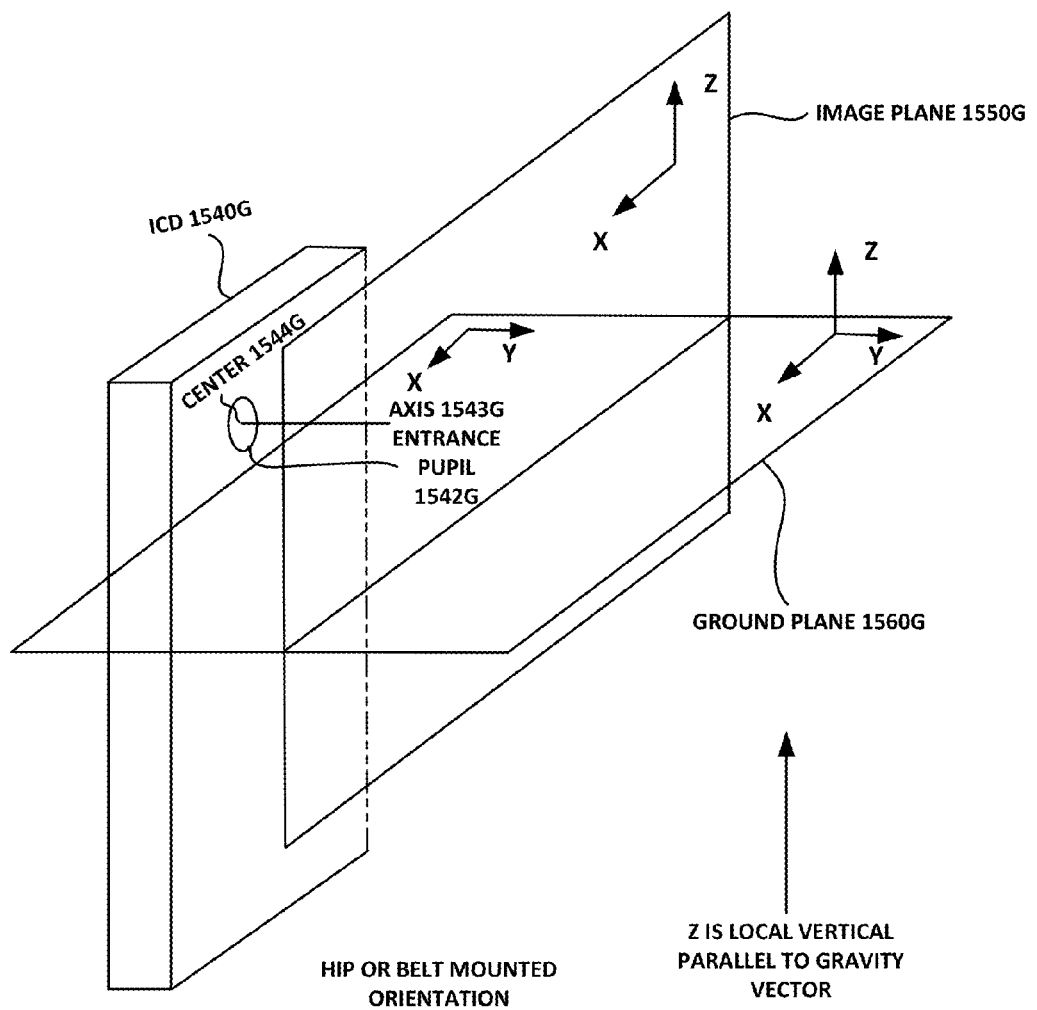

FIG. 15G depicts an image capturing device 1540G, for example, in a hip or belt mounted orientation, according to one embodiment. The image capturing device 1540G includes an entrance pupil 1542g and an axis 1543G that is at the center 1544G of the entrance pupil 1542g. Three axes x, y and z are depicted in FIG. 15G. The x axis runs approximately parallel to the ground and parallel to the longer side of the image capturing device 1540G. The y axis runs approximately parallel to the ground and parallel to the shorter side of the image capturing device 1540G. The z axis is vertical to the ground and parallel to the gravity vector, which represents the pull of gravity toward the earth's surface and is widely used in coordinate measurement systems to provide at least one degree of orientation for devices.

The image capturing device 1540G is in a hip, belt or hat mounted orientation. Therefore, the image plane 1550G that defines the orientation of an image captured with the image capturing device 1540G would be defined by the x axis and z axis and the ground plane 1560G that is approximately parallel to the ground would be defined by the x axis and the y axis.

When the cellular device is held in a user's hand, the body of the cellular device is often tipped so that it is no longer in a vertical orientation. In this case, the image capture device may view the nearby ground as well as objects in the foreground. No loss of functionality of position shift motion detection occurs for the LMM system.

Photogrammetry is the practice of determining the geometric properties of objects from photographic images. In the simplest example, the distance between two points that lie on a plane parallel to the photographic image plane can be determined by measuring their distance on the image, if the scale s of the image is known. This is done by multiplying the measured distance by a scale factor 1/S.

One way of finding points uses features to identify the desired object, or point on a desired object. An example of an object is a door and an example of points on the object are the corners of the door. The points may be described by a "feature description" of the object. For example, the door's corners may be represented by a small collection of closely associated details, or image 'bits' which form a distinct and recognizable image pattern. Modern image processing methods are available for identifying such grouping of image bits as "feature points."

Figure 15H:
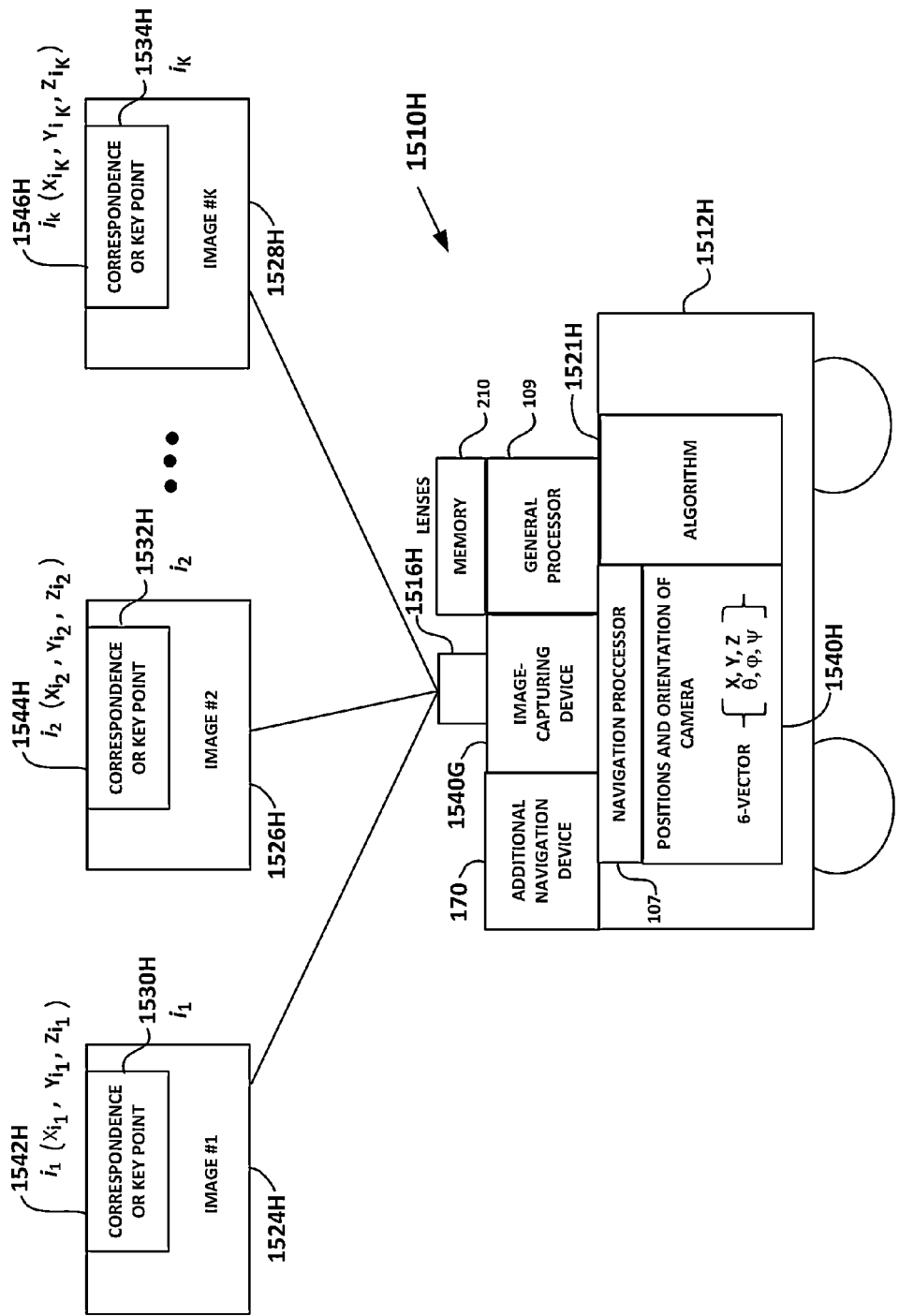

FIG. 15H depicts a block diagram of an apparatus 1510H and K images 1524H, 1526H, through 1528H taken at respective locations using the image capturing device 1540G, according to various embodiments. The apparatus 1510H includes memory 210, processor 109, algorithm 1521H, mobile platform 1512H, 6'-Vector 1540H, navigation processor 107, additional navigation device 170, image capturing device 1540G, and lenses 1516H. According to one embodiment, the 6'-Vector 1540H includes the position coordinates (x, y, z) as well as the orientation angles $\theta$, $\phi$, $\psi$.

The algorithm 1521H can include an algorithm that uses MatchMove software, or improved algorithms such as the Sequential Rolling Bundle Adjustment algorithm, as discussed herein. Sequential Rolling Bundle Adjustment algorithm can be used to obtain coordinates and orientation of the image capturing device 1540G in real time, according to one embodiment. Other types of MatchMove algorithms can be used for algorithm 1521H that are well in the image processing arts.

FIG. 15H also depicts K images 1524H, 1526H, through 1528H in the i-frame: i is an integer, key-points $I_1$ 1530H, $I_2$ 1532H, $i_k$ 1534H in the respective images #1 1524H, #2 1526H, #K 1528H, position coordinates 1542H $(x_{i1}, y_{i1}, z_{i1})$, 1544H $(x_{i2}, y_{i2}, z_{i2})$, 1546H $(x_{ik}, y_{ik}, z_{ik})$ for the respective key-points $i_1$, $i_2$, and $i_k$.

In an embodiment, the additional navigation device 170 (including the navigation processor 107) is configured to provide the initial position coordinates and orientation of the image capturing device 1540G.

The image capturing device 1540G is mounted on the mobile platform 1512H. Examples of a mobile platform 1512H include a person, a car, a truck, a bike, a motorbike, a boat, etc. When the mobile platform 1512H is a person, the apparatus 1510H can be attached to the person, for example, using a belt, a hat or some other kind of coupling mechanism. The apparatus 1510H can be coupled to various parts of the person's body such as at the hip, the head, other parts of the person's body.

The image capturing device 1540G is configured to perform image capture of a scene. The algorithm 1521H can be software instructions stored in memory 210 and executed by the processor 109 or can be hardware, such as an ASIC chip (or FPGA chip) (in analog or digital modes). The algorithm 1521H is used as a part of analyzing the set of K-images 1524H, 1526H, . . . 1528H collected in each i-frame.

Lens 1516H is for focusing. The focal length of lenses, i.e., the distance between the rears of the lenses (when focused on infinity) the imaging device, determines the angle of the view, or the field of view (FOV) and the size of objects as they appear as images 1524H, 1526H, and . . . 1528H. The image is focused on that surface by adjusting the distance between the lenses and the surface. Image capturing devices used in cell phones typically have fixed focal length imaging systems.

In an embodiment, the calibrated image capturing device 1540G is configured to collect the K images 1524H, 1526H, through 1528H in the i-frame: i is an integer. In an embodiment within each of the K images (1524H, 1526H, through 1528H) key-points are identified. The key-points are the features that are common in multiple frames. For example, in the first frame the key-points are: the key-point $I_1$ 1530H in the image #1 1524H, the key point $I_2$ 1532H in the image #2 1526H, and key-point $i_k$ 1534H in the image #K 1528H. These key-points can be tracked in the following frames as discussed herein.

In an embodiment, referring still to FIG. 15H, the obtained image data for the key-points ($i_1$ 1530H in the image #1 1524H; $i_2$ 1532H in the image #2 1526H; . . . $i_K$ 1534H in the image #K 1528H) is used within the algorithm 1521H, as discussed herein, to estimate the position and orientation of the image capturing device 1540G: the '6'-vector 1540H including the position coordinates (x, y, z) as well as the orientation angles θ, φ, ψ. The obtained image data for the key-points ($i_1$ 1530H in the image #1 1524H; $i_2$ 1532H in the image #2 1526H; . . . $i_K$ 1534H in the image #K 1528H) is also used within the algorithm 1521H to obtain the position coordinates of the key-points: position coordinates 1542H ($x_{i1}$, $y_{i1}$, $z_{i1}$) of the key-point $i_1$, the position coordinates 1544H ($x_{i2}$, $y_{i2}$, $z_{i2}$) of the key-point $i_2$; and the position coordinates 1546H ($x_{ik}$, $y_{ik}$, $z_{ik}$) of the key-point $i_k$.

Figure 15I:
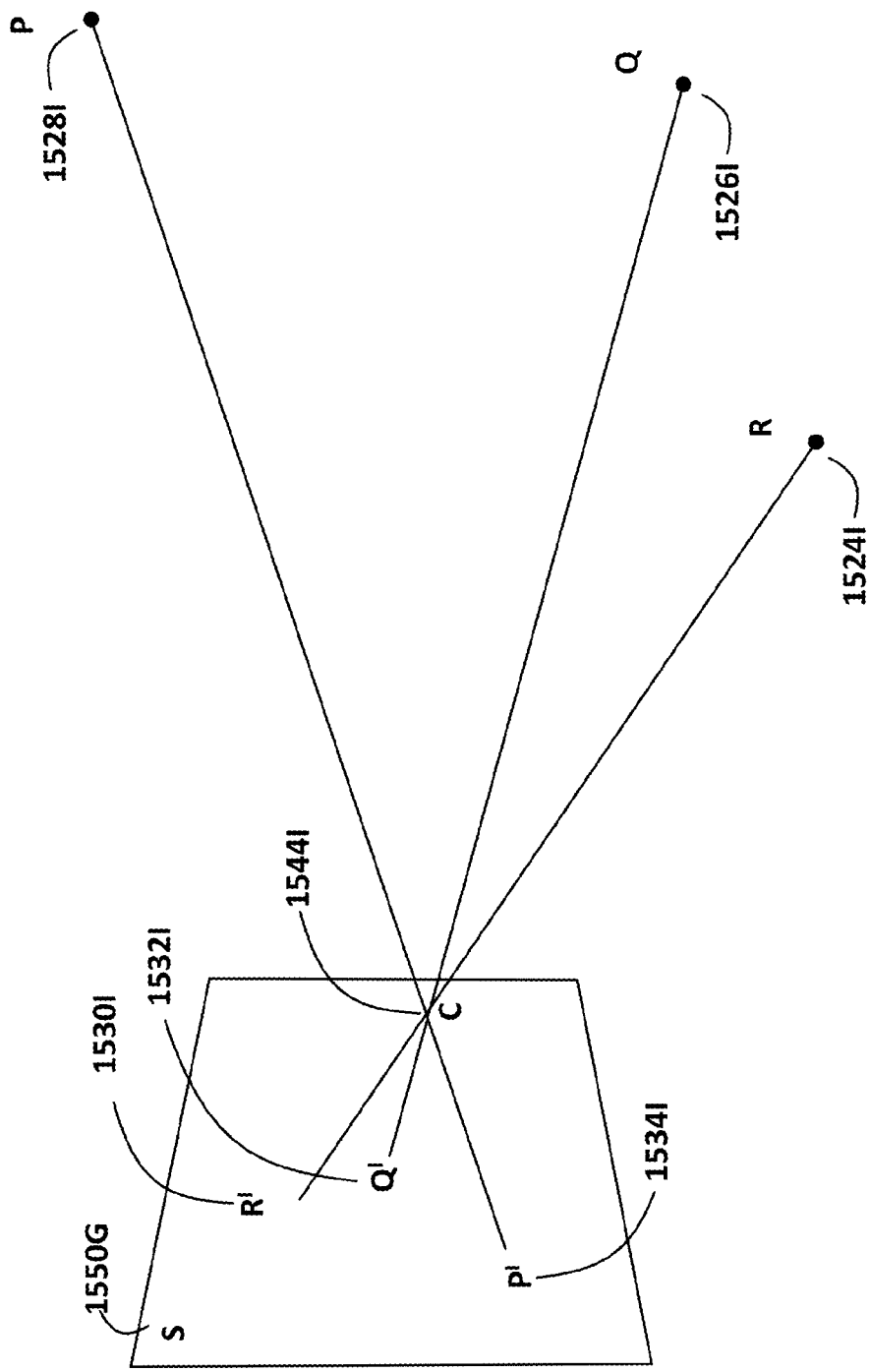

FIG. 15I depicts three points in a 3 dimensional (3D) field of view representing feature points on one or more objects, and their locations in the image plane of the imaging device, according to one embodiment. For example, FIG. 15I depicts a two dimensional (2D) projections on a 2D image plane 1550G (S) of points in view a field of view of a real 3D environment. More specifically, FIG. 15I depicts a 2D projection 1534I (P') of 3D point 1528I (P), which is a 2D projection 1530I (R') of 3D point 1524I (4), and 2D projection 1532I (Q') of 3D point 1526I (Q) on an image plane 1550G (s) by using an image capturing device 1540G and the lines between the 2D projection points 1530I (R'), 1532I (Q'), 1534I (P') and their respective 3D points 1524I (R), 1526I (Q), and 1528I (P) intersect at intersection 1544I. One or more points can be selected as key-points and the lines represent rays that can be bundled to form ray bundles, as will be discussed in more detail hereinafter. The intersection 1544I of the rays can be used to determine the 3D location of the points 1524I (R), 1526I (Q), and 1528I (P) using triangulation.

Figure 15J:
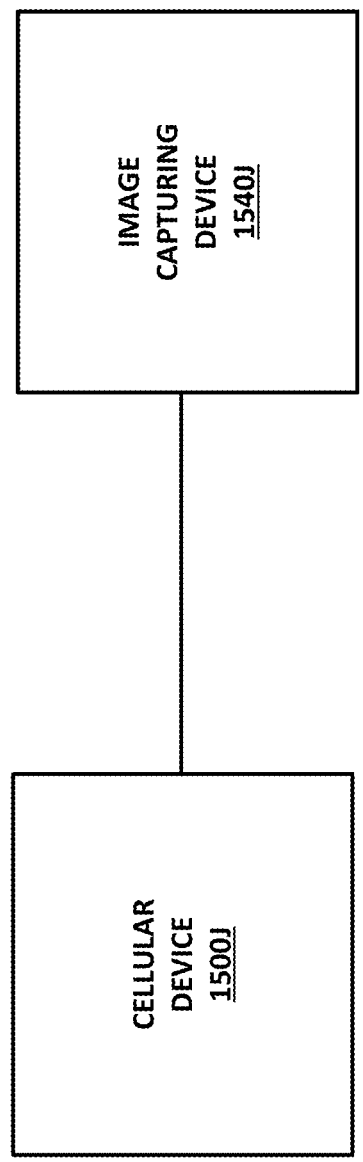

FIG. 15J depicts a block diagram of a cellular device 1500J that is coupled to an image capturing device 1540J that is external to the cellular device 1500J, according to one embodiment. Examples of a cellular device 1500J include a cell phone, a non-voice enabled cellular device, a tablet computer, and a mobile hand-held GNSS receiver. The cellular device 1500A may be mobile or stationary. Examples of a tablet computer are MICROSOFT® SURFACE®, APPLE® iPads®, APPLE® iPad Mini®, SAMSUNG® GALAXY® Tab families.

As depicted the cellular device 1500J is coupled or in communication, or a combination thereof, with image capturing device 1540J. The cellular device 1500J, according to various embodiments, can include one or more of GNSS chipset 170, improved accuracy SUPL client 1501A, operating system 160, and processor 109, memory 210, accelerometer 1502A.

The cellular device 1500J may or may not have an internal image capturing device 1540G of its own. Various embodiments as discussed herein, are well suited for the cellular device 1500J using LMM information from the external image capturing device 1540J. The image capturing device 1540J has a known physical relationship with the cellular device 1500J. For example, the physical relationship between the external image capturing device 1540J is fixed, and, therefore, does not change with respective to the cellular device 1500J. The physical relationship can be known since it is fixed. The physical relationship can be known in terms of at least distance or orientation between the image capturing device 1540J and the cellular device 1500J, or a combination thereof.

Figure 16:
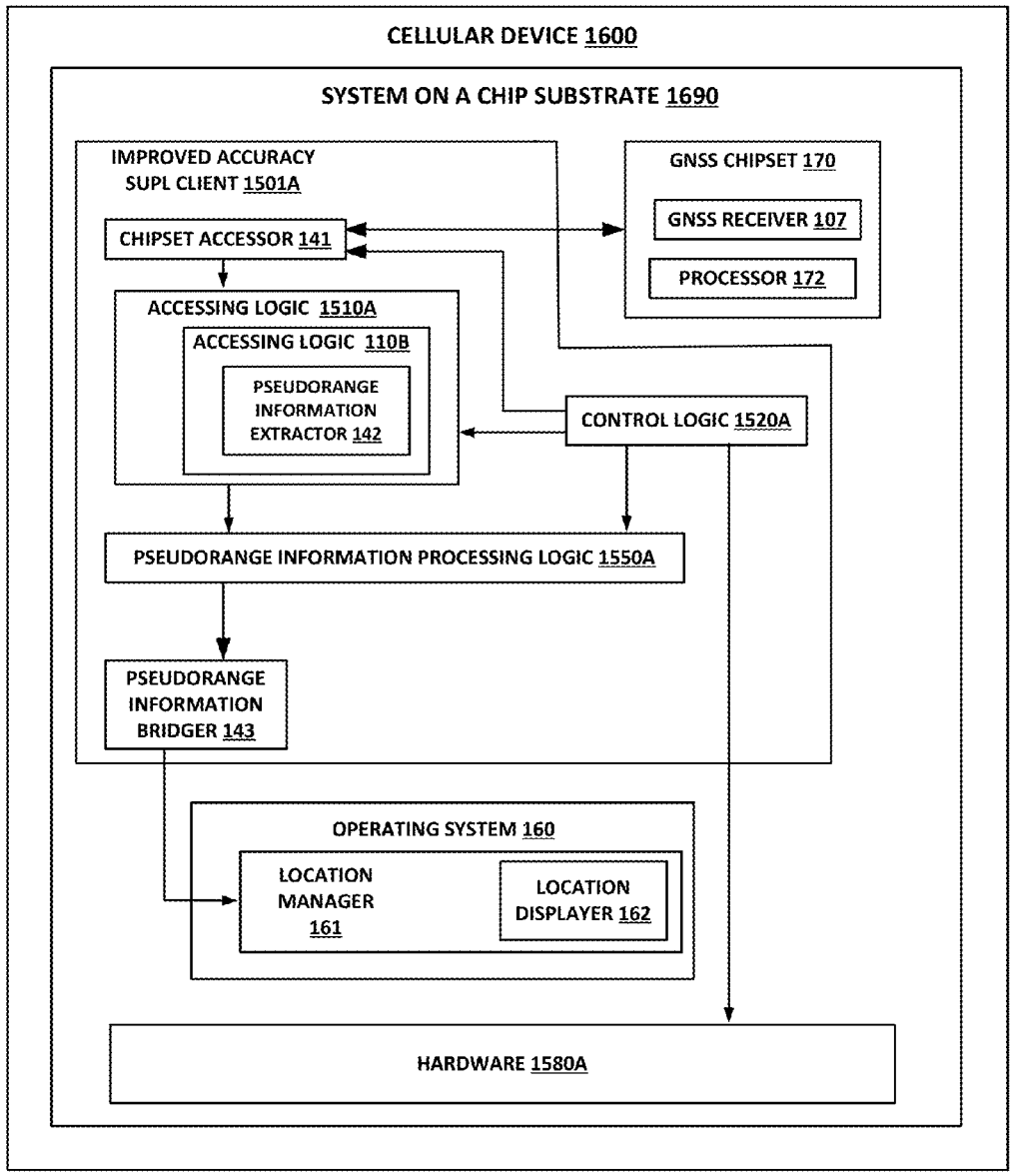
FIG. 16 depicts a block diagram of a cellular device for providing improved position fix determination, according to one embodiment.

FIG. 16 depicts a block diagram of a cellular device 1600 for improving position fix determination based on locally measured movement (LMM) information, according to one embodiment. As depicted in FIG. 16, the GNSS chipset 170 is located on a system on a chip (SOC) substrate (SOCS) 1690. Other entities such as 1501A, 160, and 1580A can also be located on the system on a chip substrate 1690.

As described herein, various types of information can be extracted from the GNSS receiver 107, such as pseudorange information, Doppler Shift Information, Real Carrier Phase Measurement, WAAS and SBAS. Other types of processing information output by the GNSS receiver 107 can be ignored.

A cellular device 1600's hardware architecture includes discreet physical layout and interconnection of multiple chipsets for processing and for special purposes such as a GNSS chipset 170. In addition, newer architectures involve further integration of chipsets in the "system on a chip" (SoC) configuration. In this configuration, the GNSS chipset 170 can still be a complete element capable of delivering a PVT (position velocity and time) solution. However in an embodiment, the pseudorange information, carrier phase, and/or Doppler measurements, along with WAAS corrections if available, are extracted prior to further signal processing in the GNSS chipset 170 and are processed using different algorithms and corrections data for developing an improved accuracy PVT solution. In so doing the deleterious effects of multipath and other error sources may be minimized. Further the GNSS chipset 170 outputs are ignored and not displayed when the external processing is employed and the higher-accuracy PVT data is available.

Many of the features depicted in FIG. 16 have already been described herein. Therefore, in the interest of brevity, those features will not be described again.

Figure 17:
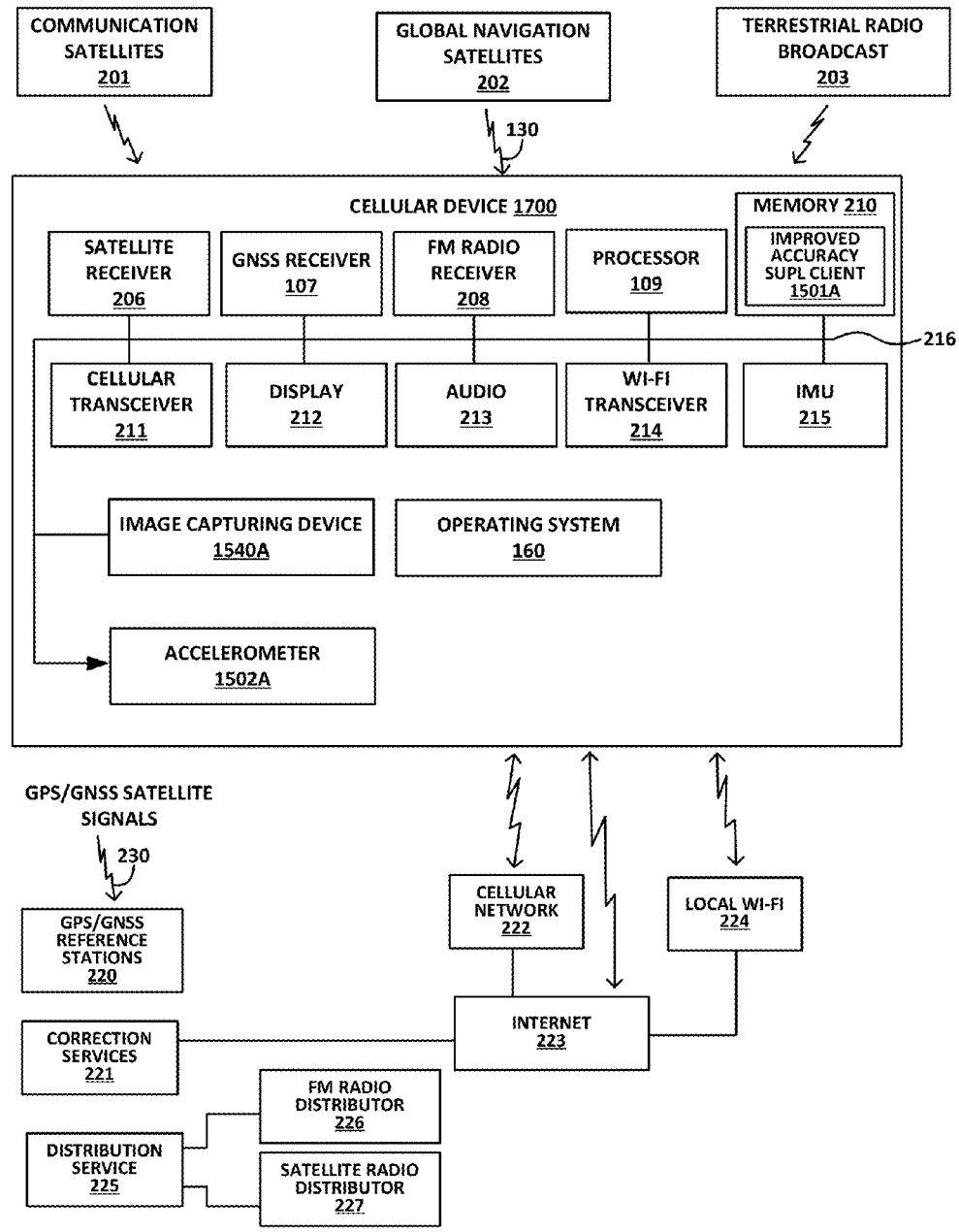
FIG. 17 depicts a block diagram of a cellular device and multiple sources for providing positioning correction information to the cellular device for processing pseudorange information, according to one embodiment.

FIG. 17 depicts a block diagram of a cellular device 1700 and multiple sources for providing positioning correction information to the cellular device 1700 for processing pseudorange information, according to one embodiment. Many of the features depicted in FIG. 17 have already been described herein. Therefore, in the interest of brevity, those features will not be described again. The cellular device 1700 also includes an image capturing device 1540G and an accelerometer 1502A.

Examples of a cellular device 1500A, 1500J, 1600, 1700 include a cell phone, a non-voice enabled cellular device, a tablet computer, and a mobile hand-held GNSS receiver. The cellular device 1500A may be mobile or stationary. Examples of a tablet computer are MICROSOFT® SURFACE®, APPLE® iPads®, APPLE® iPad Mini®, SAMSUNG® GALAXY® Tab families. According to one embodiment, a cellular device is a mobile communications device (MCD) with cellular communications capabilities (also referred to as a "cellular communication enabled mobile communications device"). According to one embodiment, a mobile communications device has communications capabilities, such as Wi-Fi or BLUETOOTH®, or a combination thereof. According to one embodiment, a mobile communications device includes or communicates with one or more of a camera, compass, and accelerometer. Examples of a mobile communications device are tablet computers, laptops with detachable tablets, personal digital assistants, TRIMBLE® Geo-7®, TRIMBLE® JUNO®, and similar devices.

The blocks that represent features in FIGS. 15A-17 can be arranged differently than as illustrated, and can implement additional or fewer features than what are described herein. Further, the features represented by the blocks in FIGS. 15A-17 can be combined in various ways. A cellular device 1500A, 1600, 1700 (FIGS. 15A-17) can be implemented using software, hardware, hardware and software, hardware and firmware, or a combination thereof. Further, unless specified otherwise, various embodiments that are described as being a part of the cellular device 1500A, 1600, 1700, whether depicted as a part of the cellular device 1500A, 1600, 1700 or not, can be implemented using software, hardware, hardware and software, hardware and firmware, software and firmware, or a combination thereof. Various blocks in FIGS. 15A-17 refer to features that are logic, such as but not limited to, 170, 1510A, 110B, 1520A, 1550A, 150, 1540C, 1510C, 1520C, 1530C, 1521H, which can be implemented using software, hardware, hardware and software, hardware and firmware, software and firmware, or a combination thereof.

The cellular device 1500A, 1500J, 1600, 1700, according to one embodiment, includes hardware, such as one or more of the processor 109, memory 210, sensors 1502A and 1540G, and the GNSS chipset 170. An example of hardware memory 210 is a physically tangible computer readable storage medium, such as, but not limited to a disk, a compact disk (CD), a digital versatile device (DVD), random access memory (RAM) or read only memory (ROM) for storing instructions. An example of a hardware processor 109 for executing instructions is a central processing unit. Examples of instructions are computer readable instructions for implementing at least the SUPL Client 1501A that can be stored on a hardware memory 210 and that can be executed, for example, by one or more hardware processors 109. The SUPL client 1501A may be implemented as computer readable instructions, firmware or hardware, such as circuitry, or a combination thereof.

Applications

Various embodiments can be used for different types of applications or uses. For example, various embodiments could be used as a part of making a movie, surveying, determining the location of the cellular device, tracking a person or tracking valuable moveable items.

Sequential Rolling Bundle Adjustment Method for Real Time Image Capturing Device Pose Determination Referring to FIG. 15G, image-based position tracking has been developed extensively to support movie-making. When inserting computer-generated images into movies for special effects, the graphics focal point must be aligned with the entrance pupil 1542G of the lens of the image capturing device 1540G. Any departure from perfect coincidence makes the final cut look fake. Therefore, the location of the entrance pupil 1542G must be captured in relation to the movie's environment. This means that the location [x, y, z] of the image capturing device 1540G and its orientation in space [roll, pitch, and yaw, or Euler angles], must be determined and stored by an apparatus, such as a cellular device, associated with the image capturing device 1540G. Collectively, the six parameters are referred to as obtaining the image capturing device 1540G's "pose." The method of choice is to use the imagery captured directly by an image capturing device 1540G that is a movie camera, however, various embodiments are also well suited using a sequence of individual images captured with an image capturing device 1540G that is not a movie camera.

The process involves tracking objects in the field of view of the image capturing device 1540G from one image frame to the next via feature detection methods, and then performing some mathematical processes to determine where the entrance pupil 1542G has to be in order to "see" the tracked features in the next frame as they are seen in the next frame image. The ray paths (also referred to as "rays") from a feature on an external object pass through the entrance pupil 1542G and are captured on the image capturing device 1540G. These ray paths from multiple features form a group of lines, commonly called a bundle. The location on the image plane 1550G for each feature is determined and stored for each captured image 1524H, 1526H . . . 1528H. In the next image captured, if the image capturing device 1540G has moved, the location of the features in the image have moved and thus the entire collection of ray paths has changed. Previously identified features are again found by a matching technique. Their location in the second image is estimated. To determine where the image capturing device 1540G has moved, the first image 1524H's feature points are compared to their respective new locations in the second image 1526H and so on between subsequent image pairs. The comparison is done by creating a transformation or conversion matrix, which deals with all the data available. The transformation matrix also creates an estimate of the error in location for each feature data point from first image to second image. The image capturing device 1540G's location is adjusted iteratively until the errors are reduced as much as possible. When a suitable error minimum is achieved, the new location of the image capturing device 1540G is found, for the point where the second image 1526H was taken. Essentially the location of the entrance pupil 1542G is moved until many of the ray paths pass through the same point at the entrance pupil 1542G. The mathematical techniques are well-known and referred to in the literature as "bundle adjustments." and the family of computer programs developed to support this activity are often referred to as MatchMove. However, this canonical approach to performing bundle adjustments is a kind of brute force approach and requires a lot of computer processing. The terms of art used herein include: Full Bundle Adjustment, Rolling Bundle Adjustment, and Sequential Rolling Bundle Adjustment. Sequential rolling bundle adjustment achieves sufficient processing speed to enable real-time operation in an image capturing device 1540G and processor.

Typically a range of images is processed together, where the range of images anywhere from 10 to 50 and all data is used and processed. Recent developments have enabled real-time processing via a simpler alternate iterative method for incrementally determining the bundle adjustments by simply deleting the oldest image and adding one new image and then using an alternative mathematical method for determining the incremental change in image capturing device 1540G's pose that does not require as much computation. When implemented in a cellular device, the location shifts and orientation shifts that occur while the user, or other platform for the image capturing device 1540G, is moving can now be captured in real time.

The new method is known as "Sequential Rolling Bundle Adjustment," and is fully described in a patent application with U.S. patent application Ser. No. 13/954,995, by Shawn D. Weisenburger titled "Sequential Rolling Bundle Adjustment" filed Jul. 31, 2013, now U.S. Pat. No. 9,177,384, and assigned to the same assignee as this current application. A summary of the method follows.

Figure 29:
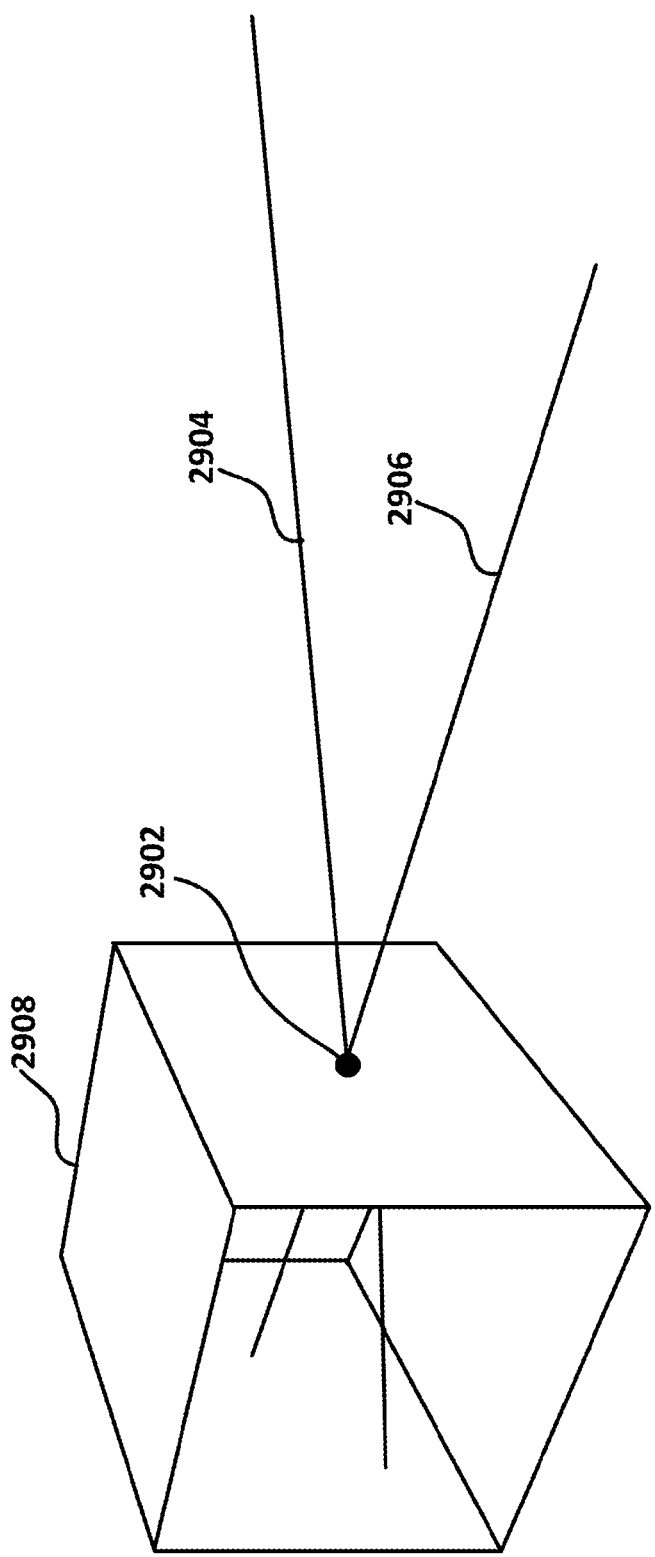
FIG. 29 depicts light beams passing through the pinhole of a pinhole camera, according to one embodiment.

Referring to FIG. 29, the image capturing device 1540G can be modeled by a pinhole camera 2908 that captures light beams 2904 and 2906 passing through the pinhole 2902 for purposes of explanation.

Referring to FIG. 15H, in an embodiment of the present technology, the lens 1516H further comprises regular rectilinear lens. Rectilinear lens is a lens in which straight lines are not substantially curved or distorted. Such lenses are commonly found in cell phone cameras.

In an embodiment of the present technology, the lens 1516H further comprises a fisheye lens. A fisheye lens is a wide-angle lens that takes in an extremely wide, hemispherical image. Fisheye lenses are often used to shoot broad landscapes. Fisheye lenses achieve extremely wide angles of view by forgoing a rectilinear image, opting instead for a special mapping (for example: equisolid angle), which gives images a characteristic convex appearance. A fisheye lens may be added to a cell phone camera via a clip-on device such as found in the product called the Olloclip; information about this product can be found at olloclip.com/product.

In an embodiment of the present technology, the image capturing device 1540G further comprises a stereo digital camera. A stereo camera is a type of camera with two or more lenses. This allows the camera to simulate binocular vision, and therefore gives it the ability to capture three-dimensional images, a process known as stereo photography. Cell phone cameras may be augmented by an image-combining device which emulates a true stereo camera by using a pair of lens separated by a short distance that provides two images delivered to the camera imager, which may be processed as a stereo pair. A device providing this stereo imaging capability is offered by HolgaDirect called the Holga 3D Lens Set for an Iphone; information about this device can be found at http://shop.holgadirect.com/products/holga-3d-set-lens-kit-iphone-4-5#. Stereo images may be processed via photogrammetric methods to reveal dimensional information about the objects in view, as well as distance information from image capturing device to an object.

In an embodiment of the present technology, referring still to FIG. 15H, the image capturing device 1540G (camera) is calibrated. This calibration is used to correct the images for lens 1516H distortions. Typical calibrations correct for principal distance (focal length), principal point offset, radial distortion, tangential distortion, and other effects that can be found in any text book on photogrammetry. All image measurements are corrected with these calibration parameters.

In an embodiment of the present technology, referring still to FIG. 15H, the calibrated image capturing device 1540G is configured to capture an i-th frame including K sub-images (1524H, 1526H, through 1528H); i is an integer.

In an embodiment of the present technology, referring still to FIG. 15H, within each of K sub-images (1524H, 1526H, through 1528H) the key-points is identified. The key-points are the features that are common in multiple frames. For example, in the first frame the key-points are: the key-point $i_1$ 1530H in the sub-image #1 1524H, the key-point $i_2$ 1532H in the sub-image #2 1526H, and key-point $i_K$ 1534H in the sub-image #K 1528H. These key-points should be tracked in the following frames.

In an embodiment of the present technology, referring still to FIG. 15H, the obtained image data for the key-points ($i_1$ 1530H in the sub-image #1 1524H; $i_2$ 1532H in the sub-image #2 1526H; . . . $i_K$ 1534H in the sub-image #K 1528H) is used within the bundle adjustment algorithm to estimate the position and orientation of the image capturing device 1540G: the '6'-vector 1540H including the position coordinates (x, y, z) as well as the orientation angels $\theta$, $\phi$, and $\psi$.

In an embodiment of the present technology, referring still to FIG. 15H, the obtained image data for the key-points ($i_1$ 1530H in the sub-image #1 1524H; $i_2$ 1532H in the sub-image #2 1526H; . . . $i_K$ 1534H in the sub-image #K 1528H) is also used to obtain the position coordinates of the key-points: position coordinates 1542H ($x_{i1}$, $y_{i1}$, $z_{i1}$) of the key-point i, the position coordinates 1544H ($x_{i2}$, $y_{i2}$, $z_{i2}$) of the key-point $i_2$, and so on; and finally, the position coordinates 1546H ($x_{iK}$, $y_{iK}$, $z_{iK}$) of the key-point $i_K$.

In an embodiment of the present technology, referring still to FIG. 15H, the algorithm 1521H includes the sequential rolling bundle adjustment algorithm, which is the further development of the full bundle adjustment algorithm.

Given a set of images depicting a number of 3-D points from different viewpoints, the bundle adjustment can be defined as the problem of simultaneously refining the 3-D coordinates describing the scene geometry as well as the parameters of the relative motion and the optical characteristics of the image capturing device 1540G (FIG. 15H) employed to acquire these images, according to an optimality criterion involving the corresponding image projections of all points.

The correspondence problem refers to the problem of ascertaining which parts of one image (or frame) correspond to which parts of subsequent image (or frame), where differences are due to movement of the camera, the elapse of time, and/or movement of objects in the photos. More specifically, given two or more images (or frames) of the same 3-D scene, taken from different points of view and at different time, the correspondence problem refers to the task of finding a set of points in one frame which can be identified as the same points in another subsequent frame.

The correspondence problem can occur in a stereo situation when two images of the same scene are used, or can be generalized to the N-view correspondence problem. In the latter case, the images may come either from N different image capturing devices 1540G (cameras) photographing at the same time or from one image capturing device 1540G (camera) which is moving relative to the scene and collecting the image data from N-frames. The problem is made more difficult when the objects in the scene are in motion relative to the image capturing device(s) 1540G.

There are two basic ways to find the correspondences between two images: the correlation-based method, and the feature based method.

The correlation-based method includes checking if one location in one image looks/seems like another in another image.

The feature-based method includes finding features in an image and seeing if the layout of a subset of features is similar in the two images. To avoid the aperture problem a good feature should have local variations in two directions.

Example I

To find the correspondence between set A [1,2,3,4,5] and set B [3,4,5,6,7] find where they overlap and how far off one set is from the other. Here we see that the last three numbers in set A correspond with the first three numbers in set B. This shows that B is offset 2 to the left of A.

In most camera configurations, finding correspondences requires a search in two-dimensions. However, if the two cameras are aligned to be coplanar, the search is simplified to one dimension—a horizontal line parallel to the line between the cameras. Furthermore, if the location of a point in the left image is known, it can be searched for in the right image by searching left of this location along the line, and vice versa).

To perform the simplified search in one dimension, an image rectification is used to perfect cameras' alignment. Image rectification is usually performed regardless of camera precision because it may be impractical to perfectly align cameras, and even perfectly aligned cameras may become misaligned over time.

If the images to be rectified are taken from camera pairs without geometric distortion, a linear transformation can be used including: (i) X & Y rotation that puts the images on the same plane, (ii) scaling that makes the images to be of the same size, and (iii) Z rotation & skew adjustments are made to make the image pixel rows directly line up.

In performing the linear transform, if the cameras themselves are calibrated for internal parameters, an essential matrix provides the relationship between the cameras.

The more general case (without camera calibration) is represented by the fundamental matrix. If the fundamental matrix is not known, it is necessary to find preliminary point correspondences between stereo images to facilitate its extraction.

There are basically three algorithms for image rectification: planar rectification, cylindrical rectification, and polar rectification. A simple method is to compare small patches between rectified images. This works best with images taken with roughly the same point of view and either at the same time or with little to no movement of the scene between image captures, such as stereo images.

A small window is passed over a number of positions in one image, according to one embodiment. Each position is checked to see how well it compares with the same location in the other image. Also several nearby locations are also compared for the objects in one image may not be at exactly the same image-location in the other image. It is possible that there is no fit that is good enough. This may mean that the feature is not present in both images, it has moved farther than your search accounted for; it has changed too much, or is being hidden by other parts of the image.

The Hough transform (mostly used in the scale-invariant feature transform) is an algorithm important in understanding the full bundle adjustment algorithm. More specifically, the Hough transform is a feature extraction technique used in image analysis, computer vision, and digital image processing.

The purpose of the Hough transform technique is to find imperfect instances of objects within a certain class of shapes by a voting procedure. This Hough voting procedure is carried out in a parameter space, from which object candidates are obtained as local maxima in a so-called accumulator space that is explicitly constructed by the algorithm for computing the Hough transform.

The classical Hough transform was concerned with the identification of lines in the image, but later the Hough transform has been extended to identifying positions of arbitrary shapes, most commonly circles or ellipses.

There are several examples of a feature-based 3-D reconstruction algorithm.

Scale-invariant feature transform (or SIFT) is an algorithm in computer vision designed to detect and describe local features in images. The algorithm was published by David Lowe in 1999. This algorithm uses the Hough transform. Applications include object recognition, robotic mapping and navigation, image stitching, 3-D modeling, gesture recognition, video tracking, individual identification of wildlife and match moving. The algorithm is patented in the US; the owner is the University of British Columbia. Please, see U.S. Pat. No. 6,711,293, entitled "Method and apparatus for identifying scale invariant features in an image and use of same for locating an object in an image" and issued to David G. Lowe.

According to the scale-invariant feature transform (or SIFT) algorithm, for any object in an image, interesting points on the object can be extracted to provide a "feature description" of the object. This description, extracted from a training image, can then be used to identify the object when attempting to locate the object in a test image containing many other objects. To perform reliable recognition, it is important that the features extracted from the training image be detectable even under changes in image scale, noise and illumination. Such points usually lie on high-contrast regions of the image, such as object edges.

Another important characteristic of these features is that the relative positions between them in the original scene shouldn't change from one image to another. For example, if only the four corners of a door were used as features, they would work regardless of the door's position; but if points in the frame were also used, the recognition would fail if the door is opened or closed. Similarly, features located in articulated or flexible objects would typically not work if any change in their internal geometry happens between two images in the set being processed.

However, in practice SIFT detects and uses a much larger number of features from the images, which reduces the contribution of the errors caused by these local variations in the average error of all feature matching errors.

Lowe's patented method can robustly identify objects even among clutter and under partial occlusion because his SIFT feature descriptor is invariant to uniform scaling, orientation, and partially invariant to affine distortion and illumination changes. This section summarizes Lowe's object recognition method and mentions a few competing techniques available for object recognition under clutter and partial occlusion.

SIFT key-points of objects are first extracted from a set of reference images and stored in a database. An object is recognized in a new image by individually comparing each feature from the new image to this database and finding candidate matching features based on Euclidean distance of their feature vectors. From the full set of matches, subsets of key-points that agree on the object and its location, scale, and orientation in the new image are identified to filter out good matches. The determination of consistent clusters is performed rapidly by using an efficient hash table implementation of the generalized Hough transform. Each cluster of 3 or more features that agree on an object and its pose is then subject to further detailed model verification and subsequently outliers are discarded. Finally the probability that a particular set of features indicates the presence of an object is computed, given the accuracy of fit and number of probable false matches. Object matches that pass all these tests can be identified as correct with high confidence.

"Match moving" is another 3-D reconstruction algorithm. In cinematography, match moving is a cinematic technique that allows the insertion of computer graphics into live-action footage with correct position, scale, orientation, and motion relative to the photographed objects in the shot.

Match moving is primarily used to track the movement of a camera through a shot so that an identical virtual camera move can be reproduced in a 3-D animation program. When new animated elements are composited back into the original live-action shot, they will appear in perfectly-matched perspective and therefore appear seamless.

By using SIFT or a match moving algorithm to analyze a set of image data captured by an image capturing device 1540G, it is possible to obtain the combination of position and orientation, or pose, of an object.

The pose can be described by means of a rotation and translation transformation which brings the object from a reference pose to the observed pose. This rotation transformation can be represented in different ways, e.g., as a rotation matrix or a quaternion.

The specific task of determining the pose of an object in an image (or stereo images, image sequence) is referred to as pose estimation. The pose estimation problem can be solved in different ways depending on the image sensor configuration, and choice of methodology. Three classes of methodologies can be distinguished: analytic or geometric methods, genetic algorithm methods, and learning-based methods.

By using analytic or geometric methods, the image sensor (camera) is calibrated by using the mapping from 3-D points in the scene to the 2-D points in the image. If the geometry of an object is known, the projected image of the object on the camera image is a well-known function of the object's pose. Once a set of control points on the object, typically corners or other feature points, has been identified it is then possible to solve the pose transformation from a set of equations which relate the 3-D coordinates of the points with their 2-D image coordinates.

The Bundle adjustment algorithm is used as the last step of every feature-based 3-D reconstruction algorithm. It amounts to an optimization problem on the 3-D structure and viewing parameters (i.e., camera pose and possibly intrinsic calibration and radial distortion), to obtain a reconstruction which is optimal under certain assumptions regarding the noise pertaining to the observed image features.

If the image error is zero-mean Gaussian, then bundle adjustment is the Maximum Likelihood Estimator. Its name refers to the bundles of light rays originating from each 3-D feature and converging on each camera's optical center, which are adjusted optimally with respect to both the structure and viewing parameters.

In statistics, Maximum-Likelihood estimation (MLE) is a method of estimating the parameters of a statistical model. When applied to a data set and given a statistical model, maximum-likelihood estimation provides estimates for the model's parameters.

In general, for a fixed set of data and underlying statistical model, the method of maximum likelihood selects the set of values of the model parameters that maximizes the likelihood function. Intuitively, this maximizes the "agreement" of the selected model with the observed data, and for discrete random variables it indeed maximizes the probability of the observed data under the resulting distribution. Maximum-likelihood estimation gives a unified approach to estimation, which is well-defined in the case of the normal distribution and many other problems.

Bundle adjustment boils down to minimizing the re-projection error between the image locations of observed and predicted image points, which is expressed as the sum of squares of a large number of nonlinear, real-valued functions.

The re-projection error is a geometric error corresponding to the image distance between a projected point and a measured one. It is used to quantify how closely an estimate of a 3-D point recreates the point's true projection.

Minimizing the re projection error can be used for estimating the error from point correspondences between two images. The correspondences can be interpreted as imperfect images of a world point and the re-projection error quantifies their deviation from the true image projections.

Thus, the minimization of the re projection error can be achieved by using nonlinear least-squares algorithms. Of these, Levenberg-Marquardt has proven to be one of the most successful due to its ease of implementation and its use of an effective damping strategy that lends it the ability to converge quickly from a wide range of initial guesses.

Marquardt recommended starting with a value $\lambda_0$ and a factor v>1. Initially setting $\lambda=\lambda_0$ and computing the residual sum of squares after one step from the starting point with the damping factor of $\lambda=\lambda_0$ and secondly with $\lambda_0/v$. If both of these are worse than the initial point then the damping is increased by successive multiplication by v until a better point is found with a new damping factor of $\lambda_0 v^k$ for some k.

If use of the damping factor $\Delta/v$ results in a reduction in squared residual then this is taken as the new value of $\Delta$ (and the new optimum location is taken as that obtained with this damping factor) and the process continues; if using $\Delta/v$ resulted in a worse residual, but using $\Delta$ resulted in a better residual, then $\Delta$ is left unchanged and the new optimum is taken as the value obtained with $\Delta$ as damping factor.

When solving the minimization problems arising in the framework of bundle adjustment, the normal equations have a sparse block structure owing to the lack of interaction among parameters for different 3-D points and cameras. This can be exploited to gain tremendous computational benefits by employing a sparse variant of the Levenberg-Marquardt algorithm which explicitly takes advantage of the normal equations zeros pattern, avoiding storing and operating on zero elements.

Bundle adjustment amounts to jointly refining a set of initial camera and structure parameter estimates for finding the set of parameters that most accurately predict the locations of the observed points in the set of available images.

The full bundle adjustment is the optimal solution and makes use of all images. However, it requires all images to be collected before any processing can be completed and is not a real-time solution.

In the pair-wise or triplet pose change technique, only 2 or 3 images are used to estimate the change in position and orientation over the image set. When summed up over many images, a trajectory can be estimated. For example, see the U.S. Pat. No. 7,336,814 entitled "Method and apparatus for machine-vision." However, the solution provided by this a technology is prone to drift over time due to the loss of connection between even 2 or 3 images over time.

Kalman filter also can be used to estimate the current position and orientation (pose) of an object.

More specifically, the Kalman filter, also known as linear quadratic estimation (LQE), is an algorithm that uses a series of measurements observed over time, containing noise (random variations) and other inaccuracies, and produces estimates of unknown variables that tend to be more precise than those based on a single measurement alone.

The Kalman filter algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. Because of the algorithm's recursive nature, it can run in real time using only the present input measurements and the previously calculated state; no additional past information is required.

From a theoretical standpoint, the main assumption of the Kalman filter is that the underlying system is a linear dynamical system and that all error terms and measurements have a Gaussian distribution (often a multivariate Gaussian distribution).

However, a solution provided by the Kalman drifts over time due to loss of connection between images thus making it difficult to use the Kalman filter for real time applications.

The present technology of the rolling bundle adjustment is an improvement over the prior art techniques of bundle adjustment algorithm because it allows to significantly decrease the amount of computation time thus making possible the real time estimation of the pose of the image capturing device 1540G.

Indeed, as it is fully explained below, with each new frame, the rolling bundle adjustment algorithm prescribes removing the position and orientation states associated with the oldest frame and adding position and orientation states for the new frame. An initial estimate of the current frames position and orientation can be made by simply using the previous frames position and orientation estimate. The image locations of the key-points from the last frame are then identified in the new frame. These image measurements are then added to the estimation process using the method of sequential least squares which is much more efficient than completely running the bundle adjustment on the last N frames.

In the embodiment of the present technology, as shown in FIG. 15H, the general processor 109 of FIG. 15H is configured to execute the algorithm 1521H further comprising a rolling bundle adjustment algorithm. The rolling bundle adjustment algorithm computes a bundle adjustment using N frames every time a new frame is available. This is the starting point for this new technique, however the rolling bundle adjustment algorithm uses sequential least squares to add the new frame rather than completely redo the bundle adjustment.

The rolling bundle adjustment algorithm of the present technology (also referred to as "sequential rolling bundle adjustment") is basically a cross between a Kalman filter and the rolling bundle adjustment. Although implemented using sequential least squares, the mathematics are identical to a Kalman filter that retains the previous N−1 frame position and orientation states.

Example II

Figure 28:
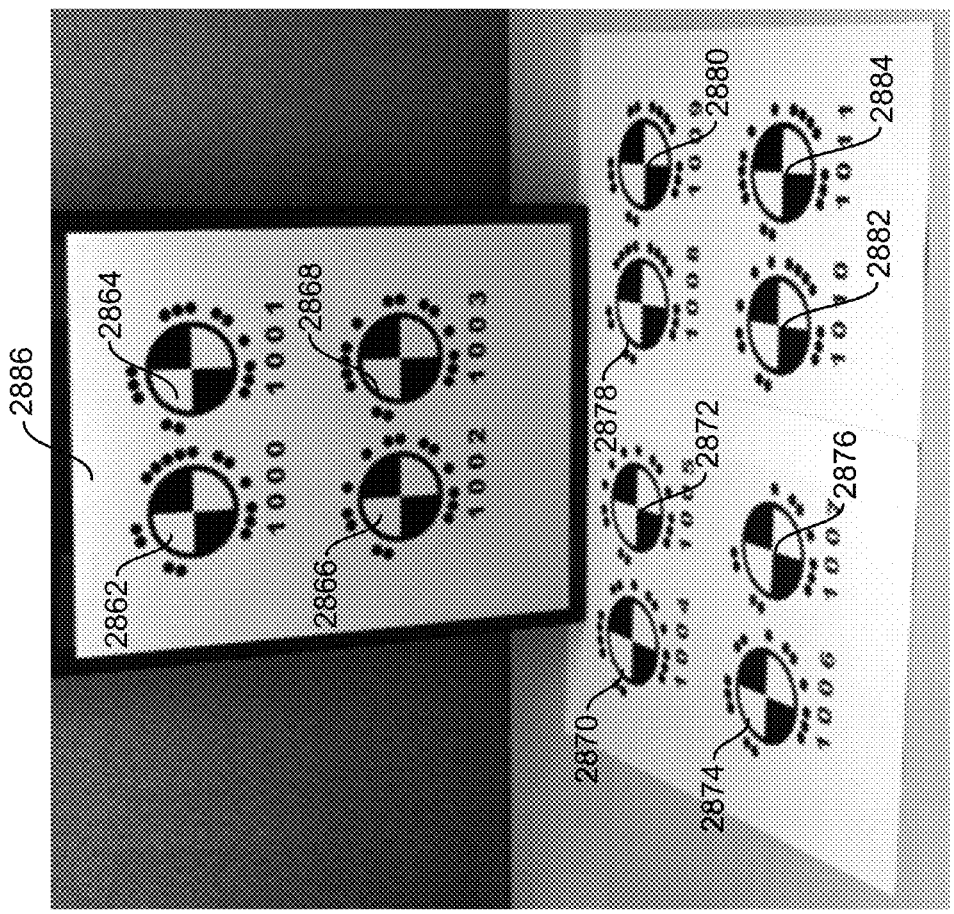
FIG. 28 illustrates a frame from the 720 p video (1280×720) sequence taken at 25 frames per second by Nikon D 800 camera using 35 mm lens, according to one embodiment.

FIG. 28 illustrates a frame from the video sequence 2860 including a set of sib-images 2886, 2888, and 2890 taken from a Nikon D 800 camera using a 35 mm lens. Each sub-image includes at least four key-points: sub-image 2886 includes the key-points 2862, 2864, 2866 and 2868, sub-image 2890 includes the key-points 2878, 2880, 2882 and 2884, and sub-image 2888 includes the key-points 2870, 2872, 2874 and 2876. The camera was set to collect 720 p video (1280×720) at 25 frames per second. Calibration parameters for the camera/lens were pre-computed using the Open CV camera calibration routines. It should be noted that the calibration parameters may also be estimated on the fly as part of the process, however this was not done in this test. The round targets (1000-1011) (or key-points 2862, 2864, 2866 2868, 2870, 2872, 2874, 2876, 2878, 2880, 2882 and 2884), were tracked throughout the sequence while the camera was moved (keeping the targets in view at all times to simplify the test). For this example the number of frames used in the rolling bundle adjustment is 25, i.e. 1 second of data.

In order for the rolling bundle adjustment algorithm of the present technology to work, the system should be initialized. For example, the initial position coordinates of the image capturing device 1540G can be estimated by using the full bundle adjustment algorithm for N preceding frames. In another example, the additional navigation device 107 (FIG. 15H) can be used to estimate the initial position coordinates of the image capturing device 1540G.

In an embodiment of the present technology, the key-points are identified by using 3 non-collinear targets with known absolute or relative positions. This can be done for the example by automatically identifying the target centers using an existing algorithm within TRIMBLE®. The choice of these points can be an important decision. If the initial set of points is able to sufficiently define a datum, the estimated camera positions and orientations can be in this datum and will be appropriately scaled.

In an embodiment of the present technology, before any estimation can be done, the key-points are identified by using a key-point detection algorithm such as SIFT, Surf, BRISK, etc. Many of these algorithms are already implemented within Open CV.

When natural features are used, an arbitrary coordinate system (not shown) can be defined. If a distance measurement is visible in the images it can be used to correctly scale the solution, otherwise the estimates will also be arbitrarily scaled (i.e. the estimated positions will require a similarity transformation to obtain world coordinates). Alternatively, if the location of the image capturing device 1540G can be determined via some other positioning system (say GNSS), these location estimates of the image capturing device 1540G can be used to scale the solution as well as define the required datum.

In an embodiment of the present technology, referring still to FIG. 15H, once the key-point 1530H has been found in the first sub-image 1524H, the corresponding key-points should be found in the following frames (not shown). This can be done by using key-point descriptors or tracking algorithms such as the Lucas-Kanade tracking algorithm.

The Lucas-Kanade method is a widely used differential method for optical flow estimation developed by Bruce D. Lucas and Takeo Kanade. It assumes that the flow is essentially constant in the proximity of the pixel under consideration, and solves the basic optical flow equations for all the pixels in that vicinity, by the least squares criterion. By combining information from several nearby pixels, the Lucas-Kanade method can often resolve the inherent ambiguity of the optical flow equation. It is also less sensitive to image noise than point-wise methods. On the other hand, since it is a purely local method, it cannot provide flow information in the interior of uniform regions of the image.

The Kanade-Lucas-Tomasi (KLT) feature tracker is an approach to feature extraction. It is proposed mainly for the purpose of dealing with the problem that traditional image registration techniques are generally costly. KLT makes use of spatial intensity information to direct the search for the position that yields the best match. It is faster than traditional techniques for examining far fewer potential matches between the images.

In an embodiment of the present technology, the sequential rolling bundle adjustment algorithm 1521H (FIG. 15H) needs at least 5 key-points for each frame.

Figure 31:
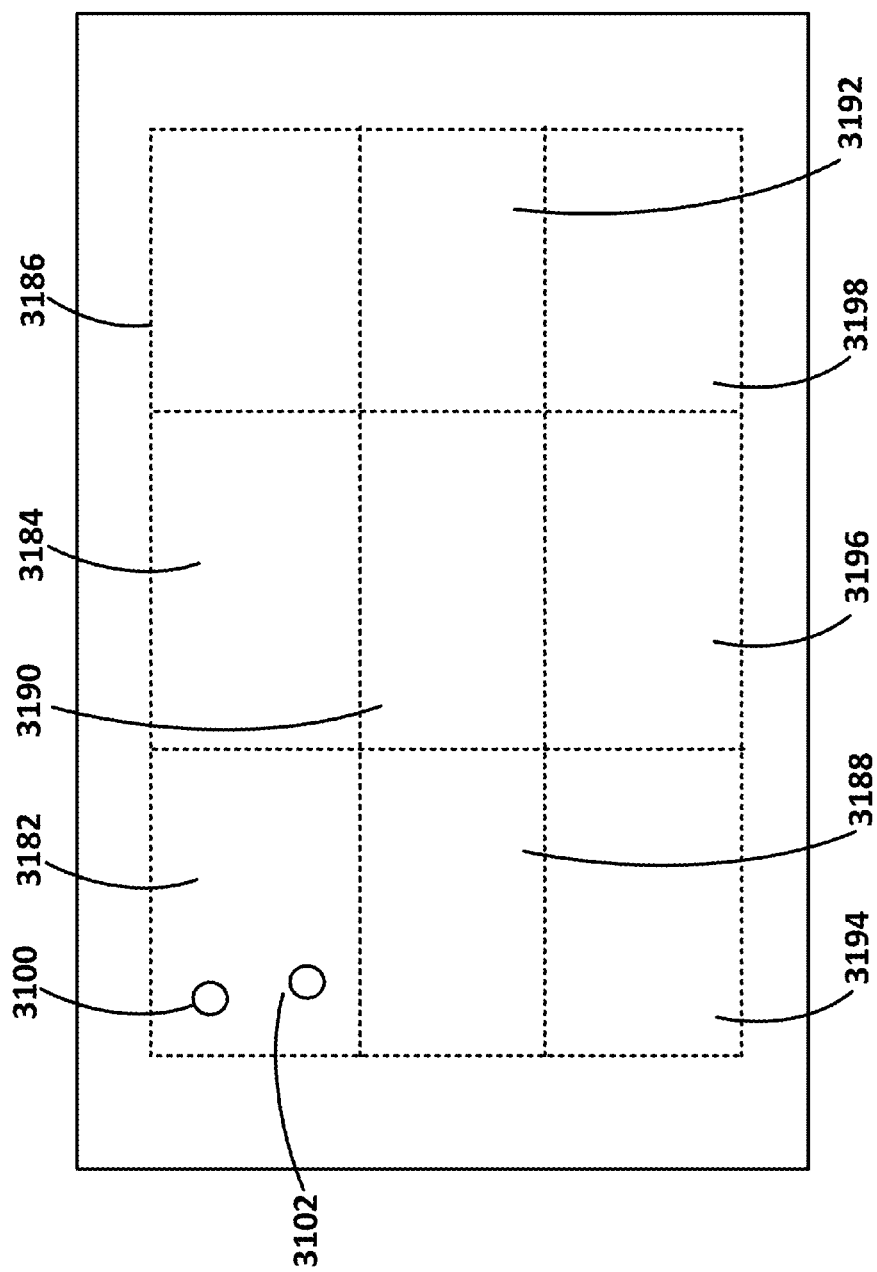
FIG. 31 depicts an image including a number of segments, each segment including a minimum number of tracked features, according to one embodiment.

In an embodiment of the present technology, as shown in FIG. 31, to ensure good geometry while also keeping the number of tracked features low is to segment the image 3180 into sections (3182, 3184, 3186, 3188, 3190, 3192, 3194, 3196 and 3198) and attempt to track a minimum two key-points (3100 and 3102) in each segment in the subsequent frames.

In an embodiment of the present technology, one of the requirements for the imagery is that the corresponding images (in consequent frames) have a significant overlap (say >50%) with one another. The frame rate required to maintain such overlap is dependent on the camera dynamics. Higher dynamics will require a higher frame rate.

In an embodiment of the present technology, an alternative approach to using a constant frame rate is to collect images whenever the camera moves a given distance or changes orientation by a maximum rotation. This approach requires a secondary source of position, velocity, and/or orientation to control the camera shutter.

In an embodiment of the present technology, referring still to FIG. 15H, the collected image data is next fed into a least squares bundle adjustment algorithm 1521H which estimates the position and orientation of the image capturing device 1540G for each frame (6'-vector 1540h including the position coordinates (x, y, z) as well as the orientation angels θ, φ, and ψ) as well as the 3-D coordinates of the tracked key-points: position coordinates 1542h data $(x_{i1}, y_{i1}, z_{i1})$ for the key-point $i_1$, the position coordinates 1544h data $(x_{i2}, y_{i2}, z_{i2})$ for the key-point $i_2$, and the position coordinates 1546h data $(x_{iK}, y_{iK}, z_{iK})$ for the key-point $i_K$.

The fundamental equations that are solved in the estimation are known as the collinearity equations. The collinearity equations are a set of two equations, used in photogrammetry and remote sensing to relate coordinates in a sensor plane (in two dimensions) to object coordinates (in three dimensions). The equations originate from the central projection of a point of the object through the optical center of the camera to the image on the sensor plane, also known as an image plane 1550G.

Figure 30:
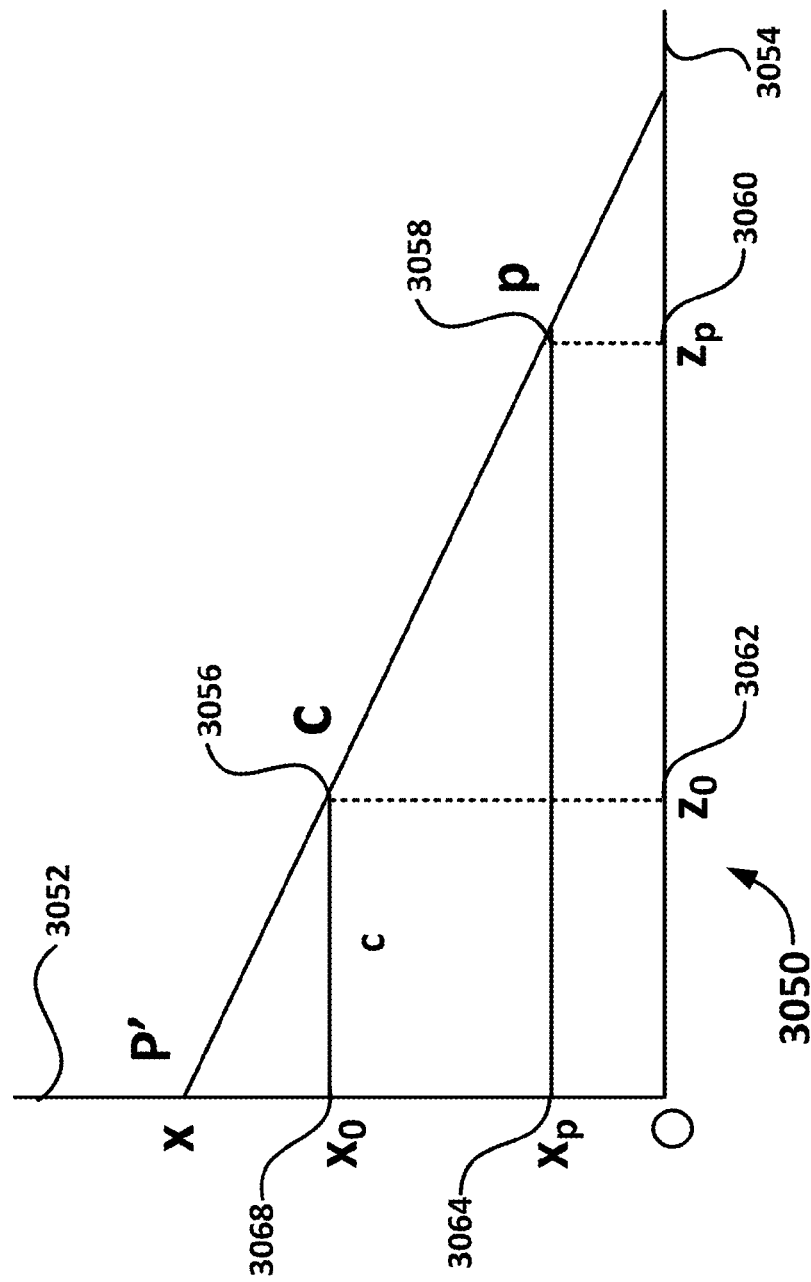
FIG. 30 illustrates x- and z-coordinates of the 2-D projection of a 3-D point through a projection center of a pinhole camera, according to one embodiment.

FIGS. 29, 15I, and 30 illustrate the geometry that is utilized in collinearity equations.

More specifically, FIG. 29 depicts light beams 2904 and 2906 passing through the pinhole 2902 of a pinhole camera 2908 for purposes of illustration. The pinhole camera 2908 is an example of an image capturing device 1540G.

As discussed herein, FIG. 15I depicts three points in a 3 dimensional (3D) field of view representing feature points on one or more objects, and their locations in the image plane of the imaging device, according to one embodiment. For example, FIG. 15I depicts 2-D projection 1534I of 3-D point 1528I (2-D projection 1530I of 3-D point 1524I, and 2-D projection 1532I of 3-D point 1526I) on a plane 1550G by using a pinhole camera with the center 1544G.

FIG. 30 illustrates a graph 3050 with an x axis 3052 and a z axis 3054 for plotting x and z coordinates of a 2-D projection of 3-D point through the center of a pinhole camera, according to one embodiment. For example, FIG. 30 depicts x (3068) and z (3062) coordinates of 2-D projection C 3056 of 3-D point through a projection center 2902 of the pinhole camera 2908 of FIG. 29, as well as x (3064) and z (3060) coordinates of 2-D projection P 3058 of 3-D point through the projection center 2902 of the pinhole camera 2908 of FIG. 29.

Derivation and details of the collinearity equations can be found in any textbook on photogrammetry. One possible derivation (please, see for the reference "*Elements of Photogrammetry*" by Paul R. Wolf, published by McGraw-Hill, 2000) results in the following:

$$x_a = -c \frac{m_{11}(X_a - X_l) + m_{12}(Y_a - Y_l) + m_{13}(Z_a - Z_l)}{m_{31}(X_a - X_l) + m_{32}(Y_a - Y_l) + m_{33}(Z_a - Z_l)} \quad \text{(Eq. 1)}$$

$$y_a = -c \frac{m_{21}(X_a - X_l) + m_{22}(Y_a - Y_l) + m_{23}(Z_a - Z_l)}{m_{31}(X_a - X_l) + m_{32}(Y_a - Y_l) + m_{33}(Z_a - Z_l)} \quad \text{(Eq. 2)}$$

$$m = \begin{vmatrix} m_{11} & m_{12} & m_{13} \\ m_{21} & m_{22} & m_{23} \\ m_{31} & m_{32} & m_{33} \end{vmatrix} \quad \text{(Eq. 3)}$$

$$m = \begin{pmatrix} \cos\varphi\cos\kappa & \sin\omega\sin\varphi\cos\kappa + \cos\omega\sin\kappa & -\cos\omega\sin\varphi\cos\kappa + \sin\omega\sin\kappa \\ -\cos\varphi\sin\kappa & -\sin\omega\sin\varphi\sin\kappa + \cos\omega\cos\kappa & \cos\omega\sin\varphi\sin\kappa + \sin\omega\cos\kappa \\ \sin\varphi & -\sin\omega\cos\varphi & \cos\omega\cos\varphi \end{pmatrix} \quad \text{(Eq. 4)}$$

where
$x_a$ is the measured x image coordinate of point a.
$y_a$ is the measured y image coordinate of point a.
$X_a, Y_a, Z_a$ are the world coordinates of point a.
$X_l, Y_l, Z_l$ are the world coordinates of camera l.
ω, φ, κ are the Euler angle rotations of camera l.
c is the principal distance (approximately the focal length of the camera).
m is the rotation matrix from the camera coordinate system to the world coordinate system.

Figure 33:
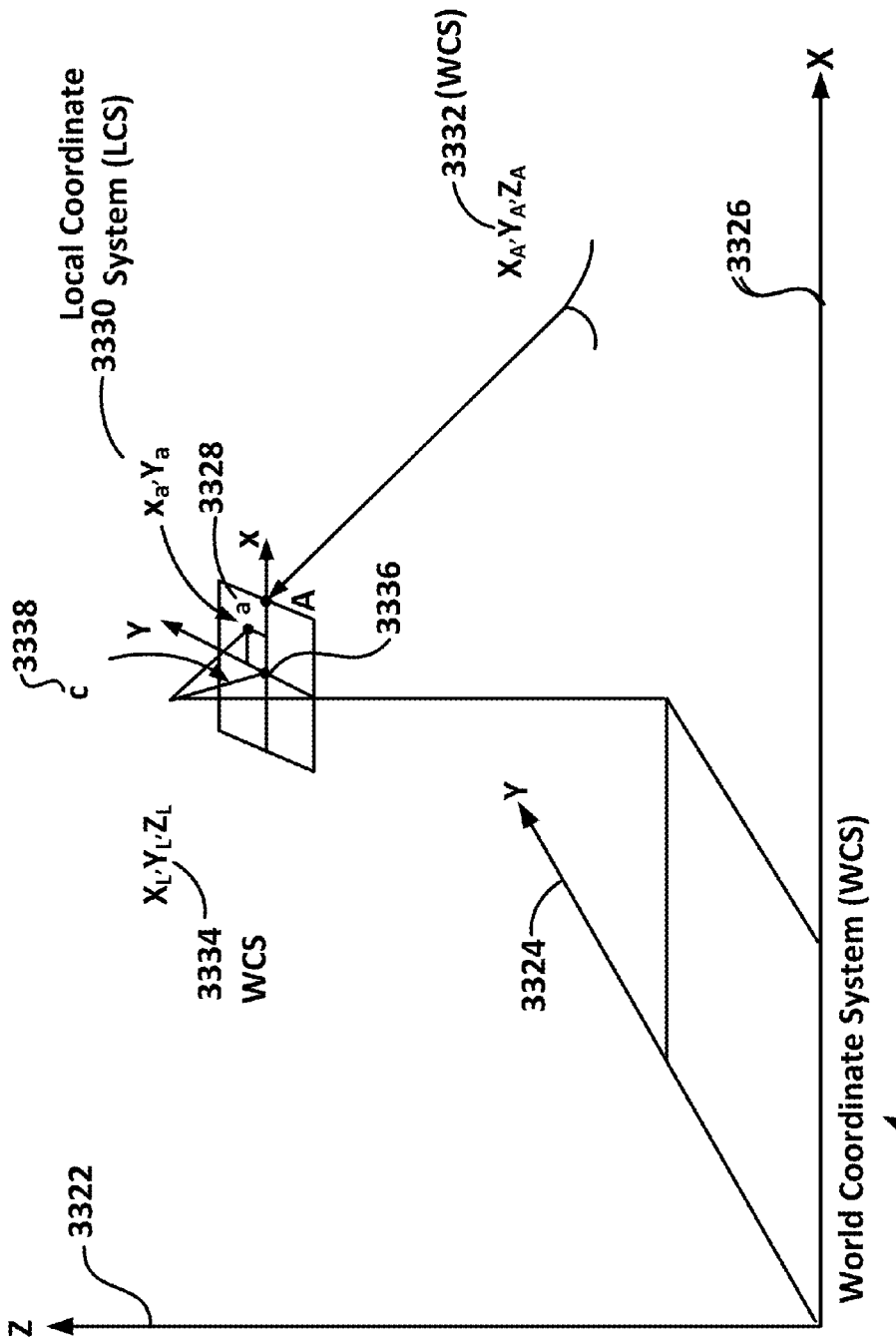
FIG. 33 illustrates the solution of collinearity equations utilized for estimation of camera position and orientation for each frame and for estimating 3-D coordinates of the tracked key-points system, according to one embodiment.

In an embodiment of the present technology, FIG. 33 illustrates the geometry 3320 involved in formulation of collinearity equations (Eq. 1 and Eq. 2) with the matrix m given by (Eq. 3 and Eq. 4) that are utilized for estimation of the position and orientation of an image capturing device 1540G for each frame and for estimating 3-D coordinates of the tracked key-points.

Referring still to FIG. 33, 3-D coordinates $(X_A, Y_A, Z_A)$ of 3-D point A in World Coordinate System (WCS) 3334 (with X axis 3326, Y axis 3324, Z axis 3322) are indicated by point 3332, whereas 3-D coordinates $(X_L, Y_L, Z_L)$ of 3-D point of the image capturing device's center L in World Coordinate System (WCS) 3334 are indicated by point 3336.

Referring still to FIG. 33, 2-D coordinates $(x_a, y_a)$ of the point a in 2-D camera Local Coordinate System (LCS) (camera frame plane) 3330 are shown by point 3328. FIG. 33 also depicts c 3338, which is the principal distance that is approximately the focal length of the image capturing device 1540G.

Example III

Referring still to FIG. 28, suppose that the 12 targets (2862, 2864, 2866, 2868, 2870, 2872, 2874, 2876, 2878, 2880, 2882, and 2884) are tracked and their coordinates are known. Each sub-image results in 2 measurements (x and y) per target per frame resulting in 2*12*25=1200 measurements for 25 frames. The unknowns in this example would be the position and orientation of the image capturing device 1540G (FIG. 15H) (including camera Nikon D 800 camera using a 35 mm lens) per frame, i.e. 6*25=150 unknowns. Clearly the minimum number of image measurements should be 150/25/2=3. In the case where an additional 3 natural features are tracked, there would be additional 3*2*25=150 measurements as well as additional 3*3=9 unknowns (XYZ for each of the three points). Additional measurements to known or unknown points can add significant geometric strength to the estimation resulting in estimates with less noise.

In an embodiment of the present technology, the collinearity equations (Eq. 1 and Eq. 2) with the matrix m given by (Eq. 3 and Eq. 4) are re-formulated in terms of least squares adjustment for the purposes of optimal estimation.

More specifically, in an embodiment of the present technology, the basic least squares equations for the above problem are summarized as follows:

$$\hat{l} = f(\hat{x}) \quad \text{(Eq. 5)}$$

$$\hat{r} = A\hat{\delta} + w \quad \text{(Eq. 6)}$$

$$w = f(x^o) - l \quad \text{(Eq. 7)}$$

$$\hat{\delta} = -N^{-1}u = -(A^T C_l^{-1} A)^{-1} A^T C_l^{-1} w \quad \text{(Eq. 8)}$$

$$C_{\hat{x}} = N^{-1} \quad \text{(Eq. 9)}$$

Where
- $\hat{l}$ is a vector of adjusted observations
- $f(\hat{x})$ is the collinearity equations evaluated at $\hat{x}$
- $x^o$ is the current extimate of the state x.
- $\hat{r}$ is a vector of residuals
- A is a Jacobean matrix (partial derivatives of the collinearity equations w.r.t. the unknowns)
- $\delta$ is a vector of corrections to the unknown parameters
- w is a vector of misclosures
- $C_l$ is the covariance matrix for the measurements
- $C_{\hat{x}}$ is the covariance matrix for the estimated parameters.

One of the most time consuming operations in the estimation is the inversion of the matrix (N) with the number of rows and columns equal to the number of unknown states. Given the iterative nature of least squares, this matrix may require inversion once per iteration.

In an embodiment of the present technology, as was disclosed above, once the initialization has been completed, the positions and orientations of the image capturing device 1540G for the first N frames have been estimated along with the positions of the selected key-points. The next step is to continue estimating the image capturing device 1540G's states as new subsequent frames (N+1, N+2, N+3, N+4, etc.) become available.

Figure 32:
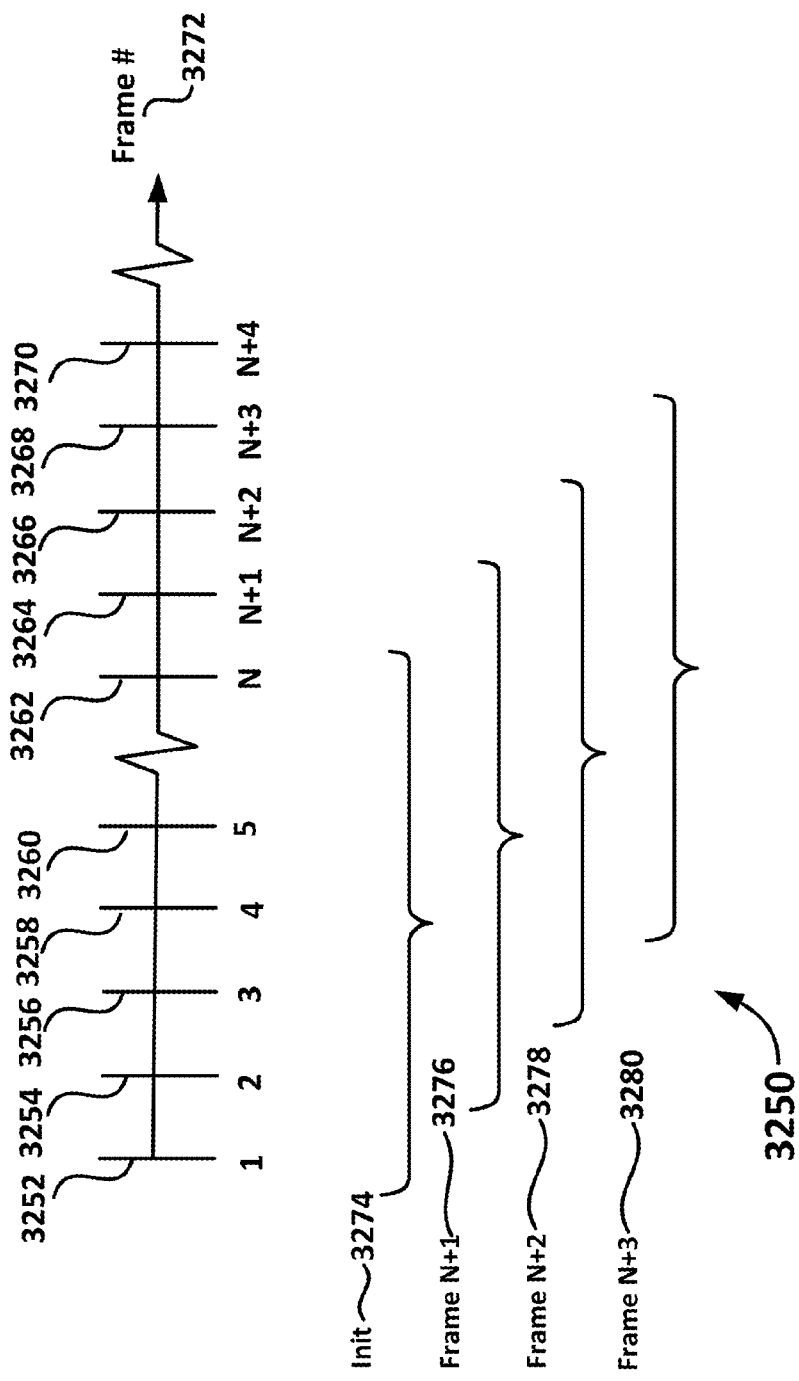
FIG. 32 shows the sequential update in estimation of camera positions and orientation from the initial N frames to the subsequent (N+1) frames while using the sequential rolling bundle adjustment algorithm, according to one embodiment.

In an embodiment of the present technology, FIG. 32 shows the rolling adjustment sequential update algorithm 3250 in estimation of image capturing device 1540G's positions and orientations from the initial N frames to the subsequent (N+1) frames.

FIG. 32 depicts frames 3252-3270 along a frame number axis 3272 with the frame numbers 1, 2, 3, 4, N, N+1, N+2, N+3, N+4 for each of the respective frames 3252-3270. FIG. 32 also depicts solutions 3274, 3276, 3280, and 3278 that correspond respectively with frame N, frame N+1, frame N+2, and frame N+3.

The bundle adjustment algorithm solution 3250 based on the initial N frames (from 3252 and up to 3262) is schematically noted as the initial solution 3274, the bundle adjustment algorithm solution 3250 based on (N+1) frames (from 3252 and up to 3264) is schematically noted as the subsequent solution 3276, the bundle adjustment algorithm solution 3250 based on (N+2) frames (from 3256 through 3264) is schematically noted as subsequent solution 3278, and the bundle adjustment algorithm solution 3250 based on (N+3) frames (from 3258 through 3278) is schematically noted as subsequent solution 3280.

When a new frame becomes available, the oldest frame is removed from the state estimation. The rows and columns associated with the frame to be removed are replaced with initial estimates for the newest frame. This initial estimate of the camera position and orientation at the new frame may be computed from the estimated key-points or if the frame rate is high relative to the camera dynamics the estimate can simply be set to the same values as the previous frame.

In an embodiment of the present technology, the sequential rolling update is accomplished in a sequential manner using the following equations:

$$\delta^{(+)} = \delta^{(-)} - K[w_2 + A_2 \delta^{(-)}] \quad \text{(Eq. 10)}$$

$$C_{\hat{x}}^{(+)} = N_1^{-1} - KA_2 N_1^{-1} \quad \text{(Eq. 11)}$$

$$K = N_1^{-1} A_2^T [C_l + A_2 N_1^{-1} A_2^T]^{-1} \quad \text{(Eq. 12)}$$

where (+), (−) indicate parameters before and after the measurement update.

The major advantage of this technique is that the only new inversion required for the sequential update is the matrix contained within the gain term K. The matrix to be inverted is a square matrix with the dimensions equal to the number of new measurements associated with the new image.

Example IV

For the Examples II and II outlined above in which 12 key-points are tracked, the required inversion would be on a 24×24 matrix. This is compared to re-computing the bundle adjustment with all N frames which would require an inversion of a matrix with dimensions of 25*6×25*6=150×150.

One of the practical justifications of the present algorithm of sequential rolling bundle adjustment that utilizes images to track position and orientation changes is that some key-points will no longer be visible as the image capturing device 1540G (also referred to as "camera") moves. This requires that the no longer visible key-points be removed from the estimation as they no longer provide useful information. This removal is accomplished by simply removing the associated rows and columns in the state and covariance matrices. Also, as the image capturing device 1540G moves it will become necessary to identify and track new key-points and add them into the estimation. Once a new key-point is identified, it should be tracked over multiple images in order to compute initial coordinates which can then be used to insert the associated position into the state and covariance matrices.

Experimental data indicates that as the number of frames increases, the differences between the optimal solution and the sequential solution begin to approach one another, and however the cost is a slight increase in computational requirements. In an example, when N=25 the maximum difference is about 21 mm. Also, the time required to update a frame was approximately 25 msec on a laptop with an Intel i7 processor and no optimization of the software. Thus this method enables operation in real time.

In an embodiment, the computer-readable and computer-executable instructions may reside on computer useable/readable media.

Modern image capturing devices 1540G also have accelerometers built in, and so can also track their movements. With 3-axis accelerometers, again it is possible to track the cellular device's pose in real time, but the error build-up is quadratic. This error can be eliminated by periodic resetting the accelerometer, usually when the change in position or pose is close to zero. However, the reset results in a restart of tracked motion, from the new zero point. Since the error build up in image-based tracking systems is linear, image tracking can be used for longer time periods. Resetting an image tracking system may be done via the accelerometer as well.

The two pose tracking systems, image-based and accelerometer-based, may be combined via a Kalman filter with appropriate weighting functions to indicate a distance traveled during a given time interval. Knowing this distance as a kind of "truth" distance allows for additional filtering on GNSS observables and processed position fixes, to improve accuracy.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Multipath Errors

Various embodiments are well suited for correcting or compensating for errors caused by multipath in pseudorange estimates. For example, multipath error can occur as signals bounce on various objects, such as buildings or other objects, reflecting signals along many paths. Extracted pseudorange information is an example of pseudorange estimates.

Multipath refers to the simultaneous processing in the GNSS receiver of both the desired GNSS signal and reflected versions of the desired GNSS signal that arrive a very short time after the desired signal. The two signals pass through the GNSS receiver and are processed by the down converter and the timing measurement systems that develop the pseudoranges. Instantaneous combining of the two signals, desired and slightly-later multipath, result in erroneous pseudoranges, which may be quite different in instantaneous magnitude from the true pseudorange that should have been determined.

Since it is very hard to shield a GNSS receiver/antenna system from such reflections, alternate means for coping with the interference have been developed. The Hatch method is particularly useful when carrier phase data is available, as carrier phase is not affected by multipath, and therefore can serve as a kind of yardstick to compare pseudorange data to (also known as "disciplining" the pseudoranges).

Multipath error can be reduced by smoothing pseudoranges using, for example, real carrier phase information or reconstructed carrier phase information. For example, assuming that the raw pseudorange smoothing based on CPI logic 1530C is implemented with a filter 1534E, the filter 1534E can remove "outlier" pseudoranges that do not conform to the extent of a change in pseudorange expected under the instant conditions, as measured by the covariance matrix. For example, if a sequence of pseudoranges contains the following data [pseudorange time estimates of the time for a timing signal to travel from a satellite to a receiver in second]: 0.0675, 00676, 0.0677 0.0680, 0.0679 . . . the filter 1534E may delete the 0.0680 entry as an "outlier."

Locally Measured Movement LMM

Locally measured movement information, abbreviated here as "LMM," according to one embodiment, is information that includes measurements of movement where the movement and the measurements of the movement occur locally with respect to a cellular device. For example, an accelerometer that is attached or part of a cellular device can be used to measure the distance that the cellular device has moved. In another example, a series of images obtained with an image capturing device 1540G that is attached or part of the cellular device can be used to measure the distance the cellular device has moved.

Referring to FIG. 15G, movement can be measured in a plane that is parallel to the ground where the plane is defined by an x axis and a y axis, such as ground plane 1560G. Movement can also be measured along a z axis (also known as "height") that is perpendicular to the ground the determination of the x and y coordinates in position as well as time to fix can be improved. Most consistent results will occur when the cellular device with its image capturing device 1540G is oriented in a reasonably fixed direction. Wearing a cellular device on a belt hook or attached to a hat or some other type of platform, for example, can be used to maintain orientation. A front-facing or a rear-facing image capturing device 1540G can be used to view the surrounding area, according to one embodiment. If the image capturing device 1540G is held by hand, then whatever orientation is first used needs to be approximately maintained. However, modern cellular device accelerometers indicate orientation in all planes and software can accommodate any change is physical orientation of the cell device.

By prior arrangement, a mounted orientation may be referenced in the software that is used to define the imaging output, so that the image from the image capturing device 1540G can directly measure changes in a horizontal plane 1560G, parallel to the earth's surface, and perpendicular to the image plane 1550G of the image capturing device 1540G. Thus the image will be approximately perpendicular to the plane of the earth's surface. In this case, X and Z are directly viewable in the captured image. Y is in the plane 1560G that is approximately perpendicular to the captured image, and approximately parallel to the earth. The image capturing device 1540G can measure left-right motion easily which is like a delta X whereas height Z is up-down. Depth view of the captured image provides Y information. However, all that is required for LMM operation is that either the accelerometers are operative and useful, or the image capturing device can see and track some features in its environment.

Various embodiments are well suited to other types of locally measured movement that can be used for improving position determination, as discussed herein.

Patterns of Using Movement Information

Locally measured movement (LMM) information from one or more types of sensors can be used to provide improved position determination. Examples of a movement sensor are an image capturing device 1540G and an accelerometer 1502A.

Various patterns can be created by using one or more types of locally measured movement information. One pattern occurs when LMM is used from a single sensor. Another pattern occurs when LMM from two sensors are used simultaneously. Yet another pattern can occur when LMM from two sensors are mutually exclusively alternated with respect to one another. Yet still another pattern can occur when LMM from two sensors over lap at times and alternate at other times. These are just a few examples of patterns of using LMM that can be used according to various embodiments. These patterns can be modified to incorporate three or more sensors.

Figure 18A:
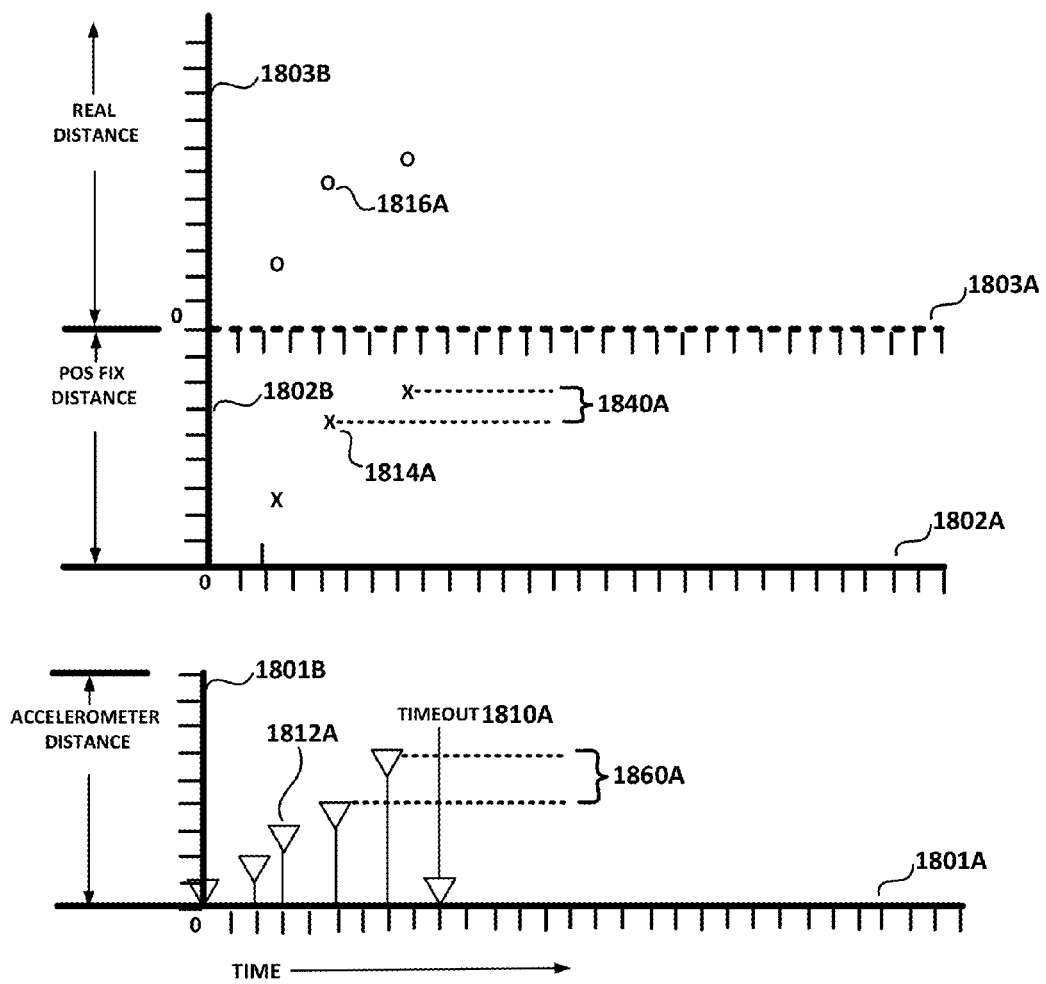
FIGS. 18A-18D depict diagrams of patterns where locally measured movement information is used to improve position fix determination, according to various embodiments.
Figure 18B:
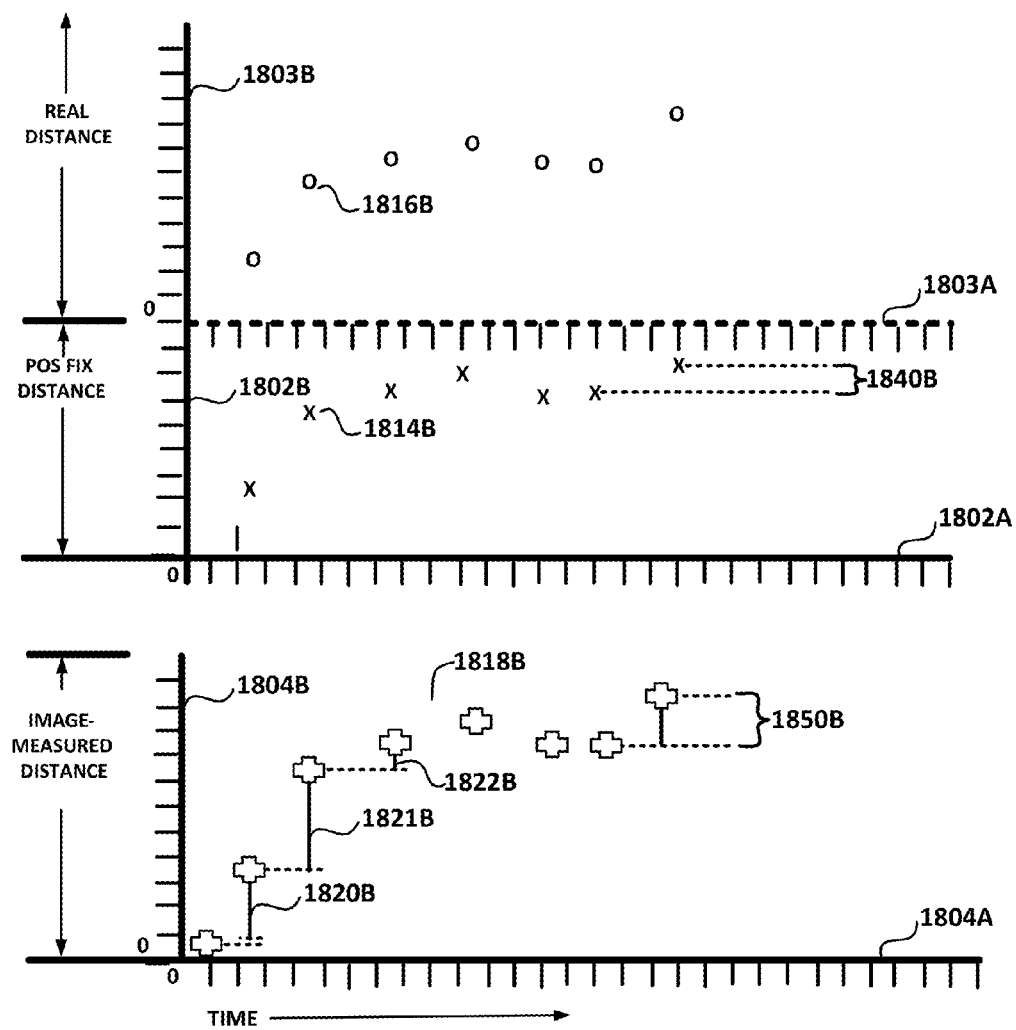

FIG. 18A depicts a diagram of a pattern where locally measured movement information 1801 from an accelerometer is used to improve position determination, according to one embodiment. Axis 1801A, 1802A, 1803A are for time, axis 1801B is for distance 1812A measured by the accelerometer, axis 1802B is for position fix distance 1814A as determined by the movement sensor position fix smoothing logic 1510C using pseudorange information, axis 1803B is for the plot 1816a of real distance plot. Note that the circular elements in plot 1816B, the X elements in plot 1814B, and the cross-shaped elements in plot 1818b are data points corresponding to the user position where the cellular device is being held by the user. The LMM devices provide incremental distances from one measurement location to the next, as shown in FIG. 18B at 1820B, 1821B, and 1822B. The plot 1812A of the distance measured by the accelerometer is an example of locally measured movement information. The locally measured accelerometer distance plot 1812A is a plot 1816a of locally measured movement of the real distance of a cellular device as it is moving. The locally measured accelerometer distance, indicated in plot 1812A, is used to correct the position fix distance as indicated by plot 1814A. Therefore, the plot 1814A of the position fix distance approximates the real distance plot 1816A. As depicted, at time 1810A, the accelerometer reaches a limiting factor.

Delta-GNSS 1840a is the difference between the last two position fix distances for the plot 1814A. Delta-LMM 1860A is the difference between the last two accelerometer distances for plot 1812a. Respective deltas may be calculated for any two successive position fixes or distances measured by a sensor, such as an image capturing device or accelerometer.

FIG. 18B depicts a diagram of a pattern where locally measured movement information from an image capturing device 1540G is used to improve position determination, according to one embodiment. Axis 1801A, 1802A, 1803A are for time, axis 1804B is for the plot 1818B of the distances measured by the image capturing device, axis 1802B is for the plot 1814B of position fix distances as determined by the movement sensor position fix smoothing logic 1510C using pseudorange information, axis 1803B is for the plot 1816B of real distances. Plot 1818B is a plot of distances measured by the image capturing device, which is an example of locally measured movement information. The locally measured image capturing device distance plot 1818B is locally measured movement of the real distance, depicted in plot 1816B, of a cellular device as it is moving. The locally measured image capturing device distance, as indicated by plot 1818B, is used to correct the position fix distances as indicated by plot 1814B. Therefore, the plot 1814D of the position fix distances approximates the real distances plot 1816B.

Delta-GNSS 1840B is the difference between the last two position fix distances for the plot 1814B. Delta-LMM 1850a is the difference between the last two distances measured by the image capturing device for plot 1818B. Respective deltas may be calculated for any two successive position fixes or distances measured by a sensor, such as an image capturing device or accelerometer.

Figure 18C:
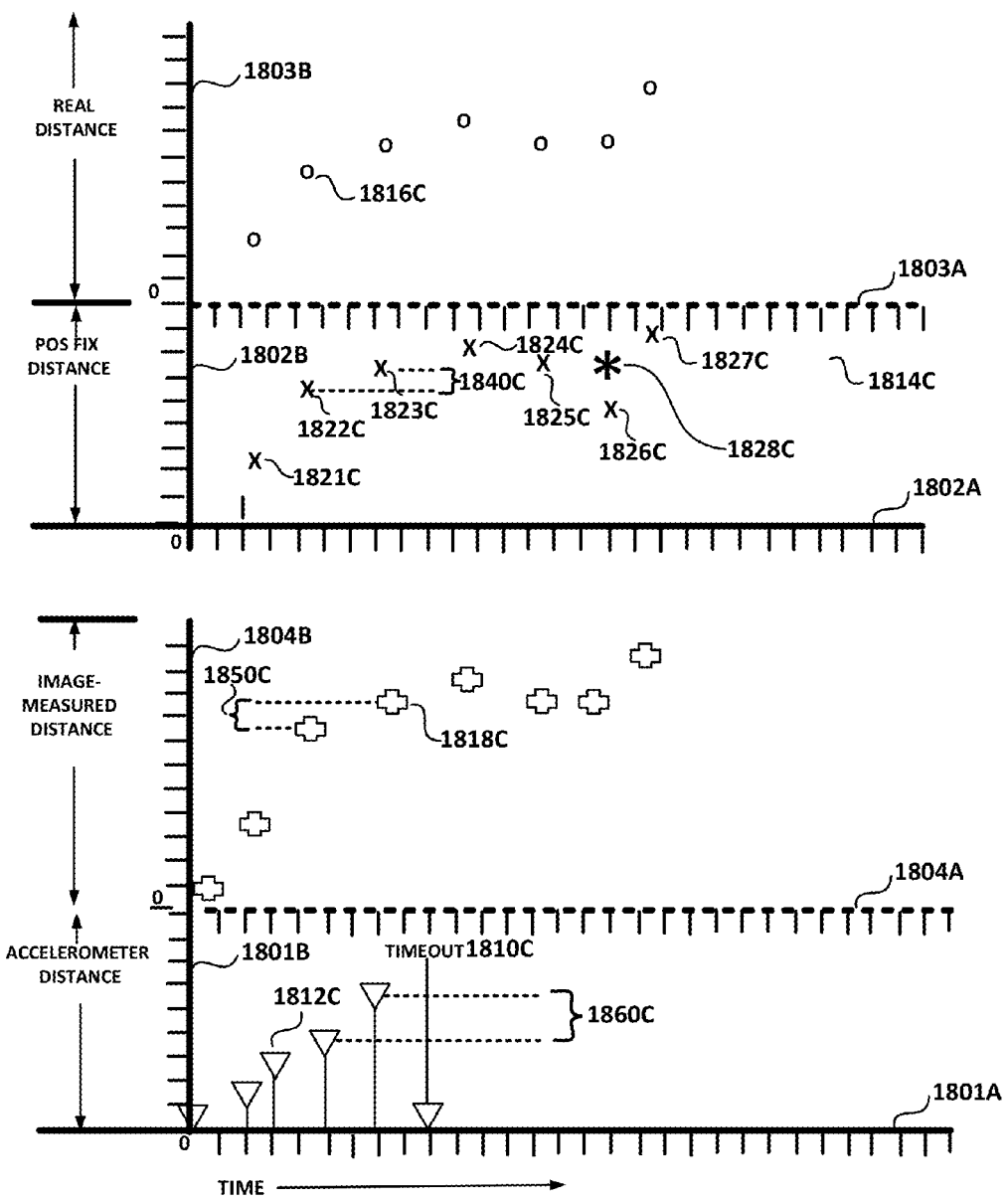

FIG. 18C depicts a diagram of a pattern where locally measured movement information, as indicated by plots 1818C and 1812C, from an accelerometer and an image capturing device are continuously integrated together to improve position determination during a period of time and the image capturing device alone is used after the accelerometer reaches a limiting factor at time 1810C, according to one embodiment. Axis 1801A, 1802A, 1803A and 1804A are for time, axis 1801B is for distance measured by the accelerometer plot 1812C, axis 1802B is for the position fix distances plot 1814C, axis 1803B is for real distances plot 1816C, and axis 1804B is for the plot 1818C of distances measured by an image capturing device. The position fix distance plot 1814C includes the position fixes 1821C-1827C. Position fix 1826C is one of the position fixes in the position fix distance plot 1814C where 1826C is an "outlier." Position fixes 1821C-1825C precede position fix 1826C and position fix 1827C succeeds position fix 1826C. Distance, as indicated in plots 1812C and 1818C, measured respectively by the accelerometer's distance and the image capturing device's distance are examples of locally measured movement information. The locally measured distances plots 1812C and 1818C are locally measured movement of the real distance, as indicated by plot 1816A, of a cellular device as it is moving. The locally measured accelerometer's distance plot 1812C and the image capturing device's distance plot 1818C are used to correct the position fix distances, as indicated by plot 1814C. Therefore, the plot 1814C of the position fix distance approximates the real distances plot 1816C, except for the position fix 1826C, which is an "outlier." The position fix 1828C is a new position fix that was determined based on a blend of locally measured movement (LMM) information from both an accelerometer and an image capturing device (also referred to as "blended locally measured movement information"). The new position fix 1828C can replace the "outlier" position fix 1826C, as discussed herein. As depicted, at time 1810C, the accelerometer reaches a limiting factor and is not used after time 1810C.

Delta-GNSS 1840c is the difference between the second and third position fixes for the plot 1814C. Delta-LMM 1850c is the difference between the two image capturing distances, which correspond to the second and third position fix, for plot 1818C. Delta-LMM 1860C is the distance between two accelerometer distances, which correspond to the second and third position fix, for plot 1812C. Respective deltas may be calculated for any two successive position fixes or distances measured by a sensor, such as an image capturing device or accelerometer.

Figure 18D:
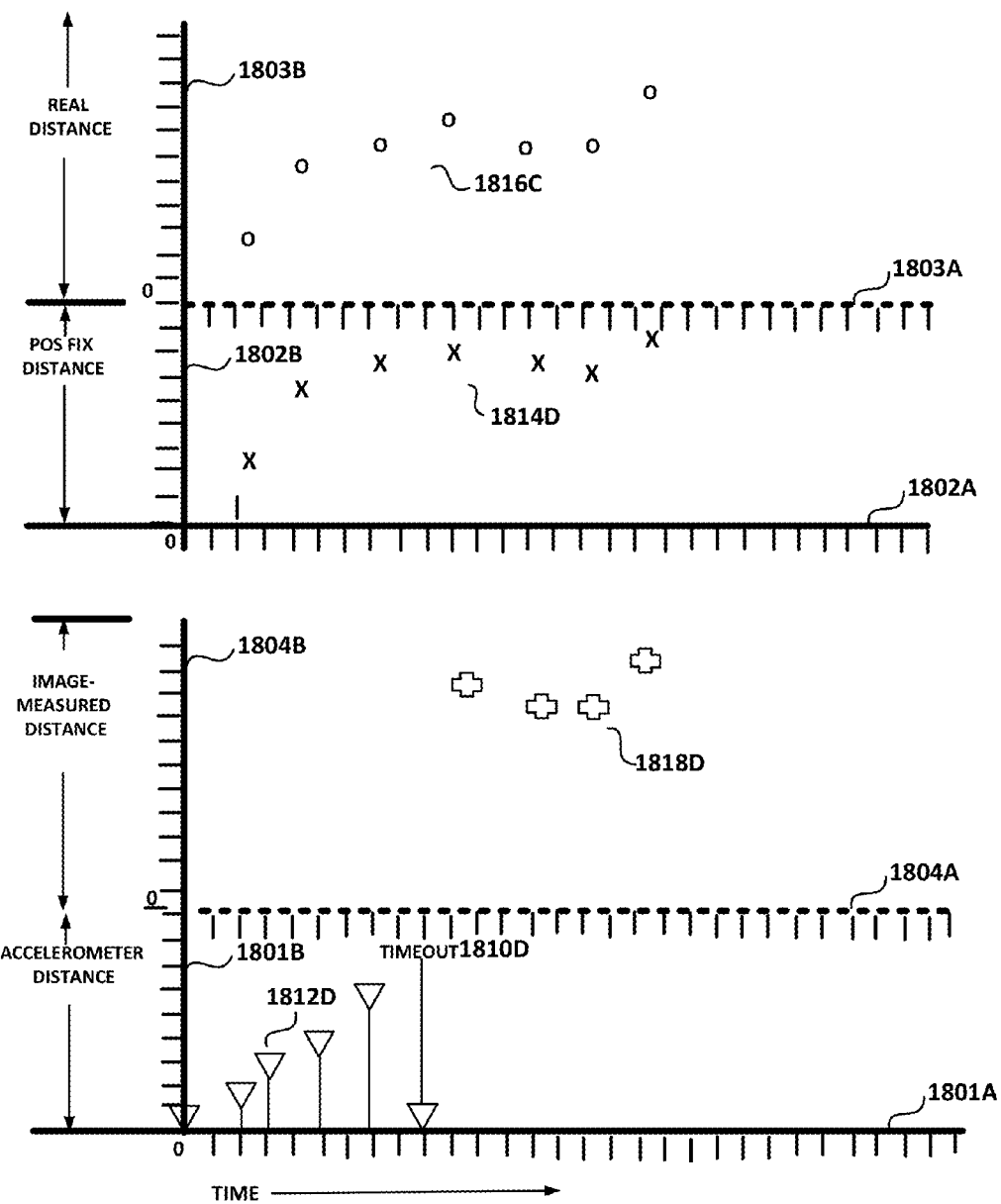

FIG. 18D depicts a diagram of a pattern where the position determination is improved by alternating the use of non-overlapping locally measured movement information from an accelerometer and an image capturing device as indicated by respective plots 1812D and 1818D, according to one embodiment. For example, from t0 to t1, only the accelerometer's locally measured movement information, as indicated by plot 1812D, is used, from time t1 to t2 only the image capturing device's locally measured movement information, as indicated by plot 1818d, is used. The locally measured accelerometer distances plot 1812D and the image capturing device's distances plot 1818D are used to correct the position fix distances, as indicated by plot 1814D. Therefore, the plot 1814D of the position fix distances approximates the real distances plot 1816D. At time 1810D, the accelerometer reaches a limiting factor and is not used after time 1810D.

Estimating a New Position when the GNSS Position Fix is an Outlier

Figure 18E:
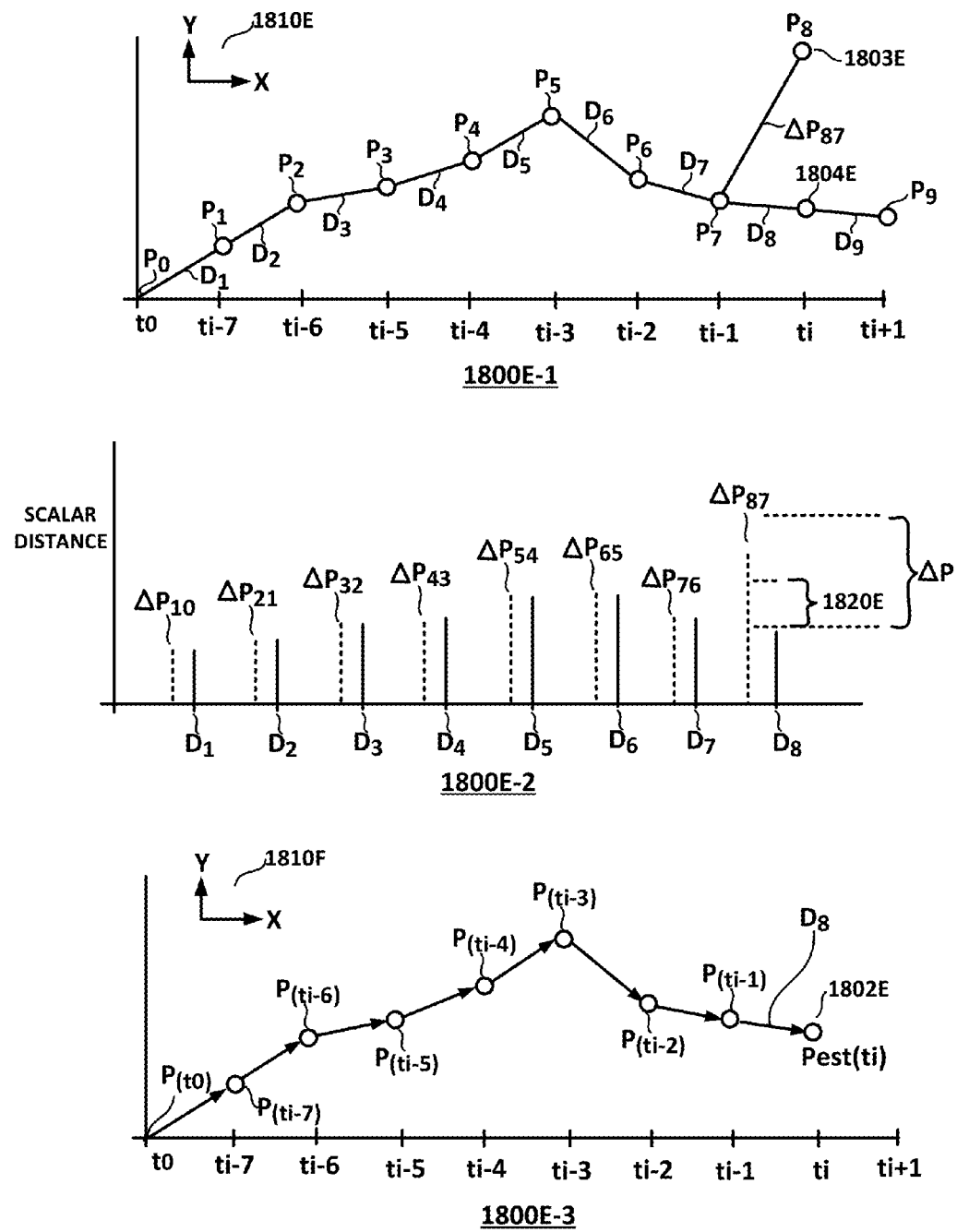
FIG. 18E depicts various graphs for estimating a new position fix when a GNSS position fix is an outlier, according to various embodiments.

FIG. 18E depicts various graphs 1800E-3, 1800E-2, 1800E-1 for estimating a new position fix when a GNSS position fix is an outlier, according to various embodiments.

Graph 1800E-1 depicts a plan view, looking down at the ground from above, of the path a user is walking as they are holding their cellular device. There is an X-Y direction reference 1810E where x is the x direction that the user can walk and y is the y direction that the user can walk. Graphs 1800E-1's x axis represents times t0 to ti+1. Since graph 1800E-1 is a plan view, the x axis also represents the direction that a person can walk in the x direction.

The graph 1800E-1 depicts the GNSS position fixes P1-P9 that the user traveled while carrying their cellular device and distances D1-D9 between each of the respective pairs of GNSS position fixes P1-P9. The distances D1-D9 are scalar distances traveled by the cellular device as measured by locally measured movement information, according to various embodiments. The position fixes P1-P9 are absolute coordinates as measured by a GNSS receiver. The position fixes P1-P9 are latitude longitude position fixes instead of distances traveled. Each of the position fixes occur at the respective times ti-7 to ti+1. P8 at time ti is an outlier 1803E. The real position fix for the user at time ti is depicted as real position fix 1804E.

Graph 1800E-2 depicts a comparison between distances calculated based on GNSS position fixes (also known as "GNSS position fix distances") and distances calculated based on locally measured movement information (also known as "LMM distances"), according to various embodiments.

The y axis represents scalar distances for the GNSS position fix distances and the LMM distances. The scalar distance is an absolute value. For example, an equation to compute the scalar distance between P(ti) and P(ti-1) is $$\|P(ti)-P(ti-1)\|.$$

$\Delta P_{10}$ to $\Delta P_{87}$ represent distances calculated based on the GNSS position fixes P1-P8. D1-D8 represent distances calculated based on locally measured movement (LMM) information, where $\Delta P_{10}$ is the distance between P0 and P1, $\Delta P_{21}$ is the distance between P1 and P2 and so on. A distance between GNSS position fixes can be determined using an equation that subtracts a subsequent position fix P from a previous position fix P. For example, $\Delta P_{21}$ can be calculated using the equation $\Delta P_{21}$=P2-P1. The graph 1800E-2 provides a comparison by depicting respective pairs together, such as D1 with $\Delta P_{10}$, D2 with $\Delta P_{21}$, and so on through D8 with $\Delta P_{87}$.

1820E represents the maximum error allowed, also referred to herein as a metric threshold. As depicted in graph 1800E-2, the GNSS position fix distance $\Delta P_{87}$ exceeds the LMM distance D8 by $\Delta P$, using the equation $\Delta P > D8 +$ maximum error 1820E. Therefore, the GNSS position fix P8 that corresponds with $\Delta P_{87}$ is determined to be an "outlier," according to one embodiment.

Image measured distances and accelerometer distances depicted in FIGS. 18A-18D are examples of LMM distances D1-D8. Position fix distances depicted in FIGS. 18A-18D are examples of GNSS position fix distances $\Delta P_{10}$ to $\Delta P_{87}$.

Graph 1800E-2 depicts a GNSS position fix 1803E that is an "outlier" at time ti. The GNSS position fix 1803E was calculated using various embodiments, as discussed herein. To make it easier to compare the GNSS position fix 1803E with the real position, at position fix 1804E, graph 1800E-1 also depicts the GNSS position fix 1803E, which is the "outlier."

Graph 1800E-3 depicts a plan view of position fixes P(t0) to P(ti-1) taken respectively at times t0-t1, according to one embodiment, where P(t0) to P(ti-1) depicted in graph 1800E-3 respectively are P0 to P8 depicted in graph 1800E-1. The x axis represents the direction the cellular device carried by the user travels in the x direction and the y axis represents the direction the cellular device travels in the y direction. In this illustration, for the sake of simplicity, it is assumed that the user is walking on near level ground. Therefore, the graph 1800E-3 does not depict a z-axis since the z slope would be close to zero.

P(ti-2) and P(ti-1), which are position fixes taken respectively at times ti-2 and ti-1. At time ti, graph 1800E-3 depicts an LMM estimate 1802E.

LMMave is equal to the scalar distance which in turn is equal to $1/N \Sigma$ LMM(t0,ti) where n=N a fixed number that represents the total number of data points. The letter M shall be used to represent slopes for LMM distances D1-D9. Therefore, the path in space from P(ti-2) to P(ti-1) is equal to MxX+MyY+MzZ+P(ti-2).

A cellular device 1500A, 1500J, 1600, 1700 may be used to estimate the position in 3D space of a position fix given by the cellular device 1500A, 1500J, 1600, 1700 which is declared to be an "outlier," as discussed herein. In an embodiment, GNSS data created by a cellular device 1500A, 1500J, 1600, 1700 is stored, for example, in memory 210 as discussed herein. Examples of GNSS data include raw pseudoranges, corrected unsmoothed pseudoranges, corrected smoothed, uncorrected unsmoothed pseudoranges, uncorrected smoothed pseudoranges, smoothed pseudoranges, and various types of GNSS position fixes calculated, as discussed herein. LMM data generated by a sensor, such as 1502A, 1540G, 1540J, is stored, for example, in memory 210, as discussed herein. A distance traveled can be determined based on LMM data, according to various embodiments.

A GNSS average distance travelled can be determined based on GNSS data for a variable number of time intervals, such as t0-ti. For the same intervals t0-ti, an LMM average distance traveled can be estimated using locally measured movement information. In an embodiment, when there is a discrepancy between the GNSS average distance traveled and the LMM average distance traveled, the GNSS position fix may be determined to be an outlier, and may be discarded.

In the event that an estimate 1802E of the discarded position 1803E is wanted, the real position 1804E's location in 3D (x, y and z coordinates) may be estimated by the following method. Let Ti represent the time that corresponds with the outlier position fix 1803E. In an embodiment, previous position fixes, such as P(ti−2), P(ti−1) depicted in graph 1800E-3, prior to the time of the outlier 1803E may be used to determine a vector direction that can give an indication of the expected direction of travel. This vector is based on calculating the mathematical slopes of the components of a line in space. Referring to graph 1800E-3, an example of a slope is the slope of the line between P(ti−2) and P(ti−1). Such slopes Mx, My, and Mz for the respective x, y and z coordinates, may be determined by well-known methods involving the data points for the previous 2 known positions, Ti−1 and Ti−2, as shown in FIG. 18E. The average travel distance LMM, represented by LMMave, may be determined by averaging the previous position fixes for 2 or more previous positions, such as P(ti−2) and P(t−1). The estimated position of the replacement for the outlier 1803E may be determined by vector addition of the LMM average distance traveled scalar quantity to the vector position of the last known position fix at time Ti−1. The equation for this method is:

Pest[Ti]=P[Ti−1]+LMMave x [Vector components Mx, My, Mz], where x and y are represented coordinates in 1810E and z represents height.

The LMM estimate 1802E depicted in graph 1800E-3 is an example of Pest[Ti]. The LMM estimate 1802E can be used to replace the GNSS position fix 1803E, according to various embodiments.

For example, the direction of the line between P(ti−2) and P(ti−1) is continued from P(ti−1) to $P_{EST}$(ti) so that P(ti−2), P(ti−1) and $P_{EST}$(ti) appear to be in a straight line. Further, $P_{EST}$(ti) may be calculated by adding the distance D8 to the position fix P(ti−1), which is the last position fix that was determined to be sufficiently accurate, according to one embodiment. For example, Position fix P(ti−1) can be determined to be sufficiently accurate because D7 and $\Delta P_{21}$ do not differ by the metric threshold 1820E.

This method, as depicted in the context of FIG. 18E, may be performed in near-real time if the LMM distance is needed for other functions. Other embodiments are also useful. In an embodiment, a more sophisticated estimation procedure may be applied that takes more previous and successive data points into account, such as a curve-fitting method.

Referring to FIGS. 18A-18E, the interval for collecting position fixes and distances for an image capturing device or accelerometer can vary, for example, from $\frac{1}{10}^{th}$ of a second to a second, according to one embodiment.

According to one embodiment, the metric threshold can range from 10 centimeters (cms) to 1 meter (m) or any other range of distance appropriate to the conditions of use.

For the sake of simplicity, FIGS. 18A-18E were depicted with movement information from one sensor or two sensors. If the movement information is from two or more sensors, the movement information can be blended based on weighting factors, as discussed herein. However, embodiments are well suited to a different number of sensors.

Weighting Factors

Weighting factors (also referred to as "weights") can be used as a part of implementing the patterns of using movement information as depicted in FIGS. 18A-18E. A weighting factor determines how much of a sensor's output is used, for example, in a particular process. Weighting factors thus capture the relative importance of a sensor in operating the particular process. Weighting factors range from 0% to 100%, and all the weighting factors for all of the sensors of a cellular device that are being used at a point in time for a particular process generally add up to 100%. For example, if only one sensor is used, then a weight of 100% may be used for the LMM information from that sensor. In another example, if a cellular device is using sensors a and b for improving position fix determination based on LLM information, then movement information for sensor a may have a weight of 10% while the weight of the other sensor b may have a weight of 90% where 10% and 90% totals 100%. In yet another example, when the cellular device includes sensors a and b, a weight of 55% may be used for the movement information from sensor a and a weight of 45% may be used for the movement information from sensor b where 55% and 45% total 100%.

According to one embodiment, the movement information from one of the sensors is not used, for example, by assigning it a weight of 0. For example, if the movement information for the accelerometer is assigned a weight of 0, then the accelerometer's movement information is not used. Similarly, if a weight of zero is assigned to the movement information of an image capturing device, then the image capturing device's movement information is not used.

Further, a weight for a type of movement information may vary over time. For example, movement information from a single sensor a or b may have a weight of 10% from time t0 to time t1, then 15% from time t1 to time t2 and so on. In another example, when movement information from two or more sensors are used, a weight of 5% may be used for the movement information from sensor a and a weight of 7% may be used for the movement information from sensor b from time t0 to time t1 and a weight of 8% may be used for the movement information from sensor a and a weight of 4% may be used for the movement information from sensor b from time t1 to time t2.

The weighting factor for the LMM information from a sensor of a plurality of sensor, according to one embodiment, is determined based on the quality the LMM information. For example, if the quality of the LMM information from sensor a is twice as good as the LMM information from sensor b, then the weighting factor for the LMM information from sensor a may be twice that of the weighting factor for the LMM information from sensor b.

The quality of the LMM information for an accelerometer may be determined, for example, based on one or more of the quality of the accelerometer, the amount of time that has elapsed since the accelerometer was reset. The quality of the LMM information from an image capturing device may be determined, for example, based on the quality of the image capturing device, the number of features associated with the one or more images obtained with the image capturing device, the amount of distance that the image capturing device has been moved since it was reset, the number of key features and so on.

The blending, based on weights, of the locally measured movement information from two or more sensors can be used as a part of determining the accuracy of a position fix, discarding a position fix that is an outlier, or calculating a new position fix to replace the discarded position fix, or a combination thereof. The weighting factors can be used to take into account that there are error buildups that occur with the Locally Measured Movement information. The weighting factors can be time dependent according to rules. For example the weighting factor for the accelerometer may decrease over the time limit preset for providing acceptable accuracy. The decrease may be linear or exponential. Similarly, the weighting factor for use of the image-based position shift estimator may also be decreased over time and over distance traveled. The sum of the two position shift sources may be weighted appropriately and then used in a second summation process as follows.

The utility of the LMM as a kind of "sanity check" on casting out position jumps in the GNSS-determined position fix arises because LMM based sources, such as an accelerometer and image capturing device, typically do not experience large position shifts themselves. So a first kind of test may be to 1) calculate the relative position fix changes for each type of sensor from a first time to a second time period; then blend the two LMM data sources together to get an LMM position shift. Then calculate the position shift determined by two successive GNSS-determined position fixes. By comparing these two successive GNSS-determined position fixes, a judgment can be made about the expected reliability of the GNSS-determined position fix.

For example, referring to FIGS. 18A-18C, let Delta-GNSS 1840A, 1840B, 1840C be the difference between two successive position shifts based on GNSS. Let Delta-LMM 1860A, 1850B, 1850C, 860C be the estimated position shift determined by the LMM sensors. If the difference between a respective Delta-GNSS and a Delta-LMM is greater than a predetermined threshold, then the GNSS position fix may be suspect, and may be discarded. For example, if the Delta-GNSS 1840A exceeds Delta-LMM 1860A for the accelerometer by a predetermined threshold, then the second position fix, which is used to calculate the Delta-GNSS 1840A, may be discarded. In another example, a Delta-LMM may be the blend of the Delta-LMMs 1850C, 1860C for two sensors. A blend of Delta-LMMs shall be referred to as a "bdl." If the Delta GNSS-1840c exceeds the blended Delta-LMM bdl by a predetermined threshold, such as threshold 1820 (FIG. 18E), then the second position fix, which is used to calculate delta-GNSS 1840C, may be discarded. The discarded position fix may be replaced with a GNSS position fix data point that is calculated based on the Delta-LMM data 1860A, 1850B, 1850C, 1860C, blended Delta-LMM bdl, which is only a linear distance estimate. The calculated GNSS position fix data point may be determined by extending a vector from the previous GNSS data point, based on the previous 2 or 3 GNSS position fixes and their X, Y, Z coordinates. For example, referring to FIG. 18A, a vector between the first and second position fix in plot 1814A can be used in calculating a GNSS position fix data point based on the Delta-LMM data 1860a that will replace the third position fix in plot 1814A. In this way, outliers may be discarded and replaced with new estimates of a position in space at the time of the discard.

Additionally, the LMM data may be used to both smooth and blend the GNSS position fix data, in another filter process. The use of a composite weighting factor for LMM data may include a time and distance-traveled dependency. In an embodiment, this pair of weighting factors are applied to the two Deltas described earlier: Delta-GNSS position shift at time period ti to ti+1, and Delta-LMM composite position shift at the same ti time period. The blending/disciplining of any GNSS position fix can both be time dependent, in the following manner. As the lifetime of useful LMM data decreases, its weight may decrease, and the weight of the factor being applied to the Delta-GNSS position shift can be increased in opposite proportion, so the sum of the weighting factors is always one. This decrease in relative importance of LMM data is essential to minimize adding errors to a position fix estimate.

Therefore, the locally measured cellular device movement information is a blend of two or more locally measured cellular device movement information obtained from two or more sensors that are in the known physical relationship with the cellular device and wherein the method further comprises blending the two or more locally measured cellular device movement information based on weighting factors. According to various embodiments, as described herein, the method further comprises changing the weighting factors over time based on respective quality of the two or more locally measured cellular device movement information.

Resetting the LMM data sources may be done automatically according to various kinds of rules, which can be chosen by a designer. For the accelerometer, the accuracy becomes unacceptable after some time period, on the order of tens of seconds. A reset can be done by program control when the accelerometer movement data drops below a threshold, such as when relative movement is less than 2 cm. Similar methods can be applied to the image capturing device, based on time and distance travelled.

Limiting Factors

A cellular device 1500A, 1600, 1700, according to one embodiment, includes limiting factor logic 1540C, where the accelerometer limiting factor logic 1542C pertains to limiting factor for the accelerometer 1502A and the ICD limiting factor logic 1544C pertains to limiting factors for an image capturing device 1540G.

Limiting factors can, for example, be used for determining whether to use movement information from a sensor, for example, due to the movement information being too inaccurate. For example, the accuracy of the movement information from an accelerometer decreases over time. Therefore, according to one embodiment, the movement information from an accelerometer may be used from the time the accelerometer is set to a threshold of time. An example of a threshold of time for an accelerometer is approximately 10 seconds. The threshold of time depends on the quality of the accelerometer where higher quality accelerometers will have a higher threshold of time than poor quality accelerometers. Higher quality accelerometers usually cost more and weigh more, so are not as appropriate as MEMS accelerometers, which are very small and light and fit with the overall design of a cellular device.

The accuracy of the movement information from an image capturing device depends, according to one embodiment, on the number of features that are in an image obtained with the image capturing device. For example, the more features that are in the image the more accurate the movement information from that image will be, up to a point of diminishing returns. According to one embodiment, movement information from an image is used when the number of features of the image is ranges from 6 to 200 points. According to one embodiment, the minimum number of points is 36 points with 6 degrees of freedom for x, y, z, roll, pitch and yaw, as 6 times 6 samples equals 36.

A technology known as match move, as discussed herein, can be used for measuring the amount of movement of a cellular device based on images taken with an image capturing device.

According to one embodiment, a type of movement information is not used if the limiting factor for the corresponding type of sensor is exceeded. Examples of sensors are hardware image capturing devices and hardware accelerometers. For example, in one embodiment, if there are fewer than 200 features in an image, then the image is not used as movement information, according to one embodiment. The threshold number of features may be set higher or lower than 200 in other embodiments. In another example, if the movement of image capturing device has exceeded a distance threshold that would interfere with correlating features in respective images, then the image capturing device is reset to use a new reference image. For example, if the image capturing device has moved ten or more feet since the reference image was set, a new image may be used as the reference image. In yet another example, if approximately 10 seconds has passed since an accelerometer was reset, then the movement information from the accelerometer is not used.

According to one embodiment, the weighting factor for a type of movement information is set to zero when the limiting factor of that type of movement information is exceeded. For example, a weight of zero can be assigned for movement information of an image from a camera when there are fewer than approximately 36 features in the image. Similarly, a weighting factor of zero can be assigned for movement information from an accelerometer when 10 seconds has passed since the accelerometer was reset.

Kalman Filter

Many types of data estimation methods may be employed to smooth the data from any single source to remove outliers, or to combine the effects of multiple and different data sources, as may be found in the cellular device system described herein. Well-known methods include use of least squares, Bayes filtering, sequential least squares, particle filtering, other methods for robust estimation, the Hough transform, the Random Sample Consensus [RANSAC] method, and so forth, as is well-known in the estimation arts. The Kalman Filtering method is also well-suited to multi-variant blending of dissimilar data sets. It is described herein as one example of a suitable estimation method.

Figure 19:
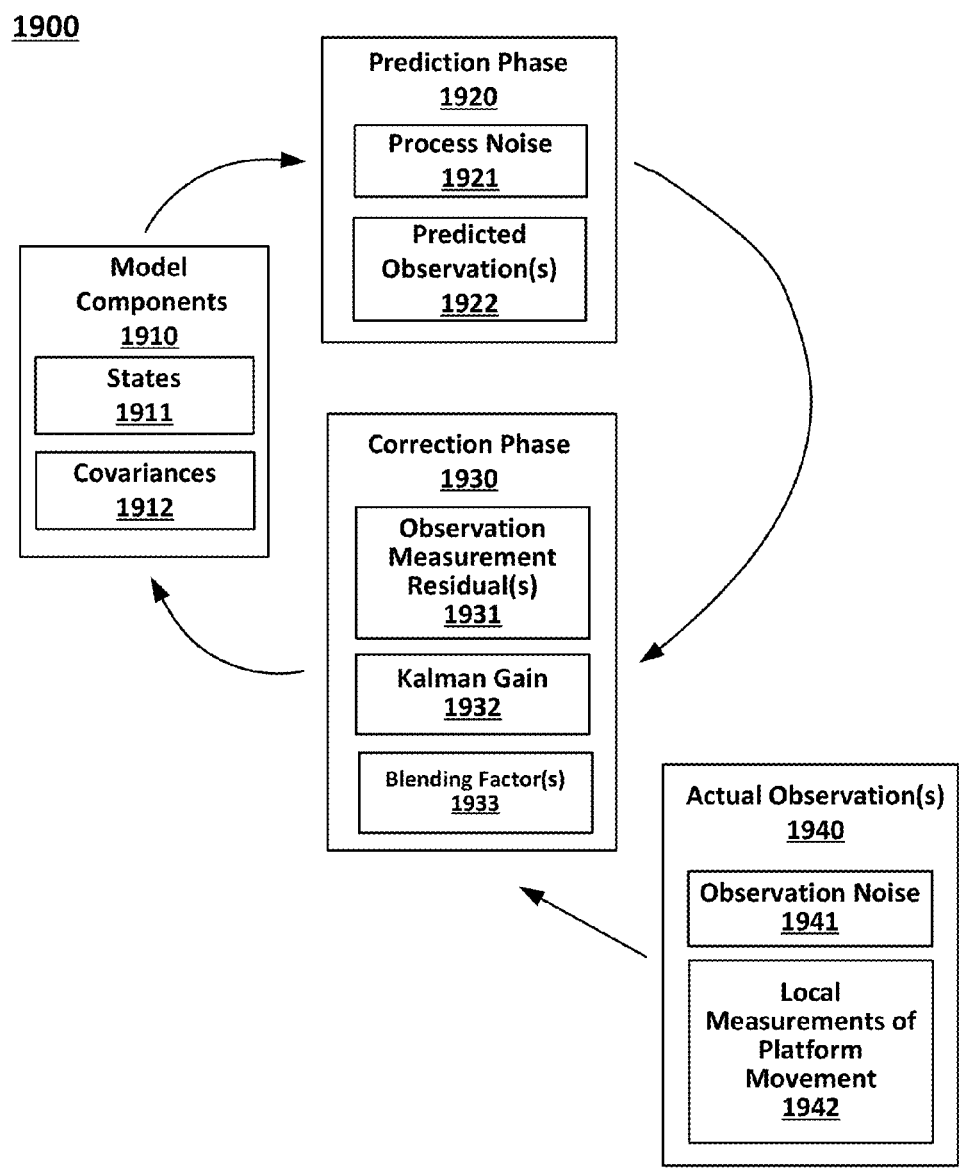
FIG. 19 depicts an example of Kalman Filter processing, according to some embodiments.

FIG. 19 depicts an example Kalman Filter processing 1900, according to some embodiments. According to one embodiment, the Kalman Filtering process 1900 is performed by filtering logic 1524D, 1534E, 1512F. It should be appreciated that Kalman Filtering is well known. As such, FIG. 19 and the associated discussion are utilized only to provide a high-level general description. Variations in the described procedures will occur during specific implementations of Kalman Filtering. The extended Kalman Filter and the unscented Kalman Filter represent some of the variations to the basic method. Generally speaking, Kalman Filtering is a basic two-step predictor/corrector modeling process that is commonly used to model dynamic systems. A dynamic system will often be described with a series of mathematical models. Models describing satellites in a Global Navigation Satellite System (GNSS) are one example of a dynamic system. Because the position of any satellite and/or the positions of all the satellites in a system constantly and dynamically change and the satellites output a signal that can be measured by a GNSS receiver, Kalman Filtering can be used in determining position fixes in a portion of a cellular device that is outside of the GNSS receiver. The models can also describe the position of a cellular device that includes GNSS receiver, for example, based on movement information.

Examples of inputs to the Kalman Filter processing 1900 are position fixes 1501F and locally measured movement information 1502F. The Kalman Filter processing 1900 selects one or more position fixes for removal. The position fixes can then be smoothed by removing the selected position fix(es). Similarly, the Kalman Filter processing 1900 selects one or more extracted pseudorange information from one (or more) sensors for removal. The extracted pseudorange information can then be smoothed by removing the selected information. Examples of output from the Kalman Filter processing 1900 are predicted observations 1922, which may be used by other processes. Examples of the outputs are adjustments to a position fix, adjustments to Doppler shift information to reconstruct carrier phase information, or adjustments to extracted pseudorange information, according to various embodiments.

A basic Kalman Filter implemented using Kalman Filter processing 1900 typically has at least two major components 1910: states 1911 and covariances 1912. States 1911 represent variables that are used to describe a system being modeled, at a particular moment in time. Covariances 1912 are represented in a covariance matrix that describes uncertainty, or lack of confidence, of states 1911 with respect to each other at that same moment in time. Kalman Filter processing 1900 also handles noise, or unpredictable variability, in the model. There are two principal types of noise, observation noise 1941 and process noise 1921. A Kalman Filter may handle additional noise types, in some embodiments. Process noise 1921 describes noise of the states 1911 as a function of time. Observation noise 1941 is noise that relates to the actual observation(s) 1940 (e.g., observed measurements) that are used as an input/update to Kalman Filtering process 1900.

A prediction phase 1920 is the first phase of Kalman Filter processing 1900. Prediction phase 1920 uses predictive models to propagate states 1911 to the time of an actual observation(s) 1940. Prediction phase 1920 also uses process noise 1921 and predictive models to propagate the covariances 1912 to time of the actual observation(s) 1940 as well. The propagated states 1911 are used to make predicted observation(s) 1922 for the time of actual observation(s) 1940.

A correction phase 1930 is the second phase in the Kalman Filter processing 1900. During correction phase 1930, Kalman Filter processing 1900 uses the difference between the predicted observation(s) 1922 and the actual observation(s) 1940 to create an observation measurement residual 1931, which may commonly be called the "measurement residual." Observation noise 1941 can be noise in actual observation(s) 1940 and/or noise that occurs in the process of taking the actual observation(s) 1940. A Kalman gain 1932 is calculated using both the covariances 1912 and the observation noise 1941. The states 1911 are then updated using the Kalman Gain 1932 multiplied by the observation measurement residual 1931. The covariances 1912 are also updated using a function related to the Kalman gain 1932; for example, in one embodiment where Kalman gain 1932 is limited to a value between 0 and 1, this function may be 1 minus the Kalman gain 1932. This updating is sometimes referred to as the "covariance update." The Blending factor logic 1933 is logic for weighting the movement information and using the weighted movement information or not using the movement information, as discussed herein.

In some embodiments, if no actual observation 1940 is available, Kalman Filter processing 1900 can simply skip correction phase 1930 and update the states 1911 and covariances 1912 using only the information from prediction phase 1920, and then begin again. Using the new definitions of the states 1911 and covariances 1912, Kalman Filter processing 1900 is ready to begin again and/or to be iteratively accomplished.

Other applications of the Kalman Filter processing 1900 may include correcting smoothed pseudoranges or correcting unsmoothed pseudoranges by incorporating various other external correction inputs such as DGPS, RTX™, PPP, SBAS, WAAS, RTK, VRS and the like, as described herein. For example, any one or more of the correction logics 151A-151G could be implemented with Kalman Filter processing 1900. Other algorithms for incorporating corrections to pseudoranges are well known in the position determination arts involving GPS and GNSS.

Kalman Filter processing 1900 could be used for filter 1524D to provide reconstructed carrier phase information 1502D based on extracted Doppler shift information 1501D.

Kalman Filter processing 1900 could be used for filter 1534E to smooth extracted raw pseudoranges 1501E based on carrier phase information (CPI) 1502E, real or reconstructed, to provide smoothed pseudoranges 1503E.

Kalman Filter processing 1900 could be used for filter 1512F to apply locally measured movement (LMM) information 1502F to calculated position fixes 1501F, as discussed herein.

Inputs to a Kalman Filter could include accelerometer data; image based position shift data; GNSS-based position fix data, with shifts in position vs. time; generic weighting factors such as length of time accelerometer data is valid; length of time image-based position shift data is valid; metric for discarding a GNSS position fix or position shift, for example, in terms of how many centimeters (cm) is allowable before discarding.

A Kalman Filter could calculate and output, for example, time-varying weighting factors; difference between GNSS position fix shifts and external sensor position shifts; a new position fix (also referred to as an "interpolated") based on locally measured movement (LMM) information to be used instead of a deleted position fix that is an "outlier."

The Kalman Filter's states 1911 (also known as "state parameters") are the parameters that the Kalman Filter calculates and outputs, as discussed herein. According to one embodiment, the state parameters are estimated.

The Kalman Filter's measurement model 1910 represents how the measurements are related to the state parameters 1911 and the measurement noise covariance matrix 1912 (i.e., the variances of each measurement). According to one embodiment, the measurements are estimated.

The Kalman Filter's System Model specifies how the state parameters evolve over time. Normally the system model is described in terms of a state transition matrix and system driving noise covariance matrix, such as x(k+1)=StateTransitionMatrix*x(k)+SystemDrivingNoiseCovMatrix, wherein the system model is model component 1910, the state transition model is states 1911, and the system driving noise covariance matrix is covariances 1912.

The Kalman Filter's initial conditions of the filters, according to one embodiment, are given in terms of the initial state covariance matrix and the initial state vector.

The inputs and outputs for filter 1534E, according to one embodiment, for the raw pseudorange smoothing based on CPI (carrier phase information) logic 1530C is as follows:

Inputs: raw pseudoranges, carrier phase, reconstructed carrier phase.

Outputs: Smoothed pseudoranges

The inputs and outputs for the Filter 1512F, according to one embodiment, for the movement sensor position fix smoothing logic 1510C is as follows:

Inputs: accelerometer data, image capture position shift data derived from Sequential Rolling Bundle Adjustment estimator; time dependent/distance dependent weighting factors.

Outputs: disciplined Position Fixes including (1) position fixes from GNSS receiver, unsmoothed [no LMM active], (2) position fixes from GNSS receiver, disciplined by LMM data, (3) position fixes from GNSS receiver wherein LMM data is substituted for discarded, and (4) GNSS position fixes.

Methods for Improving Position Fix Determination

Figure 20A:
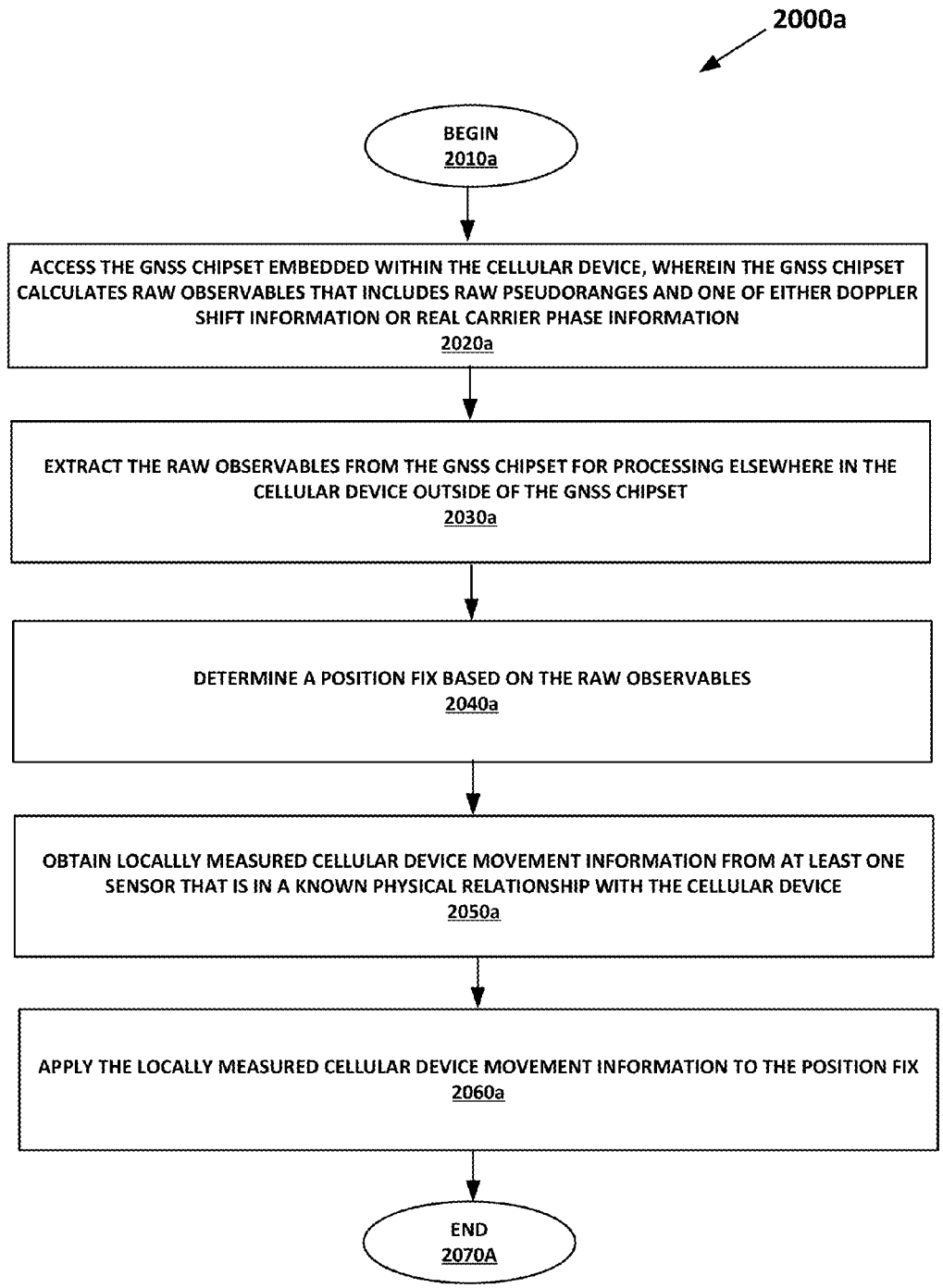
FIGS. 20a-26G depict flowcharts of methods for improving position determination of a cellular device using locally measured movement, according to one embodiment.

FIG. 20A is a flowchart of a method 2000A for improving position fix determination of a cellular device using locally measured movement, according to one embodiment.

At 2010A, the method begins.

At 2020A, the GNSS chipset embedded within the cellular device is accessed. The GNSS chipset calculates raw observables that include raw pseudoranges and one of either Doppler Shift Information or Real Carrier Phase Information. The GNSS chipset can be accessed in a manner similar to that described in the context of operation 620 of FIG. 6.

At 2030A, the raw observables are extracted from the GNSS chipset for processing elsewhere in the cellular device outside of the GNSS chipset. For example, the raw observables can be extracted from the GNSS chipset in a manner similar to that described in the context of operation 630 of FIG. 6. The extracted raw observables may be raw pseudoranges, raw pseudoranges and Real Carrier Phase information, or raw pseudoranges and Doppler Shift Information. The same or different commands may be used for extracting each of the types of raw observables. For example, the same command may be used to extract the raw pseudoranges, the real carrier phase information and the Doppler shift information, or similar commands may be used for extracting the raw pseudoranges, the real carrier phase information and the Doppler shift information.

At 2040A, a position fix is determined based on the raw observables. For example, a position fix may be determined based on the raw pseudoranges, a position fix may be determined based on smoothed pseudoranges that were smoothed based on real or reconstructed carrier phase information. A position fix may be determined based on corrected pseudoranges, uncorrected pseudoranges, unsmoothed pseudoranges, smoothed pseudoranges, or a combination thereof.

At 2050A, locally measured cellular device movement information is obtained from at least one sensor that is in a known physical relationship with the cellular device. Examples of a sensor that is internal to a cellular device are accelerometer 1502A and an image capturing device 1540G.

Examples of a known physical relationship is a sensor that is internal to a cellular device, such as sensors 1502A or 1540G. However, a sensor with a known physical relationship with the cellular device may be external to the cellular device. Examples of an external sensor with a known physical relationship to a cellular device is image capturing device 1540J. Examples of locally measured cellular device movement information are depicted in plots 1812A, 1818B, 1818C, 1812C, 1812D, and 1818D.

At 2060A, the locally measured cellular device movement information is applied to the position fix. Examples of position fixes, which locally measured cellular device movement information can be applied to, are the position fixes depicted in the plots 1814A, 1814B, 1814C, 1814D and position fix 1560C.

The locally measured cellular device movement information (also referred to as "LMM information") can be applied to the position fix. For example, the position fix may be discarded based on the application of the LMM information to the position fix. If the application of the LMM information results in determining the accuracy of a position fix, determining that the position fix is an "outlier," the position fix can be removed, the removed position fix can be replaced by a new position fix that is calculated based on LMM information, as described herein, among other things. Kalman Filtering Logic, such as filter 1512F using Kalman Filter processing 1900, can be used for determining the accuracy, determining if the position fix is an "outlier," removing the "outlier," calculating the new position fix, replacing the "outlier" with the new position fix, as discussed herein. The removal of one or more position fixes that are identified as "outliers" is also referred to as smoothing.

FIGS. 18A-18D depict various patterns of movement information that may be used from a single sensor or two sensors, according to various embodiments, as a part of applying movement information to one or more position fixes.

The blending factor logic 1933 is logic for weighting the movement information and using the weighted movement information or not using the movement information, as discussed herein. Blending factors logic 1933 can be used for determining how to blend the movement information based on one or more weights, as discussed herein. Various patterns of blending, as depicted in FIGS. 18A-18D, can result from the blending factors logic 1933. One or more weights can be used to achieve the patterns, as discussed herein.

Operation 2060A can be performed in pseudorange information processing logic 1550A. Operation 2060A shall be described in more detail in the context of FIGS. 21-27C. Another example of operation 2060A is operation 1425 (FIG. 14).

At 2070A, the method ends.

The processing of method 2000A can be performed in a loop for each determined position fix 1821C-1827C as a user is moving. For example, LMM information can be applied to each position fix 1821C-1827C. Further, LMM information can be used as a part of calculating a new position fix to replace each position fix that is discarded as the user is moving.

Figure 20B:
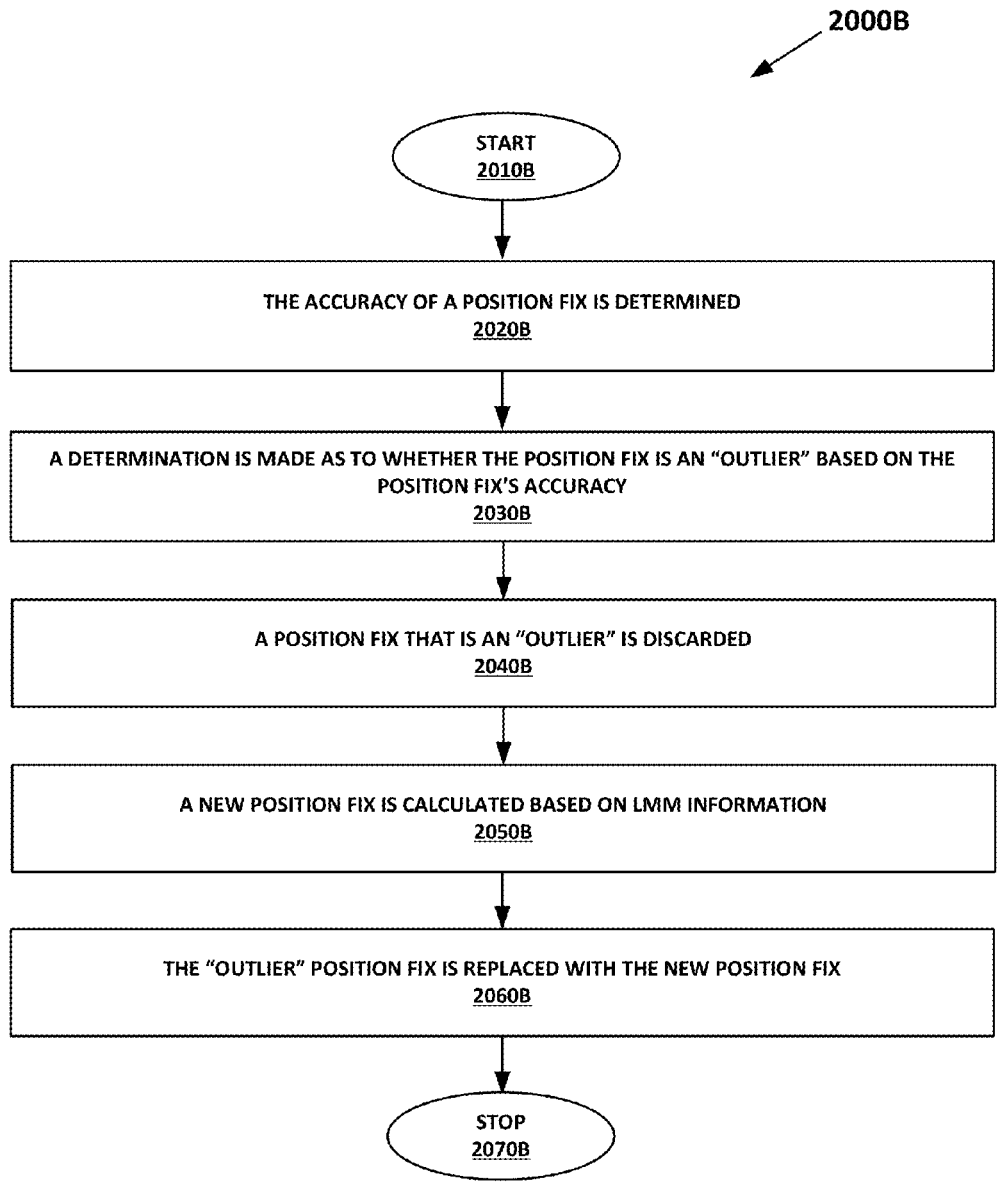

FIG. 20B depicts a flowchart of a method 2000B of improving position determination of a cellular device using locally measured movement information, according to one embodiment.

At 2010B, the method begins.

At 2020B, the accuracy of a position fix is determined.

For example, referring to FIG. 18C, the accuracy of any one of the position fixes 1821C-1827C may be determined. In this illustration assume that the accuracy of the position fixes 1821C-1825C and 1827C indicate that they are acceptable and the accuracy of position fix 1826C is an "outlier."

Referring to FIG. 18E, the accuracy of any one of position fixes P0-P9 may be determined. In this illustration, assume that the accuracy of the position fixes P0-P7 and P9 indicate that they are acceptable and the accuracy of position fix P8 is an "outlier," as discussed herein.

Embodiments are also well suited to using Delta-GNSSs 1840A, 1840B, 1840C, $\Delta P_{10}$ to $\Delta P_{87}$, combined GNSS delta cdg and Delta-LMMs 1860A, 1850B, 1850C, 1860C, D1-D8 or blended LMM-Delta bdl, or a combination thereof, as described herein, for determining the accuracy of position fixes. A blended Delta-LMM bdl may be a blend of two or more LMM-Deltas that are blended using weighting factors as discussed herein.

At 2030B, a determination is made as to whether to discard a position fix based on the position fix's accuracy.

For example, referring to FIG. 18C, in this illustration assume that position fix 1826C is selected to be discarded because the accuracy of position fix 1826C indicates it is an "outlier."

Referring to FIG. 18E, in this illustration, assume that position fix P8 is selected to be discarded because the accuracy of the position fix P8 indicates it is an "outlier."

At 2040B, the selected position fix is discarded.

For example, referring to FIG. 18C, in this illustration, position fix 1826C is removed and, therefore, will not be output to a user as a position fix 1560C. Since the accuracy of position fixes 1821C-1825C and 1827C indicate that they are not outliers, they will be output as position fixes 1560C.

In another example, referring to FIG. 18E, in this illustration, position fixe P8 is removed and, therefore, will not be output to a user as position fixes 1560C. Since the accuracy of the position fixe P0 to P7 and P9 indicate that they are not outliers, they will be output as position fixes 1560C.

At 2050B, a new position fix can be calculated based on LMM information.

For example, a trajectory of the direction that the user of the cellular device is moving can be determined based on two or more of the position fixes that precede the discarded position fix. The distance indicated by LMM information from one or more sensors in combination with the trajectory can be used to estimate a new position fix of the cellular device. The LMM information can be a blend of two or more sensors using weights and patterns of blending, as discussed herein.

According to one embodiment, the trajectory can be determined using two previous position fixes with x, y and z coordinates. A vector direction can be determined based on the two position fixes that occur before the position discarded position fix. For example, assuming the third position fix depicted in plot 1814A (FIG. 18A) will be discarded, the vector direction can be determined based on the first and second position fixes depicted in plot 1814A.

More specifically, referring to FIG. 18C, assume that the discarded position fix 1826C indicated that the user moved 6 feet and the LMM information from the one or more sensors indicated the person moved 3 feet. Assume for the sake of illustration that two or more position fixes, such as for example, 1821C-1825C (FIG. 18C) that precede the discarded position fix 1826C indicate the trajectory that the cellular device is moving along. The new position fix 1828C can be determined based by adding the 3 feet to the position fix 1825C that immediately precedes the discarded position fix 1826C in the direction of the trajectory.

In another example, referring to FIG. 18E, two or more calculated position fixes P0-P7 that precede the discarded position fix P8 can be used to determine a trajectory that the cellular device is moving along. For example, the position fixes P(ti−2), also known as P6, and P(ti−1), also known as P7, may be used could be used to determine the trajectory. There are a variety of other estimation methods to determine a best estimate for the vector direction that are well-known in the estimation arts.

The distance that the cellular device has traveled from 5 to 6 can be determined based on locally measured movement (LMM) information from one or more sensors (also referred to as "LMM distance"). The new position fix 1802E (also referred to as "$P_{EST}$(ti)" or "LMM position fix") can be determined by adding the LMM distance D8 to the calculated position fix P(ti−1), also known as P7, which immediately precedes the discarded position fix P8, in the direction of the trajectory.

The calculation of the new position fix 1802E is also referred to as "interpolating," for example, because the calculation involves determining a trajectory, as discussed herein, and adding the "LMM distance" D8, which was determined based on the LMM information, that the cellular device has been moved between the preceding measurements (at ti−1 in this example) and the current measurements (at ti in this example). For example, if the position fix is not needed in real time, then the additional data points collected subsequent to the outlier position may also be used to determine a best fit position fix to replace the "outlier."

Although only two previous position fixes P(ti−2) and P(ti−1) were used to determine a trajectory for the example depicted on FIG. 18E, embodiments are well suited to using more position fixes. The position fixes may precede the "outlier," succeed the "outlier," or a combination thereof.

At 2060B, the "outlier" position fix is replaced with the new position fix.

For example, referring to FIG. 18C, position fix 1826C is replaced with the new position fix 1828C.

In another example, referring to FIG. 18E, the calculated position fix P8 is replaced with the new position fix 1802E, also known as Pest(ti).

At 2070B, the method 2000B ends.

LMM-deltas can be compared to each other directly. An LMM position fix can be found by adding the LMM-delta for a given time period to a previously position fix. The previous position fix may be a position fix that was determined based on extracted raw pseudoranges or an LMM position fix. LMM position fixes can be compared directly with each other.

"Smoothing" position fixes can include, according to one embodiment, one or more of 2020B-20260B. The discarding (2040B) of a position fix and replacing (2050B) the discarded position fix with a new position fix is also referred to as "adjusting" or "modifying" a position fix. For example, the discarded position fix is adjusted or modified to be the new position fix.

Method 2000B can be performed iterative for each position fix 1821C-1827C (FIG. 18C), position fix P0-P9 (FIG. 18E) in a loop. For example, in a first iteration of the loop, position fix 1821C can be processed with method 2000B, then in a second iteration of the loop, position fix 1822C can be processed with method 2000B. In this illustration, the position fixes 1821C-1825C, 1828C, 1827C would be output as position fixes 1560C (FIG. 15C).

According to one embodiment, the method 2000B is performed by pseudorange information processing logic 1550A.

According to various embodiments, method 2000B can be performed as a part of operation 2060A (FIG. 20A). A filter, such as filter 1512F, can be used to perform the method 2000B, according to various embodiments.

Although, for the sake of simplicity, flowchart 2000B was discussed in the context of FIG. 18C and FIG. 18E, various embodiments are well suited to other position fixes.

Figure 21:
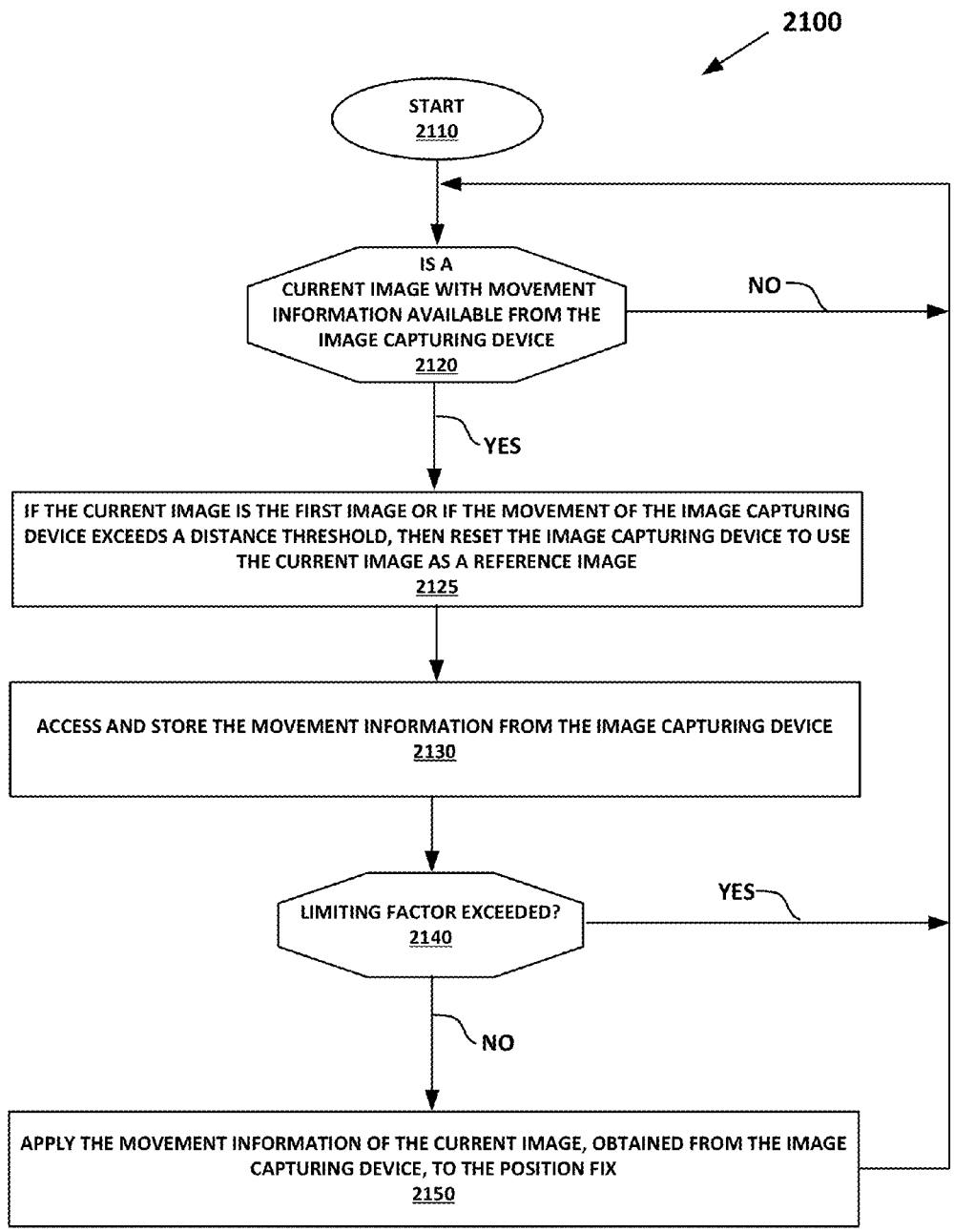

FIG. 21 is a flowchart of a method 2100 of improving position determination of a cellular device using locally measured movement information from an image capturing device, according to one embodiment.

At 2110, the method starts. Processing proceeds to 2120.

At 2120, a determination is made as to whether a current image with movement information is available from the image capturing device. One or more images are taken with an image capturing device are examples of movement information.

If this is the first image taken with the image capturing device 1540G since it was reset, then the first image can be used as the current image. Otherwise, the next image taken with the image capturing device 1540G can be used as the current image.

If movement information is available, processing proceeds to 2125. If movement information is not available, processing proceeds back to 2120. Operation 2120 can be performed by ICD movement information accessing logic 1512B.

At 2125, if the current image is the first image or if movement the image capturing device exceeds a distance threshold, then reset the image capturing device to use the current image as a reference image. For example, the current image is used as a new reference image when the image capturing device 1540G movement exceeds a distance threshold since the current reference image was taken or since the previous image, depending on how far the image capturing device 1540G has been moved, or how much time has passed. The creation of an association between the current image and one or more previous images will be interfered with if the image capturing device 1540G has been moved too far or if too much time has passed. For example, a range of a distance threshold is approximately 3 to 10 feet when a new reference image may be taken. Typically a new reference image is taken and used if the image capturing device 1540G has moved about 10 feet or more. One of the limiting factors is being able to track original feature points in a previous reference image. A new reference image might take and used (also referred to as "renewing") after a movement of 3 feet. This renewal feature of the reference frame is variable and can be subject to experimental validation for the type of image obtained with the image capturing device 1540G. Operation 2125 can be performed by the ICD movement information accessing logic 1512B. Processing proceeds to 2130.

At 2130, the movement information of the current image from the image capturing device is accessed and stored. The movement information can be stored in memory 210. Memory 210 may be cleared after a period of time, or after an accumulation of a specified number of images. Since memory costs continue to decline, the size of memory may be determined by the use case, and in event, the use of external memory cards, such as SD, SDHC, etc., may prove to be sufficient. Operation 2130 can be performed by ICD movement information accessing logic 1512B. Processing proceeds to 2140.

At 2140, a determination is made as to whether the movement information of the current image exceeds a limiting factor for that type of movement information. For example, according to one embodiment, a determination can be made as to whether there are at least 30 features associated with an image obtained from the image capturing device. The minimum may be increased based on environmental conditions. The minimum may be factory set or adjustable in the field.

If the limiting factor is exceeded, then processing proceeds back to 2120. For example, if there are less than 30-50 features associated with the image, then the image is not used and processing proceeds to 2120. This number of minimum feature set may be as low as 10. Accuracy will decrease with the decrease in feature set size.

If the limiting factor is not exceeded, the processing proceeds to 2150. For example, if there are more than approximately 100-200 features associated with the image, then the image can be used to improve the quality or improve the accuracy of the extracted pseudorange information at 2150. Operation 2150 can be performed by ICD limiting factor logic 1544C.

At 2150, the LMM information is applied to the position fix, for example, as described by operation 2060A and/or flowchart 2000B.

Figure 22:
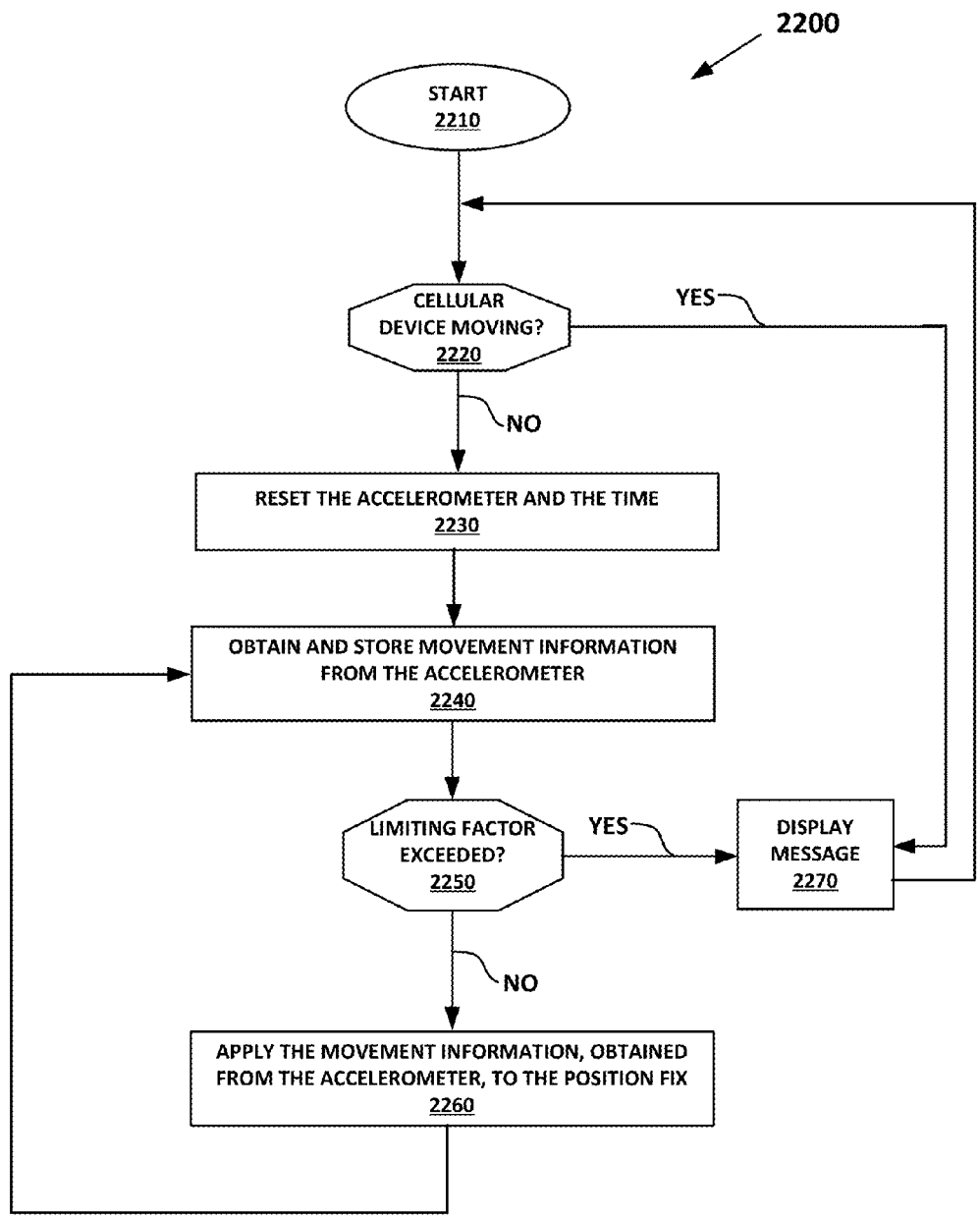

FIG. 22 is a flowchart of a method 2200 of improving position determination of a cellular device using locally measured movement information from an accelerometer, according to one embodiment.

At 2210, the method begins. Processing proceeds to 2220.

At 2220, a determination is made as to whether the cellular device is moving. If the cellular device is not moving, processing proceeds to 2230. If the cellular device is moving, processing proceeds to 2270. The accelerometer 1502A can be used to perform 2220.

At 2230, the accelerometer and the time are reset to zero. The accelerometer movement information accessing logic 1512A can perform operation 2230. Processing can proceed to 2240.

At 2240, movement information is obtained from the accelerometer and stored. The movement information can be stored in memory 210. The accelerometer movement information accessing logic 1512A can perform operation 2230. Processing can proceed to 2250.

At 2250, a determination is made as to whether a limiting factor of the accelerometer has been exceeded. For example, a determination can be made as to whether approximately 10 seconds have passed since the time was set to zero at 2230. If the limiting factor has been exceeded, then processing can proceed to 2270. For example, if more than approximately 10 seconds have passed since the time was set to zero at 2230, the processing can proceed to 2270. If the limiting factor has not been exceeded, then processing can proceed to 2260. For example, if approximately 10 seconds have not passed since the time was set to zero at 2230, then processing can proceed to 2260. Accelerometer limiting factor logic 1542C can perform operation 2250.

At 2260, LMM information from the accelerometer is applied to a position fix, for example, as described by operation 2060A and/or flowchart 2000B

At 2270, optionally a message can be displayed to the user asking the user if the user wants to stop moving the accelerometer so that it can be reset because a limiting factor has been exceeded. Accelerometer limiting factor logic 1542C can perform operation 2270. Processing can proceed to operation 2220.

According to one embodiment, one or more position fixes are passed through an LMM smoothing process, such as movement sensor position fix smoothing logic 1510C, even if no locally measured movement information is currently available. For example, even if the accelerometer is past a threshold, such as 10 seconds, and the image capturing device is not turned on, so the locally measured movement information is not available, one or more position fix(es) may still be passed through the movement sensor position fix smoothing logic 1510C.

The first time that operations 2130, 2240 are executed, an initial amount locally measured movement information is obtained. However, subsequent times that the operations 2130, 2240 are performed in their respective loops, additional locally measured cellular device movement information may be obtained. The additional locally measured cellular device movement information can be applied to an additional position fix that was determined based on additional raw pseudoranges that were, for example, obtained or extracted after an initial amount of raw pseudoranges that were used to determine, for example, a previous position fix.

Figure 23:
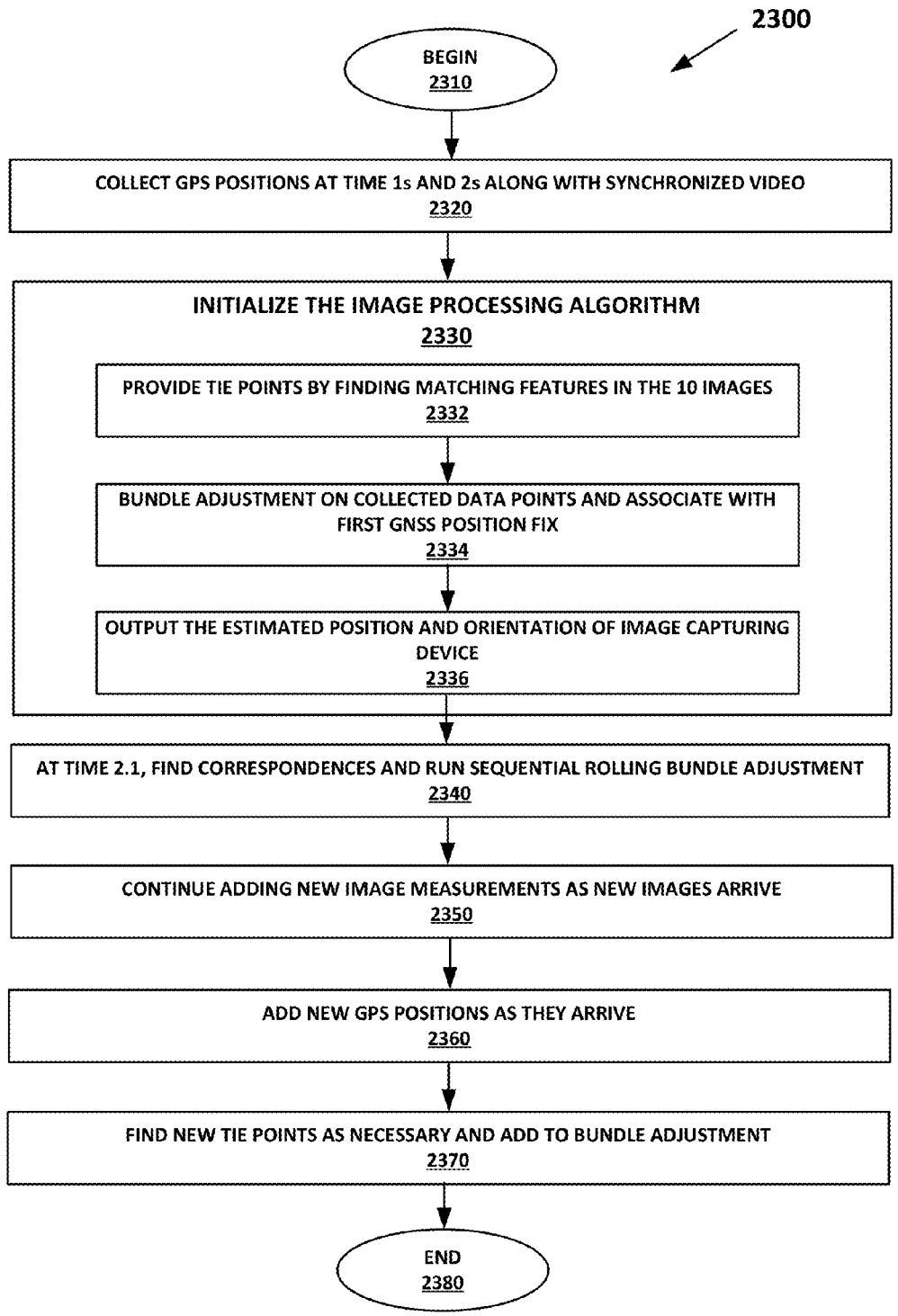

FIG. 23 is a flowchart of a method of performing sequential rolling bundle adjustments, according to one embodiment.

For the sake of illustration, assume that the images are associated with a video that is at 10. For this example assume that the video is at 10 Hz such that the images are at 1, 1.1, 1.2, . . . 2.0.

At 2310, the method begins.

At 2320, GPS positions are collected at time 1 s and 2 s along with synchronized video 2320. Processing proceeds to operation 2330.

At 2330, the image processing algorithm is initialized. Operations 2332, 2334, 2336 can be performed as a part of 2330.

At 2332, tie points are provided by finding matching features in, for example, 10 images.

At 2334, perform bundle adjustment on data points and associate with first GNSS position fix "Bundle adjustment" refers to the process of adjusting the image capturing device's position and orientation so that the bundles of ray paths from the features being tracked in the second image are made to match the original bundles of ray paths from the feature locations in the first image. The mathematical process is well known in the Match Move arts. This is an image processing step and is not related to any other kind of input data. Sequential rolling bundle adjustments speed the process by only dealing with the most significant changes.

At 2336, the estimated position and orientation of image capturing device is outputted.

At 2340, at time 2.1, find correspondences and run sequential rolling bundle adjustment.

At 2350, new image measurements continue to be added as new images arrive.

At 2360, new GPS positions are added as they arrive.

At 2370, new tie points are found as necessary and added to bundle adjustments.

At 2380, the method ends.

According to various embodiments, the method depicted in FIG. 23 provides trajectory smoothing effect because the image measurements have a high level of precision. Higher rate positions would be available with higher rate image capturing devices provided the image capturing devices have sufficient processing power, and GPS outages could be bridged.

According to one embodiment, at least 5 image samples (also referred to as "5 points," "5 key points," or "5 features") are used from one image to the next as a part of determining position fixes. The minimum of 5 points is used to provide scale. For example, if there are 5 points in a pair of images, then there are 5*2 (x and y)*2 (images)=20 measurements with 5*3 (X,Y,Z)+6 (delta X, Y, Z, roll, pitch, yaw)=21 unknowns. The scale can come from the fact that there are GPS positions at previous epochs, or it could come from ground control, or it could come from knowing approximately the positions of the 5 key points from previous epochs. Therefore, according to one embodiment, the additional locally measured cellular device movement information is applied to the additional position fix if the additional locally measured cellular device movement information includes at least 5 features in the image. According to one embodiment, the additional locally measured cellular device movement information is based on an image and the limiting factor is at least 5 features in the image.

Figure 24A:
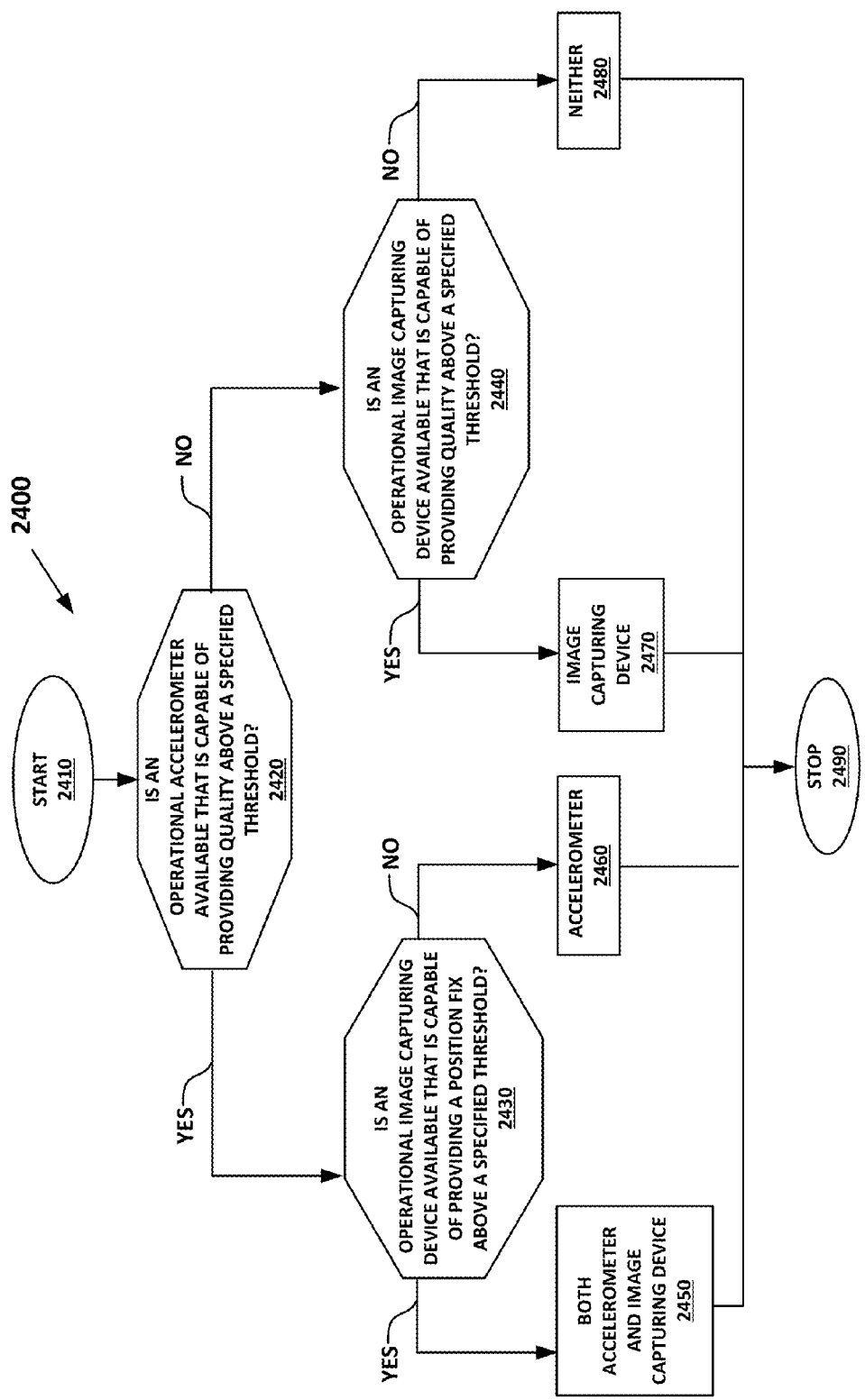
Figure 24B:
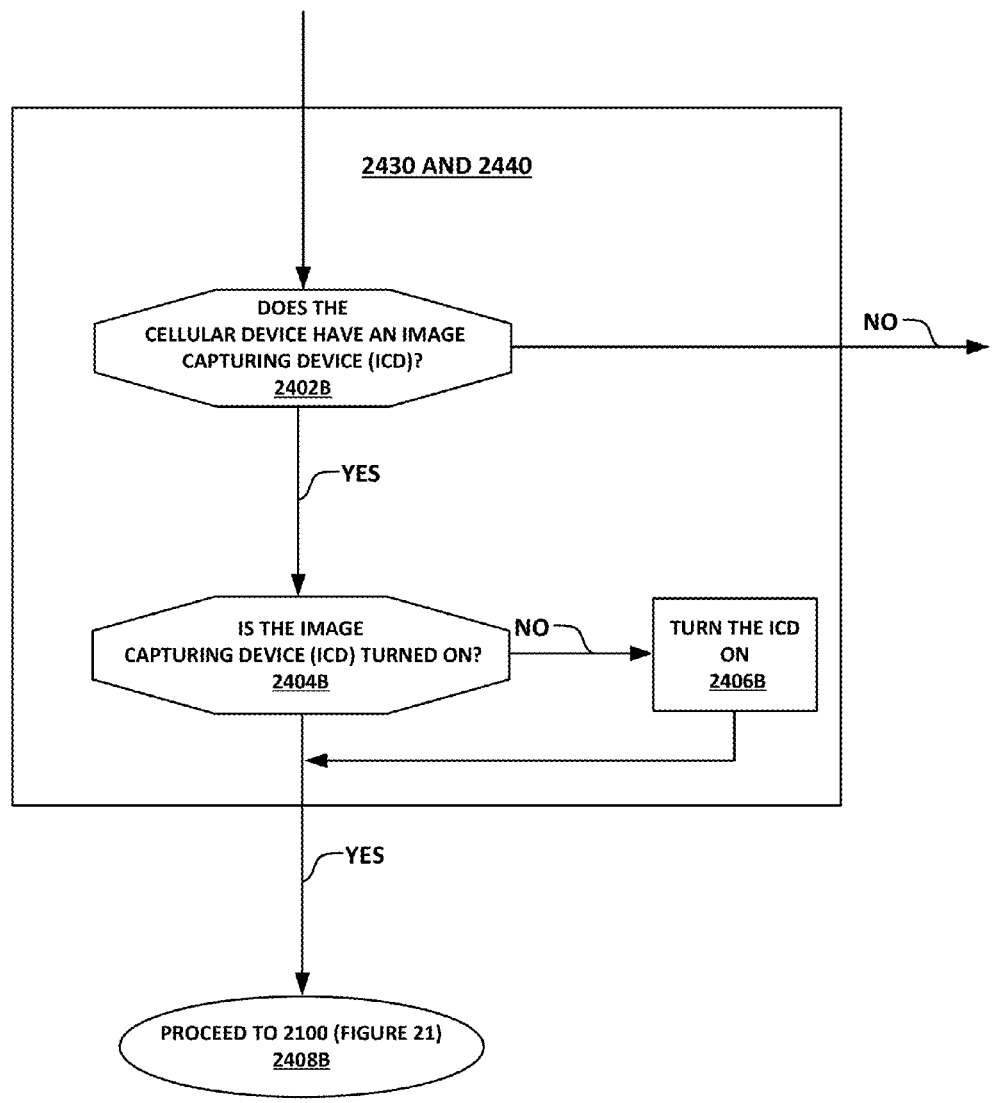
Figure 24C:
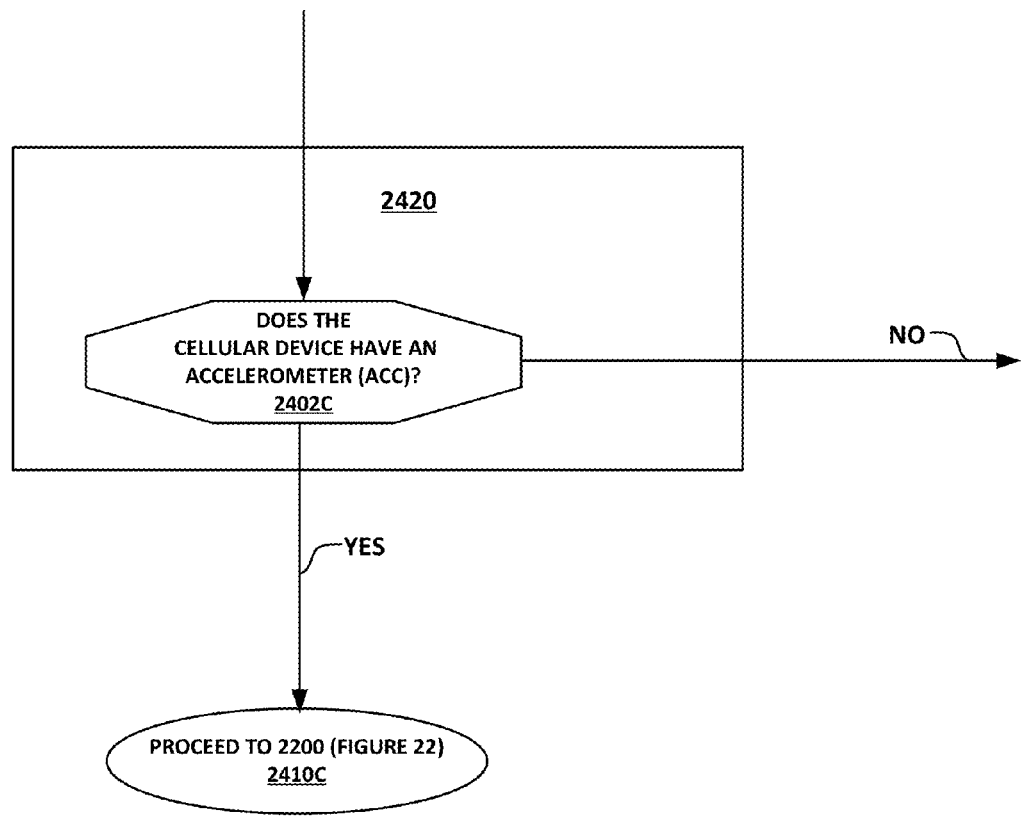

FIGS. 24A to 24C are flow charts for determining what, if any, of the sensor devices can be used, according to one embodiment.

Flowchart 2400 starts at 2410. At 2420, a decision is performed to determine whether an operational accelerometer is available that is capable of providing quality above a specified threshold. If the decision to 2420 is yes, processing proceeds to 2430. If the decision to 2420 is no, processing proceeds to 2440.

At 2430, a decision is performed to determine whether an operational image capturing device is available that is capable of providing a position fix above a specified threshold. If the answer to the decision at 2430 is yes, then processing proceeds to 2450 indicating that locally measured movement information can be obtained from both the accelerometer and the image capturing device. If the answer to the determination at 2430 is no, then processing proceeds to 2460 indicating that locally measured movement information may still be obtained from only the accelerometer.

At 2440, a decision is performed to determine whether an operational image capturing device is available that is capable of providing quality above a specified threshold. If the answer to the decision at 2440 is yes, then processing proceeds to 2470 indicating that locally measured movement information can be obtained only from image capturing device. If the answer to the determination at 2440 is no, then processing proceeds to 2480 indicating that locally measured movement information will not be obtained.

FIG. 24B depicts a flowchart with more details for the processing of 2430 and 2440, according to various embodiments. At 2402B, a decision is performed as to whether the cellular device has an image capturing device (ICD). If the decision for 2402B is no, then the decision for 2430 is no. If the decision for 2402B is yes, then processing proceeds to 2404B where a determination is made as to whether the image capturing device is turned on. If the answer to the decision at 2402B is no, processing proceeds to 2406B where the image capturing device is turned on. After either 2404B or 2406B, the image capturing device is turned on and the answer to the decision for 2430 or 2440 is yes and processing can proceed, according to one embodiment, to flowchart 2100 depicted on FIG. 21.

FIG. 24C depicts a flowchart with more details for the processing of 2420, according to various embodiments. At 2402C a decision is performed as to whether the cellular device has an accelerometer (ACC). If the cellular device does not have an accelerometer, then the decision for 2420 is no. If the cellular device has an accelerometer, then the answer for decision 2402C is yes and processing proceeds to 2410C.

At 2410C, processing proceeds to flowchart 2200 depicted on FIG. 22.

Figure 25:
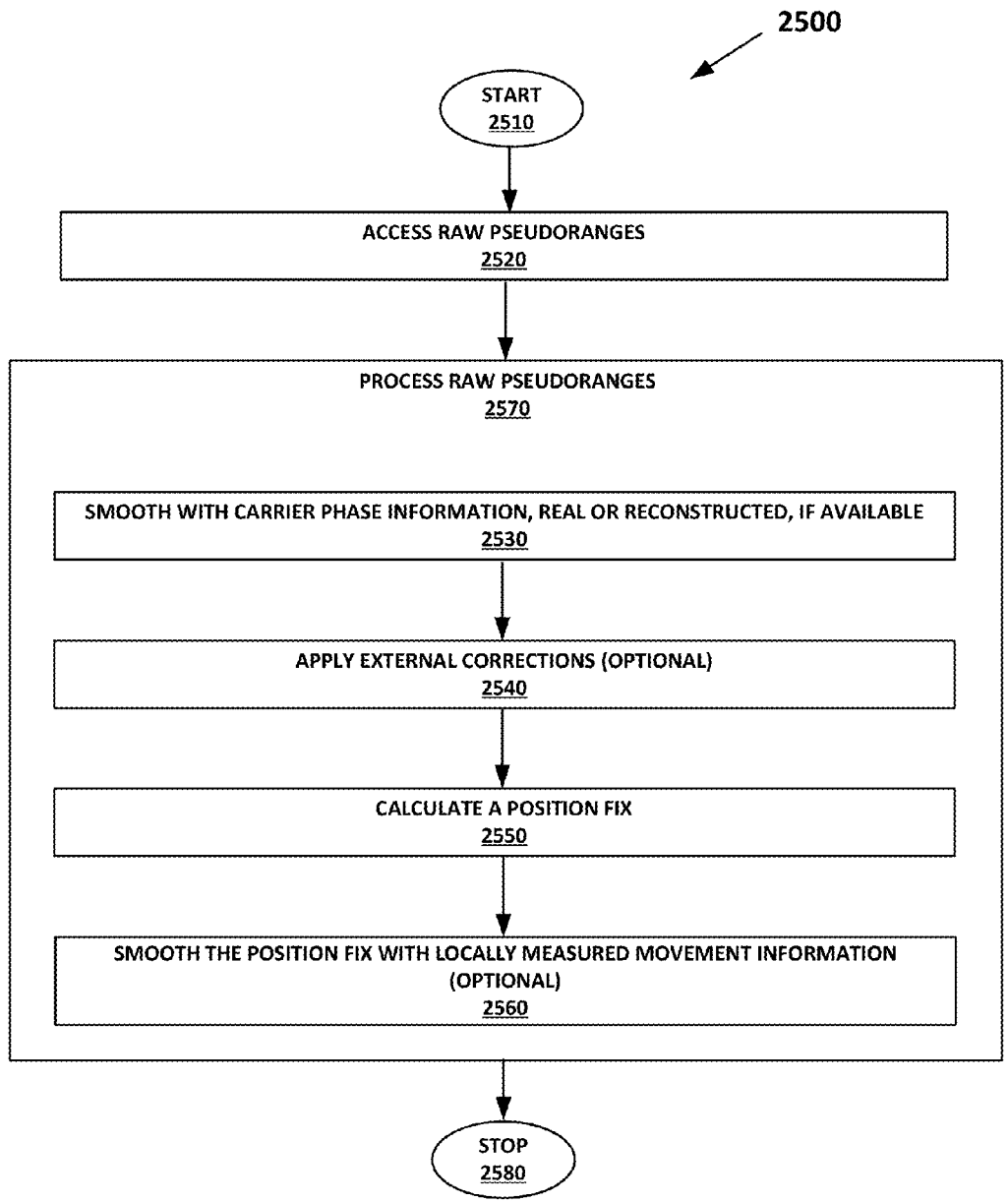

FIG. 25 depicts a flowchart 2500 for improving a position fix based on locally measured movement information, according to one embodiment.

At 2510, the method begins. Processing proceeds to 2520.

At 2520, raw pseudoranges are accessed. For example, a GNSS chipset can be accessed and the raw pseudoranges can be extracted as discussed herein. Raw pseudoranges are one type of raw observables. Other types of raw observables such as real carrier phase information or Doppler Shift Information can also be accessed at 2520. The extracted raw pseudoranges can be stored in memory 210. Processing proceeds to 2530.

At 2530, smoothing can be performed using carrier phase information, which is real or reconstructed, if the carrier phase information is available. The smoothing can be performed on the extracted raw pseudoranges. The output of 2530 is smoothed uncorrected pseudoranges, if carrier phase information is available. Otherwise, the output of 2530 is unsmoothed uncorrected pseudoranges. According to one embodiment, if both Doppler Shift Information and real carrier phase information are available, real carrier phase information will be used instead of Doppler Shift Information. Processing proceeds to 2540.

At 2540, external corrections can optionally be applied to the output of 2530. Processing proceeds to 2550.

At 2550, a position fix is determined based on the output of 2520, 2530, or 2540 depending on which was last performed since 2530 and 2540 are optional. Processing proceeds to 2560.

At 2560, the position fix from 2550 can optionally be smoothed based on locally measured movement information from a sensor with a known physical relationship to a cellular device, such as an accelerometer or an image capturing device. At 2560, LMM information from one or more sensors can be applied to the position fix from 2550, as described herein. Processing proceeds to 2580.

At 2580, the method ends.

Operations 2530, 2540, 2550 and 2560 are a part of improving position determination, according to various embodiments, by processing raw observables 2570.

FIGS. 26A-26G depict flowcharts for improving position determination using LMM information, according to various embodiments.

Figure 26A:
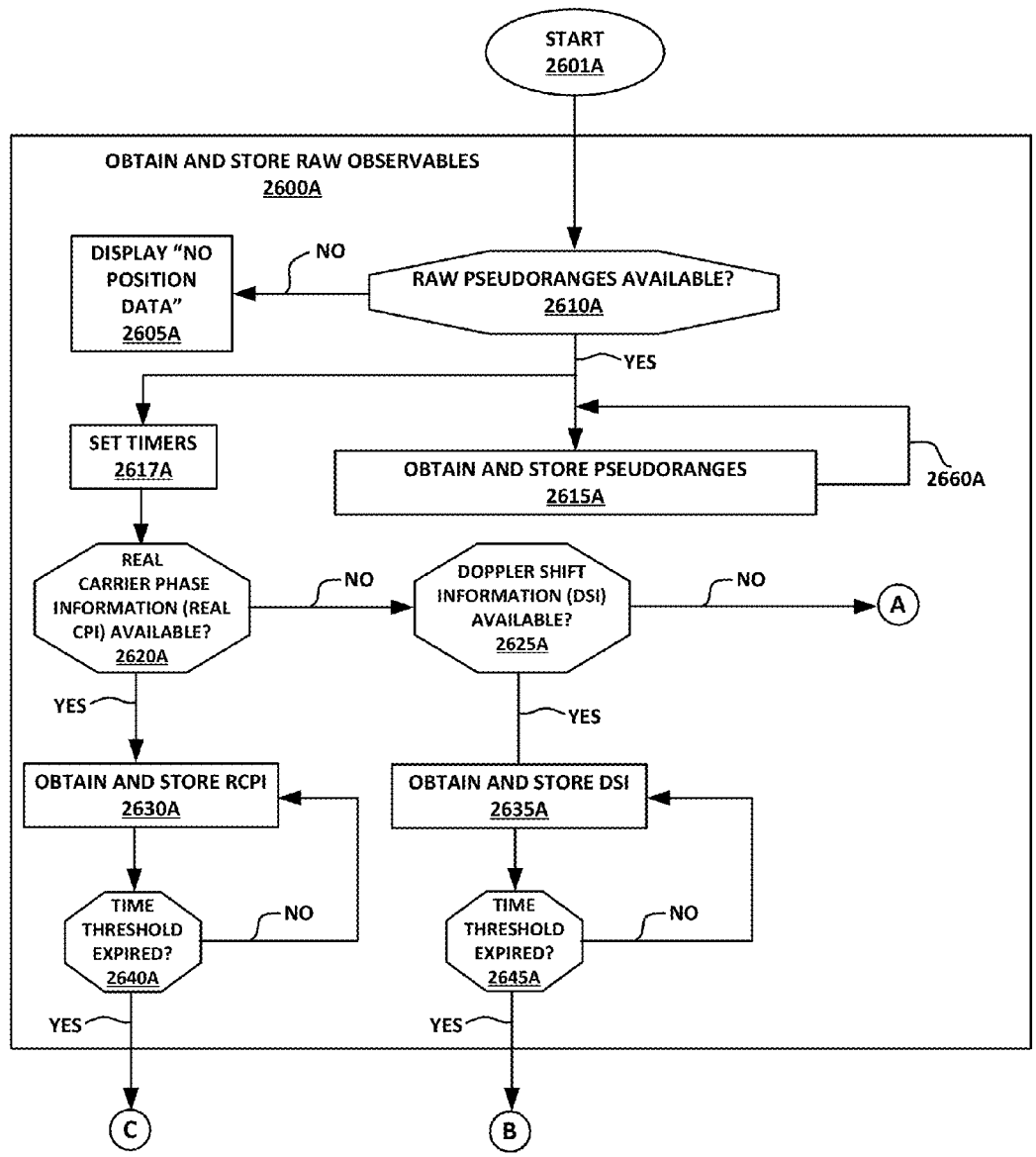
Figure 26B:
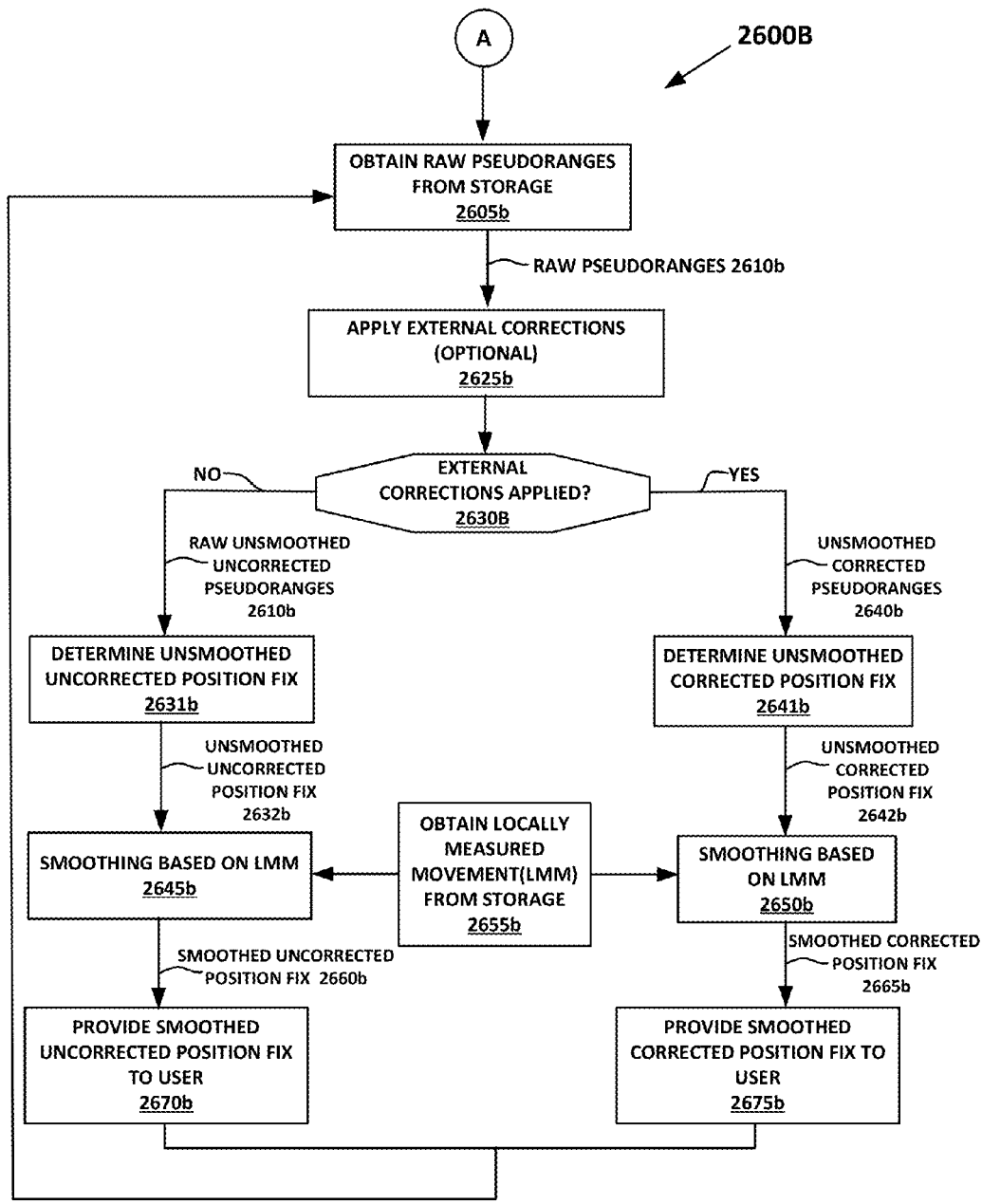

FIG. 26A depicts a flowchart 2600A for obtaining and storing raw observables. The raw observables can be obtained by extracting them from a GNSS chipset 170 and stored in memory 210. FIG. 26B-26G depict respective flowcharts 2600B-2600G for processing the raw extracted observables. More specifically, FIG. 26F depicts a flowchart 2600F for processing raw observables based on real carrier phase information. FIG. 26D depicts a flowchart 2600D for processing raw observables based on reconstructed carrier phase information that was reconstructed based on Doppler Shift Information. FIG. 26B is used for processing raw observables when neither Doppler Shift nor Real Carrier Phase information is available.

Referring to FIG. 26A, the flow chart starts at 2601A and proceeds to 2600A.

At 2600A, raw observables are obtained and stored. More specifically, processing proceeds from the start 2601 to determining whether raw pseudoranges are available at 2610A and 2617A. If raw pseudoranges are not available, processing proceeds to 2605A. If raw pseudoranges are available, then processing proceeds to 2615A.

At 2605A, a message is displayed indicating to the user that a position fix cannot be provided because raw pseudoranges are not available.

At 2617A, timers are reset. These timers are for the time thresholds that are used to determine if enough, such as a predetermined amount, real carrier phase information or enough Doppler Shift Information have been obtained within their respective time thresholds.

At 2615A, raw pseudoranges are continuously obtained and stored using a continuous loop 2660A. For example, raw pseudoranges can continuously be extracted from the GNSS chipset 170 and stored in memory 210.

At 2620A, a determination is made as to whether real carrier phase Information (Real CPI or RCPI) is available. If real carrier phase information is available, processing proceeds to 2630A. If real carrier phase information is not available, then processing proceeds to 2625A.

At 2630A, real carrier phase information is obtained and stored. Processing proceeds to 2640A. For example, real carrier phase information can continuously be extracted from the GNSS chipset 170 and stored in memory 210.

At 2640A, a determination is made as to whether a time threshold has expired for obtaining real carrier phase information. If a time threshold for obtaining has not expired, then processing proceeds back to 2630A where additional real carrier phase information is obtained and stored. For example, additional real carrier phase information can be extracted from the GNSS receiver 107 and stored in memory 210. If the time threshold has expired, indicating there is enough, such as a predetermined amount, data to begin applying LMM information to one or more position fixes, processing proceeds to flowchart 2600F on FIG. 26F.

At 2625A, a determination is made as to whether Doppler Shift Information (DSI) is available. If Doppler Shift information is not available, processing proceeds to flowchart 2600B on FIG. 26B. If Doppler Shift Information is available, processing proceeds to 2635A.

At 2635A, Doppler Shift Information is obtained and stored. For example, Doppler Shift information can continuously be extracted from the GNSS chipset 170 and stored in memory 210. Processing proceeds to 2645A.

At 2645A, a determination is made as to whether a time threshold has expired for obtaining Doppler Shift Information. If a time threshold for obtaining has not expired, then processing proceeds back to 2635A where additional Doppler Shift Information is obtained and stored. If the time threshold has expired, then enough Doppler shift information has been obtained and processing proceeds to flowchart 2600D on FIG. 26D.

According to various embodiments, approximately 20-100 seconds of raw observables, such as raw pseudoranges, real carrier phase information, and Doppler Shift Information, are obtained, for example, at least at 1413, 1415, 1416 (FIG. 14), 2615A, 2630A, 2635A (FIG. 26A).

Two or more of obtaining pseudoranges at 2610A, obtaining real carrier phase information at 2630A and obtaining Doppler Shift Information at 2635A can be performed concurrently, for example, by one or more processors 109. Further, two or more of obtaining pseudoranges at 2610A, obtaining real carrier phase information at 2630A and obtaining Doppler Shift Information at 2635A can be performed by separate processes or threads that are executed concurrently, for example, by one or more processors 109.

Referring to FIG. 26B, at 2605B, raw pseudoranges 2610B are obtained from memory 210. The raw pseudoranges were placed into memory 210 at 2615A (FIG. 26A). The processing of the raw pseudoranges 2610B proceeds to 2625B. The raw pseudorange 2610B are uncorrected and unsmoothed.

At 2625B, external corrections are optionally applied to the raw pseudoranges 2610B. Processing proceeds to 2630B.

At 2630B, a determination is made as to whether external corrections were applied at 2625B. If external corrections were not applied, processing of the raw uncorrected pseudoranges 2610B proceeds to 2631B. If external corrections were applied, processing of the corrected pseudoranges 2640B proceeds to 2641B.

At 2631B, an unsmoothed uncorrected position fix 2632B is determined based on the raw unsmoothed uncorrected pseudoranges 2610B.

At 2641B, an unsmoothed corrected position fix 2642B is determined based on the unsmoothed corrected pseudoranges 2640B.

At 2645B, the unsmoothed uncorrected position fix 2632B is optionally smoothed using locally measured movement information. The locally measured movement (LMM) information can be obtained from memory 210 at 2655B. The locally measured movement (LMM) information may have been placed into memory 210 at either 2130 (FIG. 21) or 2240 (FIG. 22) or both 2130 and 2240. Processing of the smoothed uncorrected position fix 2660B can proceed to 2670B.

At 2670B the smoothed uncorrected position fix 2660B can be provided to a user. If the position fix 2632B is not smoothed at 2645B, then the unsmoothed uncorrected position fix 2632B is provided to the user at 2670B. Processing can proceed back to 2605B.

At 2650B, the unsmoothed corrected position fix 2640B can be smoothed using locally measured movement information. The locally measured movement (LMM) information can be obtained from memory 210 at 2655B. The locally measured movement (LMM) information may have been placed into memory 210 at either 2130 (FIG. 21) or 2240 (FIG. 22) or both 2130 and 2240. Processing of the smoothed corrected position fix 2665B can proceed to 2675B.

At 2675B the smoothed corrected position fix 2665B can be provided to a user. If the position fix 2642B is not smoothed at 2650B, then the unsmoothed corrected position fix 2642B is provided to the user at 2675B. Processing can proceed back to 2605B.

Figure 26C:
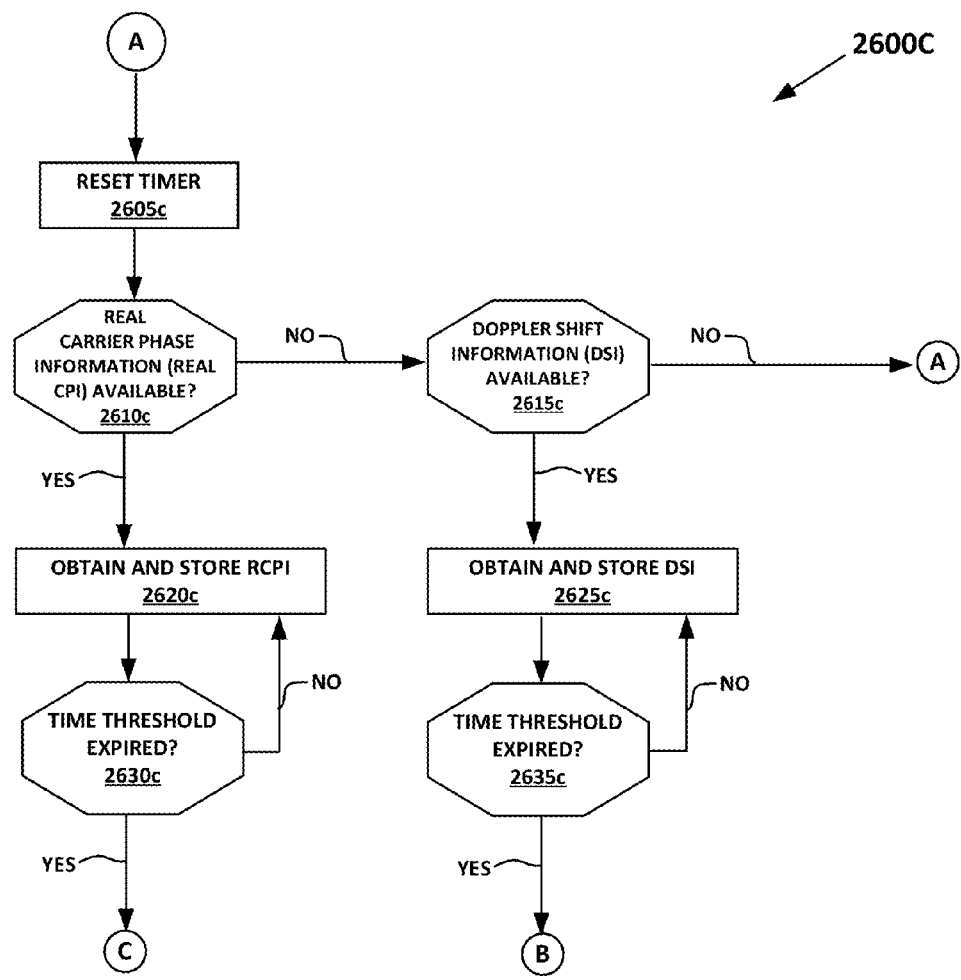
Figure 26D:
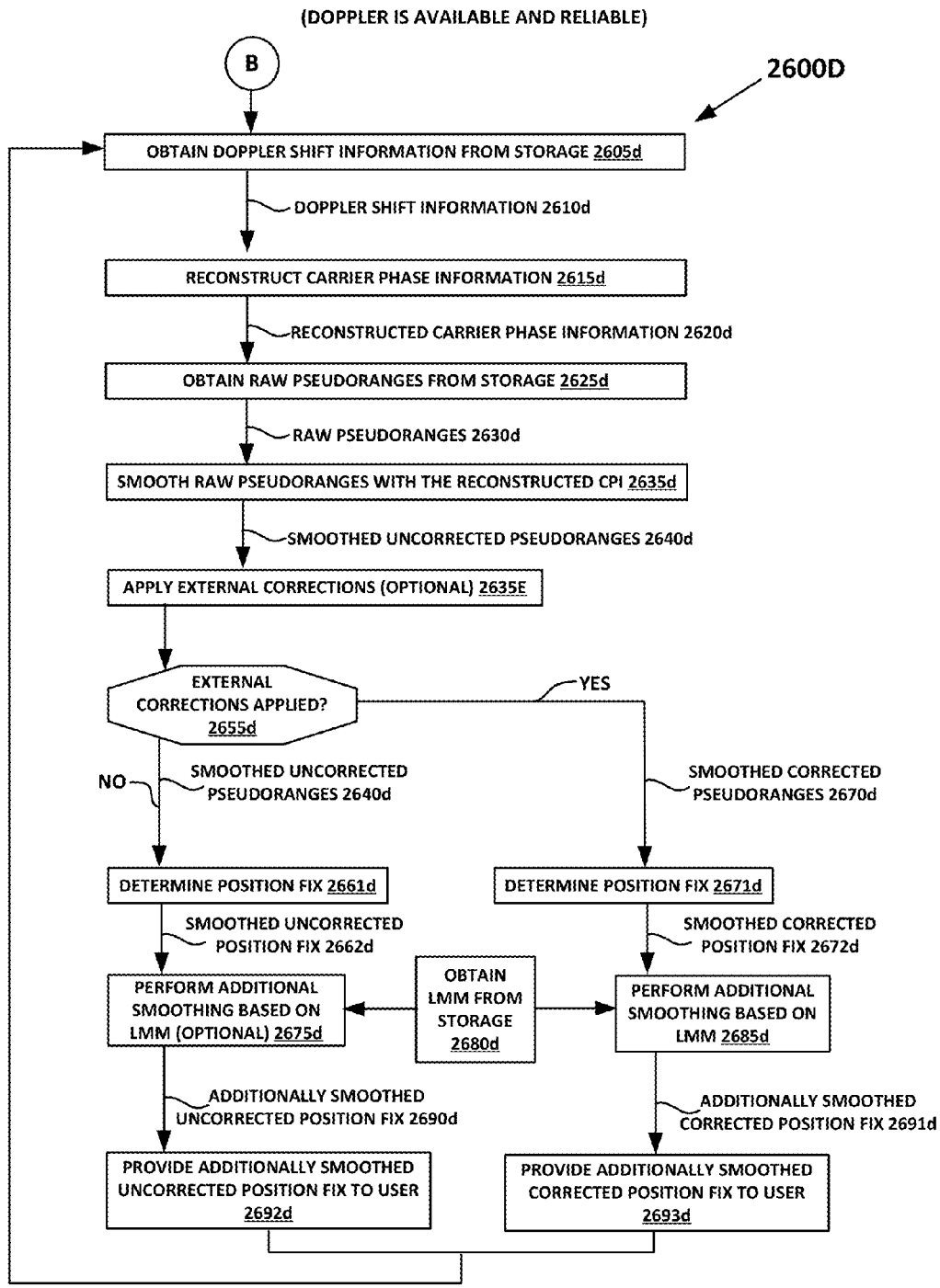

Referring to FIG. 26C, the flow chart 2600C can be performed concurrently with flowchart 2600B (FIG. 26B), to determine whether either real carrier phase information or Doppler Shift Information becomes available and switch to processing raw pseudoranges based on real carrier phase information or Doppler Shift Information if enough, such as a predetermined amount, of either becomes available.

For example, at 2605C, timers are reset. For example, a timer for the real carrier phase information threshold that is checked at 2630C and a timer for the Doppler Shift Information that is checked at 2635C are reset.

At 2610C, a determination is made as to whether real carrier phase Information (Real CPI or RCPI) is available. If real carrier phase information is available, processing proceeds to 2620C. If real carrier phase information is not available, then processing proceeds to 2615C.

At 2620C, real carrier phase information is obtained and stored. For example, real carrier phase information can continuously be extracted from the GNSS chipset 170 and stored in memory 210. Processing proceeds to 2630C.

At 2630A, a determination is made as to whether a time threshold has expired for obtaining real carrier phase information. If a time threshold for obtaining has not expired, then processing proceeds back to 2620C where additional real carrier phase information is obtained and stored. For example, additional carrier phase information can be extracted from the GNSS chipset 170 and stored in memory 210. If the time threshold has expired indicating enough, such as a predetermined amount, real carrier phase information has been obtained, processing proceeds to flowchart 2600F on FIG. 26F.

At 2615C, a determination is made as to whether Doppler Shift Information (DSI) is available. If Doppler Shift information is not available, processing proceeds to flowchart 2600B on FIG. 26B. If Doppler Shift Information is available, processing proceeds to 2625C.

At 2625C, Doppler Shift Information is obtained and stored. For example, Doppler Shift information can continuously be extracted from the GNSS chipset 170 and stored in memory 210. Processing proceeds to 2635C.

At 2635C, a determination is made as to whether a time threshold has expired for obtaining Doppler Shift Information. If a time threshold for obtaining has not expired, then processing proceeds back to 2625C where additional Doppler Shift Information is obtained and stored. For example, additional Doppler Shift information can be extracted from the GNSS chipset 170 and stored in memory 210. If the time threshold has expired, then enough Doppler Shift Information has been obtained and processing proceeds to flowchart 2600D on FIG. 26D.

Referring to FIG. 26D, at 2605D, Doppler Shift Information 2610D is obtained from storage. The Doppler Shift Information 2610D can be obtained from memory 210 where it was placed, for example, at 2635A (FIG. 26A). The processing of the Doppler Shift Information 2610D proceeds to 2615D.

At 2615D, the Doppler Shift Information is processed to provide reconstructed carrier phase information 2620D. A filter 1524D (FIG. 15D) or some other type of integration logic 1522D (FIG. 15D) can be used to reconstruct carrier phase information based on Doppler Shift Information. Processing can proceed to 2625D.

At 2625D, raw pseudoranges 2630D are obtained from memory 210. The raw pseudoranges 2630D can be obtained from memory 210 where it was placed, for example, at 2615A (FIG. 26A). The raw pseudoranges 2630D are uncorrected and unsmoothed. The processing of the raw pseudoranges 2630D can proceed to 2635D.

At 2635D, the raw pseudoranges 2630D are smoothed using the reconstructed carrier phase information 2620D provided at 2615D. A filter 1534E (FIG. 15E) or the hatch logic 1532E (FIG. 15E) can be used for smoothing the raw pseudoranges 2630D with the reconstructed carrier phase information 2620D at 2635D. Processing of the smoothed uncorrected pseudoranges 2640D from 2635D proceeds to 2655D.

At 2655D, external corrections are optionally applied to the smoothed uncorrected pseudoranges 2640D. External corrections are pseudoranges corrections that can be obtained, for example, from a correction source such as at least correction service 221, FM radio distribution 226, or satellite radio distributor 227, or a combination thereof. According to one embodiment, a correction source is located outside of the cellular device (also referred to as an "external correction source," and, therefore, corrections from the correction source are referred to as "external corrections" or "external pseudorange corrections." Examples of external corrections include WAAS, SBAS, DGPS, PPP, RTK, VRS and RTX™ corrections. Processing proceeds to 2660D.

At 2660D, a determination is made as to whether external corrections were applied at 2655D. If corrections were applied, processing of the smoothed corrected pseudoranges 2670D proceeds from 2655D proceeds to 2671D. If corrections were not applied, processing of the smoothed uncorrected pseudoranges 2640D proceeds to 2661D.

At 2661D, a smoothed uncorrected position fix 2662D is determined based on the smoothed uncorrected pseudoranges 2640D. Processing proceeds to 2675D.

At 2675D, the smoothed uncorrected position fix 2650D can be additionally smoothed based on locally measured movement (LMM) information. The locally measured movement (LMM) information can be obtained from memory 210 at 2680D. The locally measured movement (LMM) information may be placed into memory 210 at either 2130 (FIG. 21) or 2240 (FIG. 22) or both 2130 and 2240. Processing of the additionally smoothed uncorrected position fix 2690D can proceed to 2692D.

At 2692D, the additionally smoothed uncorrected position fix 2690D can be provided to the user. If the position fix 2662D was not smoothed based on LMM at 2675D, then the smoothed uncorrected position fix 2662D can be provided to the user at 2692D. Processing proceeds back to 2605D.

At 2671D, a smoothed corrected position fix 2672D is determined based on the smoothed corrected pseudoranges 2670D. Processing proceeds to 2685D.

At 2685D, the smoothed corrected position fix 2670D can be additionally smoothed based on locally measured movement (LMM) information. The locally measured movement (LMM) information can be obtained from memory 210 at 2680D. The locally measured movement (LMM) information may be placed into memory 210 at either 2130 (FIG. 21) or 2240 (FIG. 22) or both 2130 and 2240. Processing of the additionally smoothed corrected position fix 2691D can proceed to 2693D.

At 2693D, the additionally smoothed corrected position fix 2691D can be provided to the user. If the position fix 2672D was not smoothed based on LMM information at 2685D, then the smoothed corrected position fix 2662D can be provided to the user at 2693D. Processing proceeds back to 2605D.

Figure 26E:
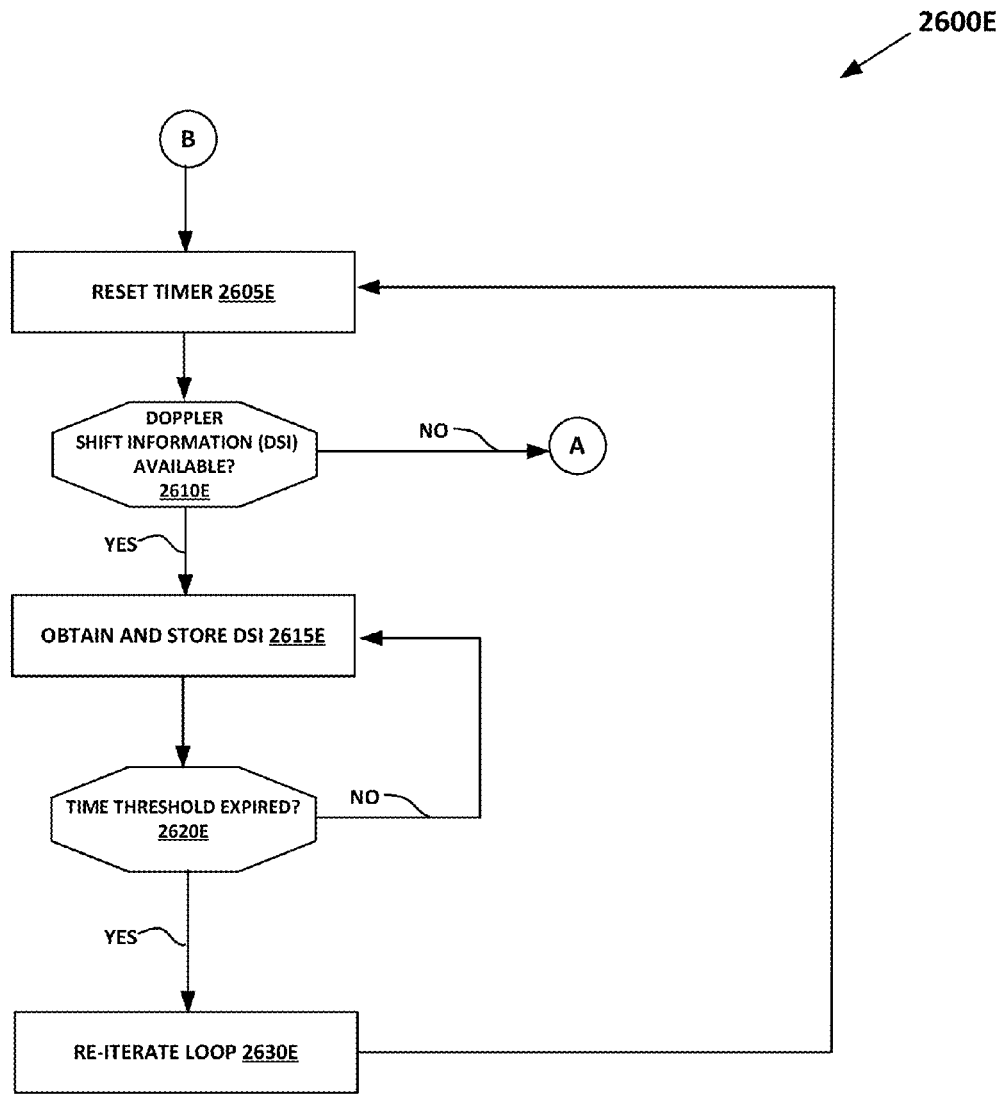
Figure 26F:
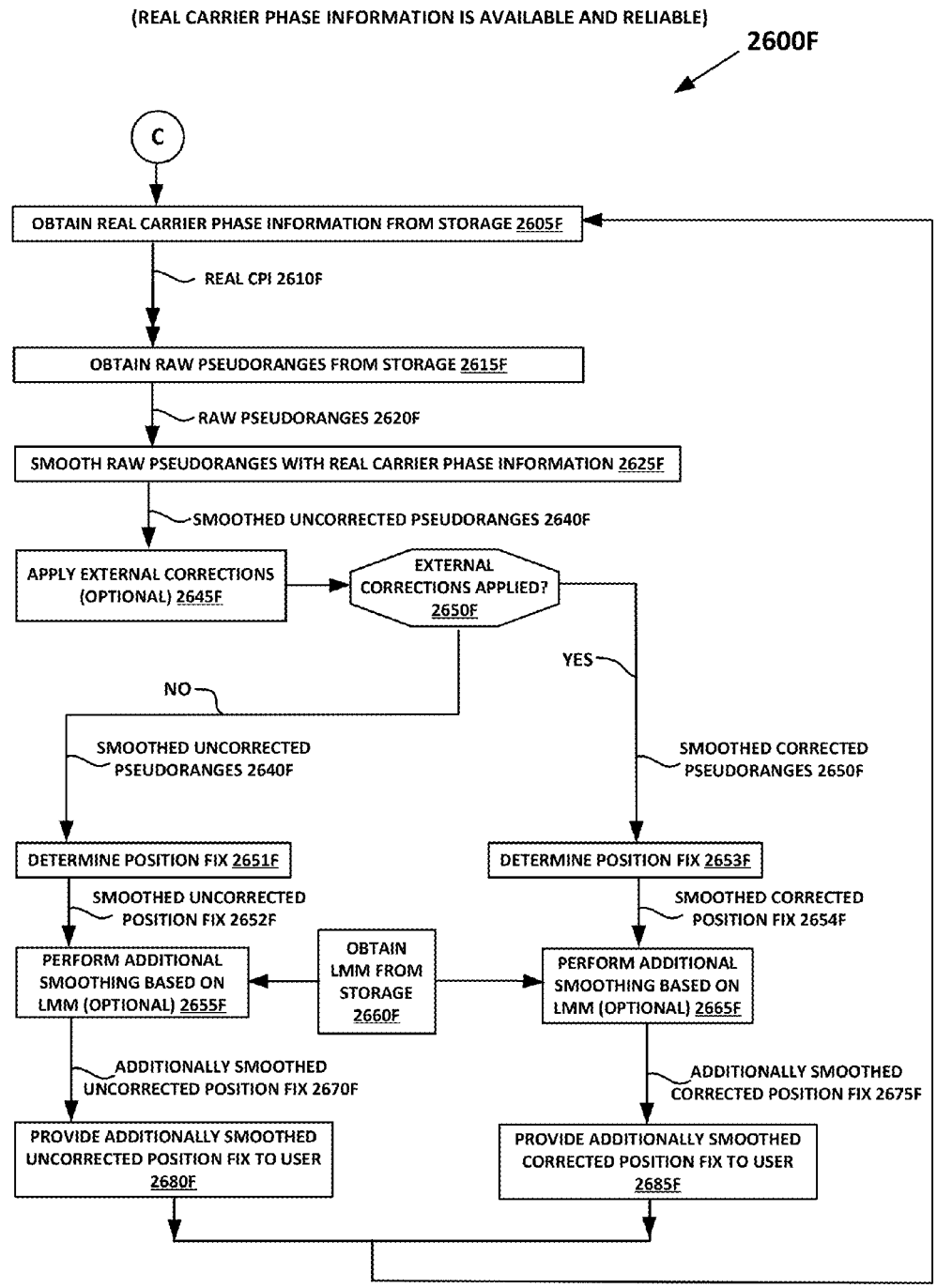

Referring to FIG. 26E, the flowchart 2600E can be performed concurrently with flowchart 2600D (FIG. 26D) to determine whether Doppler Shift Information becomes unreliable or unavailable and switch to processing raw pseudoranges without Doppler Shift Information. If enough, such as a predetermined amount, Doppler Shift Information is not obtained, then the already obtained Doppler Shift Information is not useful for smoothing. If enough Doppler Shift Information is obtained, the processing continues with flowchart 2600D.

For example, at 2605E, a timer is reset. For example, a timer that is checked at 2620E is reset. Processing proceeds to 2610E.

At 2610E, a determination is made as to whether Doppler Shift Information is available. If Doppler Shift Information is not available, then processing proceeds to flowchart 2600B on FIG. 26B. If enough, such as a predetermined amount, Doppler Shift Information is available, then processing proceeds to 2615E.

At 2615E, Doppler Shift Information is obtained and stored. For example, Doppler Shift information can continuously be extracted from the GNSS chipset 170 and stored in memory 210. Processing proceeds to 2620E.

At 2620E, a determination is made as to whether a time threshold has expired for obtaining Doppler Shift Information. If the time threshold for obtaining has not expired, then processing proceeds back to 2615E where additional Doppler Shift Information is obtained and stored. For example, additional Doppler shift information can be extracted from the GNSS chipset 170 and stored into memory 210. If the time threshold has expired, then enough Doppler Shift Information has been obtained, processing proceeds from 2630E and to 2605E where the loop in flowchart 2600E is reiterated.

Referring to FIG. 26F, at 2605F, Real Carrier Phase Information 2610F is obtained from memory 210. The Real Carrier Phase Information 2610F was placed into memory 210 at 2630A (FIG. 26A). The processing of the Real Carrier Phase Information 2610F proceeds to 2615F.

At 2615F, raw pseudoranges 2620F are obtained from memory 210. The raw pseudoranges 2620F were placed into memory 210 at 2615A (FIG. 26A). The processing of the raw pseudoranges 2620F can proceed to 2625F.

At 2625F, the raw pseudoranges 2620F are smoothed using the real carrier phase information 2610F provided at 2605F. A filter 1534E (FIG. 15E) or the hatch logic 1532E (FIG. 15E) can be used for smoothing the raw pseudoranges 2620F with the real carrier phase information 2610F at 2625F. The output of 2625F is smoothed uncorrected pseudoranges 2640F. Processing of the smoothed uncorrected pseudoranges 2640F proceeds from 2625F proceeds to 2645F.

At 2645F, external corrections are optionally applied to the smoothed uncorrected pseudoranges 2640F. External corrections are pseudorange corrections that can be obtained, for example, from a correction source such as at least correction service 221, FM radio distribution 226, or satellite radio distributor 227, or a combination thereof. According to one embodiment, a correction source is located outside of the cellular device, and, therefore, corrections from the correction source are referred to as "external corrections" or "external pseudorange corrections." Examples of external corrections include WAAS, SBAS, DGPS, PPP, RTK, VRS and RTX™ corrections. Processing proceeds to 2650F.

At 2650F, a determination is made as to whether external corrections were applied at 2645F. If corrections were applied, processing of the smoothed corrected pseudoranges 2650F proceeds from 2650F proceeds to 2653F. If corrections were not applied, processing of the smoothed uncorrected pseudoranges 2640F proceeds from 2650F to 2651F.

At 2651F, a smoothed uncorrected position fix 2652F is determined based on the smoothed uncorrected pseudoranges 2640F. Processing proceeds to 2655F.

At 2655F, the smoothed uncorrected position fix 2640F can be additionally smoothed based on locally measured movement (LMM) information. The locally measured movement (LMM) information can be obtained from memory 210 at 2660F. The locally measured movement (LMM) information may be placed into memory 210 at either 2130 (FIG. 21) or 2240 (FIG. 22) or both 2130 and 2240. Processing of the additionally smoothed uncorrected position fix 2670F can proceed to 2680F.

At 2680F, the additionally smoothed uncorrected position fix 2670F can be provided to the user. If the position fix 2652F was not smoothed based on LMM at 2655F, then the smoothed uncorrected position fix 2652F can be provided to the user at 2680F. Processing proceeds back to 2605F.

At 2653F, a smoothed corrected position fix 2654F is determined based on the smoothed corrected pseudoranges 2650F. Processing proceeds to 2665F.

At 2665F, the smoothed corrected position fix 2654F can be additionally smoothed based on locally measured movement (LMM) information. The locally measured movement (LMM) information can be obtained from memory 210 at 2660F. The locally measured movement (LMM) information may be placed into memory 210 at either 2130 (FIG. 21) or 2240 (FIG. 22) or both 2130 and 2240. Processing of the additionally smoothed corrected position fix 2675F can proceed to 2685F.

At 2685F, the additionally smoothed corrected position fix 2675F can be provided to the user. If the position fix 2654F is smoothed based on LMM information at 2665F, then the smoothed corrected position fix 2654F can be provided to the user at 2685F. Processing proceeds back to 2605F.

Figure 26G:
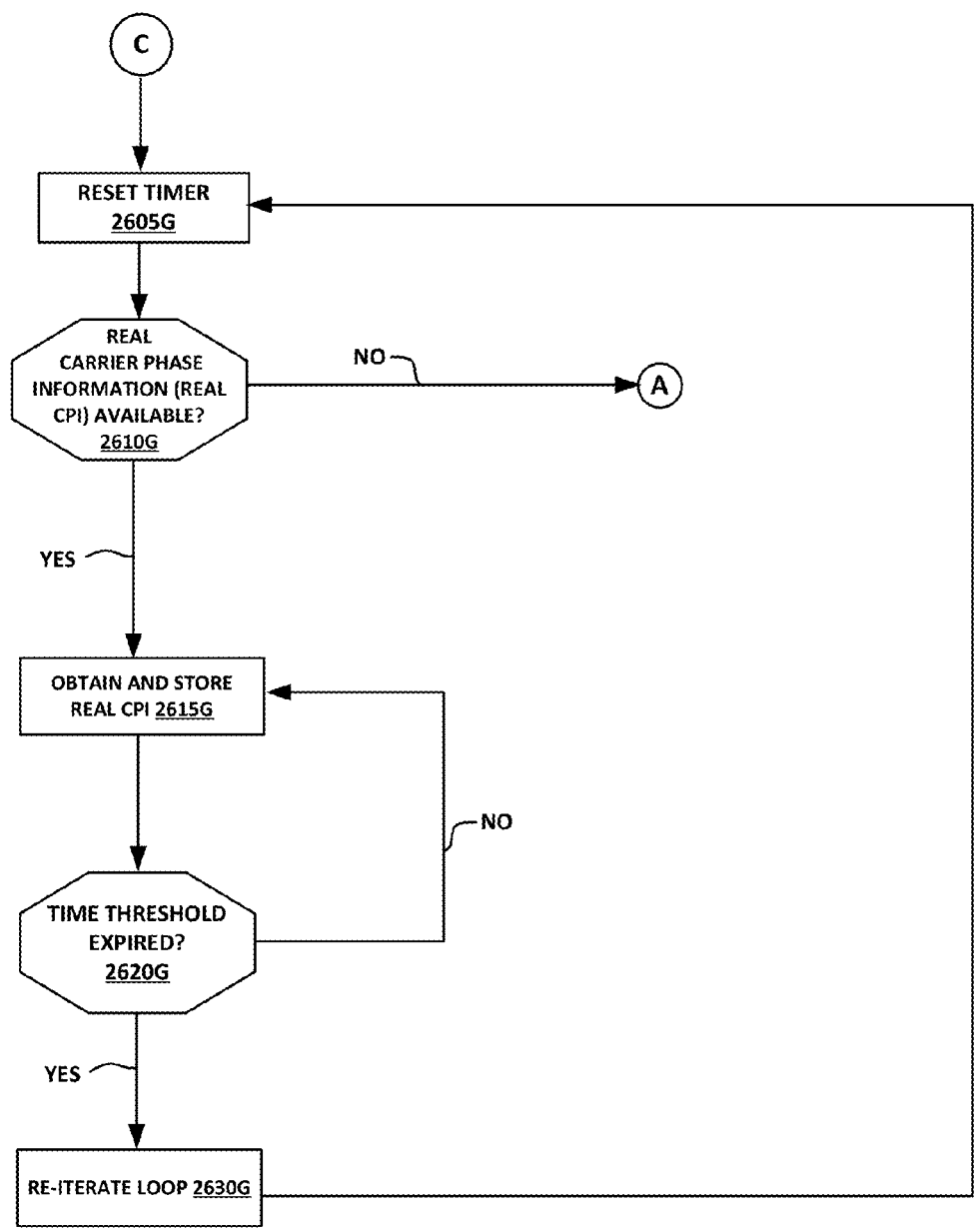

Referring to FIG. 26G, the flowchart 2600G can be performed concurrently with flowchart 2600F (FIG. 26F) to determine whether real carrier phase information becomes unreliable or unavailable and switch to processing raw pseudoranges without real carrier phase information. If enough carrier phase information is not obtained within a threshold of time, then the already obtained real carrier phase information is no longer sufficiently useful. If enough real carrier phase information is obtained within a threshold of time, the processing continues with flowchart 2600F.

For example, at 2605G, a timer is reset. For example, a timer that is checked at 2620G is reset. Processing proceeds to 2610G.

At 2610G, a determination is made as to whether real carrier phase information is available. If real carrier phase information is not available, then processing proceeds to flowchart 2600B on FIG. 26B. If real carrier phase information is available, then processing proceeds to 2615G.

At 2615G, real carrier phase information is obtained and stored. For example, real carrier phase information can continuously be extracted from the GNSS chipset 170 and stored in memory 210. Processing proceeds to 2620G.

At 2620G, a determination is made as to whether a time threshold has expired for obtaining real carrier phase information. If the time threshold for obtaining has not expired, then processing proceeds back to 2615G where additional real carrier phase information is obtained and stored. For example, real carrier phase information can continuously be extracted from the GNSS chipset 170 and stored in memory 210. If the time threshold has expired, then enough real carrier phase information has been obtained and processing proceeds to 2630G and to 2605G where the loop in flowchart 2600G is reiterated.

Various operations refer to obtaining raw observables, such as extracted raw pseudoranges, real carrier phase information, and Doppler Shift information, from memory 210. The raw observables may be obtained from memory 210 using a push method or pull method. The pull method is also referred to as "fetch."

The control logic 1520A (FIG. 15A) is responsible for directly performing the processing of flowcharts 14, 20-26G or indirectly coordinating the processing of flowcharts 14, 20-26G, according to various embodiments. An example of direct is when the control logic 1520A performs the processing itself. An example of indirect is when the control logic 1520A calls another entity to perform the processing. The control logic 1520A can call any one or more entities associated with a cellular device to perform the processing of flowcharts 14, 20A-26G indirectly. For example, the control logic 1520A may call at least one or more of the following to perform processing of flowcharts 14, 20-26G indirectly:

(1) pseudorange information extractor 142 to obtain and store raw pseudoranges, for example, at 2520 (FIG. 25), 1413 (FIG. 14), 2515A (FIG. 26A);

(2) accessing logic 1510A, 110B to extract and store information such as real carrier phase information, for example, at 2530 (FIG. 25), 2620C (FIG. 26C), 2615G (FIG. 26G), 1416 (FIG. 14), 2630A (FIG. 26A), Doppler Shift Information, for example, at 2530 (FIG. 25), 1418 (FIG. 14), 2635a (FIG. 26A), 2625C (FIG. 26C), 2615E (FIG. 26E), or external corrections, for example, at 2540 (FIG. 25), 1424 (FIG. 14), 2625B (FIG. 26B), 2655D (FIG. 26D), 2645F (FIG. 26F);

(3) carrier phase measurement extracting logic 112B-4 to obtain and store real carrier phase information, for example, at 2530 (FIG. 25), 2620C (FIG. 26C), 2615G (FIG. 26G), 1416 (FIG. 14), 2630A (FIG. 26A);

(4) doppler-e-logic 112B-3 to obtain and store Doppler Shift Information, for example, at 2530 (FIG. 25), 1418 (FIG. 14), 2635A (FIG. 26A), 2625C (FIG. 26C), 2615E (FIG. 26E);

(5) locally measured movement information accessing logic 1510B to obtain and store locally managed measurement (LMM) information, for example, at 2130 (FIG. 21), 2240 (FIG. 22);

(6) carrier phase reconstructing logic 1520C to reconstruct carrier phase information based on Doppler Shift Information, for example, at 1427 (FIG. 14), 2615D (FIG. 26D);

(7) real carrier phase logic 152B to perform smoothing based on real carrier phase information, for example, at 2530 (FIG. 25), 1428 (FIG. 14), 2625F (FIG. 26F);

(8) reconstructed carrier phase logic 152B to perform smoothing based on reconstructed Doppler Shift Information, for example, at 2530 (FIG. 25), 1421 (FIG. 14), 2635 (FIG. 26D);

(9) movement sensor position fix smoothing logic 1510C to perform smoothing based on LMM information, for example, at 2560 (FIG. 25), 1425 (FIG. 14), 2645B (FIG. 26B), 2650B (FIG. 26B), 2675D (FIG. 26D), 2685D (FIG. 26D), 2655F (FIG. 26F), 2665F (FIG. 26F);

(10) determining position fix logic 170B to determine position fixes based on inputs, such as raw pseudoranges, smoothed pseudoranges, smoothed corrected pseudoranges, smoothed uncorrected pseudoranges, for example, at 2550 (FIG. 25), 1423 (FIG. 14), 2631B (FIG. 26B), 2641B (FIG. 26B), 2661d (FIG. 26D), 2671D (FIG. 26D), 2651F (FIG. 26F), 2653F (FIG. 26F). The determining position fix logic 170B can perform a least squares error system to calculate the position fix;

(11) correction-logic 151 to apply external corrections, for example, at 2540 (FIG. 25), 1424 (FIG. 14), 2625B (FIG. 26B), 2655D (FIG. 26D), 2645F (FIG. 26F);

(12) accessing logic 1510A, 110B;

(13) processing logic 1550A, 150; and

(14) chipset accessor 141.

Referring to FIGS. 14, 21 and 22, according to various embodiments, different processes 1-6 can execute the following:

Process 1 for continuously extracting and storing raw pseudoranges. For example, process 1 could include operations 1411, 1412 and 1413, Process 2 for processing when neither real carrier phase information nor reconstructed carrier phase information is available. For example, process 2 could include operations 1416, 1418, 1424, 1423, 1425, 1426, Process 3 for processing when real carrier phase information is available. The real carrier phase information can be continuously obtained and stored into memory 210. The process 3 could include operations 1416, 1415, 1428, 1424, 1423, 1425, 1426, Process 4 for processing when Doppler Shift Information is available. The Doppler Shift information can be continuously obtained and stored into memory 210. The process 4 could include operations 1418, 1417, 1427, 1421, 1424, 1423, 1425, and 1426, Process 5 for continuously accessing and storing into memory 210 locally measured movement information from an ICD and handling ICD limiting factor. For example, process 5 could include operations 2120, 2125, 2130 and 2140 (FIG. 21), and Process 6 for continuously accessing and storing into memory 210 locally measured movement information from an accelerometer and handling accelerometer limiting factor. For example, process 6 could include operations 2220, 2230, 2240, 2250, and 2270.

According to various embodiments, two or more of processes 1-6 are executed concurrently. According to various embodiments, process 1 and one or more of processes 2-6 are executed concurrently. One or more hardware processors 109 can be used for executing one or more of processes 1-6.

Referring to FIGS. 14, 21, and 22, examples of combinations of processes that could be executed concurrently include at least:

Combination 1: processes 1, 2, 3, and 5 or 6,
Combination 2: processes 1, 2, 4, 5 and 6
Combination 3: processes 1, 2, 3, and 5 or 6,
Combination 4: processes 1, 2, 4, 5 and 6,
Combination 5: processes 1 and 5,
Combination 6: process 1 and 6,
Combination 7: process 1, 5 and 6,
Combination 8: process 1, 2 and 3,
Combination 9: process 1, 2 and 4.

Referring to FIGS. 21, 22, 26A-26G, according to various embodiments, different processes 1-6 can execute the following:

Process 1 for continuously extracting and storing raw pseudoranges into memory 210. For example, process 1 can include loop 2660A that is executed continuously, Process 2 for processing when neither real carrier phase information nor reconstructed carrier phase information is available. According to one embodiment, process 2 may include a process pair 2A and 2B. For example, process 2A may include flowchart 2600B and process 2B may include flowchart 2600C, Process 3 for processing when real carrier phase information is available. According to one embodiment, process 3 may include a process pair 3a and 3b. Process 3a may include operations 2620A, 2630A, 2640A, flowcharts 2600F for real carrier phase information. Process 3b may include flowchart 2600G, Process 4 for processing when Doppler Shift Information is available. According to one embodiment, process 4 includes a process pair 4a and 4B. Process 4A may include operations 2625A, 2635A, 2645A, flowchart 2600D for Doppler Shift Information. Process 4B may include flowchart 2600E, Process 5 for accessing and storing locally measured movement information from an ICD and handling ICD limiting factor. For example, process 5 could include operations 2120, 2125, 2130 and 2140 (FIG. 21), and Process 6 for accessing and storing locally measured movement information from an accelerometer and handling accelerometer limiting factor. For example, process 6 could include operations 2220, 2230, 2240, 2250, and 2270.

According to one embodiment, processes 2A and 2B are executed concurrently. According to one embodiment, processes 3A and 3B are executed concurrently. According to one embodiment, processes 4A and 4B are executed concurrently. According to various embodiments, two or more of processes 1-6 are executed concurrently. According to various embodiments, process 1 and one or more of processes 2-6 are executed concurrently. One or more hardware processors 109 can be used for executing one or more of processes 1-6.

Referring to FIGS. 21, 22, 26A-26G, examples of combinations of processes that could be executed concurrently include at least:
Combination 1: processes 1, 2A, 2B, 3A, 3B, and 5 or 6,
Combination 2: processes 1, 2A, 2B, 4A, 4B, 5 and 6
Combination 3: processes 1, 2A, 2B, 3A, 3B, and 5 or 6,
Combination 4: processes 1, 2A, 2B, 4A, 4B, 5 and 6,
Combination 5: processes 1 and 5,
Combination 6: process 1 and 6,
Combination 7: process 1, 5 and 6,
Combination 8: process 1, 2A, 2B, 3A, and 3B,
Combination 9: process 1, 2A, 2B, 4A, and 4B.

According to one embodiment, different continuously executing concurrent processes can be used for obtaining and storing various types of information. For example, a continuously executing process could be used for extracting raw pseudoranges and storing raw pseudoranges into memory 210. Another continuously executing process could be used for obtaining and storing into memory 210 real carrier phase information. Yet another continuously executing process could be used for obtaining and storing into memory 210 Doppler Shift Information. Yet still another continuously executing process could be used for obtaining and storing into memory LMM information from an accelerator. Yet still another continuously executing process could be used for obtaining and storing into memory 210, LMM information from an image capturing device. Yet one or more additional processes could be used to fetch or receive pushed information, such as extracted raw pseudorange information, real carrier phase information, Doppler Shift Information, and/or real carrier phase information to perform various types of processing, such as smoothing based on carrier phase information, reconstruct carrier phase information, apply external corrections, perform additional smoothing based on LMM information, performing decision logic, such as determining whether limiting factors have been exceeded, determining whether raw observables are available in sufficient amounts, and so on.

A combination of processes could be used for an entire work session, according to one embodiment. An example of a work session could be a period of time that the cellular device is being used to survey an area. Different combinations could be used during different subsets of a work session, according to another embodiment. For example, one combination could be used while the cellular device is unobstructed and capable of obtaining good signals and another combination could be used while the cellular device is obstructed. In another example, one combination could be used while both the accelerometer and the ICD are turned on and another combination could be used when one of the sensors becomes unavailable. These are just a few examples. Embodiments are well suited for other examples.

Figure 27A:
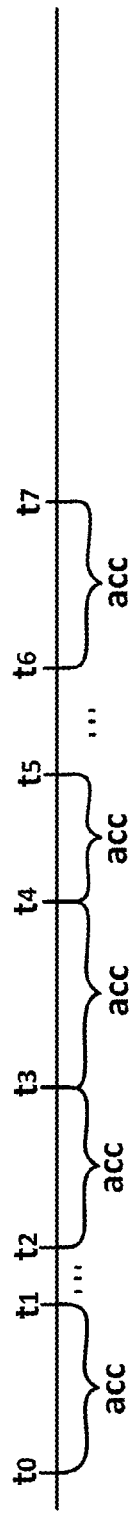
FIGS. 27A-27C are example timelines that demonstrate techniques for using various combinations of sensors and/or carrier phase smoothing concurrently over time for improving position determination of a cellular device using locally measured movement information, according to various embodiments.
Figure 27A:
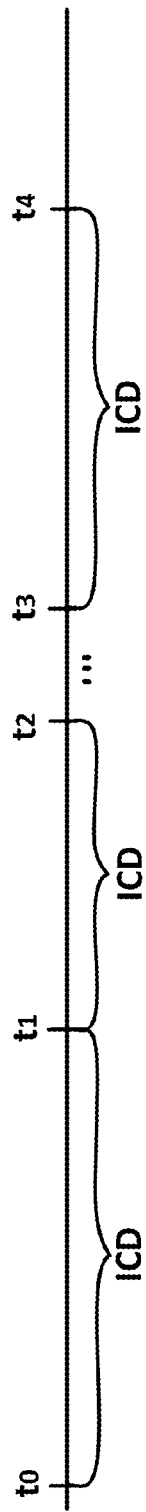
Figure 27B:
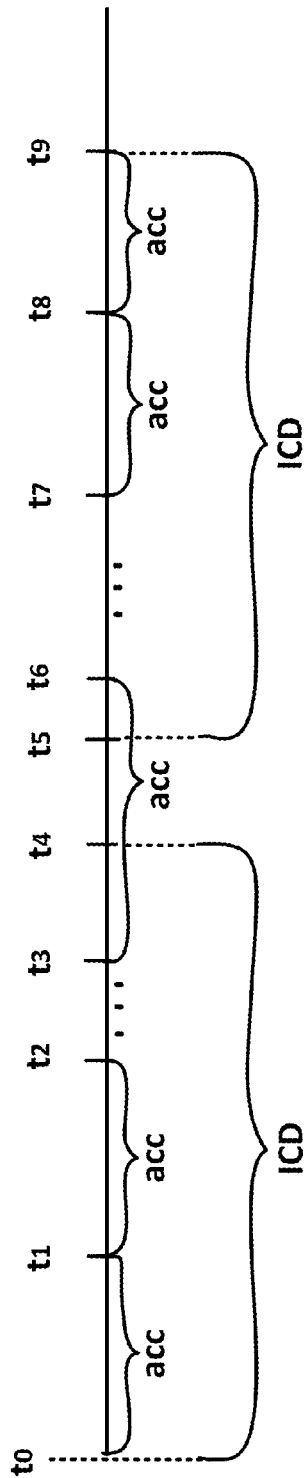
Figure 27B:
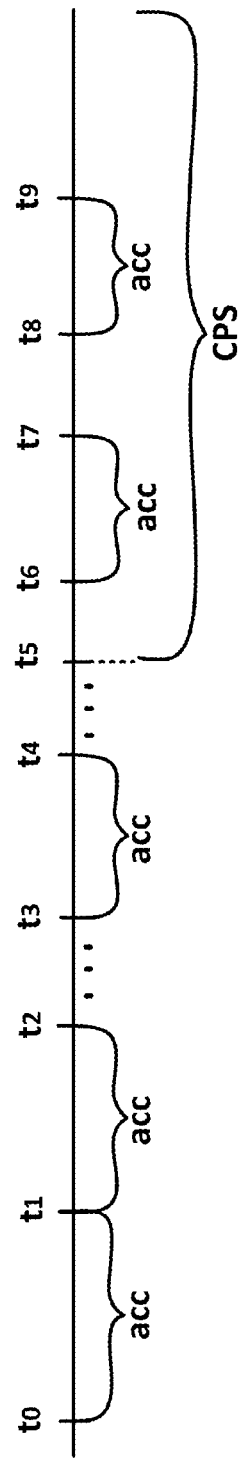
Figure 27C:
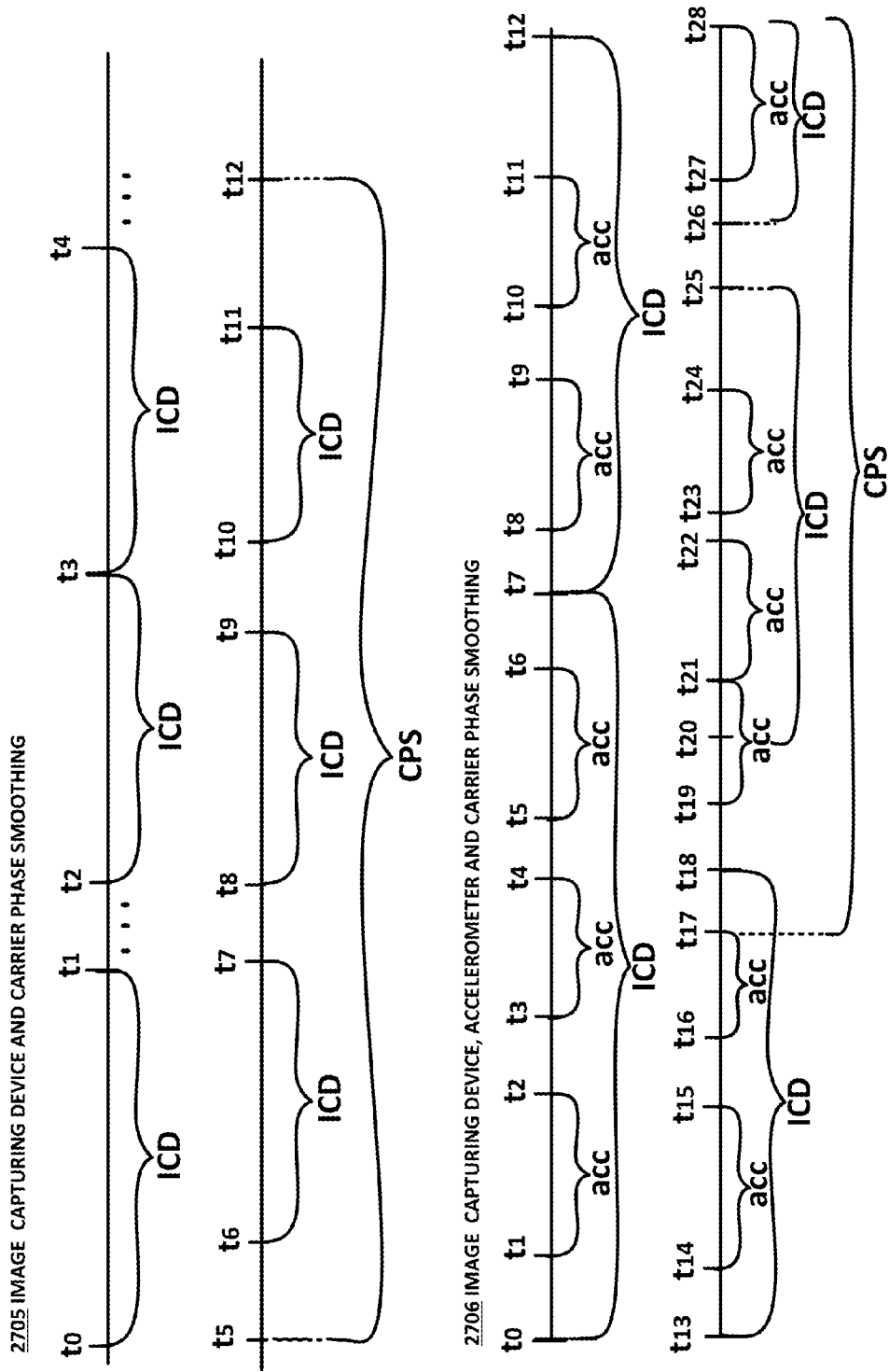

FIGS. 27A-27C are example timelines that demonstrate techniques for using various combinations of sensors and/or carrier phase smoothing concurrently over time for improving position determination of a cellular device using locally measured movement information, according to various embodiments.

The timelines depicted in FIGS. 27A-27C shall be discussed in the context of FIGS. 20A-26C.

Referring to timeline 2701 on FIG. 27A, an accelerometer (acc) and no carrier phase smoothing is used for improving position determination of a cellular device using locally measured movement information. For example, LMM information can be obtained from only an accelerometer (2460 on FIG. 24A) and no carrier phase smoothing (A in FIG. 26A) may be performed. The accelerometer is used for the time periods of t0-t1, t2-t5, t6-t7 to obtain movement information (2050A at FIG. 20A and 2240 at FIG. 22) and to improve position determination (2060A at FIG. 20A, 2570 at FIG. 25, 1420 at FIG. 14, 2260 at FIG. 22, 2600B at FIG. 26B). The accelerometer's limiting factor(s) is exceeded (2250 at FIG. 22) at t1, t3, t4, t5 and t7. The accelerometer is reset (2230 at FIG. 22) at times t0, t2, t3, t4 and t6. The accelerometer is not used during the time periods of t1-t2 and t5-t6.

Referring to timeline 2702 on FIG. 27A, the image capturing device (ICD) and no carrier phase smoothing is used for improving position determination of a cellular device using locally measured movement information. For example, LMM information is obtained from only the image capturing device (2470 on FIG. 24A) and no carrier phase smoothing is performed (A on FIG. 26A). The image capturing device is used for the time periods of t0-t1, t1-t2 and t3-t4 to obtain movement information (2130 at FIG. 21) and to improve position determination (2150 at FIG. 21, 2570 at FIG. 25, 1420 at FIG. 14, 2600B at FIG. 26B). The image capturing device's limiting factor(s) is exceeded (2140 at FIG. 21) at t1, t2 and t4. The image capturing device is reset (2125 at FIG. 21) at times t0, t1, and t3. The image capturing device is not used during the time period of t2-t3.

Referring to timeline 2703 of FIG. 27B, the accelerometer (acc), the image capturing device (ICD) and no carrier phase smoothing are used for improving position determination of a cellular device using locally measured movement information. For example, locally measured movement information from both the accelerometer and the image capturing device (2450 on FIG. 24A) with no carrier phase information (A on FIG. 26A) is used. The accelerometer is used for the time periods of t0-t1, t1-t2, t3-t6, t7-t8 and t8-t9 to obtain movement information (2240 at FIG. 22) and to improve position determination (2060A at FIG. 20A, 2570 at FIG. 25, 1420 at FIG. 14, 2260 at FIG. 22, 2600B at FIG. 26B). The accelerometer's limiting factor(s) is exceeded (2250 at FIG. 22) at t1, t2, t6, t8 and t9. The accelerometer is reset at times t0, t1, t3, t7 and t8.

The image capturing device is used for the time periods of t0-t4 and t5-t9 to obtain movement information (2130 at FIG. 21) and to improve position determination (2150 at FIG. 21, 2570 at FIG. 25, 1420 at FIG. 14, 2600B at FIG. 26B). The image capturing device's limiting factor(s) is exceeded (2140 at FIG. 21) at t4 and t9. The image capturing device is reset (2125 at FIG. 21) at times t0 and t5.

The use of the accelerometer and the image capturing device overlap for the time periods of t0-t2, t3-t4, t5-t6, and t7-t9. The accelerometer only is used from time t4-t5. Embodiments are well suited for periods of time when the image capturing device only is used for periods of time as well.

According to various embodiments, carrier phase smoothing, real or reconstructed, is not used immediately because it takes some time for carrier phase smoothing information with sufficient quality to be obtained. For example, it may take several 100s of seconds before the carrier phase smoothing information is useful. Therefore, according to various embodiments, one or more sensors may be used without carrier phase smoothing until the carrier phase smoothing information becomes useful.

Referring to timeline 2704 on FIG. 27A, an accelerometer (acc) and carrier phase smoothing (CPS) is used for improving position determination of a cellular device using locally measured movement information. For example, locally measured movement information from only the accelerometer (2460 on FIG. 24A) and carrier phase information (2620A or 2625A on FIG. 26A) are used. The carrier phase smoothing may be based on either reconstructed or real carrier phase information. As depicted in timeline 2704, the accelerometer is used for the time periods of t0-t1, t1-t2, t3-t4, t6-t7 and t8-t9 to obtain movement information (2240 at FIG. 22) and to improve position determination (2060A at FIG. 20A, 2570 at FIG. 25, 1420 at FIG. 14, 2260 at FIG. 22, either 2600D on FIG. 26D or 2600F on FIG. 26F). The accelerometer's limiting factor(s) is exceeded (2250 at FIG. 22) at t1, t2, t4, t7 and t9. The accelerometer is reset (2230 at FIG. 22) at times t0, t1, t3, t6 and t8. Carrier phase smoothing is used from time t5 on. The use of the accelerometer and carrier phase smoothing overlap during the time periods of t6-t7 and t8-t9. The accelerometer alone is used for the time periods of t0-t2 and t3-t4. Carrier phase smoothing alone is used for the time periods of t5-t6, t7-t8 and t9. No improvements are used from either the accelerometer or carrier phase smoothing during the time periods of t2-t3 and t4-t5.

Referring to timeline 2705 of FIG. 27C, the image capturing device (ICD) and carrier phase smoothing (CPS) are used for improving position determination of a cellular device using locally measured movement information. For example, locally measured movement information from only an ICD (2470 on FIG. 24A) and carrier phase information (either 2620A or 2625A on FIG. 26A) are used. As depicted in timeline 2705, the image capturing device is used for the time periods of t0-t1, t2-t3, t3-t4, t6-t7, t8-t9 and t10-t11 to obtain movement information (2130 at FIG. 21) and to improve position determination (2150 at FIG. 21, 2570 at FIG. 25, 1420 at FIG. 14, either 2600D or 2600F). The image capturing device's limiting factor(s) is exceeded (2140 at FIG. 21) at t1, t3, t4, t7, t9, and t11. The image capturing device is reset (2125 at FIG. 21) at times t0, t2, t3, t6, t8, and t10.

Carrier phase smoothing is used from time t5-t12. The use of the image capturing device and carrier phase smoothing overlap during the time periods of t6-t7, t8-t9 and t10-t11. In this illustration, carrier phase smoothing alone is used during the periods of t5-t6, t7-t8, t9-t10, t11-t12. Neither the image capturing device nor carrier phase smoothing is used during the period of t1-t2 and t4-t5.

Referring to timeline 2706 of FIG. 27C, the accelerometer (acc), the image capturing device (ICD) and carrier phase smoothing (CSP) are used for improving position determination of a cellular device using locally measured movement information. For example, locally measured movement information from both an accelerometer and an image capturing device (2450 on FIG. 24A) and carrier phase information (either 2620A or 2625A on FIG. 26A) are used. As depicted in timeline 2706, the accelerometer is used for the time periods of t1-t2, t3-t4, t5-t6, t8-t9, t10-t11, t14-t15, t16-t17, t19-t21, t21-t22, t23-t24, t27-t28 to obtain movement information (2240 at FIG. 22) and improve position determination (2060A at FIG. 20A, 2570 at FIG. 25, 1420 at FIG. 14, 2260 at FIG. 22, either 2600D on FIG. 26D or 2600F on FIG. 26F). The accelerometer's limiting factor(s) is exceeded (2250 at FIG. 22) at t2, t4, t6, t9, t11, t15, t17, t21, t22, t24, t28. The accelerometer is reset (2125 at FIG. 21) at times t1, t3, t5, t8, t10, t14, t16, t19, t21, t23 and t27.

The image capturing device is used for the time periods of t0-t7, t7-t12 t13-t18, t20-t25, t26-t28 to obtain movement information (2130 at FIG. 21) and to improve position determination (2150 at FIG. 21, 2570 at FIG. 25, 1420 at FIG. 14, either 2600D or 2600F). The image capturing device's limiting factor(s) is exceeded (2140 at FIG. 21) at t7, t12, t18, t25 and t28. The image capturing device is reset (2125 at FIG. 21) at times t0, t7, t13, t20, t26. Carrier phase smoothing is used from time t17 on.

The image capturing device alone is used for the time periods of t0-t1, t2-t3, t4-t5, t6-t8, t9-t10, t11-t12, t13-t14, t15-t16. The accelerometer and the image capturing device are used together during the time periods of t1-t2, t3-t4, t5-t6, t8-t9, t10-t11, t14-t15, t16-t17. Carrier phase smoothing and the image capturing device without the accelerometer are used during the periods of t17-t18, t24-t25 and t26-t27.

Carrier phase smoothing and the accelerometer without the image capturing device are used during the period of t19-t20. The use of the image capturing device, the accelerometer and carrier phase smoothing overlap during the periods of t20-t22, t23-t24 and t27-t28. Carrier phase smoothing alone is used during the periods of t18-t19 and t25-t26.

Any one or more of the operations depicted in flowcharts 1400, 1900-2600G can be performed by the hardware processor 109 that is located in the cellular device 1500A, 1500J, 1600, 1700 and outside of the GNSS chipset 170 embedded in the cellular device.

According to various embodiments, the applying of LMM information to position fixes is performed automatically and on the fly.

According to one embodiment, a method of improving position determination of a cellular device 1500A, 1500J, 1600, 1700 using locally measured movement is provided. For example, a Global Navigation Satellite System (GNSS) chipset 170 embedded within the cellular device 1500A, 1500J, 1600, 1700 is accessed where the GNSS chipset 170 calculates raw pseudoranges. The raw pseudoranges are extracted from the GNSS chipset 170 for processing elsewhere in the cellular device 1500A, 1500J, 1600, 1700 outside of the GNSS chipset 170. A position fix is calculated (2040A, FIG. 20A) based on the raw pseudoranges. At a first point in time, a first image is obtained with an image capturing device that is in a known physical relationship with the cellular device. At a second point in time, a second image is obtained with the image capturing device 1540G. Examples of a first point in time could be any point in time depicted in FIGS. 27A-27C that the image capturing device 1540G (ICD) is being used. Examples of a second point in time could be any point in time depicted in FIGS. 27A-27C that is subsequent to the first point in time. An estimate of a distance that the cellular device 1500A, 1500J, 1600, 1700 moved from the first point in time to the second point in time is calculated by processing image data collected for the time frame from the first time to the second time. Various embodiments described herein, provide for processing the position fix based on the estimate of the distance. he accessing, the extracting, the calculating of the position fix, the obtaining the first image, the obtaining the second image, the calculating of the estimate, and the processing of the position fix are performed by one or more hardware processors 109 located in the cellular device and outside of the GNSS chipset 170.

According to various embodiments, the calculating of the estimate of the distance that the cellular device moved from the first point in time to the second point in time by processing image data collected for the time frame from the first point in time to the second point in time further comprises replacing a set of image data related to at least five key-points included in the first image related to at least five same key-points included in the second image.

According to various embodiments, the obtaining, at the first point in time, of the first image with the image capturing device further comprises calibrating the image capturing device to correct the image for lens distortion, the lens distortion selected from a group consisting of a principal distance distortion, a focal length, a principal point offset, a radial distortion, and a tangential distortion.

According to various embodiments, the position fix is a current position fix of the cellular device and wherein the method further comprises: obtaining a set of images 1 to n using the image capturing device from at least the first point in time to the second point in time, each image of the set of images 1 to n includes a set of image data and images 1 to n−1 has at least one respective subsequent image and images 2 to n has at least one respective previous image; calculating position fix estimates of positions of the cellular device between the first point in time and the second point in time by replacing a set of image data included in an image with a set of image data included in a respective subsequent image; determining a previous position fix, based on previous raw pseudoranges, wherein the previous position fix correlates with a position of the cellular device at a time that is less than or equal to the second point in time; and determining the estimate of the distance based on the previous position fix and at least one of the position fix estimates.

According to various embodiments, the method further comprises collecting position fixes from the first point in time to the second point in time; collecting synchronized video that includes a plurality of images from the first point in time to the second point time; initializing an image processing algorithm; locating correspondences; performing a sequential rolling bundle adjustment; adding new locally measured movement information from new images and the new images are taken with the cellular device; and adding new position fixes based on the new measurements, where the collecting of position fixes, the collecting of synchronized video, the initializing of the image processing algorithm, the locating of correspondences, the performing of the sequential rolling bundle adjustment, the adding of new locally measured movement information and the adding of new position fixes are performed by the one or more hardware processors.

According to various embodiments, at the first point in time, first accelerometer data is obtained from an accelerometer 1502A that is part of the cellular device 1500A, 1500J, 1600, 1700. At the second point in time, second accelerometer data is obtained from the accelerometer 1502A. A second estimate of the distance is calculated based on the first accelerometer data and the second accelerometer data. A third estimate is determined by blending the first estimate and the second estimate using any type of filter described herein. The obtaining of the first accelerometer data, the obtaining of the second accelerometer data, the calculating of the second estimate and the determining of the third estimate are performed by the one or more hardware processors 109.

According to one embodiment, a previous position fix of the cellular device 1500A, 1500J, 1600, 1700 is determined for the first point in time based on previous raw pseudoranges and a current position fix is determined for the second point in time based on current raw pseudoranges. Referring to FIG. 18E, P7 is an example of a previous position fix and P8 is an example of a current position fix. Still referring to FIG. 18E, a position fix distance $\Delta P_{87}$ is determined that is the difference between the current position fix P8 and the previous position fix P7. A second difference $\Delta P$ is determined between the estimate of the distance D8 and the position fix distance $\Delta P_{87}$. If the second difference $\Delta P$ exceeds a metric threshold 1820E, the current position fix P8 is discarded. The extracting of the previous raw pseudoranges, the determining of the previous position fix, the determining of the position fix distance, the determining of the second difference and the discarding of the current position fix are performed by the one or more hardware processors 109. Still referring to FIG. 18E, a trajectory of movement of the cellular device 1500A, 1500J, 1600, 1700 is determined based on two or more position fixes P(ti−2), P(ti−1), which are previous to the current position fix P8, of the cellular device. A new position fix $P_{EST}(ti)$ is interpolated based on the estimate of the distance D8 and the trajectory.

FIGS. 14, 19-26G depict flowcharts 1400, 1900-2600G, according to one embodiment. Although specific operations are disclosed in flowcharts 1400, 1900-2600G, such operations are exemplary. That is, embodiments of the present invention are well suited to performing various other operations or variations of the operations recited in flowcharts 1400, 1900-2600G. It is appreciated that the operations in flowcharts 1400, 1900-2600G may be performed in an order different than presented, and that not all of the operations in flowcharts 1400, 1900-2600G may be performed.

The operations depicted in FIGS. 14, 19-26G transform data or modify data to transform the state of a cellular device 1500A, 1500J, 1600, 1700. For example, by extracting pseudorange information from a GNSS chipset 170 for use elsewhere, the state of the cellular device 1500A, 1500J, 1600, 1700 is transformed, for example, from a cellular device that is not capable of determining a position fix itself into a cellular device that is capable of determining a position fix itself. In another example, operations depicted in flowcharts 1400, 1500J, 1900-2600G transform the state of a cellular device 1500A, 1500J, 1600, 1700 from not being capable of providing an improved accuracy position fix 1560C to being capable of providing an improved accuracy position fix 1560C.

The above illustration is only provided by way of example and not by way of limitation. There are other ways of performing the method described by flowcharts 1400, 1900-2600G.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of computer readable instructions (e.g., software program) that reside within non-transitory computer readable storage memory of a cellular device 1500A, 1500J, 1600, 1700 (FIGS. 15A-17) and are executed by a hardware processor of the cellular device 1500A, 1500J, 1600, 1700. When executed, the instructions cause a computer system to implement the functionality of various embodiments of the present invention. For example, the instructions can be executed by a central processing unit 109 associated with the cellular device 1500A, 1500J, 1600, 1700. According to one embodiment, the non-transitory computer readable storage medium is tangible. Instructions for any one or more of the operations depicted in or described in the context of FIGS. 14-33 could be stored in the non-transitory computer readable storage medium.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause the cellular device 1500A, 1500J, 1600, 1700 to implement the functionality of various embodiments. For example, according to one embodiment, the SUPL client 1501A and the operations depicted or described in the context of FIG. 14-33 are implemented with computer readable instructions that are stored on computer readable storage medium, which can be tangible or non-transitory or a combination thereof, and can be executed by a hardware processor 109 of a cellular device 1500A, 1500J, 1600, 1700.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of improving position determination of a cellular device using locally measured movement, the method comprising:
    accessing a Global Navigation Satellite System (GNSS) chipset embedded within the cellular device, wherein the GNSS chipset calculates raw pseudoranges;
    extracting the raw pseudoranges from the GNSS chipset for processing elsewhere in the cellular device outside of the GNSS chipset;
    calculating a position fix based on the raw pseudoranges;
    obtaining, at a first point in time, a first image with an image capturing device that is in a known physical relationship with the cellular device;
    obtaining, at a second point in time, a second image with the image capturing device;
    calculating an estimate of a distance that the cellular device moved from the first point in time to the second point in time by processing image data collected for a time frame from the first point in time to the second point in time; and
    processing the position fix based on the estimate of the distance,
    wherein the accessing, the extracting, the calculating of the position fix, the obtaining the first image, the obtaining the second image, the calculating of the estimate, and the processing of the position fix are performed by one or more hardware processors located in the cellular device and outside of the GNSS chipset.

2. The method as recited by claim 1, wherein the estimate is a first estimate and wherein the method further comprises:
    obtaining, at the first point in time, first accelerometer data from an accelerometer that is part of the cellular device;
    obtaining, at the second point in time, second accelerometer data from the accelerometer;
    calculating a second estimate of the distance based on the first accelerometer data and the second accelerometer data; and
    determining a third estimate by blending the first estimate and the second estimate using a filter,
    wherein the obtaining of the first accelerometer data, the obtaining of the second accelerometer data, the calculating of the second estimate and the determining of the third estimate are performed by the one or more hardware processors.

3. The method as recited by claim 1, wherein the processing of the position fix further comprises:
    determining whether to discard the position fix based on the estimate of the distance; and
    if the position fix is discarded,
        interpolating a new position fix based on the distance and two or more position fixes that precede the discarded position fix; and
        replacing the discarded position fix with the new position fix,
    wherein the determining whether to discard, the interpolating and the replacing are performed by the one or more hardware processors.

4. The method as recited by claim 3, wherein the raw pseudoranges are current raw pseudoranges, wherein the position fix is a current position fix at the second point in time, and wherein the method further comprises:
    extracting previous raw pseudoranges from the GNSS chipset, wherein the previous raw pseudoranges are extracted before the current raw pseudoranges are extracted;
    determining a previous position fix, for the first point in time, based on the previous raw pseudoranges;
    determining a position fix distance that is a difference between the current position fix and the previous position fix;
    determining a second difference between the estimate of the distance and the position fix distance; and
    if the second difference exceeds a metric threshold, discarding the current position fix, wherein the extracting of the previous raw pseudoranges, the determining of the previous position fix, the determining of the position fix distance, the determining of the second difference and the discarding of the current position fix are performed by the one or more hardware processors.

5. The method as recited by claim 4, wherein the position fix is a current position fix of the cellular device and wherein the interpolating of the new position fix further comprises:
determining a trajectory of movement of the cellular device based on two or more position fixes, which are previous to the current position fix, of the cellular device; and
interpolating the new position fix based on the estimate of the distance and the trajectory.

6. The method as recited by claim 1, wherein the calculating of the estimate of the distance that the cellular device moved from the first point in time to the second point in time by processing image data collected for the time frame from the first point in time to the second point in time further comprises:
replacing a set of image data related to at least five key-points included in the first image with a set of image data related to at least five same key-points included in the second image.

7. The method as recited by claim 1, wherein the obtaining, at the first point in time, of the first image with the image capturing device further comprises:
calibrating the image capturing device to correct the image for lens distortion, the lens distortion selected from a group consisting of a principal distance distortion, a focal length, a principal point offset, a radial distortion, and a tangential distortion.

8. The method as recited by claim 1, wherein the calculating the estimate of the distance that the cellular device moved from the first point in time to the second point in time by processing image data collected for the time frame from the first point in time to the second point in time further comprises:
calculating the estimate of the distance that the cellular device moved from the first point in time to the second point in time by processing image data collected for the time frame from the first point in time to the second point in time using a sequential rolling bundle adjustment algorithm.

9. The method as recited by claim 1, wherein the position fix is a current position fix of the cellular device and wherein the method further comprises:
obtaining a set of images 1 to n using the image capturing device from at least the first point in time to the second point in time, each image of the set of images 1 to n includes a set of image data and images 1 to n−1 has at least one respective subsequent image and images 2 to n has at least one respective previous image;
calculating position fix estimates of positions of the cellular device between the first point in time and the second point in time by replacing a set of image data included in an image with a set of image data included in a respective subsequent image;
determining a previous position fix, based on previous raw pseudoranges, wherein the previous position fix correlates with a position of the cellular device at a time that is less than or equal to the second point in time; and
determining the estimate of the distance based on the previous position fix and at least one of the position fix estimates.

10. A system for improving position determination of a cellular device using locally measured movement, the system comprising:
accessing logic that accesses a Global Navigation Satellite System (GNSS) chipset embedded within the cellular device, wherein the GNSS chipset calculates raw pseudoranges;
extracting logic that extracts the raw pseudoranges from the GNSS chipset for processing elsewhere in the cellular device outside of the GNSS chipset;
position fix determining logic that calculates a position fix based on the raw pseudoranges;
image capturing device movement information accessing logic that obtains, at a first point in time, a first image with an image capturing device that is in a known physical relationship with the cellular device and that obtains, at a second point in time, a second image with the image capturing device; and
processing logic that calculates an estimate of a distance that the cellular device moved from the first point in time to the second point in time by processing image data collected for a time frame from the first point in time to the second point in time, and that processes the position fix based on the estimate of the distance,
wherein the accessing logic, the extracting logic, the image capturing device movement information accessing logic and the processing logic are performed by one or more hardware processors located in the cellular device and outside of the GNSS chipset.

11. The system of claim 10, wherein the image capturing device is selected from a group consisting of: a digital camera, a digital video camera, a digital camcorder, a stereo digital camera, a stereo video camera, a motion picture camera, and a television camera.

12. The system as recited by claim 10, wherein the processing logic further comprises logic that:
determines whether to discard the position fix based on the estimate of the distance; and
if the position fix is discarded,
interpolates a new position fix based on the distance and two or more position fixes that precede the discarded position fix; and
replaces the discarded position fix with the new position fix.

13. The system as recited by claim 12, wherein the raw pseudoranges are current raw pseudoranges, wherein the position fix is a current position fix at the second point in time, and wherein:
the extracting logic further comprises logic that extracts previous raw pseudoranges from the GNSS chipset, wherein the previous raw pseudoranges are extracted before the current raw pseudoranges are extracted;
the position fix determining logic further comprises logic that determines a previous position fix, for the first point in time, based on the previous raw pseudoranges; and
the processing logic further comprises logic that determines a position fix distance that is a difference between the current position fix and the previous position fix and determines a difference between the estimate of the distance and the position fix distance, and if the difference exceeds a metric threshold, discards the current position fix.

14. The system as recited by claim 13, wherein the position fix is a current position fix of the cellular device and wherein the processing logic further comprises logic that:

determines a trajectory of movement of the cellular device based on two or more position fixes, which are previous to the current position fix, of the cellular device; and interpolates the new position fix based on the estimate of the distance and the trajectory.

15. The system as recited by claim 10, wherein the processing logic further comprises logic that:

replaces a set of image data related to at least five key-points included in the first image with a set of image data related to at least five same key-points included in the second image as a part of calculating the estimate of the distance.

16. The system as recited by claim 10, wherein image capturing device movement information accessing logic further comprises logic that:

calibrates the image capturing device to correct the image for lens distortion, the lens distortion selected from a group consisting of a principal distance distortion, a focal length, a principal point offset, a radial distortion, and a tangential distortion.

17. The system as recited by claim 10, wherein the processing logic further comprises logic that:

calculates the estimate of the distance that the cellular device moved from the first point in time to the second point in time by processing image data collected for the time frame from the first point in time to the second point in time using a sequential rolling bundle adjustment algorithm.

18. The system as recited by claim 10, wherein the cellular device comprises a cellular communication enabled mobile communications device.

19. A non-transitory computer readable storage medium having computer readable instructions stored thereon for causing a computer system to perform a method of improving position determination of a cellular device using locally measured movement, the method comprising:

accessing a Global Navigation Satellite System (GNSS) chipset embedded within the cellular device, wherein the GNSS chipset calculates raw pseudoranges;

extracting the raw pseudoranges from the GNSS chipset for processing elsewhere in the cellular device outside of the GNSS chipset;

calculating a position fix based on the raw pseudoranges;

obtaining, at a first point in time, a first image with an image capturing device that is in a known physical relationship with the cellular device;

obtaining, at a second point in time, a second image with the image capturing device;

calculating an estimate of a distance that the cellular device moved from the first point in time to the second point in time by processing image data collected for a time frame from the first point in time to the second point in time; and processing the position fix based on the estimate of the distance, wherein the accessing, the extracting, the calculating of the position fix, the obtaining the first image, the obtaining the second image, the calculating of the estimate, and the processing of the position fix are performed by one or more hardware processors located in the cellular device and outside of the GNSS chipset.

20. The non-transitory computer readable storage medium as recited by claim 19, wherein the calculating the estimate of the distance that the cellular device moved from the first point in time to the second point in time by processing image data collected for the time frame from the first point in time to the second point in time further comprises:

calculating the estimate of the distance that the cellular device moved from the first point in time to the second point in time by processing image data collected for the time frame from the first point in time to the second point in time using a sequential rolling bundle adjustment algorithm.

21. The non-transitory computer readable storage medium as recited by claim 19, wherein the processing of the position fix further comprises:

determining whether to discard the position fix based on the estimate of the distance; and if the position fix is discarded, interpolating a new position fix based on the distance and two or more position fixes that precede the discarded position fix; and replacing the discarded position fix with the new position fix, wherein the determining whether to discard, the interpolating and the replacing are performed by the one or more hardware processors.

22. The non-transitory computer readable storage medium as recited by claim 19, wherein the method further comprises:

collecting position fixes from the first point in time to the second point in time;

collecting synchronized video that includes a plurality of images from the first point in time to the second point time;

initializing an image processing algorithm;

locating correspondences;

performing sequential rolling bundle adjustment;

adding new locally measured movement information from new images, wherein the new images are taken with the cellular device; and adding new position fixes based on the new measurements, wherein the collecting of the position fixes, the collecting of synchronized video, the initializing of the image processing algorithm, the locating of correspondences, the performing of the sequential rolling bundle adjustment, the adding of new locally measured movement information and the adding of new position fixes are performed by the one or more hardware processors.

\* \* \* \* \*